(12) United States Patent
Sakamoto et al.

(10) Patent No.: US 12,479,834 B2
(45) Date of Patent: Nov. 25, 2025

(54) PHENOL COMPOUND OR SALT THEREOF

(71) Applicant: TAIHO PHARMACEUTICAL CO., LTD., Tokyo (JP)

(72) Inventors: Toshihiro Sakamoto, Ibaraki (JP); Hideki Kazuno, Ibaraki (JP); Hitomi Kondo, Ibaraki (JP); Tomohiro Yamamoto, Ibaraki (JP); Tetsuya Sugimoto, Ibaraki (JP)

(73) Assignee: TAIHO PHARMACEUTICAL CO., LTD., Tokyo (JP)

( * ) Notice: Subject to any disclaimer, the term of this patent is extended or adjusted under 35 U.S.C. 154(b) by 802 days.

(21) Appl. No.: 17/780,591

(22) PCT Filed: Dec. 6, 2019

(86) PCT No.: PCT/JP2019/047732
§ 371 (c)(1),
(2) Date: May 27, 2022

(87) PCT Pub. No.: WO2021/106230
PCT Pub. Date: Jun. 3, 2021

(65) Prior Publication Data
US 2023/0049402 A1 Feb. 16, 2023

(30) Foreign Application Priority Data
Nov. 29, 2019 (JP) ................. 2019-216496

(51) Int. Cl.
| C07D 405/12 | (2006.01) |
| C07D 205/04 | (2006.01) |
| C07D 401/12 | (2006.01) |
| C07D 401/14 | (2006.01) |
| C07D 403/12 | (2006.01) |
| C07D 409/12 | (2006.01) |
| C07D 413/12 | (2006.01) |
| C07D 417/10 | (2006.01) |

(52) U.S. Cl.
CPC ......... *C07D 405/12* (2013.01); *C07D 205/04* (2013.01); *C07D 401/12* (2013.01); *C07D 401/14* (2013.01); *C07D 403/12* (2013.01); *C07D 409/12* (2013.01); *C07D 413/12* (2013.01); *C07D 417/10* (2013.01)

(58) Field of Classification Search
CPC .. C07D 205/04; C07D 401/12; C07D 401/14; C07D 403/12; C07D 405/12; C07D 409/12; C07D 413/12; C07D 417/10
See application file for complete search history.

(56) References Cited

U.S. PATENT DOCUMENTS

| 4,034,075 A | 7/1977 | Bays et al. |
| 9,840,516 B2 | 12/2017 | Li et al. |
| 10,125,134 B2 | 11/2018 | Blake et al. |
| 10,144,724 B2 | 12/2018 | Li et al. |
| 10,556,906 B2 | 2/2020 | Kuramoto et al. |
| 10,662,204 B2 | 5/2020 | Planken et al. |
| 10,988,485 B2 | 4/2021 | Minatti et al. |
| 11,045,484 B2 | 6/2021 | Wurz et al. |
| 11,090,304 B2 | 8/2021 | Allen et al. |
| 11,096,939 B2 | 8/2021 | Booker et al. |
| 11,299,491 B2 | 4/2022 | Parsons et al. |
| 11,453,683 B1 | 9/2022 | Wang et al. |
| 11,459,327 B1 | 10/2022 | Lv et al. |
| 11,530,218 B2 | 12/2022 | Zhao et al. |
| 11,697,657 B2 | 7/2023 | Bharathan et al. |
| 11,932,633 B2 | 3/2024 | Marx et al. |
| 12,208,099 B2 | 1/2025 | Aranda et al. |
| 2006/0135532 A1 | 6/2006 | Bryant et al. |
| 2010/0331305 A1 | 12/2010 | Bergeron et al. |
| 2014/0275070 A1 | 9/2014 | Grembecka et al. |
| 2014/0288045 A1 | 9/2014 | Ren et al. |
| 2014/0371203 A1 | 12/2014 | Madge et al. |
| 2015/0176010 A1 | 6/2015 | Wersinger |
| 2015/0239900 A1 | 8/2015 | Li et al. |
| 2015/0246934 A1 | 9/2015 | Bensen et al. |

(Continued)

FOREIGN PATENT DOCUMENTS

| CN | 104011054 A | 8/2014 |
| CN | 107556289 A | 1/2018 |

(Continued)

OTHER PUBLICATIONS

D.S. Hong, et al., "KRASG12C Inhibition with Sotorasib in Advanced Solid Tumors", The New England Journal of Medicine, vol. 383 No. 13 pp. 1207-1217 (2020).

(Continued)

*Primary Examiner* — D Margaret M Seaman
(74) *Attorney, Agent, or Firm* — Venable LLP

(57) ABSTRACT

The present invention provides a phenol compound represented by the following Formula (I) or a salt thereof:

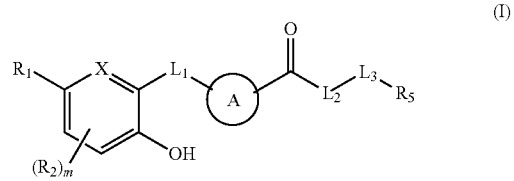

wherein $R_1$, $R_2$, $R_5$, $L_1$, $L_2$, $L_3$, A, X, and m are as described in the specification.

20 Claims, No Drawings

(56) References Cited

U.S. PATENT DOCUMENTS

| | | |
|---|---|---|
| 2016/0046647 A1 | 2/2016 | Grembecka et al. |
| 2016/0108019 A1 | 4/2016 | Li et al. |
| 2016/0137665 A1 | 5/2016 | Grembecka et al. |
| 2016/0152634 A1 | 6/2016 | Madge et al. |
| 2016/0159738 A1 | 6/2016 | Ren et al. |
| 2016/0297774 A1 | 10/2016 | Li et al. |
| 2016/0318866 A1 | 11/2016 | Becker-Pelster et al. |
| 2017/0131278 A1 | 5/2017 | Patricelli et al. |
| 2017/0197945 A1 | 7/2017 | Li et al. |
| 2017/0253611 A1 | 9/2017 | Grembecka et al. |
| 2018/0072723 A1 | 3/2018 | Blake et al. |
| 2018/0118757 A1 | 5/2018 | Li et al. |
| 2018/0127396 A1 | 5/2018 | Li et al. |
| 2018/0141927 A1 | 5/2018 | Li et al. |
| 2018/0162812 A1 | 6/2018 | Ren et al. |
| 2018/0177767 A1 | 6/2018 | Lanman et al. |
| 2018/0334454 A1 | 11/2018 | Lanman et al. |
| 2019/0062313 A1 | 2/2019 | Li et al. |
| 2019/0062330 A1 | 2/2019 | Blake et al. |
| 2019/0127336 A1 | 5/2019 | Li et al. |
| 2019/0144444 A1 | 5/2019 | Blake et al. |
| 2019/0233440 A1 | 8/2019 | Planken et al. |
| 2019/0248767 A1 | 8/2019 | Planken et al. |
| 2019/0270743 A1 | 9/2019 | Marx et al. |
| 2019/0276432 A1 | 9/2019 | Beaumont et al. |
| 2019/0284144 A1 | 9/2019 | Li et al. |
| 2019/0292182 A1 | 9/2019 | Kuramoto et al. |
| 2019/0343838 A1 | 11/2019 | Allen et al. |
| 2019/0374542 A1 | 12/2019 | Allen et al. |
| 2019/0375749 A1 | 12/2019 | Chen et al. |
| 2020/0055845 A1 | 2/2020 | Lanman et al. |
| 2020/0069657 A1 | 3/2020 | Lanman et al. |
| 2020/0115363 A1 | 4/2020 | Li et al. |
| 2020/0115375 A1 | 4/2020 | Barda et al. |
| 2020/0140437 A1 | 5/2020 | Kuramoto et al. |
| 2020/0165231 A1 | 5/2020 | Shin et al. |
| 2020/0181118 A1 | 6/2020 | Malhotra et al. |
| 2020/0237771 A1 | 7/2020 | Hallur et al. |
| 2020/0262837 A1 | 8/2020 | Marx et al. |
| 2020/0289503 A1 | 9/2020 | Huang |
| 2020/0331911 A1 | 10/2020 | Marx et al. |
| 2021/0009577 A1 | 1/2021 | Lanman et al. |
| 2021/0024501 A1 | 1/2021 | Li et al. |
| 2021/0040089 A1 | 2/2021 | Gao et al. |
| 2021/0047297 A1 | 2/2021 | Schulze et al. |
| 2021/0122764 A1 | 4/2021 | Bharathan et al. |
| 2021/0395234 A1 | 12/2021 | Sakamoto et al. |
| 2022/0064141 A1 | 3/2022 | Fang et al. |
| 2022/0298174 A1 | 9/2022 | Guo et al. |
| 2022/0315597 A1 | 10/2022 | Su et al. |
| 2022/0315598 A1 | 10/2022 | Xu et al. |
| 2022/0370416 A1 | 11/2022 | Chu et al. |
| 2022/0389029 A1 | 12/2022 | Guo et al. |
| 2022/0402916 A1 | 12/2022 | Hoover et al. |
| 2023/0023023 A1 | 1/2023 | Shibata et al. |
| 2023/0174518 A1* | 6/2023 | Kawai ............... A61K 45/06 514/210.21 |
| 2023/0181536 A1 | 6/2023 | Abe et al. |
| 2023/0348495 A1 | 11/2023 | Kawai et al. |
| 2023/0416266 A1 | 12/2023 | Han et al. |
| 2024/0043448 A1 | 2/2024 | Bharathan et al. |
| 2024/0083913 A1 | 3/2024 | Bharathan et al. |
| 2024/0124478 A1 | 4/2024 | Han et al. |
| 2024/0174691 A1 | 5/2024 | Jiang et al. |
| 2024/0239788 A1 | 7/2024 | Sloman et al. |
| 2024/0246968 A1 | 7/2024 | Shibata et al. |
| 2024/0262842 A1 | 8/2024 | Shibata et al. |
| 2024/0317759 A1 | 9/2024 | Kobayakawa et al. |
| 2024/0376123 A1 | 11/2024 | Zhou et al. |
| 2024/0417408 A1 | 12/2024 | Shibata et al. |
| 2025/0136615 A1 | 5/2025 | Kawamura et al. |

FOREIGN PATENT DOCUMENTS

| | | |
|---|---|---|
| CN | 109843856 A | 6/2019 |
| CN | 112390788 A1 | 2/2021 |
| CN | 112430234 A | 3/2021 |
| CN | 114615981 A | 6/2022 |
| EP | 3871673 A1 | 9/2021 |
| EP | 4053120 A1 | 9/2022 |
| EP | 4397664 A1 | 10/2024 |
| JP | 2016-519072 A | 6/2016 |
| JP | 2016-532656 A | 10/2016 |
| JP | 2017-528498 A | 9/2017 |
| WO | 03/037898 A1 | 5/2003 |
| WO | 2005/019177 A1 | 3/2005 |
| WO | 2009/114575 A1 | 9/2009 |
| WO | 2010/064705 A1 | 6/2010 |
| WO | 2013/072694 A1 | 5/2013 |
| WO | 2014/043272 A1 | 3/2014 |
| WO | 2014/143659 A1 | 9/2014 |
| WO | 2014/152588 A1 | 9/2014 |
| WO | 2014/164543 A1 | 10/2014 |
| WO | 2015/054572 A1 | 4/2015 |
| WO | 2015/091415 A1 | 6/2015 |
| WO | 2015/131005 A1 | 9/2015 |
| WO | 2016/029454 A1 | 3/2016 |
| WO | 2016/044772 A1 | 3/2016 |
| WO | 2016/049524 A1 | 3/2016 |
| WO | 2016/049565 A1 | 3/2016 |
| WO | 2016/049568 A1 | 3/2016 |
| WO | 2016/164675 A1 | 10/2016 |
| WO | 2016/168540 A1 | 10/2016 |
| WO | 2017/015562 A1 | 1/2017 |
| WO | 2017/058728 A1 | 4/2017 |
| WO | 2017/058768 A1 | 4/2017 |
| WO | 2017/058792 A1 | 4/2017 |
| WO | 2017/058805 A1 | 4/2017 |
| WO | 2017/058807 A1 | 4/2017 |
| WO | 2017/058902 A1 | 4/2017 |
| WO | 2017/058915 A1 | 4/2017 |
| WO | 2017/070256 A2 | 4/2017 |
| WO | 2017/087528 A1 | 5/2017 |
| WO | 2017/100546 A1 | 6/2017 |
| WO | 2017/172979 A1 | 10/2017 |
| WO | 2017/201161 A1 | 11/2017 |
| WO | 2018/022897 A1 | 2/2018 |
| WO | 2018/064510 A1 | 4/2018 |
| WO | 2018/068017 A1 | 4/2018 |
| WO | 2018/119183 A2 | 6/2018 |
| WO | 2018/140512 A1 | 8/2018 |
| WO | 2018/140513 A1 | 8/2018 |
| WO | 2018/140514 A1 | 8/2018 |
| WO | 2018/140598 A1 | 8/2018 |
| WO | 2018/140599 A1 | 8/2018 |
| WO | 2018/140600 A1 | 8/2018 |
| WO | 2018/143315 A1 | 8/2018 |
| WO | 2018/206539 A1 | 11/2018 |
| WO | 2018/217651 A1 | 11/2018 |
| WO | 2018/218069 A1 | 11/2018 |
| WO | 2018/218070 A2 | 11/2018 |
| WO | 2018/218071 A1 | 11/2018 |
| WO | 2019/051291 A1 | 3/2019 |
| WO | 2019/058132 A1 | 3/2019 |
| WO | 2019/058393 A1 | 3/2019 |
| WO | 2019/077631 A1 | 4/2019 |
| WO | 2019/099524 A1 | 5/2019 |
| WO | 2019/099703 A1 | 5/2019 |
| WO | 2019/110751 A1 | 6/2019 |
| WO | 2019/155399 A1 | 8/2019 |
| WO | 2019/167000 A1 | 9/2019 |
| WO | 2019/185525 A1 | 10/2019 |
| WO | 2019/215203 A1 | 11/2019 |
| WO | 2019213526 A1 | 11/2019 |
| WO | 2019217307 A1 | 11/2019 |
| WO | 2019217691 A1 | 11/2019 |
| WO | 2019232419 A1 | 12/2019 |
| WO | 2020/035031 A1 | 2/2020 |
| WO | 2020/041331 A1 | 2/2020 |
| WO | 2020/050890 A2 | 3/2020 |
| WO | 2020047192 A1 | 3/2020 |

(56) References Cited

FOREIGN PATENT DOCUMENTS

| | | |
|---|---|---|
| WO | 2020055755 A1 | 3/2020 |
| WO | 2020055756 A1 | 3/2020 |
| WO | 2020055758 A1 | 3/2020 |
| WO | 2020055760 A1 | 3/2020 |
| WO | 2020055761 A1 | 3/2020 |
| WO | 2020/085493 A1 | 4/2020 |
| WO | 2020/097537 A2 | 5/2020 |
| WO | 2020/101736 A1 | 5/2020 |
| WO | 2020102730 A1 | 5/2020 |
| WO | 2020/113071 A1 | 6/2020 |
| WO | 2020118066 A1 | 6/2020 |
| WO | 2020/146613 A1 | 7/2020 |
| WO | 2020/156285 A1 | 8/2020 |
| WO | 2020/177629 A1 | 9/2020 |
| WO | 2020/178282 A1 | 9/2020 |
| WO | 2020/221239 A1 | 11/2020 |
| WO | 2020/233592 A1 | 11/2020 |
| WO | 2020/234103 A1 | 11/2020 |
| WO | 2020/236940 A1 | 11/2020 |
| WO | 2020/238791 A1 | 12/2020 |
| WO | 2020/239077 A1 | 12/2020 |
| WO | 2020/239123 A1 | 12/2020 |
| WO | 2020/244637 A1 | 12/2020 |
| WO | 2020/259432 A1 | 12/2020 |
| WO | 2020/259513 A1 | 12/2020 |
| WO | 2020/259573 A1 | 12/2020 |
| WO | 2021/000885 A1 | 1/2021 |
| WO | 2021/023154 A1 | 2/2021 |
| WO | 2021/027911 A1 | 2/2021 |
| WO | 2021/027943 A1 | 2/2021 |
| WO | 2021/031952 A1 | 2/2021 |
| WO | 2021/037018 A1 | 3/2021 |
| WO | 2021/041671 A1 | 3/2021 |
| WO | 2021/043322 A1 | 3/2021 |
| WO | 2021/052499 A1 | 3/2021 |
| WO | 2021/055728 A1 | 3/2021 |
| WO | 2021/057832 A1 | 4/2021 |
| WO | 2021/058018 A1 | 4/2021 |
| WO | 2021/063346 A1 | 4/2021 |
| WO | 2021/078312 A1 | 4/2021 |
| WO | 2021/081212 A1 | 4/2021 |
| WO | 2021/083167 A1 | 5/2021 |
| WO | 2021/084765 A1 | 5/2021 |
| WO | 2021/085653 A1 | 5/2021 |
| WO | 2021/086833 A1 | 5/2021 |
| WO | 2021/088458 A1 | 5/2021 |
| WO | 2021/093758 A1 | 5/2021 |
| WO | 2021/098859 A1 | 5/2021 |
| WO | 2021/104431 A1 | 6/2021 |
| WO | 2021/106231 A1 | 6/2021 |
| WO | 2021/107160 A1 | 6/2021 |
| WO | 2021/109737 A1 | 6/2021 |
| WO | 2021/113595 A1 | 6/2021 |
| WO | 2021/118877 A1 | 6/2021 |
| WO | 2021/121330 A1 | 6/2021 |
| WO | 2021/121367 A1 | 6/2021 |
| WO | 2021/121371 A1 | 6/2021 |
| WO | 2021/124222 A1 | 6/2021 |
| WO | 2021/127404 A1 | 6/2021 |
| WO | 2021/129824 A1 | 7/2021 |
| WO | 2021/147965 A1 | 7/2021 |
| WO | 2021/147967 A1 | 7/2021 |
| WO | 2021142252 A1 | 7/2021 |
| WO | 2021150613 A1 | 7/2021 |
| WO | 2021/215544 A1 | 10/2021 |
| WO | 2021/215545 A1 | 10/2021 |
| WO | 2021211864 A1 | 10/2021 |
| WO | 2021/219072 A1 | 11/2021 |
| WO | 2022002102 A1 | 1/2022 |
| WO | 2022015375 A1 | 1/2022 |
| WO | 2022031678 A1 | 2/2022 |
| WO | 2022/066646 A1 | 3/2022 |
| WO | 2022042630 A1 | 3/2022 |
| WO | 2022047260 A1 | 3/2022 |
| WO | 2022061251 A1 | 3/2022 |
| WO | 2022068921 A1 | 4/2022 |
| WO | 2022083569 A1 | 4/2022 |
| WO | 2022087371 A1 | 4/2022 |
| WO | 2022087375 A1 | 4/2022 |
| WO | 2022/105857 A1 | 5/2022 |
| WO | 2022/109485 A1 | 5/2022 |
| WO | 2022/109487 A1 | 5/2022 |
| WO | 2022/132200 A1 | 6/2022 |
| WO | 2022/133038 A1 | 6/2022 |
| WO | 2022/148422 A1 | 7/2022 |
| WO | 2022/173870 A1 | 8/2022 |
| WO | 2022/177917 A2 | 8/2022 |
| WO | 2022187688 A1 | 9/2022 |
| WO | 2022/221739 A1 | 10/2022 |
| WO | 2022/232318 A1 | 11/2022 |
| WO | 2022/232320 A1 | 11/2022 |
| WO | 2022/250170 A1 | 12/2022 |
| WO | 2022/251576 A1 | 12/2022 |
| WO | 2022/256459 A1 | 12/2022 |
| WO | 2022248885 A2 | 12/2022 |
| WO | 2022258974 A1 | 12/2022 |
| WO | 2022261210 A1 | 12/2022 |
| WO | 2022262686 A1 | 12/2022 |
| WO | 2022266069 A1 | 12/2022 |
| WO | 2022271658 A1 | 12/2022 |
| WO | 2023018699 A1 | 2/2023 |
| WO | 2023018809 A1 | 2/2023 |
| WO | 2023018812 A1 | 2/2023 |
| WO | 2023020518 A1 | 2/2023 |
| WO | 2023020519 A1 | 2/2023 |
| WO | 2023020521 A1 | 2/2023 |
| WO | 2023020523 A1 | 2/2023 |
| WO | 2023/046135 A1 | 3/2023 |
| WO | 2023034290 A1 | 3/2023 |
| WO | 2023049697 A1 | 3/2023 |
| WO | 2023056421 A1 | 4/2023 |
| WO | 2023056951 A1 | 4/2023 |
| WO | 2023060253 A1 | 4/2023 |
| WO | 2023061294 A1 | 4/2023 |
| WO | 2023061463 A1 | 4/2023 |
| WO | 2023064857 A1 | 4/2023 |
| WO | 2023072188 A1 | 5/2023 |
| WO | 2023/097227 A1 | 6/2023 |
| WO | 2023/103523 A1 | 6/2023 |
| WO | 2023098425 A1 | 6/2023 |
| WO | 2023098426 A1 | 6/2023 |
| WO | 2023098832 A1 | 6/2023 |
| WO | 2023099592 A1 | 6/2023 |
| WO | 2023099608 A1 | 6/2023 |
| WO | 2023099612 A1 | 6/2023 |
| WO | 2023099620 A1 | 6/2023 |
| WO | 2023099623 A1 | 6/2023 |
| WO | 2023099624 A1 | 6/2023 |
| WO | 2023101928 A1 | 6/2023 |
| WO | 2023103906 A1 | 6/2023 |
| WO | 2023104018 A1 | 6/2023 |
| WO | 2023105491 A1 | 6/2023 |
| WO | 2023114733 A1 | 6/2023 |
| WO | 2023117681 A1 | 6/2023 |
| WO | 2023122154 A1 | 6/2023 |
| WO | 2023125627 A1 | 7/2023 |
| WO | 2023125989 A1 | 7/2023 |
| WO | 2023133183 A | 7/2023 |
| WO | 2024/009191 A1 | 1/2024 |
| WO | 2024/015262 A1 | 1/2024 |
| WO | 2024/032704 A1 | 2/2024 |
| WO | 2024/041573 A1 | 2/2024 |
| WO | 2024/044667 A2 | 2/2024 |
| WO | 2024031088 A1 | 2/2024 |
| WO | 2024/063578 A1 | 3/2024 |
| WO | 2024/083168 A1 | 4/2024 |
| WO | 2024/103010 A1 | 5/2024 |
| WO | 2024/120433 A1 | 6/2024 |
| WO | 2024/209339 A1 | 10/2024 |
| WO | 2024/213979 A1 | 10/2024 |
| WO | 2024/233776 A1 | 11/2024 |
| WO | 2024/238343 A1 | 11/2024 |

(56) References Cited

FOREIGN PATENT DOCUMENTS

| WO | 2025/019819 A1 | 1/2025 |
| WO | 2025/019823 A1 | 1/2025 |
| WO | 2025/085748 A1 | 4/2025 |

OTHER PUBLICATIONS

D. Gentile, et al., "Ras Binder Induces a Modified Switch-II Pocket in GTP and GDP States", Cell Chemical Biology, 24, pp. 1455-1466 (2017).

D. Kessler, et al., "Drugging an undruggable pocket on KRAS", Proceedings of the National Academy of Sciences (PNAS), vol. 116, No. 32, pp. 15823-15829 (2019).

Y. Mao, et al., "Design, synthesis and biological evaluation of novel pyrimidine, 3-cyanopyridine and m-amino-N-phenylbenzamide based monocyclic EGFR tyrosine kinase inhibitors", Bioorganic & Medicinal Chemistry, 21, pp. 3090-3104 (2013).

PubChem CID 10121096, PubChem release Jun. 18, 2019, modify date Nov. 21, 2020, retrieved on Feb. 10, 2021 (9 pages).

G. Palfy, et al., "1H, 15N backbone assignment and comparative analysis of the wild type and G12C, G12D, G12V mutants of K-Ras bound to GDP at physiological pH", Biomolecular NMR Assignment, vol. 14, No. 1, pp. 1-7 (2019).

M.R. Janes, et al., "Targeting KRAS Mutant Cancers with a Covalent G12C-Specific Inhibitor", Cell, 172, pp. 578-589 (2018).

M.P. Patricelli, et al., "Selective Inhibition of Oncogenic KRAS Output with Small Molecules Targeting the Inactive State", Cancer Discovery, 6(3), pp. 316-329 (2016).

H. Chuang, et al., "Pharmacological strategies to target oncogenic KRAS signaling in pancreatic cancer", Pharmacological Research, 117, pp. 370-376 (2017).

Lopez-Tapia, F., et al., "Linker Variation and Structure-Activity Relationship Analyses of Carboxylic Acid-based Small Molecule STAT3 Inhibitors", ACS Med. Chem. Lett. 2018, 9, 250-255.

R.B. Kargbo, "Small Molecule Inhibitors of KRAS G12C Mutant", Acs Med. Chem. Lett., vol. 12, pp. 1210-1211 (2021).

International Search Report and Written Opinion in corresponding international application No. PCT/JP2019/047732 dated Jan. 10, 2020 (11 pages).

PubChem SID 469710826, available Jul. 28, 2022.

J.G. Kettle, et al., "Structure-Based Design and Pharmacokinetic Optimization of Covalent Allosteric Inhibitors of the Mutant GTPase KRAS G12C", J. Med. Chem., vol. 63, pp. 4468-4483 (2020).

Q. Zheng, et al., "Drugging the Next Undruggable KRAS Allele-Gly12Asp", J. Med. Chem, vol. 65, pp. 3119-3122 (2022).

\* cited by examiner

PHENOL COMPOUND OR SALT THEREOF

CROSS REFERENCE TO RELATED APPLICATIONS

The present application is a national-stage entry under 35 U.S.C. § 371 of International Application No. PCT/JP2019/047732 filed on Dec. 6, 2019, and claims the benefit of priority under 35 U.S.C. § 119 (a)-(d) of Japanese Application No. 2019-216496 filed on Nov. 29, 2019, the entirety of each of which is incorporated by reference herein.

FIELD OF THE INVENTION

The present invention relates to a phenol compound having inhibitory activity against a KRAS G12C mutant or a salt thereof, and a pharmaceutical composition containing the same as an active ingredient.

BACKGROUND

RAS, which is a small monomeric GTP-binding protein having a molecular weight of about 21 kDa, acts as a molecular on/off switch. RAS can bind to GTP by binding to proteins of a guanine nucleotide exchange factor (GEF) (e.g., SOS1), which forces the release of a bound nucleotide, and releasing GDP. When RAS binds to GTP, it becomes activated (turned on) and recruits and activates proteins necessary for the propagation of other receptors' signals, such as c-Raf and PI 3-kinase. RAS also possesses enzymatic activity with which it cleaves the terminal phosphate of the nucleotide and converts it to GDP. The rate of conversion is usually slow, but can be dramatically sped up by a protein of the GTPase-activating protein (GAP) class, such as RasGAP. When GTP is converted into GDP, RAS is deactivated (turned off).

The mainly known members of the RAS subfamily include HRAS, KRAS, and NRAS. Of these, mutations of KRAS are observed in many malignant tumors: 95% of pancreatic cancers, 45% of colorectal cancers, and 35% of lung cancers. The mutations often occur in the glycine residue at position 12; in pulmonary adenocarcinoma, in particular, the mutation in the glycine residue at position 12 occurs in about 90% of the whole. Among such mutations, the most often occurring mutation (44%) has been reported to be a mutation into cysteine (Non Patent Literature 1).

A recent study has reported that ARS-853 binds to the cysteine of the G12C mutant of inactive KRAS (GDP), thus inhibiting conversion of inactive KRAS (GDP) to active KRAS (GTP), blocking downstream signaling, and inducing apoptosis in cancer cells with the KRAS G12C mutant (Patent Literature 1 and Non Patent Literature 2). It has also been reported that ARS-1620 with a quinazoline backbone exerts antitumor action in tumor-bearing mice expressing the KRAS G12C mutant by improving metabolic stability of ARS-853 mice (Patent Literature 2 and Non Patent Literature 3).

CITATION LIST

Patent Literature

[Patent Literature 1] International Publication No. WO 2014/152588
[Patent Literature 2] International Publication No. WO 2015/054572

Non Patent Literature

[Non Patent Literature 1] Nature Reviews Drug Discovery 13 (11), 828-51, 2014
[Non Patent Literature 2] Cancer Discov. 6 (3), 316-29, 2016
[Non Patent Literature 3] Cell. 172 (3), 578-89, 2018

SUMMARY

An object of the present invention is to provide a novel compound or a salt thereof which binds to the G12C mutant cysteine of KRAS and inhibits KRAS activity, and to provide a pharmaceutical composition containing the same.

The present inventors have conducted diligent studies to attain the object and consequently completed the present invention by finding that a compound group represented by the Formula (I) given below having phenol and heteroaryl strongly binds to G12C mutant cysteine of KRAS and inhibits KRAS functions.

Specifically, the present invention provides the following [1] to [34]:

(1) A phenol compound represented by the following Formula (I) or a salt thereof:

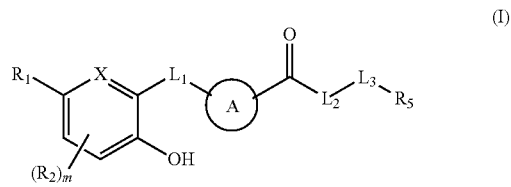

wherein
$R_1$ represents substituted or unsubstituted C1-C6 alkyl, substituted or unsubstituted C2-C6 alkenyl, substituted or unsubstituted C2-C6 alkynyl, substituted or unsubstituted C3-C7 cycloalkyl, substituted or unsubstituted silyl, or substituted or unsubstituted sulfanyl;
$R_2$ represents halogen, cyano, nitro, C1-C6 alkyl, C2-C6 alkenyl, or C2-C6 alkynyl;
at least one of $R_2$ is present in the para-position of $L_1$, m represents 1 or 2;
when m is 2, $R_2$ may be identical or different;
$R_1$ and $R_2$ present in the para-position of $L_1$, taken together with the following adjacent group:

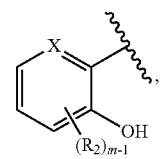

may form

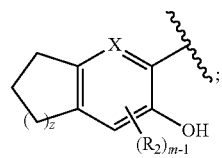

wherein

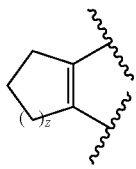

may have at least one member selected from the group consisting of halogen and C1-C6 alkyl as a substituent; and z represents an integer of 1 to 3;

X represents nitrogen, CH, or $CR_2$;

$L_1$ represents —NH—$C(Ra)_2$—, —$C(Ra)_2$—, or —$C(Ra)_2$—$C(Ra)_2$—;

Ra are identical or different, and each represents hydrogen, C1-C6 alkyl, or hydroxyl;

ring A represents a 5- or 6-membered unsaturated heterocyclic group that may have substituent $R_6$ or a benzene ring that may have substituent $R_6$;

$R_6$ represents at least one member selected from the group consisting of halogen, cyano, nitro, amino, hydroxyl, carboxyl, C1-C6 alkyl that may have substituent $R_{71}$, C2-C6 alkenyl that may have substituent $R_{72}$, C2-C6 alkynyl that may have substituent $R_{73}$, C3-C10 cycloalkyl that may have substituent $R_{74}$, C4-C10 cycloalkenyl that may have substituent $R_{75}$, C6-C10 aromatic hydrocarbon that may have substituent $R_{76}$, a 4- to 10-membered saturated heterocyclic group that may have substituent $R_{77}$, and a 5- to 10-membered unsaturated heterocyclic group that may have substituent $R_{78}$; and when one or more substituents are present, they may be identical or different;

when $R_6$ is C1-C6 alkyl that may have substituent $R_{71}$, C2-C6 alkenyl that may have substituent $R_{72}$, or C2-C6 alkynyl that may have substituent $R_{73}$, the substituent $R_{71}$, $R_{72}$, or $R_{73}$ represents halogen, cyano, nitro, amino, hydroxyl, carboxyl, C1-C6 alkoxy, di(C1-C6 alkyl)amino, C3-C7 cycloalkyl, substituted or unsubstituted C6-C10 aromatic hydrocarbon, a substituted or unsubstituted 4- to 10-membered saturated heterocyclic group, or a substituted or unsubstituted 5- to 10-membered unsaturated heterocyclic group; and when one or more substituents $R_{71}$, $R_{72}$, or $R_{73}$ are present, they may be identical or different;

when $R_6$ is C3-C10 cycloalkyl that may have substituent $R_{74}$, C4-C10 cycloalkenyl that may have substituent $R_{75}$, C6-C10 aromatic hydrocarbon that may have substituent $R_{76}$, a 4- to 10-membered saturated heterocyclic group that may have substituent $R_{77}$, or a 5- to 10-membered unsaturated heterocyclic group that may have substituent $R_{78}$, the substituent $R_{74}$, $R_{75}$, $R_{76}$, $R_{77}$, or $R_{78}$ represents halogen, cyano, nitro, amino, hydroxyl, carboxyl, substituted or unsubstituted C1-C6 alkyl, C2-C6 alkenyl, C2-C6 alkynyl, C1-C6 alkoxy, di(C1-C6 alkyl)amino, (C1-C6 alkyl)carbonyl, C7-C14 aralkyl, (C1-C6 alkoxy)carbonyl, C3-C7 cycloalkyl, C6-C10 aromatic hydrocarbon, a substituted or unsubstituted 4- to 10-membered saturated heterocyclic group, or a substituted or unsubstituted 5- to 10-membered unsaturated heterocyclic group; and when one or more substituents $R_{74}$, $R_{75}$, $R_{76}$, $R_{75}$, or $R_{78}$ are present, they may be identical or different;

$L_2$ represents

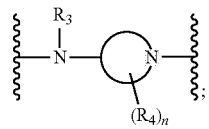

Wherein

represents a 4- to 8-membered saturated heterocyclic ring having at least one nitrogen;

$R_3$ represents hydrogen or C1-C6 alkyl, $R_4$ represents halogen, cyano, nitro, amino, hydroxyl, carboxyl, C1-C6 alkyl that may have substituent $R_8$, C2-C6 alkenyl, C2-C6 alkynyl, or C1-C6 alkoxy; when two $R_4$ are present on the same carbon atom, the two $R_4$, taken together with the carbon atom to which these groups are attached, may form a 3- to 8-membered saturated hydrocarbon ring;

$R_8$ represents halogen, cyano, hydroxyl, C1-C6 alkoxy, or di(C1-C6 alkyl)amino;

n represents an integer of 0 to 3; and when n is 2 or 3, $R_4$ may be identical or different;

$L_3$ represents —C(=O)— or —S(=O)$_2$—; and $R_5$ represents substituted or unsubstituted C2-C6 alkenyl or substituted or unsubstituted C2-C6 alkynyl.

(2) The phenol compound or a salt thereof according to (1), wherein in the Formula (I), $R_1$ represents substituted or unsubstituted C1-C6 alkyl, substituted or unsubstituted C2-C6 alkenyl, substituted or unsubstituted C3-C7 cycloalkyl, tri(C1-C6 alkyl) silyl, or pentafluorosulfanyl, when $R_1$ is substituted or unsubstituted C1-C6 alkyl, substituted or unsubstituted C2-C6 alkenyl, or substituted or unsubstituted C3-C7 cycloalkyl, the substituent is halogen, cyano, or C1-C6 alkyl; and when one or more substituents are present, they may be identical or different, $R_2$ represents halogen, cyano, C1-C6 alkyl, or C2-C6 alkenyl, $R_1$ and $R_2$ present in the para-position of $L_1$, taken together with the following adjacent group:

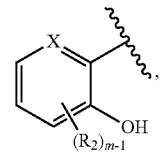

may form

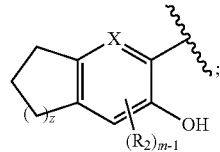

wherein

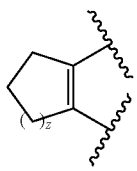

may have at least one member selected from the group consisting of halogen and C1-C6 alkyl as a substituent,
m represents 1 or 2,
z represents an integer of 1 to 3, and
X represents nitrogen or CH.
(3) The phenol compound or a salt thereof according to (1) or (2), wherein in the Formula (I),
L$_1$ represents —NH—C(Ra)$_2$—, —C(Ra)$_2$—, or —C(Ra)$_2$—C(Ra)$_2$—, and
Ra are identical or different, and each represents hydrogen, methyl, or hydroxyl.
(4) The phenol compound or a salt thereof according to any one of (1) to (3), wherein in the Formula (I),
ring A represents

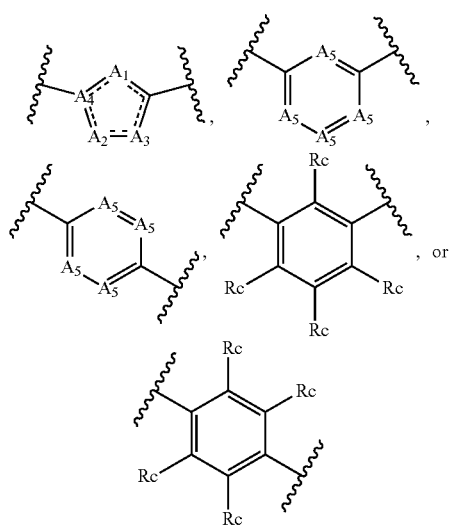

wherein
===== represents a single bond or a double bond,
A$_1$ represents C—Rb1, nitrogen, N—Rb1, oxygen, or sulfur,
A$_2$ represents C—Rb2, nitrogen, N—Rb2, oxygen, or sulfur,
A$_3$ represents C—Rb3, nitrogen, N—Rb3, oxygen, or sulfur,
A$_4$ represents carbon or nitrogen,
at least one of A$_1$, A$_2$, A$_3$, and A$_4$ is at least one member selected from the group consisting of nitrogen, N—Rb1, N—Rb2, N—Rb3, oxygen, and sulfur,
A$_5$ represents C—Rb5 or N—Rb5, and at least one of A$_5$ is N—Rb5,
Rb1, Rb2, and Rb3 are identical or different, and each represents hydrogen, halogen, cyano, C1-C6 alkyl that may have substituent R$_{71}$, alkenyl that may have substituent R$_{72}$, alkynyl that may have substituent R$_{73}$, C3-C7 cycloalkyl that may have substituent R$_{74}$, C4-C7 cycloalkenyl that may have substituent R$_{75}$, C6-C10 aromatic hydrocarbon that may have substituent R$_{76}$, a 4- to 10-membered saturated heterocyclic group that may have substituent R$_{77}$, or a 5- to 10-membered unsaturated heterocyclic group that may have substituent R$_{78}$,
when Rb1, Rb2, or Rb3 is C1-C6 alkyl that may have substituent R$_{71}$, C2-C6 alkenyl that may have substituent R$_{72}$, or C2-C6 alkynyl that may have substituent R$_{73}$, the substituent R$_{71}$, R$_{72}$, or R$_{73}$ represents halogen, cyano, nitro, amino, hydroxyl, carboxyl, C1-C6 alkoxy, di(C1-C6 alkyl)amino, C3-C7 cycloalkyl, substituted or unsubstituted C6-C10 aromatic hydrocarbon, a substituted or unsubstituted 4- to 10-membered saturated heterocyclic group, or a substituted or unsubstituted 5- to 10-membered unsaturated heterocyclic group; and when one or more substituents R$_{71}$, R$_{72}$, or R$_{73}$ are present, they may be identical or different,
when Rb1, Rb2, or Rb3 is C3-C10 cycloalkyl that may have substituent R$_{74}$, C4-C10 cycloalkenyl that may have substituent R$_{75}$, C6-C10 aromatic hydrocarbon that may have substituent R$_{76}$, a 4- to 10-membered saturated heterocyclic group that may have substituent R$_{77}$, or a 5- to 10-membered unsaturated heterocyclic group that may have substituent R$_{78}$, the substituent R$_{74}$, R$_{75}$, R$_{76}$, R$_{77}$, or R$_{78}$ represents halogen, cyano, nitro, amino, hydroxyl, carboxyl, substituted or unsubstituted C1-C6 alkyl, C2-C6 alkenyl, C2-C6 alkynyl, C1-C6 alkoxy, di(C1-C6 alkyl)amino, (C1-C6 alkyl)carbonyl, C7-C14 aralkyl, (C1-C6 alkoxy)carbonyl, C3-C7 cycloalkyl, C6-C10 aromatic hydrocarbon, a substituted or unsubstituted 4- to 10-membered saturated heterocyclic group, or a substituted or unsubstituted 5- to 10-membered unsaturated heterocyclic group; and when one or more substituents R$_{74}$, R$_{75}$, R$_{76}$, R$_{77}$, or R$_{78}$ are present, they may be identical or different,
Rb5 are identical or different, and each represents hydrogen, halogen, or C1-C6 alkyl, and
Rc are identical or different, and each represents hydrogen, halogen, or C1-C6 alkyl.
(5) The phenol compound or a salt thereof according to any one of (1) to (4), wherein in the Formula (I),
L$_2$ represents

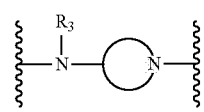

Wherein

represents azetidine or pyrrolidine, and
R$_3$ represents hydrogen or C1-C6 alkyl.
(6) The phenol compound or a salt thereof according to any one of (1) to (5), wherein in the Formula (I), L$_3$ represents —C(=O)—.

(7) The phenol compound or a salt thereof according to any one of (1) to (6), wherein in the Formula (I), $R_5$ represents vinyl, dimethylamino-1-propenyl, or 1-propynyl.

(8) The phenol compound or a salt thereof according to any one of (1) to (7), wherein in the Formula (I), ring A represents

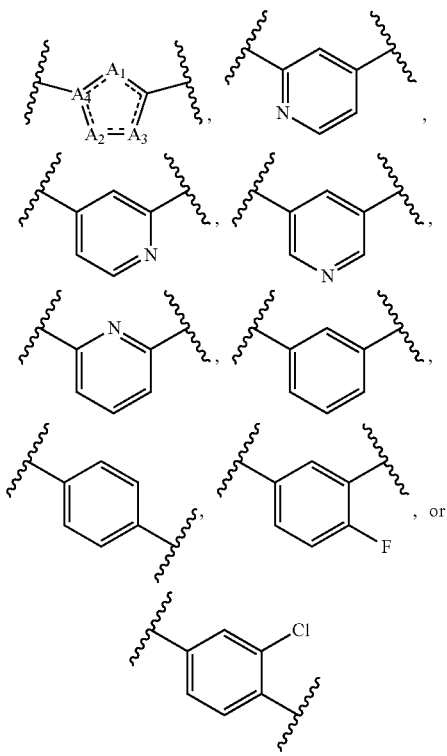

wherein

------- represents a single bond or a double bond, $A_1$ represents C—Rb1, nitrogen, N—Rb1, oxygen, or sulfur, $A_2$ represents C—Rb2, nitrogen, N—Rb2, oxygen, or sulfur, $A_3$ represents C—Rb3, nitrogen, N—Rb3, oxygen, or sulfur, and $A_4$ represents carbon or nitrogen;

wherein at least one of $A_1$, $A_2$, $A_3$, and $A_4$ is at least one member selected from the group consisting of nitrogen, N—Rb1, N—Rb2, N—Rb3, oxygen, and sulfur, Rb1 represents hydrogen, halogen, C1-C6 alkyl that may have substituent $R_{71}$, C3-C7 cycloalkyl that may have substituent $R_{74}$, C4-C7 cycloalkenyl, a monocyclic 4- to 7-membered saturated heterocyclic group having one nitrogen or oxygen that may have substituent $R_{77}$, or a monocyclic 5- to 8-membered unsaturated heterocyclic group having one nitrogen, $R_{71}$ represents halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl)amino, $R_{74}$ represents hydroxyl or C1-C6 alkoxy, $R_{77}$ represents C1-C6 alkyl that may have halogen or C6-C10 aromatic hydrocarbon as a substituent, C2-C6 alkenyl, (C1-C6 alkyl)carbonyl, (C1-C6 alkoxy)carbonyl, a monocyclic 4- to 7-membered saturated heterocyclic group having one nitrogen or oxygen, or a monocyclic 5- to 8-membered unsaturated heterocyclic group having one nitrogen, Rb2 represents hydrogen or C1-C6 alkyl, and Rb3 represents hydrogen, halogen, or C1-C6 alkyl that may have halogen as a substituent.

(9) The phenol compound or a salt thereof according to any one of (1) to (8), wherein in the Formula (I), $R_5$ is vinyl or dimethylamino-1-propenyl.

(10) The phenol compound or a salt thereof according to any one of (1) to (9), wherein in the Formula (I), ring A represents

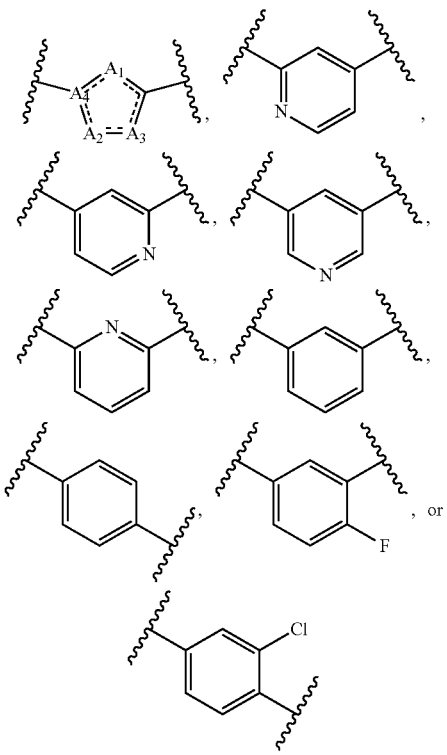

wherein

------- represents a single bond or a double bond, $A_1$ represents C—Rb1, nitrogen, N—Rb1, oxygen, or sulfur, $A_2$ represents C—Rb2, nitrogen, N—Rb2, oxygen, or sulfur, $A_3$ represents C—Rb3, nitrogen, N—Rb3, oxygen, or sulfur, and $A_4$ represents carbon or nitrogen;

wherein at least one of $A_1$, $A_2$, $A_3$, and $A_4$ is at least one member selected from the group consisting of nitrogen, N—Rb1, N—Rb2, N—Rb3, oxygen, and sulfur, Rb1 represents hydrogen, C1-C6 alkyl that may have substituent $R_{71}$, or C3-C7 cycloalkyl, $R_{71}$ represents C1-C6 alkoxy, C6-C10 aromatic hydrocarbon, a monocyclic 5- to 8-membered unsaturated heterocyclic group having one nitrogen, or di(C1-C6 alkyl)amino, Rb2 represents hydrogen or C1-C6 alkyl, and
Rb3 represents hydrogen, halogen, or C1-C6 alkyl that may have halogen as a substituent.

(11) A compound according to any one of the following (1) to (23), or a salt of the compound according to any one of the following (1) to (23):

(1) N-(1-acryloylazetidin-3-yl)-5-(((5-(tert-butyl)-4-chloro-2-hydroxyphenyl)amino)methyl)-N-methylfuran-2-carboxamide, (2) N-(1-acryloylazetidin-3-yl)-5-(((5-(tert-butyl)-4-chloro-2-hydroxyphenyl)amino)methyl)-N-ethylfuran-2-carboxamide, (3) N-(1-acryloylazetidin-3-yl)-2-(((5-(tert-butyl)-4-chloro-2-hydroxyphenyl)amino)methyl)-1-methyl-1H-imidazole-5-carboxamide, (4) N-(1-acryloylazetidin-3-yl)-2-(((5-(tert-butyl)-4-chloro-2-hydroxyphenyl)amino)methyl)-4-methylthiazole-5-carboxamide, (5) N-(1-acryloylazetidin-3-yl)-2-(((5-(tert-butyl)-4-chloro-2-hydroxyphenyl)amino)methyl)-4-iodo-1-methyl-1H-imidazole-5-carboxamide, (6) N-(1-acryloylazetidin-3-yl)-4-(((5-(tert-butyl)-4-chloro-2-hydroxyphenyl)amino)methyl)-N-methylthiazole-2-carboxamide, (7) N-(1-acryloylazetidin-3-yl)-2-(((5-(tert-butyl)-4-chloro-2-hydroxyphenyl)amino)methyl)-1-ethyl-1H-imidazole-5-carboxamide, (8) N-(1-acryloylazetidin-3-yl)-2-(((5-(tert-butyl)-4-chloro-2-hydroxyphenyl)amino)methyl)-1-(2-methoxyethyl)-1H-imidazole-5-carboxamide, (9) N-(1-acryloylazetidin-3-yl)-2-(((5-(tert-butyl)-4-chloro-2-hydroxyphenyl)amino)methyl)-1-(2-(dimethylamino)ethyl)-1H-imidazole-5-carboxamide,

(10) N-(1-acryloylazetidin-3-yl)-2-(((5-(tert-butyl)-4-chloro-2-hydroxyphenyl)amino)methyl)-1,4-dimethyl-1H-imidazole-5-carboxamide,

(11) N-(1-acryloylazetidin-3-yl)-1-benzyl-2-(((5-(tert-butyl)-4-chloro-2-hydroxyphenyl)amino)methyl)-4-methyl-1H-imidazole-5-carboxamide,

(12) N-(1-acryloylazetidin-3-yl)-2-(((5-(tert-butyl)-4-chloro-2-hydroxyphenyl)amino)methyl)-1-ethyl-4-methyl-1H-imidazole-5-carboxamide,

(13) N-(1-acryloylazetidin-3-yl)-2-(((5-(tert-butyl)-4-chloro-2-hydroxyphenyl)amino)methyl)-1-isopropyl-4-methyl-1H-imidazole-5-carboxamide,

(14) N-(1-acryloylazetidin-3-yl)-1-butyl-2-(((5-(tert-butyl)-4-chloro-2-hydroxyphenyl)amino)methyl)-4-methyl-1H-imidazole-5-carboxamide,

(15) N-(1-acryloylazetidin-3-yl)-2-(((5-(tert-butyl)-4-chloro-2-hydroxyphenyl)amino)methyl)-4-methyl-1-propyl-1H-imidazole-5-carboxamide,

(16) N-(1-acryloylazetidin-3-yl)-2-(((5-(tert-butyl)-4-chloro-2-hydroxyphenyl)amino)methyl)-1-cyclopentyl-4-methyl-1H-imidazole-5-carboxamide,

(17) N-(1-acryloylazetidin-3-yl)-2-(((5-(tert-butyl)-4-chloro-2-hydroxyphenyl)amino)methyl)-4-methyl-1-(pyridin-3-ylmethyl)-1H-imidazole-5-carboxamide,

(18) N-(1-acryloylazetidin-3-yl)-2-(((5-(tert-butyl)-2-hydroxy-4-methylphenyl)amino)methyl)-1,4-dimethyl-1H-imidazole-5-carboxamide,

(19) N-(1-acryloylazetidin-3-yl)-2-(((6-(tert-butyl)-5-chloro-3-hydroxypyridin-2-yl)amino)methyl)-1-methyl-1H-imidazole-5-carboxamide,

(20) (E)-2-(((5-(tert-butyl)-4-chloro-2-hydroxyphenyl)amino)methyl)-N-(1-(4-(dimethylamino)but-2-enoyl)azetidin-3-yl)-1-methyl-1H-imidazole-5-carboxamide,

(21) N-(1-acryloylazetidin-3-yl)-2-(5-(tert-butyl)-4-chloro-2-hydroxybenzyl)-1,4-dimethyl-1H-imidazole-5-carboxamide,

(22) N-(1-acryloylazetidin-3-yl)-1-(5-(tert-butyl)-4-chloro-2-hydroxybenzyl)-3,5-dimethyl-1H-pyrazole-4-carboxamide, and

(23) N-(1-acryloylazetidin-3-yl)-2-(5-(tert-butyl)-4-chloro-2-hydroxybenzoyl)-1-methyl-1H-imidazole-5-carboxamide.

(12) A KRAS G12C mutant inhibitor comprising the compound or a salt thereof of any one of (1) to (11) as an active ingredient.

(13) A pharmaceutical composition comprising the compound or a salt thereof of any one of (1) to (11), and a pharmaceutically acceptable carrier.

(14) An antitumor agent comprising the compound or a salt thereof of any one of (1) to (11) as an active ingredient.

(15) An antitumor agent comprising the compound or a salt thereof of any one of (1) to (11), and one or more other antitumor agents, as active ingredients.

(16) An antitumor agent comprising the compound or a salt thereof of any one of (1) to (11) as an active ingredient, wherein the antitumor agent is administered in combination with one or more other antitumor agents.

(17) Use of the compound or a salt thereof of any one of (1) to (11) for the manufacture of KRAS G12C mutant inhibitor.

(18) The use according to (17), wherein the inhibitor is administered in combination with one or more other antitumor agents.

(19) Use of the compound or a salt thereof of any one of (1) to (11) for the manufacture of a pharmaceutical composition.

(20) The use according to (19), wherein the pharmaceutical composition is administered in combination with one or more other antitumor agents.

(21) Use of the compound or a salt thereof of any one of (1) to (11) for the manufacture of an antitumor agent.

(22) The use according to (21), wherein the antitumor agent is administered in combination with one or more other antitumor agents.

(23) The compound or a salt thereof according to any one of (1) to (11) for use as KRAS G12C mutant inhibitor.

(24) The compound or a salt thereof according to any one of (1) to (11) for use as a medicament

(25) The compound or a salt thereof according to any one of (1) to (11) for use in the treatment of tumor.

(26) The compound or a salt thereof according to any one of (1) to (11) for use in the treatment of tumor, characterized that the compound or a salt thereof is administered in combination with one or more other antitumor agents.

(27) A combination of the compound or a salt thereof of any one of (1) to (11) and one or more other antitumor agents, for use in the treatment of tumor.

(28) A method for treating a tumor, the method comprising administering the compound or a salt thereof of any one of (1) to (11) in an effective amount to a subject in need.

(29) A method for treating a tumor, the method comprising administering the compound or a salt thereof of any one of (1) to (11) in an effective amount and one or more other antitumor agents in an effective amount to a subject in need.

(30) Use of the compound or a salt thereof of any one of (1) to (11) for treating a tumor.

(31) The use according to (30), wherein the compound or a salt thereof of any one of (1) to (11) is administered in combination with one or more other antitumor agents

(32) Use of a combination of the compound or a salt thereof of any one of (1) to (11) and one or more other antitumor agents, for treating a tumor.

(33) A commercial package containing as an active pharmaceutical ingredient the compound or a salt thereof of any one of (1) to (11), together with instructions for the use thereof for treating a tumor in a subject.

(34) The commercial package according to (33), wherein the compound or a salt thereof of any one of (1) to (11) is administered in combination with one or more other antitumor agents.

DETAILED DESCRIPTION

The phenol compound represented by the Formula (I) of the present invention is a novel compound that is not described in any of the literatures cited above, etc.

When a divalent substituent is described in the present specification, the direction of a bond is interpreted as indicated in the present specification unless otherwise specified. For example, when -$Q_B$- in the Formula: $Q_A$-$Q_B$-$Q_C$ is represented by the Formula: -$Q_{B-1}$-$Q_{B-2}$-, the divalent substituent -$Q_{B-1}$-$Q_{B-2}$- intends to attach $Q_{B-1}$ to $Q_A$- and to attach $Q_{B-2}$ to $Q_C$.

In the present specification, examples of the "substituent" include halogen, hydroxyl, cyano, nitro, amino, oxo, carboxyl, C1-C6 alkyl, halogeno-C1-C6 alkyl, C3-C7 cycloalkyl, C7-C14 aralkyl, C2-C6 alkenyl, C2-C6 alkynyl, C1-C6 alkoxy, halogeno-C1-C6 alkoxy, C3-C7 cycloalkoxy, C7-C13 aralkyloxy, C1-C6 alkylthio, mono or di(C1-C6 alkyl)amino, acyl, acyloxy, (C1-C6 alkoxy)carbonyl, C7-C13 aralkyl)oxycarbonyl, carbamoyl, a 4- to 10-membered saturated heterocyclic group, a 5- to 10-membered unsaturated heterocyclic group, C6-C10 aromatic hydrocarbon, and 4- to 10-membered saturated heterocyclyloxy. When the substituent is present, the number thereof is typically 1, 2, or 3.

In the present specification, examples of the "halogen" include fluorine, chlorine, bromine, and iodine.

In the present specification, the "C1-C6 alkyl" may be linear or branched, and examples thereof include methyl, ethyl, n-propyl, isopropyl, n-butyl, isobutyl, tert-butyl, n-pentyl, isopentyl, and n-hexyl.

In the present specification, the "halogeno-C1-C6 alkyl" refers to linear or branched alkyl having 1 to 6 carbon atoms having 1 to 13 halogen atoms, and examples thereof include fluoromethyl, difluoromethyl, trifluoromethyl, trichloromethyl, fluoroethyl, 1,1,1-trifluoroethyl, monofluoro-n-propyl, perfluoro-n-propyl, and perfluoroisopropyl.

In the present specification, examples of the "C3-C7 cycloalkyl" include cyclopropyl, cyclobutyl, cyclopentyl, cyclohexyl, and cycloheptyl.

In the present specification, examples of the "C7-C14 aralkyl" include benzyl, phenethyl, naphthylmethyl, and fluorenylmethyl.

In the present specification, the "C2-C6 alkenyl" may be linear or branched and means unsaturated hydrocarbon having at least one double bond, and examples thereof include vinyl, allyl, 1-propenyl, 2-methyl-2-propenyl, isopropenyl, 1-, 2- or 3-butenyl, 2-, 3- or 4-pentenyl, 2-methyl-2-butenyl, 3-methyl-2-butenyl, 5-hexenyl, and 3-methyl-3-butenyl.

In the present specification, examples of the "C4-C7 cycloalkenyl" include 1-cyclopentenyl and 1-cyclohexenyl.

In the present specification, the "C2-C6 alkynyl" may be linear or branched and means unsaturated hydrocarbon having at least one triple bond, and examples thereof include ethynyl, 1- or 2-propynyl, 1-, 2- or 3-butynyl, and 1-methyl-2-propynyl.

In the present specification, the "C1-C6 alkoxy" may be linear or branched, and examples thereof include methoxy, ethoxy, n-propoxy, isopropoxy, n-butoxy, isobutoxy, sec-butoxy, tert-butoxy, n-pentyloxy, and n-hexyloxy.

In the present specification, the "halogeno-C1-C6 alkoxy" refers to linear or branched alkoxy having 1 to 6 carbon atoms having 1 to 13 halogen atoms, and examples thereof include fluoromethoxy, difluoromethoxy, trifluoromethoxy, trichloromethoxy, fluoroethoxy, 1,1,1-trifluoroethoxy, monofluoro-n-propoxy, perfluoro-n-propoxy, and perfluoroisopropoxy.

In the present specification, examples of the "C3-C7 cycloalkoxy" include cyclopropoxy, cyclobutoxy, cyclopentyloxy, cyclohexyloxy, and cycloheptyloxy.

In the present specification, examples of the "C7-C13 aralkyloxy" include benzyloxy, phenethyloxy, naphthylmethyloxy, and fluorenylmethyloxy.

In the present specification, the "C1-C6 alkylthio" may be linear or branched, and examples thereof include methylthio, ethylthio, n-propylthio, isopropylthio, n-butylthio, isobutylthio, tert-butylthio, n-pentylthio, isopentylthio, and n-hexylthio.

In the present specification, the "mono(C1-C6 alkyl)amino" refers to amino substituted by one linear or branched C1-C6 alkyl, and examples thereof include methylamino, ethylamino, n-propylamino, isopropylamino, n-butylamino, isobutylamino, tert-butylamino, n-pentylamino, isopentylamino, and n-hexylamino.

In the present specification, the "di(C1-C6 alkyl)amino" refers to amino substituted by two linear or branched C1-C6 alkyl groups, and examples thereof include dimethylamino, diethylamino, di(n-propyl)amino, diisopropylamino, di(n-butyl)amino, diisobutylamino, di(tert-butyl)amino, di(n-pentyl)amino, diisopentylamino, di(n-hexyl)amino, methylethylamino, and methylisopropylamino.

In the present specification, the "acyl" means (C1-C6 alkyl)carbonyl or (C6-C14 aryl)carbonyl.

In the present specification, examples of the "(C1-C6 alkyl)carbonyl" include methylcarbonyl, ethylrbonyl, n-propylcarbonyl, isopropylcarbonyl, n-butylcarbonyl, isobutylcarbonyl, tert-butylcarbonyl, n-pentylcarbonyl, isopentylcarbonyl, and n-hexylcarbonyl.

In the present specification, examples of the "(C6-C14 aryl)carbonyl" include phenylcarbonyl, naphthylcarbonyl, fluorenylcarbonyl, anthrylcarbonyl, biphenylylcarbonyl, tetrahydronaphthylcarbonyl, chromanylcarbonyl, 2,3-dihydro-1,4-dioxanaphthalenylcarbonyl, indanylcarbonyl, and phenanthrylcarbonyl.

In the present specification, the "acyloxy" means (C1-C6 alkyl)carbonyloxy or (C6-C14 aryl)carbonyloxy.

In the present specification, the "(C1-C6 alkyl)carbonyloxy" may be linear or branched, and examples thereof include methylcarbonyloxy, ethylcarbonyloxy, n-propylcarbonyloxy, isopropylcarbonyloxy, n-butylcarbonyloxy, isobutylcarbonyloxy, tert-butylcarbonyloxy, n-pentylcarbonyloxy, isopentylcarbonyloxy, and n-hexylcarbonyloxy.

In the present specification, examples of the "(C6-C14 aryl)carbonyloxy" include phenylcarbonyloxy, naphthylcarbonyloxy, fluorenylcarbonyloxy, anthrylcarbonyloxy, biphenylylcarbonyloxy, tetrahydronaphthylcarbonyloxy, chromanylcarbonyloxy, 2,3-dihydro-1,4-dioxanaphthalenylcarbonyloxy, indanylcarbonyloxy, and phenanthrylcarbonyloxy.

In the present specification, the "(C1-C6 alkoxy)carbonyl" may be linear or branched, and examples thereof include methoxycarbonyl, ethoxycarbonyl, n-propoxycarbonyl, isopropoxycarbonyl, butoxycarbonyl, isobutoxycarbonyl, tert-butoxycarbonyl, n-pentyloxycarbonyl, isopentyloxycarbonyl, and n-hexyloxycarbonyl.

In the present specification, examples of the "(C7-C13 aralkyl)oxycarbonyl" include benzyloxycarbonyl, phenethyloxycarbonyl, naphthylmethyloxycarbonyl, and fluorenylmethyloxycarbonyl.

In the present specification, the "4- to 10-membered saturated heterocyclic group" refers to a monocyclic or bicyclic 4- to 10-membered saturated heterocyclic group having at least one heteroatom selected from nitrogen, oxygen, and sulfur, and examples thereof include azetidinyl, morpholino, pyrrolidinyl, piperidinyl, piperazinyl, tetrahydrofuranyl, tetrahydropyranyl, tetrahydrothiophenyl, thiazolidinyl, oxazolidinyl, and octahydroindolyl. A monocyclic 4- to 7-membered saturated heterocyclic group having at least one heteroatom selected from nitrogen, oxygen, and sulfur is preferred, and examples thereof include azetidinyl, morpholino, pyrrolidinyl, piperidinyl, piperazinyl, tetrahydrofuranyl, tetrahydropyranyl, tetrahydrothiophenyl, thiazolidinyl, and oxazolidinyl.

In the present specification, the "5- to 10-membered unsaturated heterocyclic group" refers to a monocyclic or bicyclic 5- to 10-membered unsaturated heterocyclic group having at least one heteroatom selected from the group consisting of nitrogen, oxygen, and sulfur, and examples thereof include thienyl, furyl, pyrrolyl, oxazolyl, isoxazolyl, thiazolyl, isothiazolyl, thiadiazolyl, pyrazolyl, triazolyl, tetrazolyl, pyridyl, pyrazyl, pyrimidinyl, pyridazinyl, indolyl, isoindolyl, indazolyl, triazolopyridyl, benzimidazolyl, benzoxazolyl, benzothiazolyl, benzothienyl, benzofuranyl, purinyl, quinolyl, isoquinolyl, quinazolinyl, quinoxalinyl, methylenedioxyphenyl, ethylenedioxyphenyl, and dihydrobenzofuranyl. A monocyclic 5- to 8-membered unsaturated heterocyclic group having at least one heteroatom selected from the group consisting of nitrogen, oxygen, and sulfur is preferred, and examples thereof include thienyl, furyl, pyrrolyl, oxazolyl, isoxazolyl, thiazolyl, isothiazolyl, thiadiazolyl, pyrazolyl, triazolyl, tetrazolyl, pyridyl, pyrazyl, pyrimidinyl, and pyridazinyl.

In the present specification, examples of the "C6-C10 aromatic hydrocarbon" include phenyl, tolyl, xylyl, naphthyl, and tetrahydronaphthyl.

In the present specification, the "4- to 10-membered saturated heterocyclyloxy" refers to 4- to 10-membered saturated heterocyclyloxy having at least one heteroatom selected from nitrogen, oxygen, and sulfur, and examples thereof include morpholinyloxy, 1-pyrrolidinyloxy, piperidinyloxy, piperazinyloxy, tetrahydrofuranyloxy, tetrahydropyranyloxy, tetrahydrothiophenyloxy, thiazolidinyloxy, and oxazolidinyloxy.

In the compound represented by the Formula (I) of the present invention, $R_1$ represents substituted or unsubstituted C1-C6 alkyl, substituted or unsubstituted C2-C6 alkenyl, substituted or unsubstituted C2-C6 alkynyl, substituted or unsubstituted silyl, or substituted or unsubstituted sulfanyl.

The "C1-C6 alkyl" in the "substituted or unsubstituted C1-C6 alkyl" represented by $R_1$ may be linear or branched, and examples thereof include methyl, ethyl, n-propyl, isopropyl, n-butyl, tert-butyl, sec-butyl, isobutyl, n-pentyl, isopentyl, and n-hexyl. The C1-C6 alkyl is preferably methyl, ethyl, n-propyl, isopropyl, n-butyl, tert-butyl, sec-butyl, isobutyl, n-pentyl, or isopentyl, more preferably methyl, ethyl, n-propyl, isopropyl, n-butyl, tert-butyl, sec-butyl, or isobutyl, still more preferably methyl, ethyl, n-propyl, isopropyl, or tert-butyl, even more preferably tert-butyl.

The "substituent" in the "substituted or unsubstituted C1-C6 alkyl" represented by $R_1$ is, for example, the substituent listed above, and is preferably halogen or cyano, more preferably halogen, still more preferably fluorine or chlorine, even more preferably fluorine.

The "substituted or unsubstituted C1-C6 alkyl" represented by $R_1$ is preferably C1-C6 alkyl that may have halogen as a substituent, more preferably C1-C6 alkyl that may have fluorine as a substituent, still more preferably ethyl, n-propyl, isopropyl, tert-butyl, trifluoromethyl, trifluoroethyl, or trifluoroisopropyl, even more preferably tert-butyl.

Examples of the "C2-C6 alkenyl" in the "substituted or unsubstituted C2-C6 alkenyl" represented by $R_1$ include vinyl, allyl, 1-propenyl, isopropenyl, 2-methyl-2-propenyl, 1-, 2- or 3-butenyl, isobutenyl, 2-, 3- or 4-pentenyl, 2-methyl-2-butenyl, 3-methyl-2-butenyl, 3-methyl-3-butenyl, and 5-hexenyl. The C2-C6 alkenyl is preferably vinyl, allyl, 1-propenyl, or isopropenyl, more preferably isopropenyl.

The "substituent" in the "substituted or unsubstituted C2-C6 alkenyl" represented by $R_1$ is, for example, the substituent listed above, and is preferably halogen or cyano, more preferably halogen, still more preferably chlorine or fluorine, even more preferably fluorine.

The "substituted or unsubstituted C2-C6 alkenyl" represented by $R_1$ is preferably C2-C6 alkenyl that may have halogen as a substituent, more preferably C2-C6 alkenyl that may have fluorine as a substituent, still more preferably isopropenyl or trifluoroisopropenyl.

Examples of the "C2-C6 alkynyl" in the "substituted or unsubstituted C2-C6 alkynyl" represented by $R_1$ include ethynyl, 1- or 2-propynyl, 1-, 2- or 3-butynyl, and 1-methyl-2-propynyl. The C2-C6 alkynyl is preferably ethynyl, or 1- or 2-propynyl.

The "substituent" in the "substituted or unsubstituted C2-C6 alkynyl" represented by $R_1$ is, for example, the substituent listed above, and is preferably halogen or cyano, more preferably fluorine or chlorine.

The "substituted or unsubstituted C2-C6 alkynyl" represented by $R_1$ is preferably C2-C6 alkynyl, more preferably ethynyl, or 1- or 2-propynyl.

Examples of the "C3-C7 cycloalkyl" in the "substituted or unsubstituted C3-C7 cycloalkyl" represented by $R_1$ include cyclopropyl, cyclobutyl, cyclopentyl, cyclohexyl, and cycloheptyl. The C3-C7 cycloalkyl is preferably cyclopropyl, cyclobutyl, or cyclopentyl, more preferably cyclopropyl or cyclobutyl.

The "substituent" in the "substituted or unsubstituted C3-C7 cycloalkyl" represented by $R_1$ is, for example, the substituent listed above, and is preferably halogen, cyano, or C1-C6 alkyl, preferably halogen or C1-C6 alkyl, more preferably fluorine, chlorine, or methyl, still more preferably fluorine or methyl.

The "substituted or unsubstituted C3-C7 cycloalkyl" represented by $R_1$ is preferably C3-C7 cycloalkyl that may have halogen or C1-C6 alkyl as a substituent, more preferably C3-C7 cycloalkyl that may have fluorine or methyl as a substituent, still more preferably cyclopropyl that may have fluorine or methyl as a substituent, or cyclobutyl that may have fluorine or methyl as a substituent, even more preferably 2,2-difluoro-1-methylcyclopropyl.

The "substituent" in the "substituted or unsubstituted silyl" represented by $R_1$ is, for example, the substituent listed above, and is preferably halogen or C1-C6 alkyl, more preferably C1-C6 alkyl, still more preferably methyl, ethyl, n-propyl, or isopropyl, even more preferably methyl.

The "substituted or unsubstituted silyl" represented by $R_1$ is preferably silyl having C1-C6 alkyl as a substituent, more preferably trimethylsilyl.

The "substituent" in the "substituted or unsubstituted sulfanyl" represented by $R_1$ is, for example, the substituent listed above, and is preferably halogen or C1-C6 alkyl, more preferably halogen, still more preferably fluorine or chlorine, even more preferably fluorine.

The "substituted or unsubstituted sulfanyl" represented by $R_1$ is preferably sulfanyl having halogen as a substituent, more preferably pentafluorosulfanyl.

$R_1$ is preferably substituted or unsubstituted C1-C6 alkyl, substituted or unsubstituted C2-C6 alkenyl, substituted or unsubstituted C3-C7 cycloalkyl, substituted or unsubstituted silyl, or substituted or unsubstituted sulfanyl, more preferably substituted or unsubstituted C1-C6 alkyl, substituted or unsubstituted C2-C6 alkenyl, substituted or unsubstituted C3-C7 cycloalkyl, substituted or unsubstituted C1-C6 alkoxy, tri(C1-C6 alkyl)silyl, or pentafluorosulfanyl; when $R_1$ is substituted or unsubstituted C1-C6 alkyl, substituted or unsubstituted C2-C6 alkenyl, or substituted or unsubstituted C3-C7 cycloalkyl, the substituent is halogen, cyano, or C1-C6 alkyl; and when one or more substituents are present, these substituents may be identical or different. $R_1$ is still more preferably C1-C6 alkyl that may have halogen as a substituent, C2-C6 alkenyl that may have halogen as a substituent, C3-C7 cycloalkyl that may have halogen or C1-C6 alkyl as a substituent, tri(C1-C6 alkyl)silyl, or pentafluorosulfanyl, even more preferably C1-C6 alkyl that may have fluorine as a substituent, C2-C6 alkenyl that may have fluorine as a substituent, cyclopropyl that may have fluorine or methyl as a substituent, cyclobutyl that may have fluorine or methyl as a substituent, silyl having C1-C6 alkyl as a substituent, or sulfanyl having halogen as a substituent, further preferably ethyl, n-propyl, isopropyl, tert-butyl, trifluoromethyl, trifluoroethyl, trifluoroisopropyl, isopropenyl, trifluoroisopropenyl, cyclopropyl, cyclobutyl, difluorocyclopropyl, 2,2-difluoro-1-methylcyclopropyl, trimethylsilyl, or pentafluorosulfanyl, still further preferably isopropyl, tert-butyl, 2,2-difluoro-1-methylcyclopropyl, or trimethylsilyl, even further preferably tert-butyl.

In the compound represented by the Formula (I) of the present invention, $R_2$ represents halogen, cyano, nitro, C1-C6 alkyl, C2-C6 alkenyl, or C2-C6 alkynyl. At least one of $R_2$ is present in the para-position of $L_1$. When one or more $R_2$ are present, these $R_2$ may be identical or different.

Examples of the "halogen" represented by $R_2$ include fluorine, chlorine, bromine, and iodine. The halogen is preferably fluorine, chlorine, or bromine, more preferably fluorine or chlorine, still more preferably chlorine.

The "C1-C6 alkyl" represented by $R_2$ may be linear or branched, and examples thereof include methyl, ethyl, n-propyl, isopropyl, n-butyl, tert-butyl, sec-butyl, isobutyl, n-pentyl, isopentyl, and n-hexyl. The C1-C6 alkyl is preferably methyl, ethyl, n-propyl, isopropyl, n-butyl, tert-butyl, sec-butyl, isobutyl, n-pentyl, or isopentyl, more preferably methyl, ethyl, n-propyl, isopropyl, n-butyl, tert-butyl, sec-butyl, or isobutyl, still more preferably methyl, ethyl, n-propyl, or isopropyl, even more preferably methyl or ethyl.

Examples of the "C2-C6 alkenyl" represented by $R_2$ include vinyl, allyl, 1-propenyl, isopropenyl, 2-methyl-2-propenyl, 1-, 2- or 3-butenyl, isobutenyl, 2-, 3- or 4-pentenyl, 2-methyl-2-butenyl, 3-methyl-2-butenyl, 3-methyl-3-butenyl, and 5-hexenyl. The C2-C6 alkenyl is preferably vinyl, allyl, 1-propenyl, or isopropenyl, more preferably vinyl.

Examples of the "C2-C6 alkynyl" represented by $R_2$ include ethynyl, 1- or 2-propynyl, 1-, 2- or 3-butynyl, and 1-methyl-2-propynyl. The C2-C6 alkynyl is preferably ethynyl, or 1- or 2-propynyl.

$R_2$ is preferably halogen, cyano, C1-C6 alkyl, or C2-C6 alkenyl, more preferably halogen, cyano, C1-C4 alkyl, or C2-C4 alkenyl, still more preferably fluorine, chlorine, bromine, cyano, methyl, ethyl, or vinyl, even more preferably fluorine, chlorine, methyl, ethyl, or vinyl, further preferably chlorine.

$R_1$ and $R_2$ present in the para-position of $L_1$, taken together with the following adjacent group:

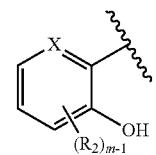

may form

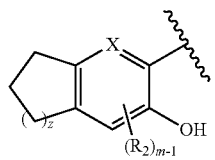

When the condensed ring is formed in the compound represented by the Formula (I) of the present invention,

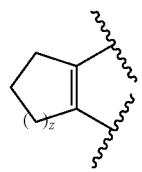

is substituted or unsubstituted. In this embodiment, the substituent refers to halogen or C1-C6 alkyl and is preferably fluorine, chlorine, or C1-C6 alkyl, more preferably C1-C6 alkyl, still more preferably methyl. When the substituent is present, the number thereof is preferably 1 to 3, more preferably 2. When one or more substituents are present, these substituents may be identical or different.

In the compound represented by the Formula (I) of the present invention, z represents an integer of 1 to 3 and is preferably 1.

In the compound represented by the Formula (I) of the present invention, m represents an integer of 1 to 3 and is preferably 1 or 2, more preferably 1.

When m is 2 or 3, $R_2$ may be identical or different.

In the compound represented by the Formula (I) of the present invention, X represents nitrogen, CH, or $CR_2$ and is preferably nitrogen or CH, more preferably CH.

In the compound represented by the Formula (I) of the present invention, when $R_1$ and $R_2$ present in the para-position of $L_1$, taken together with the following adjacent group:

form

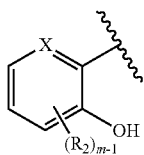

preferably,
m is 1 or 2,
z is an integer of 1 to 3,
X is nitrogen or CH, and

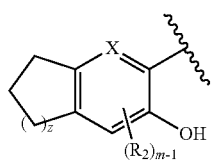

is unsubstituted or has one or two C1-C6 alkyl groups as a substituent,
more preferably,
m is 1 or 2,
z is 1,
X is nitrogen or CH, and

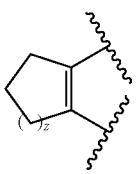

is unsubstituted or has one or two C1-C6 alkyl groups as a substituent,
still more preferably,
m is 1 or 2,
z is 1,
X is nitrogen or CH, and

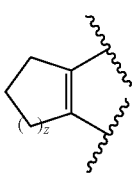

is unsubstituted or has one or two methyl groups as a substituent, and even more preferably, the condensed ring group is

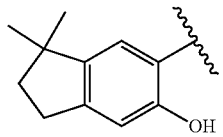 [SMILES: *c1cc2c(cc1O)CCC2(C)C]

In the compound represented by the Formula (I) of the present invention, $L_1$ represents —NH—C(Ra)$_2$—, —C(Ra)$_2$—, or —C(Ra)$_2$—C(Ra)$_2$— and is preferably —NH—C(Ra)$_2$— or —C(Ra)$_2$—, more preferably —NH—C(Ra)$_2$—.

In the compound represented by the Formula (I) of the present invention, Ra are identical or different, and each represents hydrogen, C1-C6 alkyl, or hydroxyl and is preferably hydrogen, methyl, or hydroxyl, more preferably hydrogen.

$L_1$ is preferably —NH—C(Ra)$_2$—, —C(Ra)$_2$—, or —C(Ra)$_2$—C(Ra)$_2$—, and Ra are identical or different, and each represents hydrogen, methyl, or hydroxyl. $L_1$ is more preferably —NH—CH$_2$—, —NH—CH(CH$_3$)—, —CH(OH)—, —CH$_2$—, or —CH$_2$—CH$_2$—, still more preferably —NH—CH$_2$— or —CH$_2$—, even more preferably —NH—CH$_2$—.

In the compound represented by the Formula (I) of the present invention, ring A represents a 5- or 6-unsaturated heterocyclic ring that may have substituent $R_6$, or a benzene ring that may have substituent $R_6$.

The "5- or 6-unsaturated heterocyclic ring that may have substituent $R_6$" represented by ring A is a 5- or 6-unsaturated heterocyclic ring that may have substituent $R_6$ having at least one or more heteroatoms selected from the group consisting of nitrogen, oxygen, and sulfur.

In the compound represented by the Formula (I) of the present invention, substituent $R_6$ represents at least one member selected from the group consisting of halogen, cyano, nitro, amino, hydroxyl, carboxyl, C1-C6 alkyl that may have substituent $R_{71}$, C2-C6 alkenyl that may have substituent $R_{72}$, C2-C6 alkynyl that may have substituent $R_{73}$, C3-C10 cycloalkyl that may have substituent $R_{74}$, C4-C10 cycloalkenyl that may have substituent $R_{75}$, C6-C10 aromatic hydrocarbon that may have substituent $R_{76}$, a 4- to 10-membered saturated heterocyclic group that may have substituent $R_{77}$, and a 5- to 10-membered unsaturated heterocyclic group that may have substituent $R_{78}$, and when one or more substituents are present, they may be identical or different. $R_6$ preferably represents at least one member selected from the group consisting of halogen, cyano, C1-C6 alkyl that may have substituent $R_{71}$, C3-C7 cycloalkyl that may have substituent $R_{74}$, C4-C7 cycloalkenyl, a monocyclic 4- to 7-membered saturated heterocyclic group having one nitrogen or oxygen that may have substituent $R_{77}$, and a monocyclic 5- to 8-membered unsaturated heterocyclic group having one nitrogen, and when one or more substituents are present, they may be identical or different.

The "5-membered unsaturated heterocyclic ring that may have substituent $R_6$" in the "5- or 6-unsaturated heterocyclic ring that may have substituent $R_6$" represented by ring A is preferably

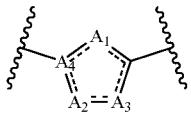

wherein

----- is a single bond or a double bond,
$A_1$ is C—Rb1, nitrogen, N—Rb1, oxygen, or sulfur,
$A_2$ is C—Rb2, nitrogen, N—Rb2, oxygen, or sulfur,
$A_3$ is C—Rb3, nitrogen, N—Rb3, oxygen, or sulfur,
$A_4$ is carbon or nitrogen, and
at least one of $A_1$, $A_2$, $A_3$, and $A_4$ is at least one member selected from the group consisting of nitrogen, N—Rb1, N—Rb2, N—Rb3, oxygen, and sulfur. The 5-membered unsaturated heterocyclic ring that may have substituent $R_6$ is more preferably

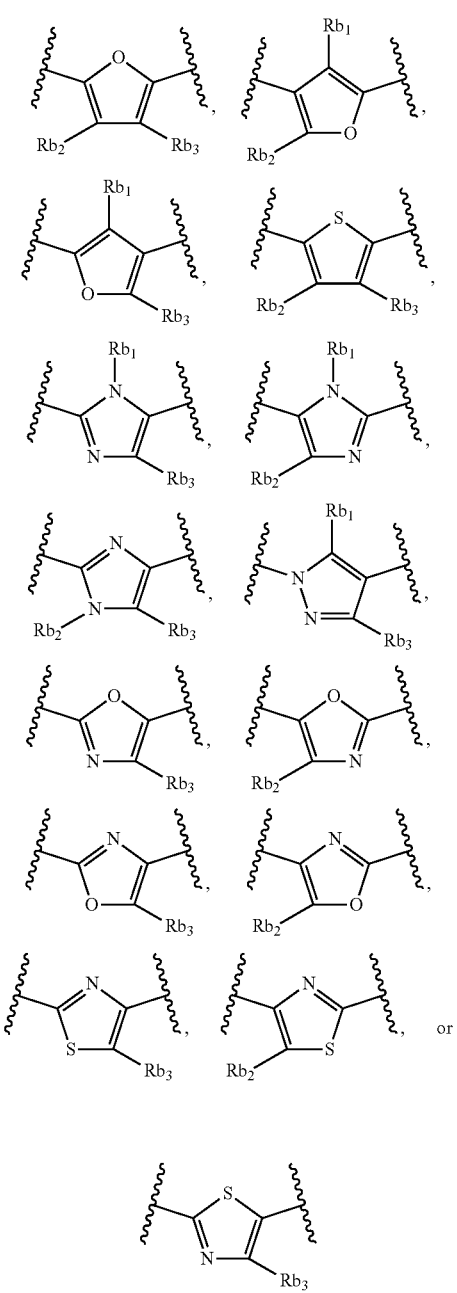

still more preferably

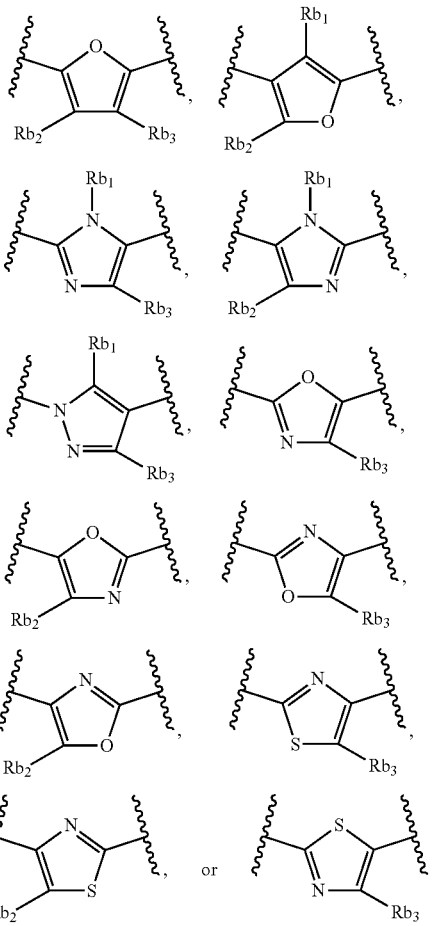

even more preferably

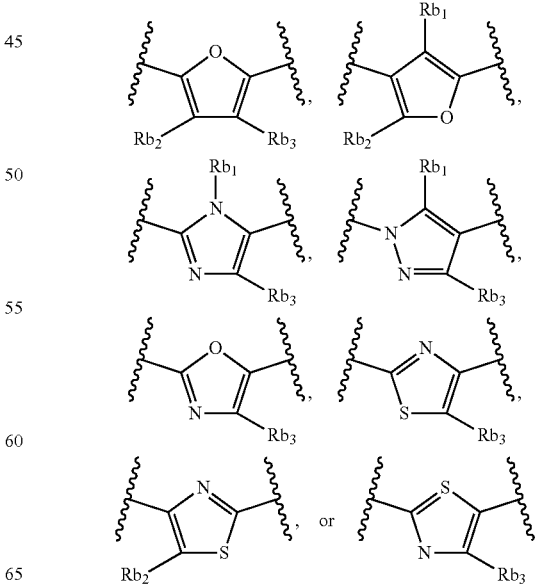

further preferably

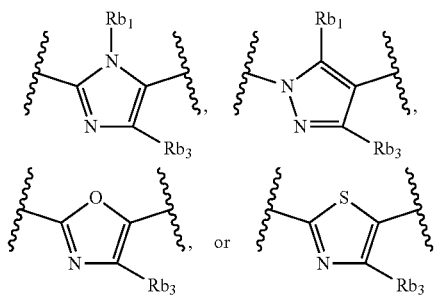

still further preferably

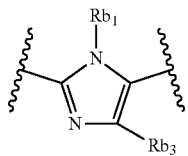

In the compound represented by the Formula (I) of the present invention, Rb1, Rb2, and Rb3 are identical or different, and each represents hydrogen, halogen, cyano, nitro, amino, hydroxyl, carboxyl, C1-C6 alkyl that may have substituent $R_{71}$, C2-C6 alkenyl that may have substituent $R_{72}$, C2-C6 alkynyl that may have substituent $R_{73}$, C3-C7 cycloalkyl that may have substituent $R_{74}$, C4-C7 cycloalkenyl that may have substituent $R_{75}$, C6-C10 aromatic hydrocarbon that may have substituent $R_{76}$, a 4- to 10-membered saturated heterocyclic group that may have substituent $R_{77}$, or a 5- to 10-membered unsaturated heterocyclic group that may have substituent $R_{78}$.

The "C1-C6 alkyl" in the "C1-C6 alkyl that may have substituent $R_{71}$" represented by Rb1, Rb2, and Rb3 may be linear or branched, and examples thereof include methyl, ethyl, n-propyl, isopropyl, n-butyl, tert-butyl, sec-butyl, isobutyl, n-pentyl, isopentyl, and n-hexyl. The C1-C6 alkyl is preferably methyl, ethyl, n-propyl, isopropyl, n-butyl, tert-butyl, sec-butyl, isobutyl, n-pentyl, or isopentyl, more preferably methyl, ethyl, n-propyl, isopropyl, n-butyl, tert-butyl, sec-butyl, or isobutyl, still more preferably methyl, ethyl, n-propyl, isopropyl, or n-butyl, even more preferably thyl, ethyl, n-propyl, or n-butyl.

The "substituent $R_{71}$" in the "C1-C6 alkyl that may have substituent $R_{71}$" represented by Rb1, Rb2, and Rb3 is, for example, the substituent listed above, and is preferably halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl)amino, more preferably halogen, C1-C6 alkoxy, C6-C10 aromatic hydrocarbon, a monocyclic 5- to 8-membered unsaturated heterocyclic group having one nitrogen, or di(C1-C6 alkyl)amino, still more preferably fluorine, methoxy, phenyl, pyridyl, or dimethylamino, even more preferably methoxy, phenyl, pyridyl, or dimethylamino, further preferably pyridyl or dimethylamino.

The "C1-C6 alkyl that may have substituent $R_{71}$" represented by Rb1, Rb2, and Rb3 is preferably C1-C6 alkyl that may have substituent $R_{71}$, and the substituent $R_{71}$ is halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl)amino. The C1-C6 alkyl that may have substituent $R_{71}$ is more preferably C1-C6 alkyl that may have substituent $R_{71}$, and the substituent $R_{71}$ is halogen, C1-C6 alkoxy, C6-C10 aromatic hydrocarbon, a monocyclic 5- to 8-membered unsaturated heterocyclic group having one nitrogen, or di(C1-C6 alkyl)amino. The C1-C6 alkyl that may have substituent $R_{71}$ is still more preferably C1-C6 alkyl that may have substituent $R_{71}$, and the substituent $R_{71}$ is fluorine, methoxy, phenyl, pyridyl, or dimethylamino. The C1-C6 alkyl that may have substituent $R_{71}$ is even more preferably methyl, ethyl, n-propyl, isopropyl, n-butyl, trifluoromethyl, methoxyethyl, benzyl, pyridylmethyl, or dimethylaminoethyl, further preferably methyl, ethyl, n-propyl, isopropyl, n-butyl, methoxyethyl, benzyl, pyridylmethyl, or dimethylaminoethyl, still further preferably methyl, ethyl, n-propyl, n-butyl, pyridylmethyl, or dimethylaminoethyl.

Examples of the "C2-C6 alkenyl" in the "C2-C6 alkenyl that may have substituent $R_{72}$" represented by Rb1, Rb2, and Rb3 include vinyl, allyl, 1-propenyl, isopropenyl, 2-methyl-2-propenyl, 1-, 2- or 3-butenyl, isobutenyl, 2-, 3- or 4-pentenyl, 2-methyl-2-butenyl, 3-methyl-2-butenyl, 3-methyl-3-butenyl, and 5-hexenyl. The C2-C6 alkenyl is preferably vinyl, allyl, 1-propenyl, or isopropenyl, more preferably vinyl or allyl.

The "substituent $R_{72}$" in the "C2-C6 alkenyl that may have substituent $R_7$" represented by Rb1, Rb2, and Rb3 is, for example, the substituent listed above, and is preferably halogen or cyano, more preferably halogen, still more preferably chlorine or fluorine.

The "C2-C6 alkenyl that may have substituent $R_{72}$" represented by Rb1, Rb2, and Rb3 is preferably C2-C6 alkenyl that may have halogen as a substituent, more preferably C2-C6 alkenyl, still more preferably vinyl or allyl.

Examples of the "C2-C6 alkynyl" in the "C2-C6 alkynyl that may have substituent $R_{73}$" represented by Rb1, Rb2, and Rb3 include ethynyl, 1- or 2-propynyl, 1-, 2- or 3-butynyl, and 1-methyl-2-propynyl. The C2-C6 alkynyl is preferably ethynyl, or 1- or 2-propynyl.

The "substituent $R_{73}$" in the "C2-C6 alkynyl that may have substituent $R_{73}$" represented by Rb1, Rb2, and Rb3 is, for example, the substituent listed above, and is preferably halogen or cyano, more preferably fluorine or chlorine.

The "C2-C6 alkynyl that may have substituent $R_{73}$" represented by Rb1, Rb2, and Rb3 is preferably C2-C6 alkynyl, more preferably ethynyl, or 1- or 2-propynyl.

Examples of the "C3-C7 cycloalkyl" in the "C3-C7 cycloalkyl that may have substituent $R_{74}$" represented by Rb1, Rb2, and Rb3 include cyclopropyl, cyclobutyl, cyclopentyl, cyclohexyl, and cycloheptyl. The C3-C7 cycloalkyl is preferably cyclopropyl, cyclobutyl, or cyclopentyl, more preferably cyclopentyl.

The "substituent $R_{74}$" in the "C3-C7 cycloalkyl that may have substituent $R_{74}$" represented by Rb1, Rb2, and Rb3 is, for example, the substituent listed above, and is preferably halogen, hydroxyl, cyano, or C1-C6 alkoxy, preferably hydroxyl or C1-C6 alkoxy.

The "C3-C7 cycloalkyl that may have substituent $R_{74}$" represented by Rb1, Rb2, and Rb3 is preferably C3-C7 cycloalkyl that may have hydroxyl or C1-C6 alkoxy as a substituent, more preferably C3-C7 cycloalkyl, still more preferably cyclopentyl.

Examples of the "C4-C7 cycloalkenyl" in the "C4-C7 cycloalkenyl that may have substituent $R_{75}$" represented by Rb1, Rb2, and Rb3 include cyclobutenyl, cyclopentenyl, cyclohexenyl, and cycloheptenyl. The C4-C7 cycloalkenyl is preferably cyclopentenyl.

The "substituent $R_{75}$" in the "C4-C7 cycloalkenyl that may have substituent $R_{75}$" represented by Rb1, Rb2, and Rb3 is, for example, the substituent listed above, and is preferably halogen, more preferably fluorine or chlorine.

The "C4-C7 cycloalkenyl that may have substituent $R_{75}$" represented by Rb1, Rb2, and Rb3 is preferably C4-C7 cycloalkenyl that may have halogen as a substituent, more preferably C4-C7 cycloalkenyl, still more preferably cyclopentenyl.

The "C6-C10 aromatic hydrocarbon" in the "C6-C10 aromatic hydrocarbon that may have substituent $R_{76}$" represented by Rb1, Rb2, and Rb3 is preferably phenyl, naphthyl, or tetrahydronaphthyl, more preferably phenyl.

The "substituent $R_{76}$" in the "C6-C10 aromatic hydrocarbon that may have substituent $R_{76}$" represented by Rb1, Rb2, and Rb3 is, for example, the substituent listed above, and is preferably halogen, more preferably fluorine or chlorine.

The "C6-C10 aromatic hydrocarbon that may have substituent $R_{76}$" represented by Rb1, Rb2, and Rb3 is preferably C6-C10 aromatic hydrocarbon, more preferably phenyl.

The "4- to 10-membered saturated heterocyclic group" in the "4- to 10-membered saturated heterocyclic group that may have substituent $R_{77}$" represented by Rb1, Rb2, and Rb3 is a monocyclic or bicyclic 4- to 10-membered saturated heterocyclic group having at least one heteroatom selected from nitrogen, oxygen, and sulfur, and is preferably a monocyclic or bicyclic 4- to 10-membered saturated heterocyclic group having 1 to 5 heteroatoms selected from the group consisting of nitrogen, oxygen, and sulfur, more preferably a monocyclic 4- to 7-membered saturated heterocyclic group having 1 to 3 heteroatoms selected from the group consisting of nitrogen, oxygen, and sulfur, still more preferably a monocyclic 4- to 7-membered saturated heterocyclic group having one nitrogen or oxygen, even more preferably azetidinyl, pyrrolidinyl, piperidinyl, tetrahydrofuranyl, or tetrahydropyranyl.

The "substituent $R_{77}$" in the "4- to 10-membered saturated heterocyclic group that may have substituent $R_{77}$" represented by Rb1, Rb2, and Rb3 is, for example, the substituent listed above, and is preferably substituted or unsubstituted C1-C6 alkyl, C1-C6 alkenyl, (C1-C6 alkyl)carbonyl, (C1-C6 alkoxy)carbonyl, C3-C7 cycloalkyl, (C1-C6 alkyl)carbonyl, (C1-C6 alkoxy)carbonyl, C6-C10 aromatic hydrocarbon, a 4- to 10-membered saturated heterocyclic group, or a 5- to 10-membered unsaturated heterocyclic group, more preferably C1-C6 alkyl that may have halogen, C1-C6 alkoxy, or C6-C10 aromatic hydrocarbon as a substituent, C1-C6 alkenyl, C3-C7 cycloalkyl, (C1-C6 alkyl)carbonyl, (C1-C6 alkoxy)carbonyl, a monocyclic 4- to 7-membered saturated heterocyclic group having one nitrogen or oxygen, or a monocyclic 5- to 8-membered unsaturated heterocyclic group having one nitrogen, still more preferably methyl, ethyl, isopropyl, difluoromethyl, methoxyethyl, benzyl, 1-propenyl, cyclopropyl, acetyl, tert-butoxycarbonyl, oxetanyl, or pyridyl.

The "4- to 10-membered saturated heterocyclic group that may have substituent $R_{77}$" represented by Rb1, Rb2, and Rb3 is preferably a monocyclic 4- to 7-membered saturated heterocyclic group having 1 to 3 heteroatoms selected from the group consisting of nitrogen, oxygen, and sulfur that may have substituent $R_{77}$, and the substituent $R_{77}$ is substituted or unsubstituted C1-C6 alkyl, C1-C6 alkenyl, (C1-C6 alkyl)carbonyl, (C1-C6 alkoxy)carbonyl, C3-C7 cycloalkyl, (C1-C6 alkyl)carbonyl, (C1-C6 alkoxy)carbonyl, C6-C10 aromatic hydrocarbon, a 4- to 10-membered saturated heterocyclic group, or a 5- to 10-membered unsaturated heterocyclic group. The 4- to 10-membered saturated heterocyclic group that may have substituent $R_{77}$ is more preferably a monocyclic 4- to 7-membered saturated heterocyclic group having one nitrogen or oxygen that may have substituent $R_{77}$, and the substituent $R_{77}$ is C1-C6 alkyl that may have halogen, C1-C6 alkoxy, or C6-C10 aromatic hydrocarbon as a substituent, C1-C6 alkenyl, C3-C7 cycloalkyl, (C1-C6 alkyl)carbonyl, (C1-C6 alkoxy)carbonyl, a monocyclic 4- to 7-membered saturated heterocyclic group having one nitrogen or oxygen, or a monocyclic 5- to 8-membered unsaturated heterocyclic group having one nitrogen. The 4- to 10-membered saturated heterocyclic group that may have substituent $R_{77}$ is still more preferably azetidinyl, pyrrolidinyl, or piperidinyl that may have substituent $R_{77}$, and the substituent $R_{77}$ is methyl, ethyl, isopropyl, difluoromethyl, methoxyethyl, benzyl, 1-propenyl, cyclopropyl, acetyl, tert-butoxycarbonyl, oxetanyl, or pyridyl. The 4- to 10-membered saturated heterocyclic group that may have substituent $R_{77}$ is even more preferably N-tert-butoxycarbonylazetidinyl, N-isopropylazetidinyl, N-acetylazetidinyl, N-methylpyrrolidinyl, N-ethylpyrrolidinyl, N-acetylpyrrolidinyl, N-isopropylpyrrolidinyl, N-pyridinepyrrolidinyl, N-2-methoxyethyl-pyrrolidinyl, N-cyclopropylpyrrolidinyl, N-oxetanylpyrrolidinyl, N-benzylpyrrolidinyl, N-difluoroethyl-pyrrolidinyl, N-prop-2-enyl-pyrrolidinyl, 1-(2,2-difluoroethyl)-2-methylpyrrolidinyn-3-yl, 1-(2,2-difluoroethyl)-5-methylpyrrolidinyn-3-yl, N-methylpipiperidinyl, N-difluoroethylpiperidinyl, tetrahydropyranyl, or tetrahydrofuranyl.

The "5- to 10-membered unsaturated heterocyclic group" in the "5- to 10-membered unsaturated heterocyclic group that may have substituent $R_{78}$" represented by Rb1, Rb2, and Rb3 is a monocyclic or bicyclic 5- to 10-membered unsaturated heterocyclic group having at least one heteroatom selected from the group consisting of nitrogen, oxygen, and sulfur, and is preferably a monocyclic or bicyclic 5- to 10-membered unsaturated heterocyclic group having 1 to 5 heteroatoms selected from the group consisting of nitrogen, oxygen, and sulfur, more preferably a monocyclic 5- to 8-membered unsaturated heterocyclic group having 1 to 3 heteroatoms selected from the group consisting of nitrogen, oxygen, and sulfur, still more preferably a monocyclic 5- to 8-membered unsaturated heterocyclic group having one nitrogen, even more preferably pyridyl.

The "substituent $R_{78}$" in the "5- to 10-membered unsaturated heterocyclic group that may have substituent $R_{78}$" represented by Rb1, Rb2, and Rb3 is, for example, the substituent listed above, and is preferably halogen, hydroxyl, or C1-C6 alkyl, more preferably methyl, ethyl, hydroxyl, fluorine, or chlorine.

The "5- to 10-membered unsaturated heterocyclic group that may have substituent $R_{78}$" represented by Rb1, Rb2, and Rb3 is preferably a 5- to 10-membered unsaturated heterocyclic group having at least one heteroatom selected from the group consisting of nitrogen, oxygen, and sulfur, more preferably a monocyclic 5- to 8-membered unsaturated heterocyclic group having 1 to 3 heteroatoms selected from the group consisting of nitrogen, oxygen, and sulfur, still more preferably a monocyclic 5- to 8-membered unsaturated heterocyclic group having one nitrogen, even more preferably pyridyl.

Rb1, Rb2, and Rb3 are preferably identical or different, and each is hydrogen, halogen, cyano, C1-C6 alkyl that may have substituent $R_{71}$, alkenyl that may have substituent $R_{72}$, alkynyl that may have substituent $R_{73}$, C3-C7 cycloalkyl that may have substituent $R_{74}$, C4-C7 cycloalkenyl that may have substituent $R_{75}$, C6-C10 aromatic hydrocarbon that may have substituent $R_{76}$, a 4- to 10-membered saturated heterocyclic group that may have substituent $R_{77}$, or $R_{78}$ is a substituted or unsubstituted 5- to 10-membered unsaturated heterocyclic group; when Rb1, Rb2, or Rb3 is C1-C6 alkyl that may have substituent $R_{71}$, C2-C6 alkenyl that may have substituent $R_{72}$, or C2-C6 alkynyl that may have substituent $R_{73}$, the substituent $R_{71}$, $R_{72}$, or $R_{73}$ is halogen, cyano, nitro, amino, hydroxyl, carboxyl, C1-C6 alkoxy, di(C1-C6 alkyl)amino, C3-C7 cycloalkyl, substituted or unsubstituted C6-C10 aromatic hydrocarbon, a substituted or unsubstituted 4- to 10-membered saturated heterocyclic group, or a substituted or unsubstituted 5- to 10-membered unsaturated heterocyclic group; when one or more substituents $R_{71}$, $R_{72}$, or $R_{73}$ are present, they may be identical or different; when Rb1, Rb2, or Rb3 is C3-C10 cycloalkyl that may have substituent $R_{74}$, C4-C10 cycloalkenyl that may have substituent $R_{75}$, C6-C10 aromatic hydrocarbon that may have substituent $R_{76}$, a 4- to 10-membered saturated heterocyclic group that may have substituent $R_{77}$, or a 5- to 10-membered unsaturated heterocyclic group that may have substituent $R_{78}$, the substituent $R_{74}$, $R_{75}$, $R_{76}$, $R_{77}$, or $R_{78}$ is halogen, cyano, nitro, amino, hydroxyl, carboxyl, substituted or unsubstituted C1-C6 alkyl, C2-C6 alkenyl, C2-C6 alkynyl, C1-C6 alkoxy, di(C1-C6 alkyl)amino, (C1-C6 alkyl)carbonyl, C7-C14 aralkyl, (C1-C6 alkoxy)carbonyl, C3-C7 cycloalkyl, C6-C10 aromatic hydrocarbon, a substituted or unsubstituted 4- to 10-membered saturated heterocyclic group, or a substituted or unsubstituted 5- to 10-membered unsaturated heterocyclic group; and when one or more substituents $R_{74}$, $R_{75}$, $R_{76}$, $R_{77}$, or $R_{78}$ are present, they may be identical or different. Rb1, Rb2, and Rb3 are more preferably identical or different, and each is hydrogen, halogen, cyano, C1-C6 alkyl that may have substituent $R_{71}$, alkenyl that may have substituent $R_{72}$, alkynyl that may have substituent $R_{73}$, C3-C7 cycloalkyl that may have substituent $R_{74}$, C4-C7 cycloalkenyl that may have substituent $R_{75}$, C6-C10 aromatic hydrocarbon that may have substituent $R_{76}$, a monocyclic 4- to 7-membered saturated heterocyclic group having one nitrogen or oxygen that may have substituent $R_{77}$, or a monocyclic 5- to 8-membered unsaturated heterocyclic group having one nitrogen that may have substituent $R_{78}$; when Rb1, Rb2, or Rb3 is C1-C6 alkyl that may have substituent $R_{71}$, C2-C6 alkenyl that may have substituent $R_{72}$, or C2-C6 alkynyl that may have substituent $R_{73}$, the substituent $R_{71}$, $R_{72}$, or $R_{73}$ is halogen, C1-C6 alkoxy, di(C1-C6 alkyl)amino, C3-C7 cycloalkyl, substituted or unsubstituted C6-C10 aromatic hydrocarbon, a substituted or unsubstituted 4- to 10-membered saturated heterocyclic group, or a substituted or unsubstituted 5- to 10-membered unsaturated heterocyclic group; when one or more substituents $R_{71}$, $R_{72}$, or $R_{73}$ are present, they may be identical or different; when Rb1, Rb2, or Rb3 is C3-C10 cycloalkyl that may have substituent $R_{74}$, C4-C10 cycloalkenyl that may have substituent $R_{75}$, C6-C10 aromatic hydrocarbon that may have substituent $R_{76}$, a monocyclic 4- to 7-membered saturated heterocyclic group having one nitrogen or oxygen that may have substituent $R_{77}$, or a monocyclic 5- to 8-membered unsaturated heterocyclic group having one nitrogen that may have substituent $R_{78}$, the substituent $R_{74}$, $R_{75}$, $R_{76}$, $R_{77}$, or $R_{78}$ is halogen, hydroxyl, substituted or unsubstituted C1-C6 alkyl, C2-C6 alkenyl, C1-C6 alkoxy, (C1-C6 alkyl)carbonyl, (C1-C6 alkoxy)carbonyl, a substituted or unsubstituted 4- to 10-membered saturated heterocyclic group, or a substituted or unsubstituted 5- to 10-membered unsaturated heterocyclic group; and when one or more substituents $R_{74}$, $R_{75}$, $R_{76}$, $R_{77}$, or $R_{78}$ are present, they may be identical or different. Rb1, Rb2, and Rb3 are still more preferably identical or different, and each is hydrogen, halogen, cyano, C1-C6 alkyl that may have substituent $R_{71}$, C3-C7 cycloalkyl that may have substituent $R_{74}$, C4-C7 cycloalkenyl, a monocyclic 4- to 7-membered saturated heterocyclic group having one nitrogen or oxygen that may have substituent $R_{77}$, or a monocyclic 5- to 8-membered unsaturated heterocyclic group having one nitrogen; the substituent $R_{71}$ is halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl)amino; the substituent $R_{74}$ is hydroxyl or C1-C6 alkoxy; and the substituent $R_{77}$ is C1-C6 alkyl that may have halogen or C6-C10 aromatic hydrocarbon as a substituent, C2-C6 alkenyl, (C1-C6 alkyl)carbonyl, (C1-C6 alkoxy)carbonyl, a monocyclic 4- to 7-membered saturated heterocyclic group having one nitrogen or oxygen, or a monocyclic 5- to 8-membered unsaturated heterocyclic group having one nitrogen. Rb1, Rb2, and Rb3 are even more preferably identical or different, and each is hydrogen, halogen, C1-C6 alkyl that may have substituent $R_{71}$, or C3-C7 cycloalkyl; the substituent $R_{71}$ is halogen, C1-C6 alkoxy, C6-C10 aromatic hydrocarbon, a monocyclic 5- to 8-membered unsaturated heterocyclic group having one nitrogen, or di(C1-C6 alkyl)amino. Rb1, Rb2, and Rb3 are further preferably identical or different, and each is hydrogen, iodine, methyl, ethyl, n-propyl, isopropyl, n-butyl, trifluoromethyl, methoxyethyl, benzyl, pyridylmethyl, dimethylaminoethyl, or cyclopentyl, still further preferably identical or different, and each is hydrogen, iodine, methyl, ethyl, n-propyl, isopropyl, n-butyl, methoxyethyl, benzyl, pyridylmethyl, dimethylaminoethyl, or cyclopentyl, even further preferably identical or different, and each is hydrogen, methyl, ethyl, n-propyl, n-butyl, pyridylmethyl, or dimethylaminoethyl.

In the compound represented by the Formula (I) of the present invention, Rb1 is preferably hydrogen, halogen, cyano, C1-C6 alkyl that may have substituent $R_{71}$, alkenyl that may have substituent $R_{72}$, alkynyl that may have substituent $R_{73}$, C3-C7 cycloalkyl that may have substituent $R_{74}$, C4-C7 cycloalkenyl that may have substituent $R_{75}$, C6-C10 aromatic hydrocarbon that may have substituent $R_{76}$, a 4- to 10-membered saturated heterocyclic group that may have substituent $R_{77}$, or a 5- to 10-membered unsaturated heterocyclic group that may have substituent $R_{78}$; when Rb1 is C1-C6 alkyl that may have substituent $R_{71}$, C2-C6 alkenyl that may have substituent $R_{72}$, or C2-C6 alkynyl that may have substituent $R_{73}$, the substituent $R_{71}$, $R_{72}$, or $R_{73}$ is halogen, cyano, nitro, amino, hydroxyl, carboxyl, C1-C6 alkoxy, di(C1-C6 alkyl)amino, C3-C7 cycloalkyl, substituted or unsubstituted C6-C10 aromatic hydrocarbon, a substituted or unsubstituted 4- to 10-membered saturated heterocyclic group, or a substituted or unsubstituted 5- to 10-membered unsaturated heterocyclic group; when one or more substituents $R_{71}$, $R_{72}$, or $R_{73}$ are present, they may be identical or different; when Rb1 is C3-C10 cycloalkyl that may have substituent $R_{74}$, C4-C10 cycloalkenyl that may have substituent $R_{75}$, C6-C10 aromatic hydrocarbon that may have substituent $R_{76}$, a 4- to 10-membered saturated heterocyclic group that may have substituent $R_{77}$, or a 5- to 10-membered unsaturated heterocyclic group that may have substituent $R_{78}$, the substituent $R_{74}$, $R_{75}$, $R_{76}$, $R_{77}$, or $R_{78}$ is halogen, cyano, nitro, amino, hydroxyl, carboxyl, substituted or unsubstituted C1-C6 alkyl, C2-C6 alkenyl, C2-C6 alkynyl, C1-C6 alkoxy, di(C1-C6 alkyl)amino, (C1-C6 alkyl)carbonyl, C7-C14 aralkyl, (C1-C6 alkoxy)carbonyl, C3-C7 cycloalkyl, C6-C10 aromatic hydrocarbon, a substituted or unsubstituted 4- to 10-membered saturated heterocyclic group, or a substituted or unsubstituted 5- to 10-membered unsaturated heterocyclic group; and when one or more substituents $R_{74}$, $R_{75}$, $R_{76}$, $R_{77}$, or $R_{78}$ are present, they may be identical or different. Rb1 is more preferably hydrogen, halogen, C1-C6 alkyl that may have substituent $R_{71}$, C3-C7 cycloalkyl that may have substituent $R_{74}$, C4-C7 cycloalkenyl, a monocyclic 4- to 7-membered saturated heterocyclic group having one nitrogen or oxygen that may have substituent $R_{77}$, or a monocyclic 5- to 8-membered unsaturated heterocyclic group having one nitrogen; when Rb1 is C1-C6 alkyl that may have substituent $R_{71}$, the substituent $R_{71}$ is halogen, cyano, nitro, amino, hydroxyl, carboxyl, C1-C6 alkoxy, di(C1-C6 alkyl)amino, C3-C7 cycloalkyl, substituted or unsubstituted C6-C10 aromatic hydrocarbon, a substituted or unsubstituted 4- to 10-membered saturated heterocyclic group, or a substituted or unsubstituted 5- to 10-membered unsaturated heterocyclic group; when one or more substituents $R_{71}$ are present, they may be identical or different; when Rb1 is C3-C10 cycloalkyl that may have substituent $R_{74}$, or a 4- to 10-membered saturated heterocyclic group that may have substituent $R_{77}$, the substituent $R_{74}$ or $R_{77}$ is halogen, cyano, nitro, amino, hydroxyl, carboxyl, substituted or unsubstituted C1-C6 alkyl, C2-C6 alkenyl, C2-C6 alkynyl, C1-C6 alkoxy, di(C1-C6 alkyl)amino, (C1-C6 alkyl)carbonyl, C7-C14 aralkyl, (C1-C6 alkoxy)carbonyl, C3-C7 cycloalkyl, C6-C10 aromatic hydrocarbon, a substituted or unsubstituted 4- to 10-membered saturated heterocyclic group, or a substituted or unsubstituted 5- to 10-membered unsaturated heterocyclic group; and when one or more substituents $R_{74}$ or $R_{77}$ are present, they may be identical or different. Rb1 is still more preferably hydrogen, halogen, C1-C6 alkyl that may have substituent $R_{71}$, C3-C7 cycloalkyl that may have substituent $R_{74}$, C4-C7 cycloalkenyl, a monocyclic 4- to 7-membered saturated heterocyclic group having one nitrogen or oxygen that may have substituent $R_{77}$, or a monocyclic 5- to 8-membered unsaturated heterocyclic group having one nitrogen; the substituent $R_{71}$ is halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl)amino; the substituent $R_{74}$ is hydroxyl or C1-C6 alkoxy; and the substituent $R_{77}$ is C1-C6 alkyl that may have halogen or C6-C10 aromatic hydrocarbon as a substituent, C2-C6 alkenyl, (C1-C6 alkyl)carbonyl, (C1-C6 alkoxy)carbonyl, a monocyclic 4- to 7-membered saturated heterocyclic group having one nitrogen or oxygen, or a monocyclic 5- to 8-membered unsaturated heterocyclic group having one nitrogen. Rb1 is even more preferably hydrogen, C1-C6 alkyl that may have substituent $R_{71}$, or C3-C7 cycloalkyl, and the substituent $R_{71}$ is C1-C6 alkoxy, C6-C10 aromatic hydrocarbon, a monocyclic 5- to 8-membered unsaturated heterocyclic group having one nitrogen, or di(C1-C6 alkyl) amino. Rb1 is further preferably hydrogen, methyl, ethyl, n-propyl, isopropyl, n-butyl, methoxyethyl, benzyl, pyridylmethyl, dimethylaminoethyl, or cyclopentyl, still further preferably methyl, ethyl, n-propyl, isopropyl, n-butyl, methoxyethyl, benzyl, pyridylmethyl, dimethylaminoethyl, or cyclopentyl, even further preferably methyl, ethyl, n-propyl, n-butyl, pyridylmethyl, or dimethylaminoethyl.

In the compound represented by the Formula (I) of the present invention, Rb2 is preferably hydrogen or C1-C6 alkyl, more preferably hydrogen or methyl, still more preferably hydrogen.

In the compound represented by the Formula (I) of the present invention, Rb3 is preferably hydrogen, halogen, cyano, or substituted or unsubstituted C1-C6 alkyl, more preferably hydrogen, halogen, or substituted or unsubstituted C1-C6 alkyl, still more preferably hydrogen, halogen, or C1-C6 alkyl that may have halogen as a substituent, even more preferably hydrogen, fluorine, chlorine, bromine, iodine, or C1-C6 alkyl that may have fluorine as a substituent, further preferably hydrogen, iodine, methyl, difluoromethyl, or trifluoromethyl, still further preferably hydrogen, iodine, methyl, or trifluoromethyl, even further preferably hydrogen, iodine, or methyl, even further preferably hydrogen or methyl.

The "6-membered unsaturated heterocyclic ring that may have substituent $R_6$" in the "5- or 6-unsaturated heterocyclic ring that may have substituent $R_6$" represented by ring A is preferably

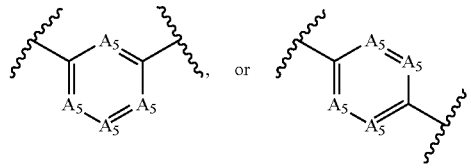

wherein $A_5$ is C—Rb5 or N—Rb5, and at least one of $A_5$ is N—Rb5.

The 6-membered unsaturated heterocyclic ring that may have substituent $R_6$ is more preferably

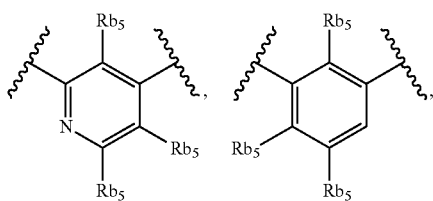

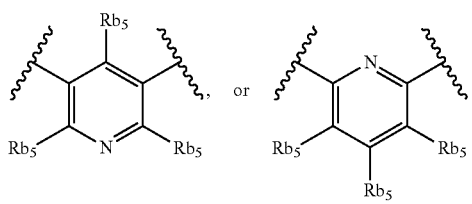

still more preferably

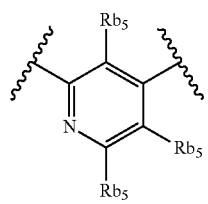

In the compound represented by the Formula (I) of the present invention, Rb5 are identical or different, and each represents hydrogen, halogen, or C1-C6 alkyl.

The "C1-C6 alkyl" represented by Rb5 may be linear or branched, and examples thereof include methyl, ethyl, n-propyl, isopropyl, n-butyl, tert-butyl, sec-butyl, isobutyl, n-pentyl, isopentyl, and n-hexyl. The C1-C6 alkyl is preferably methyl, ethyl, n-propyl, isopropyl, n-butyl, tert-butyl, sec-butyl, or isobutyl, more preferably methyl, ethyl, n-propyl, isopropyl, or n-butyl, still more preferably methyl or ethyl.

Examples of the "halogen" represented by Rb5 include fluorine, chlorine, bromine, and iodine. The halogen is preferably fluorine or chlorine, more preferably chlorine.

In the compound represented by the Formula (I) of the present invention, Rb5 is preferably hydrogen.

The "benzene ring that may have substituent $R_6$" represented by ring A is preferably

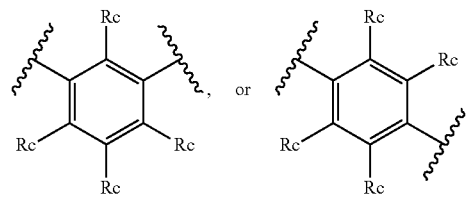

In the compound represented by the Formula (I) of the present invention, Rc are identical or different, and each represents hydrogen, halogen, or C1-C6 alkyl.

Examples of the "halogen" represented by Rc include fluorine, chlorine, bromine, and iodine. The halogen is preferably fluorine or chlorine, more preferably chlorine.

Rc are preferably identical or different, and each is hydrogen, fluorine, or chlorine, more preferably hydrogen.

In one aspect of the present invention, the "benzene ring that may have substituent $R_6$" represented by ring A is preferably

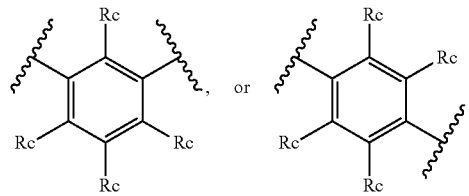

wherein Rc are identical or different, and each represents hydrogen or halogen. The benzene ring that may have substituent $R_6$ is more preferably

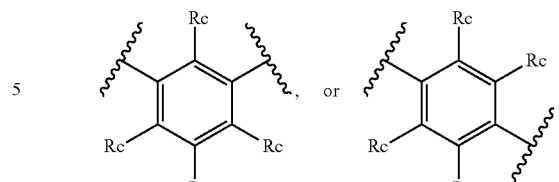

wherein each of at least three of Rc is hydrogen, and the remaining one Rc is hydrogen or halogen. The benzene ring that may have substituent $R_6$ is still more preferably

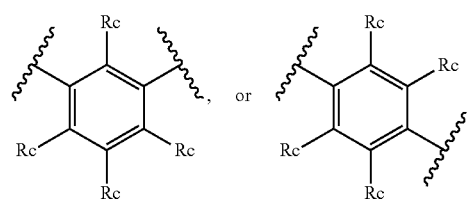

wherein each of at least three of Rc is hydrogen, and the remaining one Rc is hydrogen, fluorine, or chlorine. The benzene ring that may have substituent $R_6$ is even more preferably

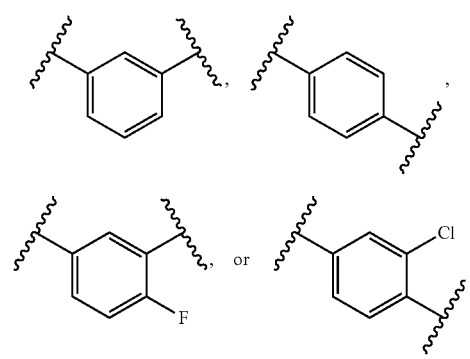

further preferably

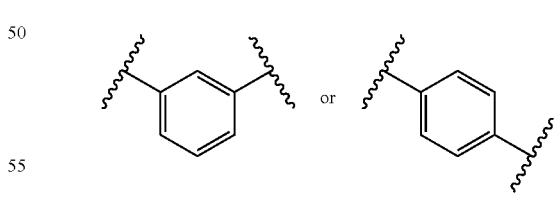

Ring A is preferably

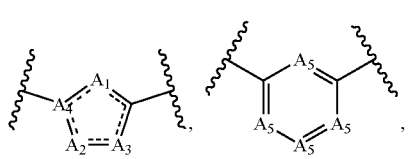

-continued

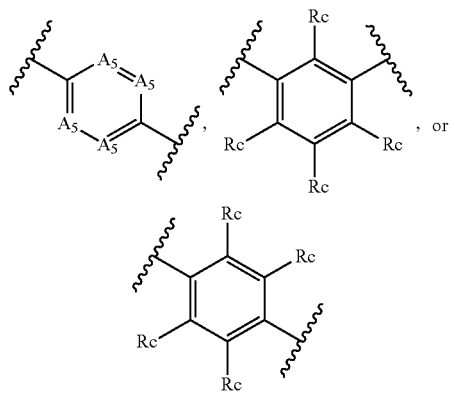

wherein

‾‾‾‾ is a single bond or a double bond, $A_1$ is C—Rb1, nitrogen, N—Rb1, oxygen, or sulfur, $A_2$ is C—Rb2, nitrogen, N—Rb2, oxygen, or sulfur, $A_3$ is C—Rb3, nitrogen, N—Rb3, oxygen, or sulfur, $A_4$ is carbon or nitrogen, at least one of $A_1$, $A_2$, $A_3$, and $A_4$ is at least one member selected from the group consisting of nitrogen, N—Rb1, N—Rb2, N—Rb3, oxygen, and sulfur, $A_5$ is C—Rb5 or N—Rb5, and at least one of $A_5$ is N—Rb5, Rb1, Rb2, and Rb3 are identical or different, and each represents hydrogen, halogen, cyano, C1-C6 alkyl that may have substituent $R_{71}$, alkenyl that may have substituent $R_{72}$, alkynyl that may have substituent $R_{73}$, C3-C7 cycloalkyl that may have substituent $R_{74}$, C4-C7 cycloalkenyl that may have substituent $R_{75}$, C6-C10 aromatic hydrocarbon that may have substituent $R_{76}$, a 4- to 10-membered saturated heterocyclic group that may have substituent $R_{77}$, or a 5- to 10-membered unsaturated heterocyclic group that may have substituent $R_{78}$, Rb5 are identical or different, and each represents hydrogen, halogen, or C1-C6 alkyl, and Rc are identical or different, and each represents hydrogen, halogen, or C1-C6 alkyl.

Ring A is more preferably

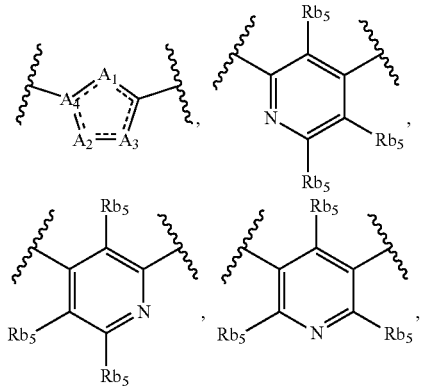

-continued

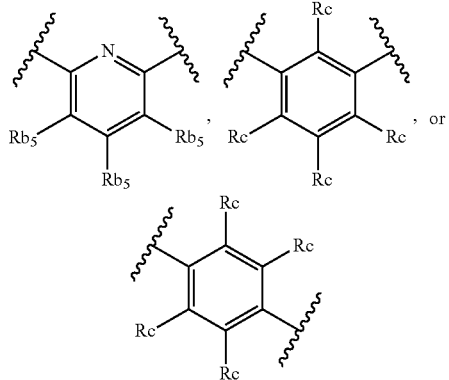

wherein

‾‾‾‾ is a single bond or a double bond, $A_1$ is C—Rb1, nitrogen, N—Rb1, oxygen, or sulfur, $A_2$ is C—Rb2, nitrogen, N—Rb2, oxygen, or sulfur, $A_3$ is C—Rb3, nitrogen, N—Rb3, oxygen, or sulfur, $A_4$ is carbon or nitrogen, at least one of $A_1$, $A_2$, $A_3$, and $A_4$ is at least one member selected from the group consisting of nitrogen, N—Rb1, N—Rb2, N—Rb3, oxygen, and sulfur, Rb1, Rb2, and Rb3 are identical or different, and each represents hydrogen, halogen, cyano, C1-C6 alkyl that may have substituent $R_{71}$, alkenyl that may have substituent $R_{72}$, alkynyl that may have substituent $R_{73}$, C3-C7 cycloalkyl that may have substituent $R_{74}$, C4-C7 cycloalkenyl that may have substituent $R_{75}$, C6-C10 aromatic hydrocarbon that may have substituent $R_{76}$, a 4- to 10-membered saturated heterocyclic group having one nitrogen that may have substituent $R_{77}$, or a 5- to 10-membered unsaturated heterocyclic group having one nitrogen, Rb5 are identical or different, and each represents hydrogen, halogen, or C1-C6 alkyl, and Rc are identical or different, and each represents hydrogen, halogen, or C1-C6 alkyl.

Ring A is still more preferably

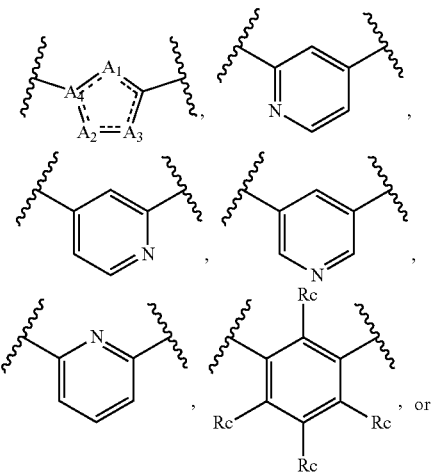

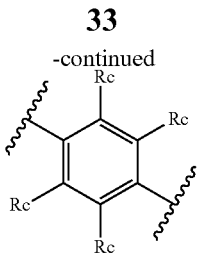

wherein
----- is a single bond or a double bond,
A₁ is C—Rb1, nitrogen, N—Rb1, oxygen, or sulfur,
A₂ is C—Rb2, nitrogen, N—Rb2, oxygen, or sulfur,
A₃ is C—Rb3, nitrogen, N—Rb3, oxygen, or sulfur,
A₄ is carbon or nitrogen,
at least one of A₁, A₂, A₃, and A₄ is at least one member selected from the group consisting of nitrogen, N—Rb1, N—Rb2, N—Rb3, oxygen, and sulfur,
Rb1, Rb2, and Rb3 are identical or different, and each represents hydrogen, halogen, cyano, C1-C6 alkyl that may have substituent $R_{71}$, C3-C7 cycloalkyl that may have substituent $R_{74}$, C4-C7 cycloalkenyl, a monocyclic 4- to 7-membered saturated heterocyclic group having one nitrogen or oxygen that may have substituent $R_{77}$, or a monocyclic 5- to 8-membered unsaturated heterocyclic group having one nitrogen; the substituent $R_{71}$ is halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl)amino; the substituent $R_{74}$ is hydroxyl or C1-C6 alkoxy; and the substituent $R_{77}$ is C1-C6 alkyl that may have halogen or C6-C10 aromatic hydrocarbon as a substituent, C2-C6 alkenyl, (C1-C6 alkyl)carbonyl, (C1-C6 alkoxy)carbonyl, a monocyclic 4- to 7-membered saturated heterocyclic group having one nitrogen or oxygen, or a monocyclic 5- to 8-membered unsaturated heterocyclic group having one nitrogen, and each of at least three of Rc is hydrogen, and the remaining one Rc is hydrogen, fluorine, or chlorine.

Ring A is even more preferably

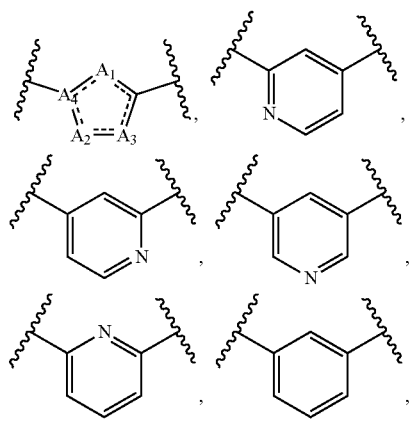

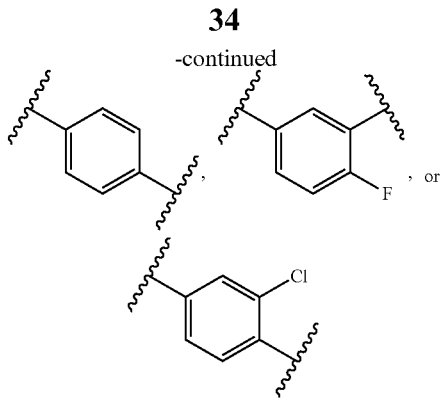

wherein
----- is a single bond or a double bond,
A₁ is C—Rb1, nitrogen, N—Rb1, oxygen, or sulfur,
A₂ is C—Rb2, nitrogen, N—Rb2, oxygen, or sulfur,
A₃ is C—Rb3, nitrogen, N—Rb3, oxygen, or sulfur,
A₄ is carbon or nitrogen,
at least one of A₁, A₂, A₃, and A₄ is at least one member selected from the group consisting of nitrogen, N—Rb1, N—Rb2, N—Rb3, oxygen, and sulfur, and
Rb1, Rb2, and Rb3 are identical or different, and each represents hydrogen, halogen, cyano, C1-C6 alkyl that may have substituent $R_{71}$, C3-C7 cycloalkyl that may have substituent $R_{74}$, C4-C7 cycloalkenyl, a monocyclic 4- to 7-membered saturated heterocyclic group having one nitrogen or oxygen that may have substituent $R_{77}$, or a monocyclic 5- to 8-membered unsaturated heterocyclic group having one nitrogen; the substituent $R_{71}$ is halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl)amino; the substituent $R_{74}$ is hydroxyl or C1-C6 alkoxy; and the substituent $R_{77}$ is C1-C6 alkyl that may have halogen or C6-C10 aromatic hydrocarbon as a substituent, C2-C6 alkenyl, (C1-C6 alkyl)carbonyl, (C1-C6 alkoxy)carbonyl, a monocyclic 4- to 7-membered saturated heterocyclic group having one nitrogen or oxygen, or a monocyclic 5- to 8-membered unsaturated heterocyclic group having one nitrogen.

Ring A is further preferably

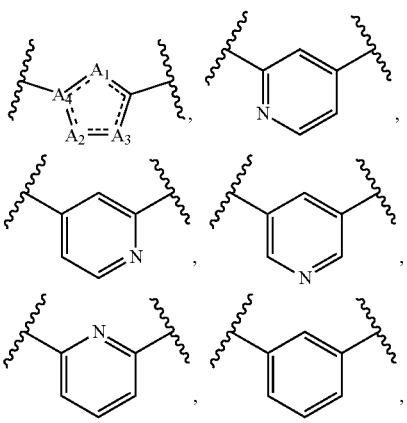

-continued

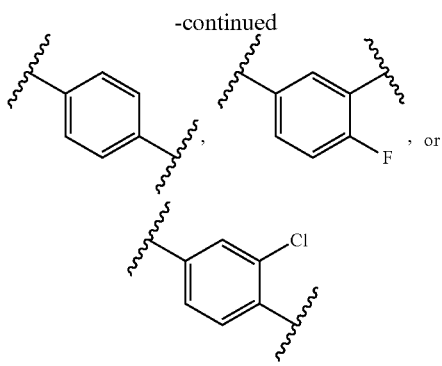

wherein

═════ is a single bond or a double bond, $A_1$ is C—Rb1, nitrogen, N—Rb1, oxygen, or sulfur,
$A_2$ is C—Rb2, nitrogen, N—Rb2, oxygen, or sulfur,
$A_3$ is C—Rb3, nitrogen, N—Rb3, oxygen, or sulfur,
$A_4$ is carbon or nitrogen,
at least one of $A_1$, $A_2$, $A_3$, and $A_4$ is at least one member selected from the group consisting of nitrogen, N—Rb1, N—Rb2, N—Rb3, oxygen, and sulfur,
Rb1 is hydrogen, halogen, C1-C6 alkyl that may have substituent $R_{71}$, C3-C7 cycloalkyl that may have substituent $R_{74}$, C4-C7 cycloalkenyl, a monocyclic 4- to 7-membered saturated heterocyclic group having one nitrogen or oxygen that may have substituent $R_{77}$, or a monocyclic 5- to 8-membered unsaturated heterocyclic group having one nitrogen; the substituent $R_{71}$ is halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl)amino; the substituent $R_{74}$ is hydroxyl or C1-C6 alkoxy; and the substituent $R_{77}$ is C1-C6 alkyl that may have halogen or C6-C10 aromatic hydrocarbon as a substituent, C2-C6 alkenyl, (C1-C6 alkyl)carbonyl, (C1-C6 alkoxy)carbonyl, a monocyclic 4- to 7-membered saturated heterocyclic group having one nitrogen or oxygen, or a monocyclic 5- to 8-membered unsaturated heterocyclic group having one nitrogen,
Rb2 is hydrogen or C1-C6 alkyl, and
Rb3 is hydrogen, halogen, or C1-C6 alkyl that may have halogen as a substituent.

Ring A is still further preferably

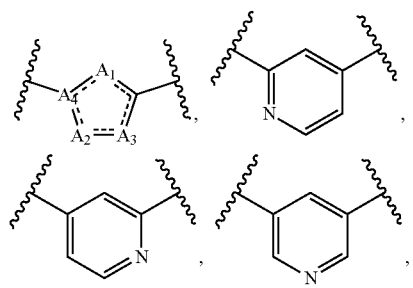

-continued

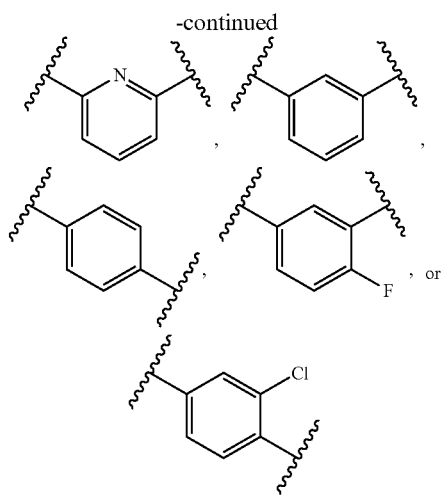

wherein

═════ is a single bond or a double bond, $A_1$ is C—Rb1, nitrogen, N—Rb1, oxygen, or sulfur,
$A_2$ is C—Rb2, nitrogen, N—Rb2, oxygen, or sulfur,
$A_3$ is C—Rb3, nitrogen, N—Rb3, oxygen, or sulfur,
$A_4$ is carbon or nitrogen,
at least one of $A_1$, $A_2$, $A_3$, and $A_4$ is at least one member selected from the group consisting of nitrogen, N—Rb1, N—Rb2, N—Rb3, oxygen, and sulfur,
Rb1 is hydrogen, C1-C6 alkyl that may have substituent $R_{71}$, or C3-C7 cycloalkyl, and the substituent $R_{71}$ is C1-C6 alkoxy, C6-C10 aromatic hydrocarbon, a monocyclic 5- to 8-membered unsaturated heterocyclic group having one nitrogen, or di(C1-C6 alkyl)amino,
Rb2 is hydrogen or C1-C6 alkyl, and
Rb3 is hydrogen, halogen, or C1-C6 alkyl that may have halogen as a substituent.

Ring A is even further preferably

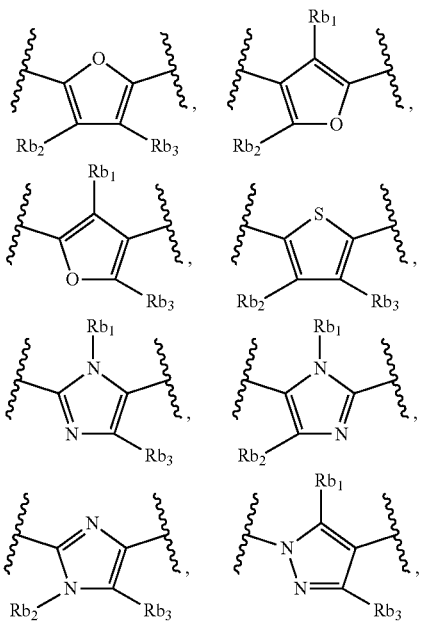

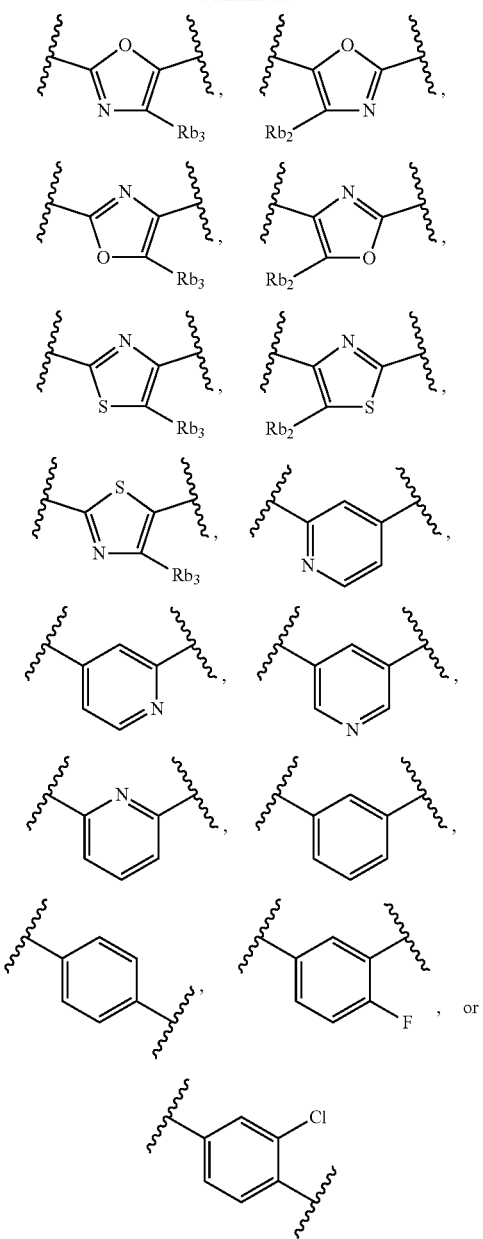

wherein

Rb1 is hydrogen, methyl, ethyl, n-propyl, isopropyl, n-butyl, methoxyethyl, benzyl, pyridylmethyl, dimethylaminoethyl, or cyclopentyl, Rb2 is hydrogen or methyl, and Rb3 is hydrogen, iodine, methyl, or trifluoromethyl.

Ring A is even further preferably

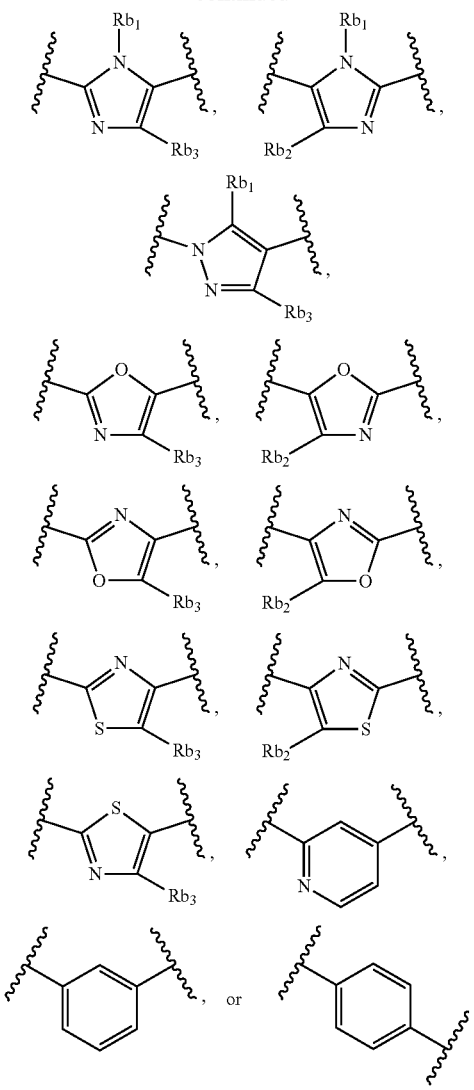

wherein

Rb1 is hydrogen, methyl, ethyl, n-propyl, isopropyl, n-butyl, methoxyethyl, benzyl, pyridylmethyl, dimethylaminoethyl, or cyclopentyl, Rb2 is hydrogen, and Rb3 is hydrogen, iodine, methyl, or trifluoromethyl.

Ring A is even further preferably

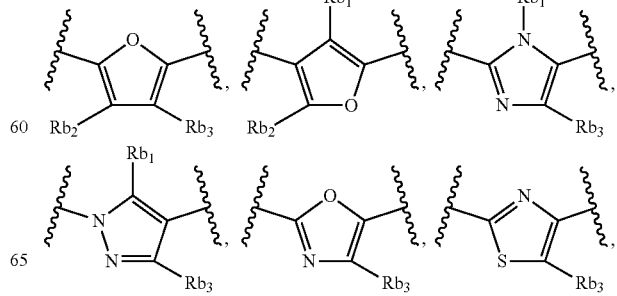

wherein
Rb1 is methyl, ethyl, n-propyl, isopropyl, n-butyl, methoxyethyl, benzyl, pyridylmethyl, dimethylamino-ethyl, or cyclopentyl,
Rb2 is hydrogen, and
Rb3 is hydrogen, iodine, or methyl.

Ring A is even further preferably even further preferably

-continued

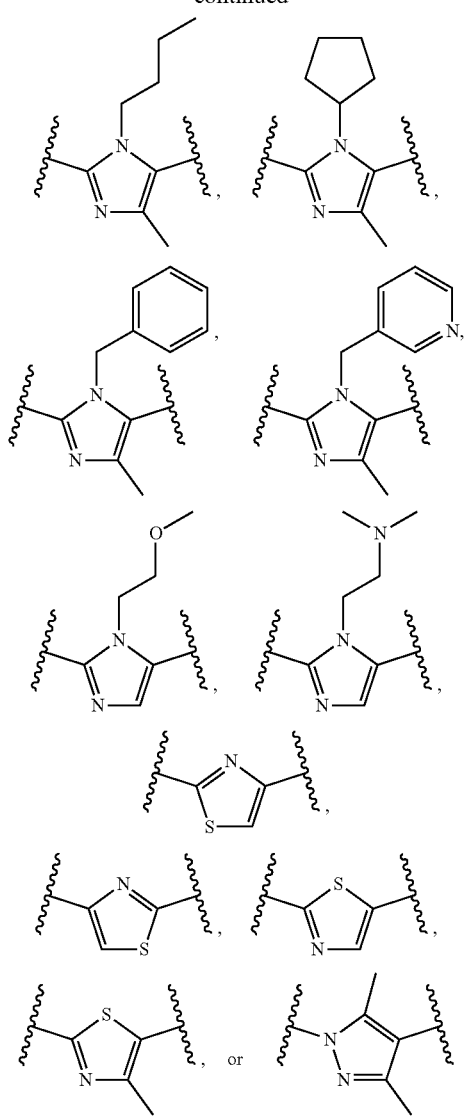

even further preferably

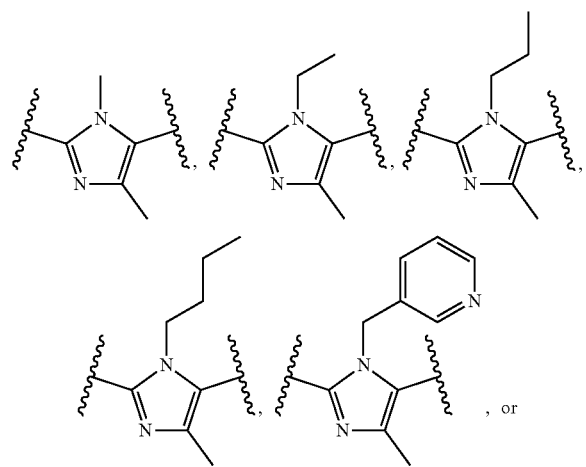

-continued

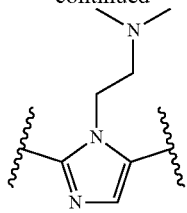

In the compound represented by the Formula (I) of the present invention, $L_2$ represents

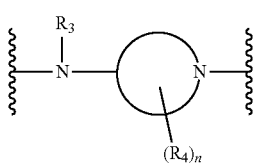

wherein

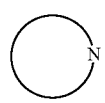

represents a 4- to 8-membered saturated heterocyclic ring having at least one nitrogen.

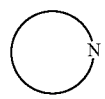

is preferably a 4- to 6-membered saturated heterocyclic ring having at least one nitrogen, more preferably azetidine or pyrrolidine, still more preferably azetidine.

In the compound represented by the Formula (I) of the present invention, $R_3$ represents hydrogen or C1-C6 alkyl.

The "C1-C6 alkyl" represented by $R_3$ may be linear or branched, and examples thereof include methyl, ethyl, n-propyl, isopropyl, n-butyl, tert-butyl, sec-butyl, isobutyl, n-pentyl, isopentyl, and n-hexyl. The C1-C6 alkyl is preferably methyl, ethyl, n-propyl, isopropyl, n-butyl, tert-butyl, sec-butyl, isobutyl, n-pentyl, or isopentyl, more preferably methyl, ethyl, n-propyl, isopropyl, n-butyl, tert-butyl, sec-butyl, or isobutyl, still more preferably methyl, ethyl, n-propyl, or isopropyl, even more preferably methyl or ethyl.

$R_3$ is preferably hydrogen, methyl, ethyl, n-propyl, isopropyl, n-butyl, tert-butyl, sec-butyl, or isobutyl, more preferably hydrogen, methyl, ethyl, n-propyl, or isopropyl, still more preferably hydrogen, methyl, or ethyl, even more preferably hydrogen.

In the compound represented by the Formula (I) of the present invention, $R_4$ represents halogen, cyano, nitro, amino, hydroxyl, carboxyl, C1-C6 alkyl that may have substituent $R_8$, C2-C6 alkenyl, C2-C6 alkynyl, or C1-C6 alkoxy, and when two $R_4$ are present on the same carbon atom, the two $R_4$, taken together with the carbon atom to which these groups are attached, may form a 3- to 8-membered saturated hydrocarbon ring. When one or more $R_4$ are present, these $R_4$ may be identical or different.

Examples of the "halogen" represented by $R_4$ include fluorine, chlorine, bromine, and iodine. The halogen is preferably fluorine or chlorine, more preferably fluorine.

The "C1-C6 alkyl" in the "C1-C6 alkyl that may have substituent $R_8$" represented by $R_4$ may be linear or branched, and examples thereof include methyl, ethyl, n-propyl, isopropyl, n-butyl, tert-butyl, sec-butyl, isobutyl, n-pentyl, isopentyl, and n-hexyl. The C1-C6 alkyl is preferably methyl, ethyl, n-propyl, isopropyl, n-butyl, tert-butyl, sec-butyl, isobutyl, n-pentyl, or isopentyl, more preferably methyl, ethyl, n-propyl, isopropyl, n-butyl, tert-butyl, sec-butyl, or isobutyl, still more preferably methyl, ethyl, n-propyl, or isopropyl, even more preferably methyl or ethyl, further preferably methyl.

The "substituent $R_8$" in the "C1-C6 alkyl that may have substituent $R_8$" represented by $R_4$ is preferably halogen, hydroxyl, cyano, di(C1-C6 alkyl)amino, or C1-C6 alkoxy, more preferably fluorine, hydroxyl, cyano, dimethylamino, or methoxy.

The "C1-C6 alkyl that may have substituent $R_8$" represented by $R_4$ is preferably methyl, ethyl, fluoromethyl, hydroxymethyl, cyanomethyl, dimethylaminomethyl, or methoxymethyl.

Examples of the "C2-C6 alkenyl" represented by $R_4$ include vinyl, allyl, 1-propenyl, isopropenyl, 2-methyl-2-propenyl, 1-, 2- or 3-butenyl, isobutenyl, 2-, 3- or 4-pentenyl, 2-methyl-2-butenyl, 3-methyl-2-butenyl, 3-methyl-3-butenyl, and 5-hexenyl. The C2-C6 alkenyl is preferably vinyl, allyl, 1-propenyl, or isopropenyl, more preferably vinyl.

Examples of the "C2-C6 alkynyl" represented by $R_4$ include ethynyl, 1- or 2-propynyl, 1-, 2- or 3-butynyl, and 1-methyl-2-propynyl. The C2-C6 alkynyl is preferably ethynyl, or 1- or 2-propynyl, more preferably ethynyl.

The "C1-C6 alkoxy" in the "C1-C6 alkoxy" represented by $R_4$ may be linear or branched, and examples thereof include methoxy, ethoxy, n-propoxy, isopropoxy, n-butoxy, isobutoxy, sec-butoxy, tert-butoxy, n-pentyloxy, and n-hexyloxy. The C1-C6 alkoxy is preferably methoxy, ethoxy, n-propoxy, or isopropoxy, more preferably methoxy or ethoxy, still more preferably methoxy.

The "3- to 8-membered saturated hydrocarbon ring", formed, when two $R_4$ are present on the same carbon atom, by the two $R_4$, taken together with the carbon atom to which these groups are attached, is preferably a 3- to 5-membered saturated hydrocarbon ring, more preferably a 3-membered saturated hydrocarbon ring.

$R_4$ is preferably halogen, hydroxyl, C1-C6 alkyl that may have substituent $R_8$, or C1-C6 alkoxy; when two $R_4$ are present on the same carbon atom, the two $R_4$, taken together with the carbon atom to which these groups are attached, may form a 3- to 8-membered saturated hydrocarbon ring; and substituent $R_8$ is halogen, cyano, hydroxyl, C1-C6 alkoxy, or di(C1-C6 alkyl)amino. $R_4$ is more preferably halogen, hydroxyl, C1-C6 alkyl that may have substituent $R_8$, or C1-C6 alkoxy; when two $R_4$ are present on the same carbon atom, the two $R_4$, taken together with the carbon atom to which these groups are attached, may form a 3- to 8-membered saturated hydrocarbon ring; and substituent $R_8$ is fluorine, hydroxyl, cyano, dimethylamino, or methoxy. $R_4$ is still more preferably fluorine, hydroxyl, methyl, ethyl, fluoromethyl, hydroxymethyl, cyanomethyl, dimethylaminomethyl, methoxymethyl, or methoxy; when two $R_4$ are present on the same carbon atom, the two $R_4$, taken together with the carbon atom to which these groups are attached, may form a 3-membered saturated hydrocarbon ring.

In the compound represented by the Formula (I) of the present invention, n represents an integer of 0 to 3, and is preferably an integer of 0 to 2, more preferably 0 or 1, still more preferably 0. When n is 2 or 3, $R_4$ may be identical or different.

$L_2$ is preferably

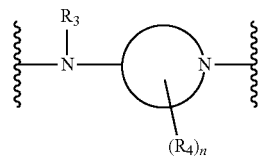

wherein

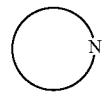

is a 4- to 6-membered saturated heterocyclic ring having at least one nitrogen, $R_3$ is hydrogen or C1-C6 alkyl, $R_4$ is halogen, hydroxyl, C1-C6 alkyl that may have substituent $R_8$, or C1-C6 alkoxy, and when two $R_4$ are present on the same carbon atom, the two $R_4$, taken together with the carbon atom to which these groups are attached, may form a 3- to 8-membered saturated hydrocarbon ring, R is halogen, hydroxyl, cyano, di(C1-C6 alkyl)amino, or C1-C6 alkoxy, n is an integer of 0 to 3, and when n is 2 or 3, $R_4$ may be identical or different.

$L_2$ is more preferably

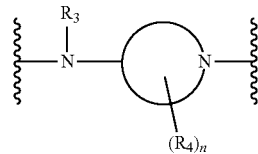

wherein

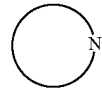

is a 4- to 6-membered saturated heterocyclic ring having at least one nitrogen, $R_3$ is hydrogen or C1-C6 alkyl, $R_4$ is halogen, hydroxyl, C1-C6 alkyl that may have substituent $R_8$, or C1-C6 alkoxy, and when two $R_4$ are present on the same carbon atom, the two $R_4$, taken together with the carbon atom to which these groups are attached, may form a 3- to 8-membered saturated hydrocarbon ring, $R_8$ is fluorine, hydroxyl, cyano, dimethylamino, or methoxy, n is an integer of 0 to 3, and when n is 2 or 3, $R_4$ may be identical or different.

$L_2$ is still more preferably wherein

[ring structure] is azetidine or pyrrolidine,
$R_3$ is hydrogen or C1-C6 alkyl,
$R_4$ is halogen, hydroxyl, C1-C6 alkyl that may have substituent $R_8$, or C1-C6 alkoxy, and when two $R_4$ are present on the same carbon atom, the two $R_4$, taken together with the carbon atom to which these groups are attached, may form a 3- to 8-membered saturated hydrocarbon ring,
$R_8$ is fluorine, hydroxyl, cyano, dimethylamino, or methoxy,
n is an integer of 0 to 3, and
when n is 2 or 3, $R_4$ may be identical or different.

$L_2$ is even more preferably wherein

[ring structure] is azetidine or pyrrolidine,
$R_3$ is hydrogen, methyl, or ethyl,
$R_4$ is fluorine, hydroxyl, methyl, ethyl, fluoromethyl, hydroxymethyl, cyanomethyl, dimethylaminomethyl, methoxymethyl, or methoxy, and when two $R_4$ are present on the same carbon atom, the two $R_4$, taken together with the carbon atom to which these groups are attached, may form a 3-membered saturated hydrocarbon ring,
n represents an integer of 0 to 2, and
when n is 2, $R_4$ may be identical or different.

$L_2$ is further preferably still further preferably even further preferably

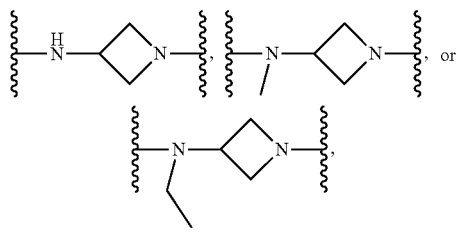

even further preferably

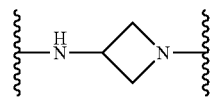

In the compound represented by the Formula (I) of the present invention, $L_3$ represents —C(=O)— or —S(=O)$_2$—, and is preferably —C(=O)—.

In the compound represented by the Formula (I) of the present invention, $R_5$ represents substituted or unsubstituted C2-C6 alkenyl, or substituted or unsubstituted C2-C6 alkynyl.

Examples of the "C2-C6 alkenyl" in the "substituted or unsubstituted C2-C6 alkenyl" represented by $R_5$ include vinyl, allyl, 1-propenyl, isopropenyl, 2-methyl-2-propenyl, 1-, 2- or 3-butenyl, isobutenyl, 2-, 3- or 4-pentenyl, 2-methyl-2-butenyl, 3-methyl-2-butenyl, 3-methyl-3-butenyl, and 5-hexenyl. The C2-C6 alkenyl is preferably vinyl, allyl, 1-propenyl, or isopropenyl, more preferably vinyl or 1-propenyl.

The "substituent" in the "substituted or unsubstituted C2-C6 alkenyl" represented by $R_5$ is, for example, the substituent listed above, and is preferably di(C1-C6 alkyl)amino, more preferably dimethylamino, methylethylamino, or diethylamino, still more preferably dimethylamino.

The "substituted or unsubstituted C2-C6 alkenyl" represented by $R_5$ is preferably C2-C6 alkenyl that may have di(C1-C6 alkyl)amino as a substituent, more preferably vinyl or 1-propenyl that may have dimethylamino as a substituent, still more preferably vinyl or dimethylamino-1-propenyl.

The "substituted or unsubstituted C2-C6 alkynyl" represented by $R_5$ is preferably C2-C6 alkynyl, more preferably ethynyl, or 1- or 2-propynyl, still more preferably 1-propynyl.

$R_5$ is preferably substituted or unsubstituted C2-C6 alkenyl or C2-C6 alkynyl,
more preferably C2-C6 alkenyl that may have di(C1-C6 alkyl)amino as a substituent, or C2-C6 alkynyl,
still more preferably C2-C6 alkenyl that may have di(C1-C6 alkyl)amino as a substituent, or 1-propynyl,
even more preferably C2-C6 alkenyl that may have di(C1-C6 alkyl)amino as a substituent,
further preferably vinyl or dimethylamino-1-propenyl.

The compound represented by the Formula (I) of the present invention is preferably a phenol compound or salt thereof, wherein
$R_1$ is substituted or unsubstituted C1-C6 alkyl, substituted or unsubstituted C2-C6 alkenyl, substituted or unsubstituted C2-C6 alkynyl, substituted or unsubstituted C3-C7 cycloalkyl, substituted or unsubstituted silyl, or substituted or unsubstituted sulfanyl,
$R_2$ is halogen, cyano, nitro, C1-C6 alkyl, C2-C6 alkenyl, or C2-C6 alkynyl,
at least one of $R_2$ is present in the para-position of $L_1$,
m is 1 or 2,
when m is 2, $R_2$ may be identical or different,
$R_1$ and $R_2$ present in the para-position of $L_1$, together with the carbon atoms to which these groups are respectively attached and taken together with the following adjacent group:

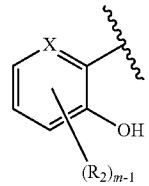

may form

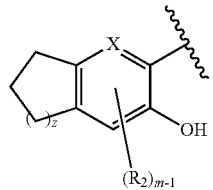

wherein

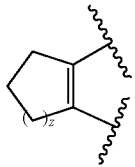

may have at least one member selected from the group consisting of halogen and C1-C6 alkyl as a substituent,
z is an integer of 1 to 3, and
X is nitrogen, CH, or $CR_2$,
$L_1$ is —NH—C(Ra)$_2$—, —C(Ra)$_2$—, or —C(Ra)$_2$—C(Ra)$_2$—,
Ra are identical or different, and each represents hydrogen, C1-C6 alkyl, or hydroxyl,
ring A is a 5- or 6-membered unsaturated hetero that may have substituent $R_6$, or a benzene ring that may have substituent $R_6$,
$R_6$ represents at least one member selected from the group consisting of halogen, cyano, nitro, amino, hydroxyl, carboxyl, C1-C6 alkyl that may have substituent $R_{71}$, C2-C6 alkenyl that may have substituent $R_{72}$, C2-C6 alkynyl that may have substituent $R_{73}$, C3-C10 cycloalkyl that may have substituent $R_{74}$, C4-C10 cycloalkenyl that may have substituent $R_{75}$, C6-C10 aromatic hydrocarbon that may have substituent $R_{76}$, a 4- to 10-membered saturated heterocyclic group that may have substituent $R_{77}$, and a 5- to 10-membered unsaturated heterocyclic group that may have substituent $R_{78}$, and when one or more substituents are present, they may be identical or different, when $R_6$ is C1-C6 alkyl that may have substituent $R_{71}$, C2-C6 alkenyl that may have substituent $R_{72}$, or C2-C6 alkynyl that may have substituent $R_{73}$, the substituent $R_{71}$, $R_{72}$, or $R_{73}$ represents halogen, cyano, nitro, amino, hydroxyl, carboxyl, C1-C6 alkoxy, di(C1-C6 alkyl)amino, C3-C7 cycloalkyl, substituted or unsubstituted C6-C10 aromatic hydrocarbon, a substituted or unsubstituted 4- to 10-membered saturated heterocyclic group, or a substituted or unsubstituted 5- to 10-membered unsaturated heterocyclic group, and when one or more substituents $R_{71}$, $R_{72}$, or $R_{73}$ are present, they may be identical or different, when $R_6$ is C3-C10 cycloalkyl that may have substituent $R_{75}$, C4-C10 cycloalkenyl that may have substituent $R_{75}$, C6-C10 aromatic hydrocarbon that may have substituent $R_{76}$, a 4- to 10-membered saturated heterocyclic group that may have substituent $R_{77}$, or a 5- to 10-membered unsaturated heterocyclic group that may have substituent $R_{78}$, the substituent $R_{74}$, $R_{75}$, $R_{76}$, $R_{77}$, or $R_{78}$ represents halogen, cyano, nitro, amino, hydroxyl, carboxyl, substituted or unsubstituted C1-C6 alkyl, C2-C6 alkenyl, C2-C6 alkynyl, C1-C6 alkoxy, di(C1-C6 alkyl)amino, (C1-C6 alkyl)carbonyl, C7-C14 aralkyl, (C1-C6 alkoxy)carbonyl, C3-C7 cycloalkyl, C6-C10 aromatic hydrocarbon, a substituted or unsubstituted 4- to 10-membered saturated heterocyclic group, or a substituted or unsubstituted 5- to 10-membered unsaturated heterocyclic group, and when one or more substituents $R_{74}$, $R_{75}$, $R_{76}$, $R_{77}$, or $R_{78}$ are present, they may be identical or different, $L_2$ is

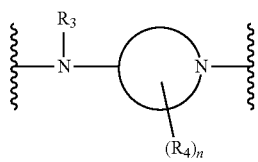

wherein

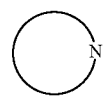

is a 4- to 8-membered saturated heterocyclic ring having at least one nitrogen, $R_3$ is hydrogen or C1-C6 alkyl, $R_4$ is halogen, cyano, nitro, amino, hydroxyl, carboxyl, C1-C6 alkyl that may have substituent $R_8$, C2-C6 alkenyl, C2-C6 alkynyl, or C1-C6 alkoxy, and when two $R_4$ are present on the same carbon atom, the two $R_4$, taken together with the carbon atom to which these groups are attached, may form a 3- to 8-membered saturated hydrocarbon ring, $R_8$ is halogen, cyano, hydroxyl, C1-C6 alkoxy, or di(C1-C6 alkyl)amino, n is an integer of 0 to 3, and when n is 2 or 3, $R_4$ may be identical or different, $L_3$ is —C(=O)— or —S(=O)$_2$—, and $R_5$ is substituted or unsubstituted C2-C6 alkenyl, or substituted or unsubstituted C2-C6 alkynyl, more preferably a phenol compound of the Formula (I) or a salt thereof, wherein $R_1$ is substituted or unsubstituted C1-C6 alkyl, substituted or unsubstituted C2-C6 alkenyl, substituted or unsubstituted C3-C7 cycloalkyl, substituted or unsubstituted silyl, or substituted or unsubstituted sulfanyl, $R_2$ is halogen, cyano, C1-C6 alkyl, or C2-C6 alkenyl, at least one of $R_2$ is present in the para-position of $L_1$, m is 1 or 2, when m is 2, $R_2$ may be identical or different, $R_1$ and $R_2$ present in the para-position of $L_1$, together with the carbon atoms to which these groups are respectively attached and taken together with the following adjacent group:

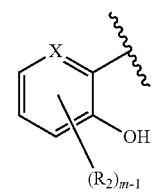

may form

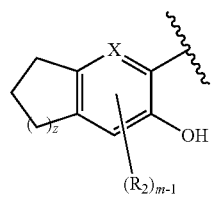

wherein

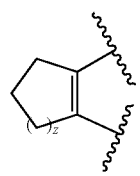

may have at least one member selected from the group consisting of halogen and C1-C6 alkyl as a substituent, z is an integer of 1 to 3, and X is nitrogen, CH, or CR$_2$, $L_1$ is —NH—C(Ra)$_2$—, —C(Ra)$_2$—, or —C(Ra)$_2$—C(Ra)$_2$—, Ra are identical or different, and each represents hydrogen, C1-C6 alkyl, or hydroxyl, ring A is a 5- or 6-unsaturated heterocyclic ring that may have substituent $R_6$, or a benzene ring that may have substituent $R_6$, $R_6$ represents at least one member selected from the group consisting of halogen, cyano, C1-C6 alkyl that may have substituent $R_{71}$, C3-C7 cycloalkyl that may have substituent $R_{74}$, C4-C7 cycloalkenyl, a monocyclic 4- to 7-membered saturated heterocyclic group having one nitrogen or oxygen that may have substituent $R_{77}$, and a monocyclic 5- to 8-membered unsaturated heterocyclic group having one nitrogen, and when one or more substituents are present, they may be identical or different, $R_{71}$ is halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl)amino, $R_{74}$ is hydroxyl or C1-C6 alkoxy, $R_{77}$ is C1-C6 alkyl that may have halogen or 6-C10 aromatic hydrocarbon as a substituent, C2-C6 alkenyl, (C1-C6 alkyl)carbonyl, (C1-C6 alkoxy)carbonyl, a monocyclic 4- to 7-membered saturated heterocyclic group having one nitrogen or oxygen, or a monocyclic 5- to 8-membered unsaturated heterocyclic group having one nitrogen, $L_2$ is

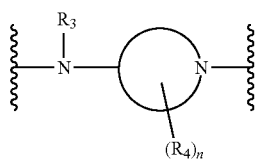

wherein

is a 4- to 8-membered saturated heterocyclic ring having at least one nitrogen, $R_3$ is hydrogen or C1-C6 alkyl, $R_4$ is halogen, hydroxyl, C1-C6 alkyl that may have substituent $R_8$, or C1-C6 alkoxy, and when two $R_4$ are present on the same carbon atom, the two $R_4$, taken together with the carbon atom to which these groups are attached, may form a 3- to 8-membered saturated hydrocarbon ring, $R_8$ is halogen, cyano, hydroxyl, C1-C6 alkoxy, or di(C1-C6 alkyl)amino, n is an integer of 0 to 2, and when n is 2, $R_4$ may be identical or different, $L_3$ is —C(=O)—, and $R_5$ is substituted or unsubstituted C2-C6 alkenyl or C2-C6 alkynyl, still more preferably a phenol compound of the Formula (I) or a salt thereof, wherein $R_1$ is C1-C6 alkyl that may have halogen as a substituent, C2-C6 alkenyl that may have halogen as a substituent, C3-C7 cycloalkyl that may have halogen or C1-C6 alkyl as a substituent, tri(C1-C6 alkyl)silyl, or pentafluorosulfanyl, $R_2$ is halogen, cyano, C1-C6 alkyl, or C2-C6 alkenyl, at least one of $R_2$ is present in the para-position of $L_1$, m is 1 or 2, when m is 2, $R_2$ may be identical or different, $R_1$ and $R_2$ present in the para-position of $L_1$, together with the carbon atoms to which these groups are respectively attached and taken together with the following adjacent group:

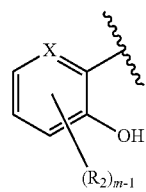

may form

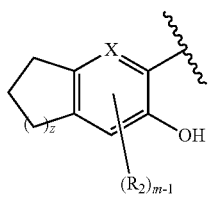

wherein

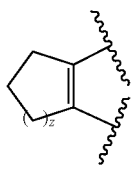

may have at least one member selected from the group consisting of halogen and C1-C6 alkyl as a substituent, z is an integer of 1 to 3, and X is nitrogen, CH, or $CR_2$, $L_1$ is —NH—C(Ra)$_2$—, —C(Ra)$_2$—, or —C(Ra)$_2$—C(Ra)$_2$—, Ra are identical or different, and each represents hydrogen, C1-C6 alkyl, or hydroxyl, ring A is a 5- or 6-unsaturated heterocyclic ring that may have substituent $R_6$, or a benzene ring that may have substituent $R_6$, $R_6$ represents at least one member selected from the group consisting of halogen, cyano, C1-C6 alkyl that may have substituent $R_{71}$, C3-C7 cycloalkyl that may have substituent $R_{74}$, C4-C7 cycloalkenyl, a monocyclic 4- to 7-membered saturated heterocyclic group having one nitrogen or oxygen that may have substituent $R_{77}$, and a monocyclic 5- to 8-membered unsaturated heterocyclic group having one nitrogen, and when one or more substituents are present, they may be identical or different, $R_{71}$ is halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl)amino, $R_{74}$ is hydroxyl or C1-C6 alkoxy, $R_{77}$ is C1-C6 alkyl that may have halogen or C6-C10 aromatic hydrocarbon as a substituent, C2-C6 alkenyl, (C1-C6 alkyl)carbonyl, (C1-C6 alkoxy)carbonyl, a monocyclic 4- to 7-membered saturated heterocyclic group having one nitrogen or oxygen, or a monocyclic 5- to 8-membered unsaturated heterocyclic group having one nitrogen, L₂ is

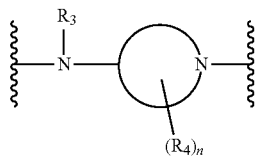

wherein

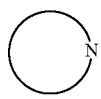

is a 4- to 8-membered saturated heterocyclic ring having at least one nitrogen,

R₃ is hydrogen or C1-C6 alkyl,

R₄ is halogen, hydroxyl, C1-C6 alkyl that may have substituent R₈, or C1-C6 alkoxy, and when two R₄ are present on the same carbon atom, the two R₄, taken together with the carbon atom to which these groups are attached, may form a 3- to 8-membered saturated hydrocarbon ring, R₈ is halogen, hydroxyl, cyano, di(C1-C6 alkyl)amino, or C1-C6 alkoxy, n is an integer of 0 to 2, and when n is 2, R₄ may be identical or different, L₃ is —C(=O)—, and R₅ is substituted or unsubstituted C2-C6 alkenyl or C2-C6 alkynyl, even more preferably a phenol compound of the Formula (I) or a salt thereof, wherein R₁ is C1-C6 alkyl that may have halogen as a substituent, C2-C6 alkenyl that may have halogen as a substituent, C3-C7 cycloalkyl that may have halogen or C1-C6 alkyl as a substituent, silyl having C1-C6 alkyl as a substituent, or sulfanyl having halogen as a substituent, R₂ is halogen, cyano, C1-C6 alkyl, or C2-C6 alkenyl, at least one of R₂ is present in the para-position of L₁, m is 1 or 2, when m is 2, R₂ may be identical or different, R₁ and R₂ present in the para-position of L₁, together with the carbon atoms to which these groups are respectively attached and taken together with the following adjacent group:

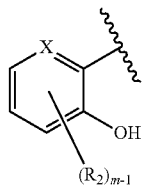

may form

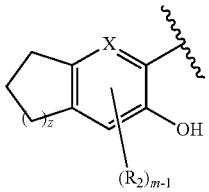

wherein

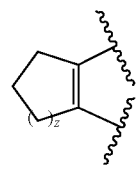

may have at least one member selected from the group consisting of halogen and C1-C6 alkyl as a substituent, z is an integer of 1 to 3, and X is nitrogen, CH, or CR₂, L₁ is —NH—C(Ra)₂—, —C(Ra)₂—, or —C(Ra)₂—C(Ra)₂—, Ra are identical or different, and each represents hydrogen, C1-C6 alkyl, or hydroxyl, ring A is

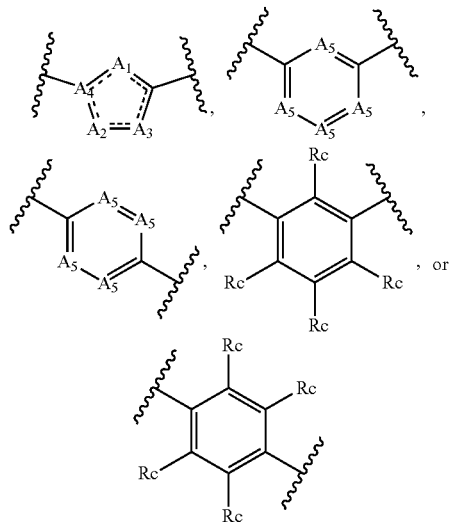

wherein

⸺ is a single bond or a double bond,

A₁ is C—Rb1, nitrogen, N—Rb1, oxygen, or sulfur,
A₂ is C—Rb2, nitrogen, N—Rb2, oxygen, or sulfur,
A₃ is C—Rb3, nitrogen, N—Rb3, oxygen, or sulfur,
A₄ is carbon or nitrogen, at least one of A₁, A₂, A₃, and A₄ is at least one member selected from the group consisting of nitrogen, N—Rb1, N—Rb2, N—Rb3, oxygen, and sulfur, A₅ is C—Rb5 or N—Rb5, and at least one of A₅ is N—Rb5, Rb1, Rb2, and Rb3 are identical or different, and each represents hydrogen, halogen, cyano, C1-C6 alkyl that may have substituent R₇₁, C3-C7 cycloalkyl that may have substituent R₇₄, C4-C7 cycloalkenyl, a monocyclic 4- to 7-membered saturated heterocyclic group having one nitrogen or oxygen that may have substituent R₇₇, or a monocyclic 5- to 8-membered unsaturated heterocyclic group having one nitrogen, R₇₁ is halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl) amino, R₇₄ is hydroxyl or C1-C6 alkoxy, R₇₇ is C1-C6 alkyl that may have halogen or C6-C10 aromatic hydrocarbon as a substituent, C2-C6 alkenyl, (C1-C6 alkyl)carbonyl, (C1-C6 alkoxy)carbonyl, a monocyclic 4- to 7-membered saturated heterocyclic group having one nitrogen or oxygen, or a monocyclic 5- to 8-membered unsaturated heterocyclic group having one nitrogen, Rb5 are identical or different, and each represents hydrogen, halogen, or C1-C6 alkyl, and Rc are identical or different, and each represents hydrogen, halogen or C1-C6 alkyl, L₂ is

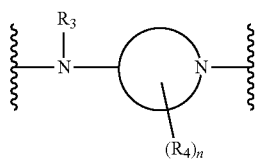

wherein

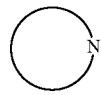

is a 4- to 8-membered saturated heterocyclic ring having at least one nitrogen,

R₃ is hydrogen or C1-C6 alkyl,

R₄ is halogen, hydroxyl, C1-C6 alkyl that may have substituent R₈, or C1-C6 alkoxy, and when two R₄ are present on the same carbon atom, the two R₄, taken together with the carbon atom to which these groups are attached, may form a 3- to 8-membered saturated hydrocarbon ring, R₈ is halogen, hydroxyl, cyano, di(C1-C6 alkyl)amino, or C1-C6 alkoxy, n is an integer of 0 to 2, and when n is 2, R₄ may be identical or different, L₃ is —C(=O)—, and R₅ is substituted or unsubstituted C2-C6 alkenyl or C2-C6 alkynyl, further preferably a phenol compound of the Formula (I) or a salt thereof, wherein R₁ is C1-C6 alkyl that may have fluorine as a substituent, C2-C6 alkenyl that may have fluorine as a substituent, C3-C7 cycloalkyl that may have fluorine or methyl as a substituent, silyl having C1-C6 alkyl as a substituent, or sulfanyl having halogen as a substituent, R₂ is halogen, cyano, C1-C6 alkyl, or C2-C6 alkenyl, at least one of R₂ is present in the para-position of L₁, m is 1 or 2, when m is 2, R₂ may be identical or different, R₁ and R₂ present in the para-position of L₁, together with the carbon atoms to which these groups are respectively attached and taken together with the following adjacent group:

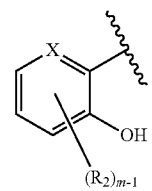

may form

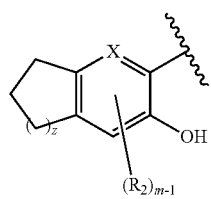

wherein

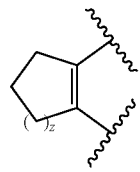

may have at least one member selected from the group consisting of halogen and C1-C6 alkyl as a substituent, and X is nitrogen or CH, L₁ is preferably —NH—C(Ra)₂—, —C(Ra)₂—, or —C(Ra)₂—C(Ra)₂—, Ra are identical or different, and each represents hydrogen, methyl, or hydroxyl, ring A is

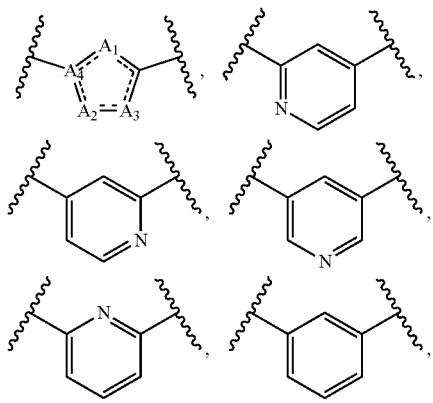

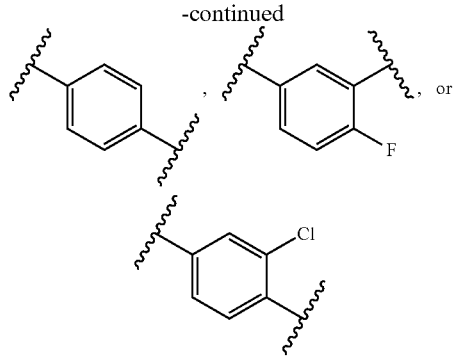, or

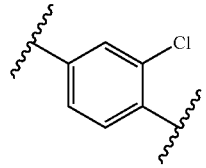

wherein

---- is a single bond or a double bond, $A_1$ is C—Rb1, nitrogen, N—Rb1, oxygen, or sulfur,
$A_2$ is C—Rb2, nitrogen, N—Rb2, oxygen, or sulfur,
$A_3$ is C—Rb3, nitrogen, N—Rb3, oxygen, or sulfur,
$A_4$ is carbon or nitrogen,
at least one of $A_1$, $A2$, $A_3$, and $A_4$ is at least one member selected from the group consisting of nitrogen, N—Rb1, N—Rb2, N—Rb3, oxygen, and sulfur,
Rb1 is hydrogen, C1-C6 alkyl that may have substituent $R_{71}$, or C3-C7 cycloalkyl,
$R_{71}$ is C1-C6 alkoxy, C6-C10 aromatic hydrocarbon, a monocyclic 5- to 8-membered unsaturated heterocyclic group having one nitrogen, or di(C1-C6 alkyl) amino,
Rb2 is hydrogen or C1-C6 alkyl, and
Rb3 is hydrogen, halogen, or C1-C6 alkyl that may have halogen as a substituent, $L_2$ is

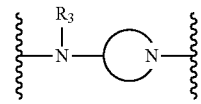

wherein

is a 4- to 8-membered saturated heterocyclic ring having at least one nitrogen, and
$R_3$ is hydrogen or C1-C6 alkyl,
$L_3$ is —C(=O)—, and
$R_5$ is C2-C6 alkenyl that may have di(C1-C6 alkyl)amino as a substituent,
  still further preferably a phenol compound of the Formula (I) or a salt thereof, wherein
$R_1$ is ethyl, n-propyl, isopropyl, tert-butyl, trifluoromethyl, trifluoroethyl, trifluoroisopropyl, isopropenyl, trifluoroisopropenyl, cyclopropyl, cyclobutyl, difluorocyclopropyl, 2,2-difluoro-1-methylcyclopropyl, trimethylsilyl, or pentafluorosulfanyl,
$R_2$ is fluorine, chlorine, bromine, cyano, methyl, ethyl, or vinyl, at least one of $R_2$ is present in the para-position of $L_1$,
m is 1 or 2,
when m is 2, $R_2$ may be identical or different,
$R_1$ and $R_2$ present in the para-position of $L_1$, together with the carbon atoms to which these groups are respectively attached and taken together with the following adjacent group:

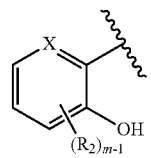

may form

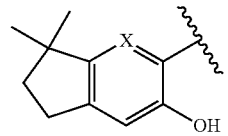

wherein

X is nitrogen or CH,
$L_1$ is —NH—CH$_2$—, —NH—CH(CH$_3$)—, —CH(OH)—, —CH$_2$—, or —CH$_2$—CH$_2$—,
ring A is

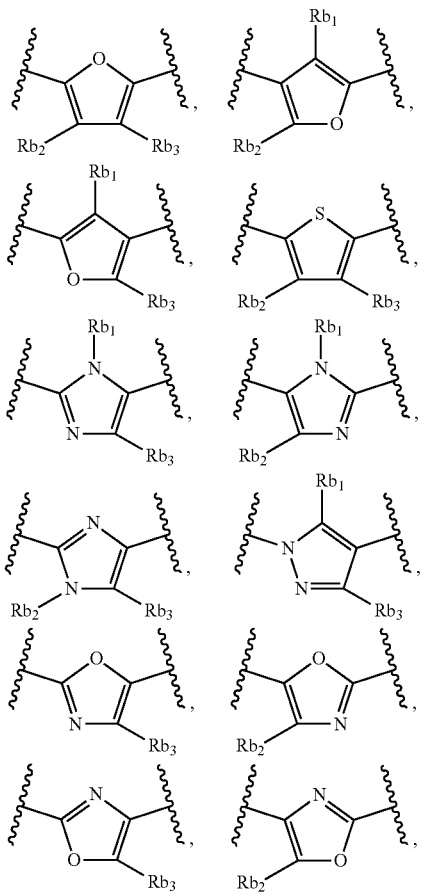

-continued

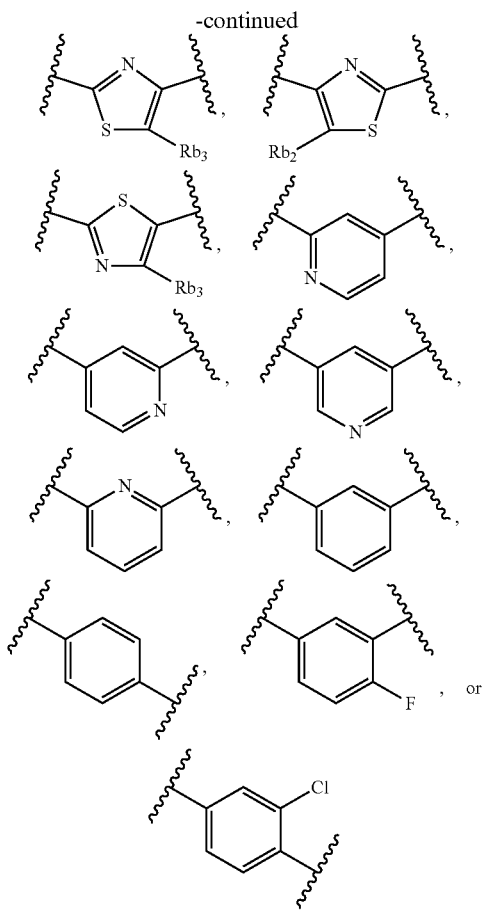

wherein
Rb1 is hydrogen, methyl, ethyl, n-propyl, isopropyl, n-butyl, methoxyethyl, benzyl, pyridylmethyl, dimethylaminoethyl, or cyclopentyl,
Rb2 is hydrogen or methyl, and
Rb3 is hydrogen, iodine, methyl, or trifluoromethyl,
$L_2$ is

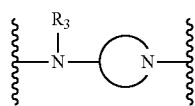

wherein

is azetidine or pyrrolidine, and
$R_3$ is hydrogen, methyl, or ethyl,
$L_3$ is —C(=O)—, and
$R_5$ is vinyl or dimethylamino-1-propenyl,
even further preferably a phenol compound of the Formula (I) or a salt thereof, wherein
$R_1$ is isopropyl, tert-butyl, 2,2-difluoro-1-methylcyclopropyl, or trimethylsilyl,
$R_2$ is fluorine, chlorine, methyl, ethyl, or vinyl,
at least one of $R_2$ is present in the para-position of $L_1$,
m is 1 or 2,
when m is 2, $R_2$ may be identical or different,
X is nitrogen or CH,
$L_1$ is —NH—CH$_2$— or —CH$_2$—,
ring A is

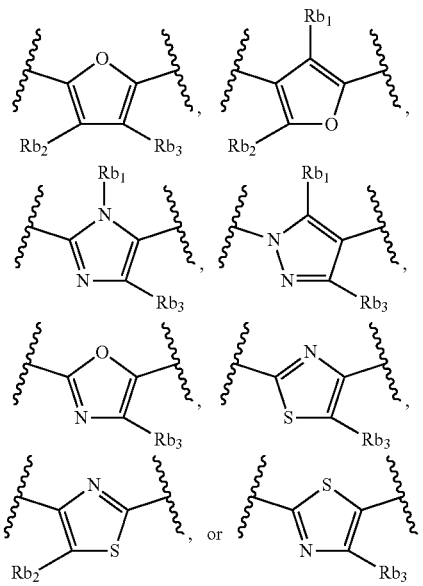

wherein
Rb1 is methyl, ethyl, n-propyl, isopropyl, n-butyl, methoxyethyl, benzyl, pyridylmethyl, dimethylaminoethyl, or cyclopentyl,
Rb2 is hydrogen, and
Rb3 is hydrogen, iodine, or methyl,
$L_2$ is

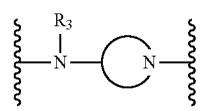

wherein

is azetidine, and
$R_3$ is hydrogen, methyl, or ethyl,
$L_3$ is —C(=O)—, and
$R_5$ is vinyl or dimethylamino-1-propenyl,
even further preferably a phenol compound of the Formula (I) or a salt thereof, wherein
$R_1$ is isopropyl, tert-butyl, 2,2-difluoro-1-methylcyclopropyl, or trimethylsilyl,
$R_2$ is fluorine, chlorine, methyl, ethyl, or vinyl,
at least one of $R_2$ is present in the para-position of $L_1$,
m is 1 or 2,
when m is 2, $R_2$ may be identical or different, X is nitrogen or CH,
L₁ is —NH—CH₂— or —CH₂—,
ring A is

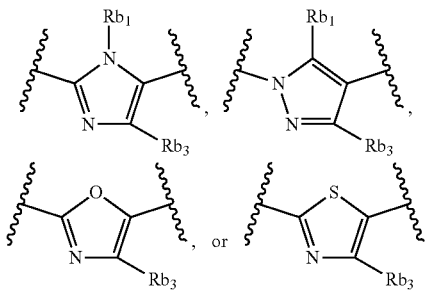

wherein
Rb1 is methyl, ethyl, n-propyl, isopropyl, n-butyl, methoxyethyl, benzyl, pyridylmethyl, dimethylaminoethyl, or cyclopentyl,
Rb2 is hydrogen, and
Rb3 is hydrogen, iodine, or methyl,
L₂ is

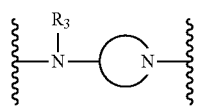

wherein

is azetidine, and
R₃ is hydrogen, methyl, or ethyl,
L₃ is —C(=O)—, and
R₅ is vinyl or dimethylamino-1-propenyl,
even further preferably a phenol compound of the Formula (I) or a salt thereof, wherein
R₁ is tert-butyl,
R₂ is chlorine,
R₂ is present in the para-position of L₁,
m is 1,
X is CH,
L₁ is —NH—CH₂—,
ring A is

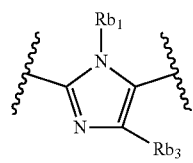

wherein
Rb1 is methyl, ethyl, n-propyl, n-butyl, pyridylmethyl, or dimethylaminoethyl, and
Rb3 is hydrogen or methyl, L₂ is

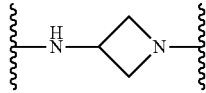 [SMILES: *NC1CN(*)C1]

L₃ is —C(=O)—, and
R₅ is vinyl.

Specific examples of the compound of the present invention can include, but are not limited to, compounds produced in Examples described below.

Preferred examples of the compound of the present invention can include the following compounds (1) to (23):

(1) N-(1-acryloylazetidin-3-yl)-5-(((5-(tert-butyl)-4-chloro-2-hydroxyphenyl)amino)methyl)-N-methylfuran-2-carboxamide, (2) N-(1-acryloylazetidin-3-yl)-5-(((5-(tert-butyl)-4-chloro-2-hydroxyphenyl)amino)methyl)-N-ethylfuran-2-carboxamide, (3) N-(1-acryloylazetidin-3-yl)-2-(((5-(tert-butyl)-4-chloro-2-hydroxyphenyl)amino)methyl)-1-methyl-1H-imidazole-5-carboxamide, (4) N-(1-acryloylazetidin-3-yl)-2-(((5-(tert-butyl)-4-chloro-2-hydroxyphenyl)amino)methyl)-4-methylthiazole-5-carboxamide, (5) N-(1-acryloylazetidin-3-yl)-2-(((5-(tert-butyl)-4-chloro-2-hydroxyphenyl)amino)methyl)-4-iodo-1-methyl-1H-imidazole-5-carboxamide, (6) N-(1-acryloylazetidin-3-yl)-4-(((5-(tert-butyl)-4-chloro-2-hydroxyphenyl)amino)methyl)-N-methylthiazole-2-carboxamide, (7) N-(1-acryloylazetidin-3-yl)-2-(((5-(tert-butyl)-4-chloro-2-hydroxyphenyl)amino)methyl)-1-ethyl-1H-imidazole-5-carboxamide, (8) N-(1-acryloylazetidin-3-yl)-2-(((5-(tert-butyl)-4-chloro-2-hydroxyphenyl)amino)methyl)-1-(2-methoxyethyl)-1H-imidazole-5-carboxamide, (9) N-(1-acryloylazetidin-3-yl)-2-(((5-(tert-butyl)-4-chloro-2-hydroxyphenyl)amino)methyl)-1-(2-(dimethylamino)ethyl)-1H-imidazole-5-carboxamide,

(10) N-(1-acryloylazetidin-3-yl)-2-(((5-(tert-butyl)-4-chloro-2-hydroxyphenyl)amino)methyl)-1,4-dimethyl-1H-imidazole-5-carboxamide,

(11) N-(1-acryloylazetidin-3-yl)-1-benzyl-2-(((5-(tert-butyl)-4-chloro-2-hydroxyphenyl)amino)methyl)-4-methyl-1H-imidazole-5-carboxamide,

(12) N-(1-acryloylazetidin-3-yl)-2-(((5-(tert-butyl)-4-chloro-2-hydroxyphenyl)amino)methyl)-1-ethyl-4-methyl-1H-imidazole-5-carboxamide,

(13) N-(1-acryloylazetidin-3-yl)-2-(((5-(tert-butyl)-4-chloro-2-hydroxyphenyl)amino)methyl)-1-isopropyl-4-methyl-1H-imidazole-5-carboxamide,

(14) N-(1-acryloylazetidin-3-yl)-1-butyl-2-(((5-(tert-butyl)-4-chloro-2-hydroxyphenyl)amino)methyl)-4-methyl-1H-imidazole-5-carboxamide,

(15) N-(1-acryloylazetidin-3-yl)-2-(((5-(tert-butyl)-4-chloro-2-hydroxyphenyl)amino)methyl)-4-methyl-1-propyl-1H-imidazole-5-carboxamide,

(16) N-(1-acryloylazetidin-3-yl)-2-(((5-(tert-butyl)-4-chloro-2-hydroxyphenyl)amino)methyl)-1-cyclopentyl-4-methyl-1H-imidazole-5-carboxamide,

(17) N-(1-acryloylazetidin-3-yl)-2-(((5-(tert-butyl)-4-chloro-2-hydroxyphenyl)amino)methyl)-4-methyl-1-(pyridin-3-ylmethyl)-1H-imidazole-5-carboxamide,

(18) N-(1-acryloylazetidin-3-yl)-2-(((5-(tert-butyl)-2-hydroxy-4-methylphenyl)amino)methyl)-1,4-dimethyl-1H-imidazole-5-carboxamide,

(19) N-(1-acryloylazetidin-3-yl)-2-(((6-(tert-butyl)-5-chloro-3-hydroxypyridin-2-yl)amino)methyl)-1-methyl-1H-imidazole-5-carboxamide,
(20) (E)-2-(((5-(tert-butyl)-4-chloro-2-hydroxyphenyl)amino)methyl)-N-(1-(4-(dimethylamino)but-2-enoyl)azetidin-3-yl)-1-methyl-1H-imidazole-5-carboxamide,
(21) N-(1-acryloylazetidin-3-yl)-2-(5-(tert-butyl)-4-chloro-2-hydroxybenzyl)-1,4-dimethyl-1H-imidazole-5-carboxamide,
(22) N-(1-acryloylazetidin-3-yl)-1-(5-(tert-butyl)-4-chloro-2-hydroxybenzyl)-3,5-dimethyl-1H-pyrazole-4-carboxamide, and
(23) N-(1-acryloylazetidin-3-yl)-2-(5-(tert-butyl)-4-chloro-2-hydroxybenzoyl)-1-methyl-1H-imidazole-5-carboxamide.

Next, methods for producing the compound according to the present invention will be described.

The compound represented by the Formula (I) of the present invention can be produced, for example, by production methods described below or methods described in Examples. However, the methods for producing the compound represented by the Formula (I) of the present invention are not limited to these reaction examples. A product obtained in each step can be subjected to the subsequent step after or without being isolated and purified by known separation and purification approaches such as concentration, concentration under reduced pressure, crystallization, solvent extraction, reprecipitation, and chromatography.

A protecting group easily convertible to the functional group can be introduced to the product obtained in each step and starting materials, if it is effective for each step, or so as to change the order of the steps, if necessary. In this context, a protecting group or the like described in Greene and Wuts, "Protective Groups in Organic Synthesis", 5th edition, John Wiley & Sons Inc., 2014 can be used as the protecting group, and the protecting group may be appropriately selected according to the reaction conditions for use in each step. After introduction of the protecting group and a reaction, the protecting group can be removed, if necessary, to obtain a desired compound.

General Production Method 1

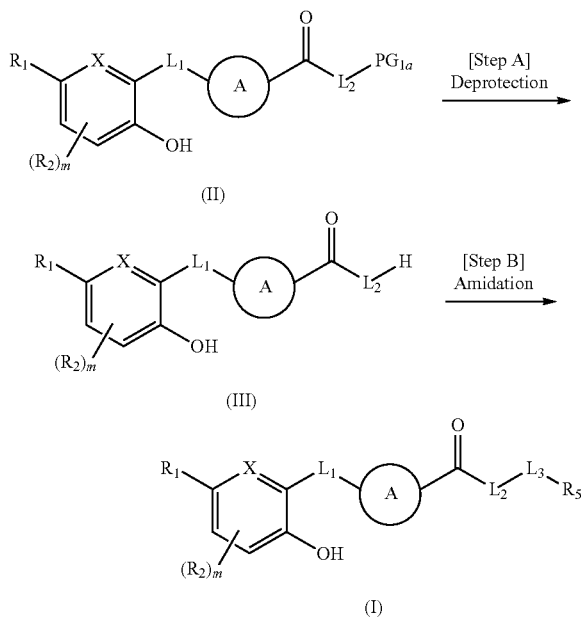

wherein $PG_{1a}$ represents an amine protecting group, and ring A, $L_1$, $L_2$, $L_3$, $R_1$, $R_2$, $R_5$, m and X are as defined above.

Protecting group $PG_{1a}$ of compound (II) is subjected to deprotection reaction of step A to obtain compound (III), which is then subjected to substituted amidation reaction of step B to produce the compound represented by the Formula (I). In this context, examples of the protecting group used include, but are not particularly limited to, tert-butoxycarbonyl and benzyloxycarbonyl.

The deprotection reaction of step A differs depending on the type of the protecting group, and can be performed, for example, according to a method described in the literature [Greene and Wuts, "Protective Groups in Organic Synthesis", 5th edition, John Wiley & Sons Inc., 2014] or a method equivalent thereto, for example, by solvolysis using an acid or a base, i.e., a method of allowing, for example, 0.01 mol to a large excess of an acid, preferably trifluoroacetic acid, formic acid, hydrochloric acid, or the like, or an equimolar amount to a large excess of a base, preferably sodium hydroxide, lithium hydroxide, or the like to act; or by chemical reduction using a metal hydride complex or the like, or catalytic reduction using a palladium carbon catalyst, a Raney nickel catalyst, or the like.

In the amidation reaction of step B, 0.3 to 10 mol of an acylation reagent is used per mol of compound (III), and their mixture is stirred under cooling to heating, preferably at −20° C. to 80° C., usually for 1 day from the completion of the addition of the acylation reagent, in the presence of a base in a solvent inert to the reaction. In this context, examples of the solvent used include, but are not particularly limited to, ethers such as THF, diethyl ether, 1,4-dioxane, and 1,2-dimethoxyethane, halogenated hydrocarbons such as dichloromethane, 1,2-dichloroethane, and chloroform, alcohols such as methanol and ethanol, aromatic hydrocarbons such as benzene, toluene, and xylene, DMF, DMSO, ethyl acetate, acetonitrile, water, and mixtures thereof. In this context, examples of the base used include inorganic bases such as sodium carbonate, potassium carbonate, and sodium bicarbonate, organic bases such as triethylamine and N,N-diisopropylethylamine, and mixtures thereof. Examples of the acylation reagent include acid halides and acid anhydrides. Examples of the acid halide include acryloyl chloride. In an alternative method that can be used, 0.5 to 10 mol, preferably 1 to 3 mol, of carboxylic acid is used per mol of compound (III), and their mixture is stirred under cooling to heating, preferably at −20° C. to 80° C., usually for 1 minute to 3 days, in the presence of a condensing agent and, if necessary, in the presence of a base, in a solvent inert to the reaction. Examples of the condensing agent include, but are not particularly limited to, N,N'-dicyclohexylcarbodiimide, N,N'-diisopropylcarbodiimide, 1-(3-dimethylaminopropyl)-3-ethylcarbodiimide, 1-(3-dimethylaminopropyl)-3-ethylcarbodiimide hydrochloride, benzotriazol-1-yloxy-tris(dimethylamino)phosphonium hexafluorophosphate, benzotriazol-1-yloxy-tris-pyrrolidinophosphonium hexafluorophosphate, bromotris(dimethylamino)phosphonium hexafluorophosphate, diphenylphosphoryl azide, and 1,1'-carbonyldiimidazole. In this context, examples of the solvent used include, but are not particularly limited to, toluene, methylene chloride, chloroform, THF, 1,4-dioxane, DMF, N,N-dimethylacetamide, NMP, 2-propanol, ethanol, methanol, water, and mixtures thereof. Also, additives such as 1-hydroxybenzotriazole and a base may be added, if necessary. Examples of the base include, but are not particularly limited to, inorganic bases such as sodium carbonate, potassium carbonate, and sodium bicarbonate, organic bases such as triethylamine, N,N-diisopropylethylamine, and 4-dimethylaminopyridine, and mixtures thereof.

General Production Method 2

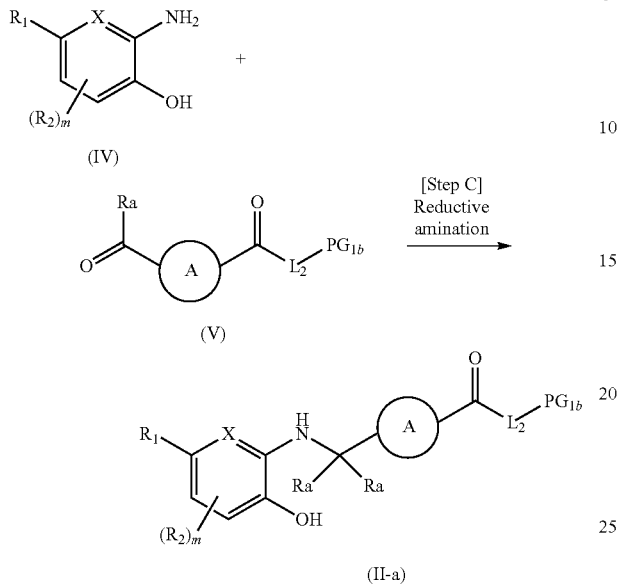

wherein $PG_{1b}$ represents an amine protecting group or $-L_3-R_5$, and ring A, $L_2$, $L_3$, $R_1$, $R_2$, $R_5$, Ra, m and X are as defined above.

Compound (IV) and compound (V) are subjected to reductive amination reaction of step C to produce a compound represented by the Formula (II-a) included in the Formula (II).

The step C is performed using 0.5 to 10 mol, preferably 0.5 to 2 mol, of compound (V) per mol of compound (IV). The reaction is performed using a reducing agent in an appropriate solvent, and an additive may be added, if necessary. Preferred examples of the solvent include toluene, methylene chloride, chloroform, THF, 1,4-dioxane, ethyl acetate, N,N-dimethylformamide, N-methylpyrrolidone, DMSO, methanol, ethanol, 2-propanol, tert-butyl alcohol, and mixed solvents thereof. In this context, examples of the reducing agent used include, but are not particularly limited to, metal hydride complexes, for example, 0.1 mol to a large excess of sodium borohydride, sodium cyanoborohydride, and hydride triacetoxyborohydride. In this context, examples of the additive used include, but are not particularly limited to, acids, bases, inorganic salts, and organic salts, for example, 0.01 mol to a large excess of trifluoroacetic acid, formic acid, acetic acid, hydrochloric acid, potassium carbonate, sodium hydroxide, lithium hydroxide, sodium sulfate, magnesium sulfate, and tetraisopropyl orthotitanate.

General Production Method 3

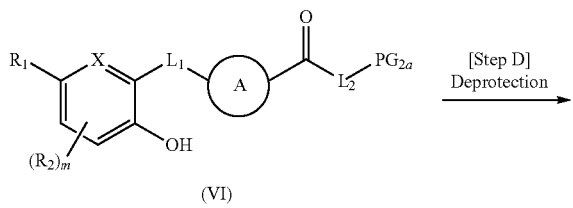

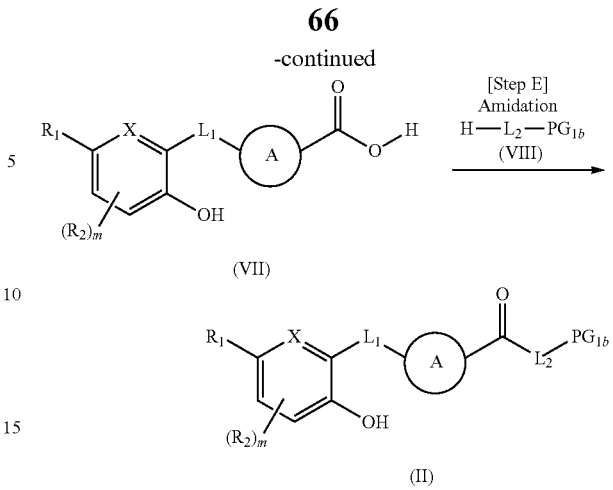

wherein $PG_{1b}$ represents an amine protecting group or $-L_3-R_5$, $PG_{2a}$ represents a carboxylic acid protecting group, and ring A, $L_1$, $L_2$, $L_3$, $R_1$, $R_2$, $R_5$, Ra, m and X are as defined above.

Protecting group $PG_{2a}$ of compound (VI) is subjected to deprotection reaction of step D to obtain compound (VII), which is then subjected to amidation reaction of step E with compound (VIII) to produce a compound represented by the Formula (II).

The step D can make application of a carboxylic acid ester hydrolysis reaction method well known in the field of organic chemistry, and can be performed, for example, by solvolysis using an acid or a base, i.e., a method of allowing, for example, 0.01 mol to a large excess of an acid, preferably trifluoroacetic acid, formic acid, hydrochloric acid, or the like, or an equimolar amount to a large excess of a base, preferably sodium hydroxide, lithium hydroxide, or the like to act per mol of compound (VI), though the method is not particularly limited thereto.

The amidation reaction of step E may be performed by a method of using 0.5 to 10 mol, preferably 1 to 3 mol, of compound (VIII) per mol of compound (VII), and stirring their mixture under cooling to heating, preferably at −20° C. to 80° C., usually for 1 minute to 3 days, in the presence of a condensing agent and, if necessary, in the presence of a base, in a solvent inert to the reaction. Examples of the condensing agent include, but are not particularly limited to, N,N'-dicyclohexylcarbodiimide, N,N'-diisopropylcarbodiimide, 1-(3-dimethylaminopropyl)-3-ethylcarbodiimide, 1-(3-dimethylaminopropyl)-3-ethylcarbodiimide hydrochloride, benzotriazol-1-yloxy-tris(dimethylamino)phosphonium hexafluorophosphate, benzotriazol-1-yloxy-tris-pyrrolidinophosphonium hexafluorophosphate, bromotris(dimethylamino)phosphonium hexafluorophosphate, diphenylphosphoryl azide, and 1,1'-carbonyldiimidazole. In this context, examples of the solvent used include, but are not particularly limited to, toluene, methylene chloride, chloroform, THF, 1,4-dioxane, DMF, N,N-dimethylacetamide, NMP, 2-propanol, ethanol, methanol, water, and mixtures thereof. Also, additives such as 1-hydroxybenzotriazole and a base may be added, if necessary. Examples of the base include, but are not particularly limited to, inorganic bases such as sodium carbonate, potassium carbonate, and sodium bicarbonate, organic bases such as triethylamine, N,N-diisopropylethylamine, and 4-dimethylaminopyridine, and mixtures thereof.

General Production Method 4

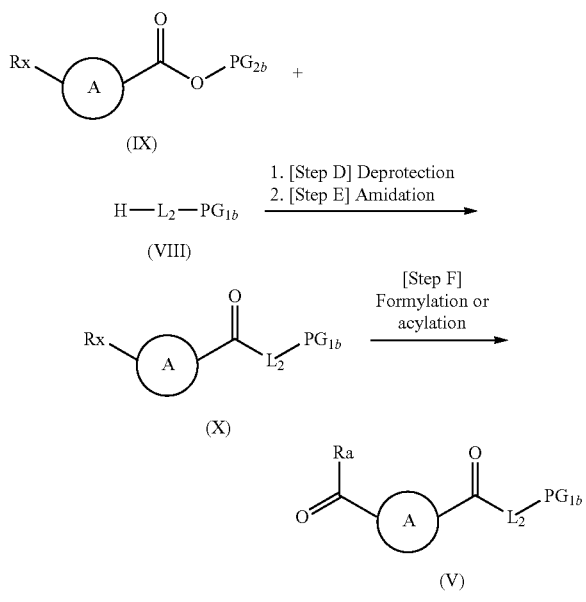

wherein PG$_{1b}$ represents an amine protecting group or -L$_3$-R$_5$; PG$_{2b}$ represents a carboxylic acid protecting group or hydrogen; Rx represents aldehyde or a functional group convertible to ketone; and ring A, L$_2$, L$_3$, R$_5$ and Ra are as defined above.

Protecting group PG$_{2b}$ of compound (IX) is subjected to deprotection reaction by the same method as in the aforementioned step D, and subsequently, the resultant compound is subjected to amidation reaction with compound (VIII) by the aforementioned step E to obtain compound (X), which is then subjected to formylation reaction (Ra=H) or acylation of step F to produce a compound represented by the Formula (V). However, the deprotection reaction is unnecessary when PG$_{2b}$ is hydrogen.

The formylation reaction of step F can usually employ a known reaction of introducing formyl. Examples of the method therefor can include (1) a method of generating an anion using a strong base, and reacting the anion with a formylating agent, (2) a method of performing hydroxylmethylation using formaldehyde or the like, and converting the resultant group to formyl using an oxidizing agent such as manganese dioxide, (3) a method of, after halogenation, performing halogen-metal exchange using an alkyl metal reagent, and reacting the resultant product with a formylating agent, and (4) a reaction of, after halogenation, introducing vinyl through coupling reaction, followed by the oxidative fission of the vinyl. This reaction can be performed, for example, by adding a strong base in an appropriate solvent, stirring the reaction mixture within the range of −78° C. to room temperature, usually for 10 minutes to 12 hours, to generate an anion, and adding a formylating agent thereto. The reaction solvent that may be used is not particularly limited as long as the solvent is not involved in the reaction, and examples thereof include ethers such as tetrahydrofuran and 1,4-dioxane, hydrocarbons such as benzene and toluene, and mixtures thereof. In this context, examples of the strong base used include, but are not particularly limited to, butyllithium, lithium diisopropylamide, lithium 2,2,6,6-tetramethylpiperidide, and 2,2,6,6-tetramethylpiperidinyl magnesium chloride lithium chloride complexes. In this context, examples of the formylation reagent used include, but are not particularly limited to, N,N-dimethylformamide and ethyl formate.

Examples of the acylation reaction of step F include (1) a method of changing the formylation reagent for use in the formylation reaction to an acylation reagent, (2) a method of reacting formyl with an alkyl metal, and then using an oxidizing agent such as manganese dioxide, and (3) a method of introducing alkoxyvinyl through coupling reaction, and converting the alkoxy to acyl through cleavage reaction using an acid or the like.

General Production Method 5

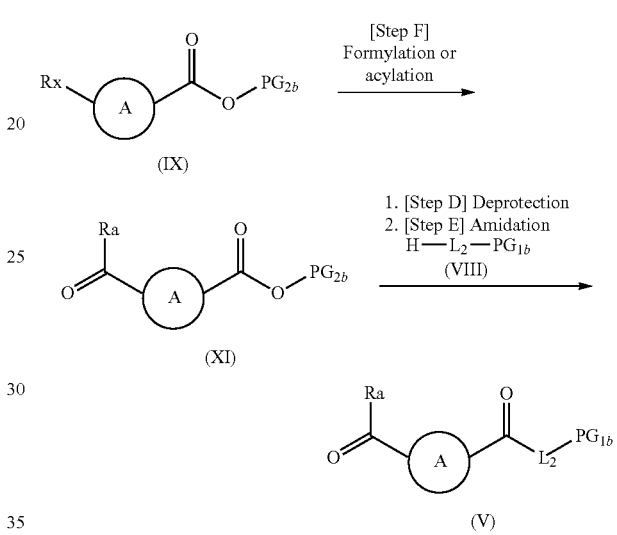

wherein PG$_{1b}$ represents an amine protecting group or -L$_3$-R$_5$; PG$_{2b}$ represents a carboxylic acid protecting group or hydrogen; Rx represents aldehyde or a functional group convertible to ketone; and ring A, L$_2$, L$_3$, R$_5$ and Ra are as defined above.

Compound (IX) is subjected to the aforementioned formylation reaction (Ra=H) or acylation of step F to obtain compound (XI), which is then subjected to the aforementioned deprotection reaction of step D and subsequently to the aforementioned amidation reaction of step E with compound (VIII) to produce a compound represented by the Formula (V).

General Production Method 6

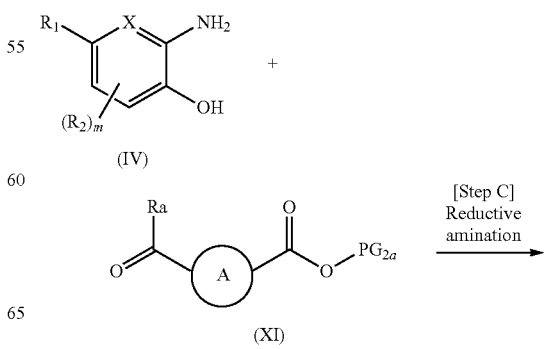

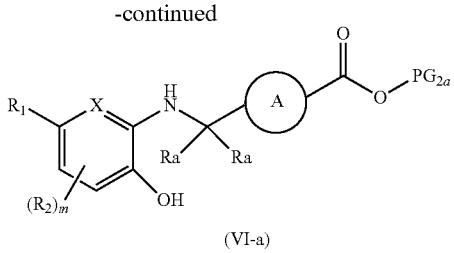

(VI-a)

wherein PG$_{2a}$ represents a carboxylic acid protecting group, and ring A, R$_1$, R$_2$, Ra, m and X are as defined above.

Compound (IV) and compound (XI) are subjected to the aforementioned reductive amination reaction of step C to produce a compound represented by the Formula (VI-a) included in the Formula (VI).

General Production Method 7

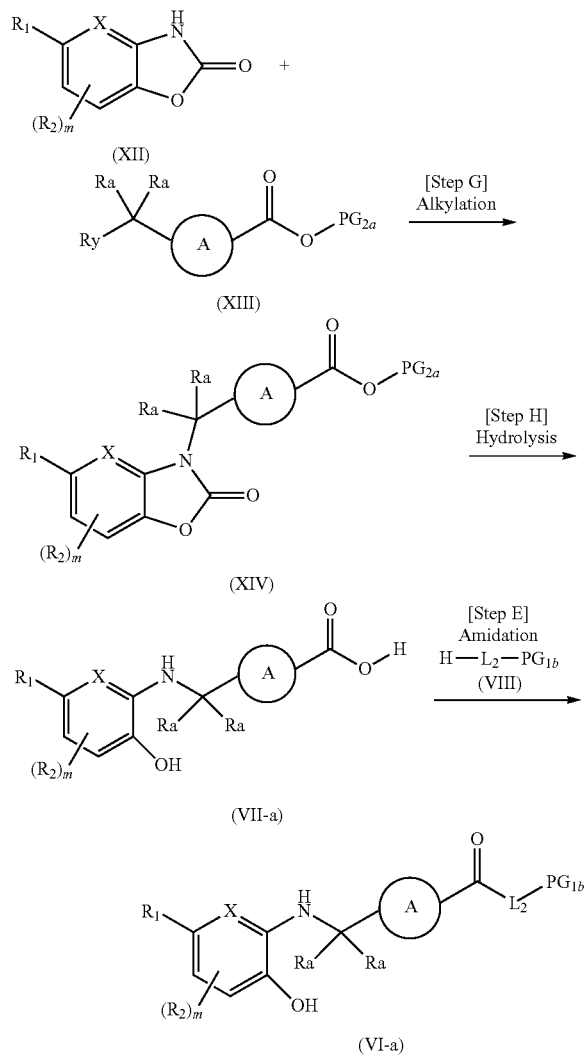

wherein PG$_{1b}$ represents an amine protecting group or -L$_3$-R$_5$; PG$_{2a}$ represents a carboxylic acid protecting group; Ry represents a leaving group; and ring A, L$_2$, L$_3$, R$_1$, R$_2$, R$_5$, Ra, m and X are as defined above.

Compound (XII) is subjected to alkylation reaction of step G with compound (XIII) to obtain compound (XIV), and a compound represented by the Formula (VII-a) included in the Formula (VII), obtained by the subsequent hydrolysis reaction of step H is subjected to the aforementioned amidation reaction of step E with compound (VIII) to produce a compound represented by the Formula (VI-a) included in the Formula (VI).

The alkylation reaction of step G is performed using 0.5 to 10 mol, preferably 1 to 3 mol, of compound (XIII) per mol of compound (XII). Preferred examples of the solvent include toluene, methylene chloride, chloroform, THF, 1,4-dioxane, DMF, N-methylpyrrolidone, acetone, DMSO, methanol, ethanol, isopropanol, tert-butyl alcohol, and mixed solvents thereof. In this context, examples of the base that can be used include inorganic bases such as sodium bicarbonate, potassium carbonate, cesium carbonate, and potassium hydroxide, and organic bases such as potassium tert-butyrate, sodium tert-butyrate, sodium methoxide, sodium ethoxide, lithium hexamethyldisilazide, sodium hexamethyldisilazide, potassium hexamethyldisilazide, triethylamine, and N,N-diisopropylethylamine. The reaction temperature is usually 0° C. to 100° C., preferably room temperature to reflux temperature. The reaction time is usually 10 minutes to 3 days, preferably 30 minutes to 24 hours.

The step H can make application of an amide or carboxylic acid ester hydrolysis reaction method well known in the field of organic chemistry, and can be performed, for example, by solvolysis using an acid or a base, i.e., a method of allowing, for example, 0.01 mol to a large excess of an acid, preferably trifluoroacetic acid, formic acid, hydrochloric acid, or the like, or an equimolar amount to a large excess of a base, preferably sodium hydroxide, lithium hydroxide, or the like to act per mol of compound (XIV), though the method is not particularly limited thereto. The reaction temperature is usually 0° C. to 150° C., preferably room temperature to reflux temperature. The reaction time is usually 10 minutes to 3 days, preferably 30 minutes to 24 hours.

General Production Method 8

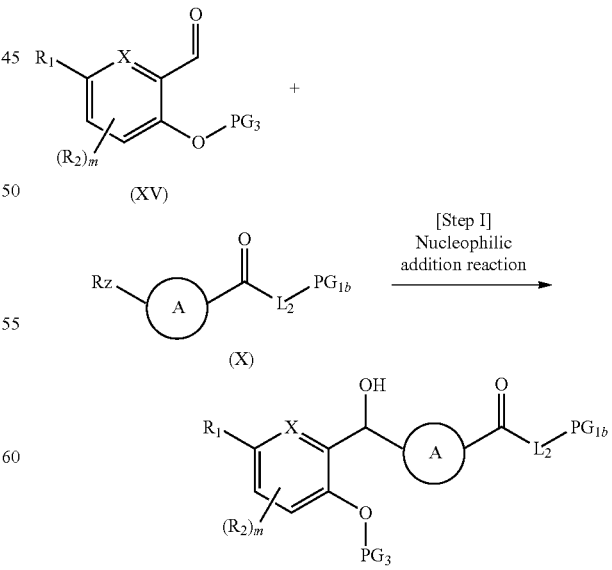

wherein PG$_{1b}$ represents an amine protecting group or -L$_3$-R$_5$; PG$_3$ represents a phenolic hydroxy protecting group or hydrogen; Rz represents a precursor for nucleophilic substitution reaction, for example, hydrogen or halogen; and ring A, L$_2$, L$_3$, R$_1$, R$_2$, R$_5$, m and X are as defined above.

Compound (XV) is subjected to nucleophilic addition reaction of step I with compound (X) to produce a compound represented by the Formula (VI-b) included in the Formula (VI).

Examples of the method for converting the compound (X) to a nucleophile in step I can include (1) a method of generating an anion using a strong base, and converting the anion to a nucleophile, and (2) a method of, after halogenation, performing halogen-metal exchange using an alkyl metal reagent for conversion to a nucleophile. This reaction is performed using 0.5 to 10 mol, preferably 1 to 3 mol, of compound (X) per mol of compound (XV). The reaction can be performed, for example, by adding a strong base to compound (X) within the range of −78° C. to room temperature in an appropriate solvent, stirring the mixture usually for 10 minutes to 12 hours to generate an anion, and adding compound (XV) thereto. The reaction solvent that may be used is not particularly limited as long as the solvent is not involved in the reaction, and examples thereof include ethers such as tetrahydrofuran and 1,4-dioxane, hydrocarbons such as benzene and toluene, and mixtures thereof. In this context, examples of the strong base used include, but are not particularly limited to, butyllithium, lithium diisopropylamide, lithium 2,2,6,6-tetramethylpiperidide, and 2,2,6,6-tetramethylpiperidinyl magnesium chloride lithium chloride complexes.

General Production Method 9

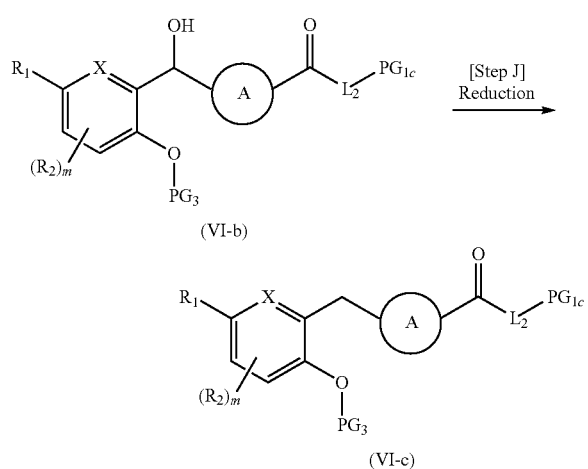

wherein PG$_{1c}$ represents an amine protecting group, hydrogen, or -L$_3$-R$_5$; PG$_3$ represents a phenolic hydroxy protecting group or hydrogen; and ring A, L$_2$, L$_3$, R$_1$, R$_2$, R$_5$, m and X are as defined above.

Compound (VI-b) is subjected to reduction reaction of step J to produce a compound represented by the compound (VI-c) included in the Formula (VI).

The reduction reaction of step J can be performed by, for example, (1) a method using a hydride reduction reagent such as triethylsilane, or (2) catalytic reduction using a palladium carbon catalyst, a Raney nickel catalyst, or the like. The reaction is performed, for example, using 0.5 mol to a large excess, preferably 1 to 10 mol, of a hydride reduction reagent per mol of compound (VI-b). An additive may be added in a solvent appropriate for the reaction. Preferred examples of the solvent include toluene, methylene chloride, chloroform, THF, 1,4-dioxane, N.N-dimethylformamide, N-methylpyrrolidone, methanol, ethanol, 2-propanol, tert-butyl alcohol, and mixed solvents thereof. In this context, examples of the hydride reduction reagent used include, but are not particularly limited to, triethylsilane, tin tributyl hydride, and hydrogen boron complexes. In this context, examples of the additive used include, but are not particularly limited to, acids, bases, inorganic salts, and organic salts, for example, 0.01 mol to a large excess of trifluoroacetic acid, formic acid, acetic acid, hydrochloric acid, potassium carbonate, sodium hydroxide, lithium hydroxide, sodium sulfate, magnesium sulfate, tetraisopropyl orthotitanate, and borane trifluoride.

When the compound of the present invention has isomers such as optical isomers, stereoisomers, rotational isomers, and tautomers, all the isomers and mixtures thereof are included in the scope of the compound of the present invention unless otherwise specified. For example, when the compound of the present invention has optical isomers, racemic mixtures and the optical isomers obtained by the resolution of racemic mixtures are also included in the scope of the compound of the present invention unless otherwise specified.

The compound of the present invention or a salt thereof may be amorphous or may be crystals, and single crystals and polymorphic mixtures are included in the scope of the compound of the present invention or a salt thereof. Such crystals can be produced by use of crystallization according to a known crystallization method. The compound of the present invention or a salt thereof may be a solvate (e.g., a hydrate) or a non-solvate, any of which is included in the scope of the compound of the present invention or a salt thereof. Compounds labeled with an isotope (e.g., 2H, 3H, 13C, 14C, 35S, and 125I) are also included in the scope of the compound of the present invention or a salt thereof.

The salt of the compound of the present invention refers to a pharmaceutically acceptable salt, and examples thereof can include base addition salts and acid addition salts.

The compound of the present invention or the salt thereof also includes a prodrug thereof. The prodrug refers to a compound that is converted to the compound of the present invention or the salt thereof through a reaction with an enzyme, gastric acid, or the like under physiological conditions in vivo, i.e., a compound that is converted to the compound of the present invention or the salt thereof by enzymatic oxidation, reduction, hydrolysis, or the like, or a compound that is converted to the compound of the present invention or the salt thereof by hydrolysis, etc. with gastric acid or the like. Also, the prodrug may be a compound that is converted to the compound of the present invention or the salt thereof under physiological conditions as described in, "Iyakuhin no Kaihatsu (Development of Pharmaceuticals in English)", Vol. 7, Molecular Design, published in 1990 by Hirokawa Shoten Co., p. 163-198.

For pharmaceutical use, the compound of the present invention or the salt thereof can be supplemented with a pharmaceutical carrier, if necessary, to form various dosage forms according to prophylactic or therapeutic purposes, and examples of the dosage form can include every form such as oral preparations, injections, suppositories, ointments, inhalants, and patches. These dosage forms can be produced by formulation methods conventionally known to those skilled in the art.

Various conventional organic or inorganic carrier materials used as pharmaceutical materials are used as pharmaceutical acceptable carriers and blended as an excipient, a binder, a disintegrant, a lubricant, or a colorant in solid preparations, or as a solvent, a solubilizing agent, a suspending agent, a tonicity agent, a buffer, or a soothing agent, etc. in liquid preparations. Also, pharmaceutical additives such as antiseptics, antioxidants, colorants, sweeteners, and stabilizers may be used, if necessary.

In the case of preparing an oral solid preparation, an excipient and optionally, a binder, a disintegrant, a lubricant, a colorant, a taste-masking or flavoring agent, etc. is added to the compound of the present invention, and then, the mixture can be formulated into tablets, coated tablets, granules, powders, capsules, or the like by ordinary methods.

In the case of preparing an injection, a pH adjuster, a buffer, a stabilizer, a tonicity agent, a local anesthetic, and the like are added to the compound of the present invention, and the mixture can be formulated into subcutaneous, intramuscular, and intravenous injections according to ordinary methods.

Although the amount of the compound of the present invention to be incorporated in each of the dosage unit forms described above varies depending on the symptoms of a patient to whom the compound is administered, the dosage form thereof, etc., the amount of the compound is desirably about 0.05 to 1000 mg for an oral preparation, about 0.01 to 500 mg for an injection, and about 1 to 1000 mg for a suppository, per dosage unit form.

Although the daily dose of a drug having such a dosage form differs depending on the symptoms, body weight, age, sex, etc. of the patient, and cannot be unconditionally determined, the daily dose for an adult (body weight: 50 kg) of the compound of the present invention may be usually about 0.05 to 5000 mg, preferably 0.1 to 1000 mg.

The compound of the present invention or the salt thereof has excellent KRAS inhibitory activity against KRAS G12C mutant-positive cancer cells. Also, the compound of the present invention or the salt thereof has excellent selectivity for a KRAS G12C mutant over wild-type KRAS. Thus, the compound of the present invention or the salt thereof is useful as an antitumor agent against KRAS G12C mutant-positive cancer cells, and has the advantage of fewer adverse reactions.

Due to its excellent KRAS G12C inhibitory activity, the compound of the present invention or the salt thereof causes the functional inhibition of KRA and is pharmaceutically useful for preventing and treating diseases involving KRAS-associated signaling.

According to one aspect of the present invention, the compound of the present invention or the salt thereof can be administered in combination with an effective amount of one or more additional antitumor agents to prevent and/or treat diseases involving KRAS-associated signaling (particularly, tumor).

Examples of the "KRAS-associated signaling" include, but are not particularly limited to, RAF, PI3K, and RAL-GEF, which are activated by KRAS, because KRAS is involved in various signaling transduction as RAS-associated signaling. Examples of the "disease involving KRAS-associated signaling" include diseases whose incidence can be reduced, and whose symptoms can be remitted, relieved, and/or completely cured by deleting, suppressing, and/or inhibiting the functions of the "KRAS-associated signaling". Examples of such a disease include, but are not limited to, cancers, autoimmune diseases, and macroglobulinemia. Examples of the tumor targeted according to the present invention include, but are not particularly limited to, head and neck cancer, gastrointestinal cancer (esophageal cancer, stomach cancer, duodenal cancer, liver cancer, biliary cancer (e.g., gallbladder and bile duct cancer), pancreatic cancer, and colorectal cancer (e.g., colon cancer and rectal cancer)), lung cancer (e.g., non-small cell lung cancer, small-cell lung cancer, and mesothelioma), breast cancer, genital cancer (ovarian cancer and uterine cancer (e.g., cervical cancer and endometrial cancer)), urological cancer (e.g., kidney cancer, bladder cancer, prostate cancer, and testicular tumor), hematopoietic tumor (e.g., leukemia, malignant lymphoma, and multiple myeloma), osteosarcoma, soft-tissue sarcoma, skin cancer, and brain tumor. Lung cancer, pancreatic cancer, and colorectal cancer are preferred.

EXAMPLES

Hereinafter, the present invention will be described in more detail with reference to Examples and Test Examples; however, the present invention is not limited to these Examples.

Various reagents used in Examples are commercially available products unless indicated otherwise. Prepacked columns manufactured by Shoko Scientific Co., Ltd. or Biotage were used in silica gel column chromatography and basic silica gel column chromatography. NMR spectra were measured using AL400 (400 MHz; JEOL Ltd. (JEOL)) or Mercury 400 (400 MHz; Varian Medical Systems, Inc.) spectrometer, and using tetramethylsilane as an internal standard for a deuterated solvent containing tetramethylsilane or an NMR solvent in other cases, and all δ values were indicated in ppm. Microwave reaction was performed using an Initiator® manufactured by Biotage.

The abbreviations are as defined below.

s: singlet
d: doublet
t: triplet
q: quartet
sep: septet
dd: double doublet
dt: double triplet
td: triple doublet
tt: triple triplet
ddd: double double doublet
ddt: double double triplet
dtd: double triple doublet
tdd: triple double doublet
m: multiplet
br: broad
brs: broad singlet
tert: tertiary
DMSO-d6: deuterated dimethyl sulfoxide
$CDCl_3$: deuterated chloroform
CD3OD: deuterium methanol
THF: tetrahydrofuran
DMF: N,N-dimethylformamide
IPE: diisopropyl ether
MTBE: tert-butyl methyl ether
NMP: N-methylpyrrolidone
DMSO: dimethyl sulfoxide
NBS: N-bromosuccinimide
NCS: N-chlorosuccinimide
NIS: N-iodosuccinimide
HoBt: 1-hydroxybenzotriazole
Selectfluor: 1-chloromethyl-4-fluoro-1,4-diazoniabicyclo[2.2.2]octane bis(tetrafluoroborate)
WSC: 1-(3-dimethylaminopropyl)-3-ethylcarbodiimide HATU: (dimethylamino)-N,N-dimethyl(3H-[1,2,3]triazolo[4,5-b]pyridin-3-yloxy)methaniminium hexafluorophosphate
Pd(PPh$_3$)$_4$: tetrakis(triphenylphosphine)palladium(0)
Pd(dppf)Cl$_2$·CH$_2$Cl$_2$: (1,1'-bis(diphenylphosphino)ferrocene)dichloropalladium(II)
DPPA: diphenylphosphoryl azide
DIAD: diisopropyl azodicarboxylate
SPhos: 2-dicyclohexylphosphino-2',6'-dimethoxybiphenyl
Boc: tert-butoxycarbonyl Production Example 1
2-Amino-4-(tert-butyl)-5-chlorophenol (Step 1) 2-Acetamido-4-(tert-butyl)phenyl acetate To 2-amino-4-(tert-butyl)phenol (10 g), acetic anhydride (20 mL) was added, and the mixture was stirred for 10 minutes. Sodium acetate (8 g) was added to the reaction mixture, and the mixture was stirred at 60° C. for 6 hours. The reaction mixture was concentrated under reduced pressure, then water and ethyl acetate were added to the residue, and the organic layer was washed with saturated saline and dried over sodium sulfate. The solvent was distilled off under reduced pressure, and the obtained solids were collected to obtain the title compound (13.94 g).

(Step 2) 2-Acetamido-4-(tert-butyl)-5-chlorophenyl acetate

To a solution of 2-acetamido-4-(tert-butyl)phenyl acetate (13.77 g) obtained in the preceding step 1 in acetic acid (140 mL), NCS (7.77 g) was added, and the mixture was stirred overnight at 60° C. The reaction mixture was concentrated under reduced pressure, then water and ethyl acetate were added to the residue, and the organic layer was washed with a saturated aqueous sodium bicarbonate and saturated saline and dried over sodium sulfate. The solvent was distilled off under reduced pressure, and the obtained solids were collected to obtain the title compound (12.67 g).

(Step 3) 2-Amino-4-(tert-butyl)-5-chlorophenol

To 2-acetamido-4-(tert-butyl)-5-chlorophenyl acetate (2.19 g) obtained in the preceding step 2 in ethanol (7 mL), a 4 M aqueous sodium hydroxide solution (7.72 mL) was added, and the mixture was reacted at 100° C. for 2 hours in a microwave reaction apparatus. The reaction mixture was poured into a saturated aqueous ammonium chloride (10 mL), and precipitates were collected by filtration to obtain the title compound (1.43 g).

Production Example 2
2-Amino-5-chloro-4-iodophenol (Step 1) 1-Chloro-2-iodo-5-methoxy-4-nitrobenzene To 4-chloro-2-methoxy-1-nitrobenzene (3 g), concentrated sulfuric acid (30 mL) was added, and then, trifluoromethanesulfonic anhydride (269 µL) and NIS (3.60 g) were slowly added. After stirring at room temperature for 6 hours, NIS (0.72 g) was added thereto, and the mixture was stirred at room temperature for 40 minutes. The reaction system was poured into ice water, and precipitated solids were collected, washed with water, an aqueous sodium bisulfite solution, an aqueous sodium bicarbonate solution, and water in this order, and dried to obtain the title compound (4.2 g).

(Step 2) 4-Chloro-5-iodo-2-methoxyaniline

To a solution of 1-chloro-2-iodo-5-methoxy-4-nitrobenzene (2.0 g) obtained in the preceding step 1 in a mixed solvent of THF (20 mL) and ethanol (20 mL), an iron powder (1.78 g), ammonium chloride (1.71 g), and water (5 mL) were added, and the mixture was stirred at 70° C. for 2 hours. The reaction mixture was filtered through celite and washed with ethyl acetate, and the filtrate was concentrated under reduced pressure. An organic layer was separated by the addition of water and ethyl acetate to the obtained residue, and washed with saturated saline. The resultant product was dried over sodium sulfate, and the solvent was distilled off under reduced pressure to obtain the title compound (1.77 g).

(Step 3) 2-Amino-5-chloro-4-iodophenol

A solution of 4-chloro-5-iodo-2-methoxyaniline (400 mg) obtained in the preceding step 2 in dichloromethane (4.0 mL) was cooled in an ice bath, and boron tribromide (1 M solution in dichloromethane, 2.8 mL) was added thereto. The mixture was warmed to room temperature and stirred for 3 hours. Water and chloroform were added to the reaction mixture, and then, the mixture was neutralized with an aqueous sodium hydroxide solution, followed by extraction with chloroform/methanol (5/1). The organic layer was washed with water and saturated saline and dried over sodium sulfate, then the solvent was distilled off under reduced pressure, and the obtained residue was purified by column chromatography (hexane:ethyl acetate) to obtain the title compound (257 mg).

Production Example 3
2-Amino-5-bromo-4-(tert-butyl)phenol (Step 1) 2-Acetamido-5-bromo-4-(tert-butyl)phenyl acetate To a solution of 2-acetamido-4-(tert-butyl)phenyl acetate (2.28 g) obtained in Production Example 1 (Step 1) in acetic acid (20 mL), NBS (1.80 g) was added, and the mixture was stirred at 60° C. for 10 hours. The reaction mixture was concentrated under reduced pressure, and an organic layer was separated by the addition of a saturated aqueous sodium bicarbonate and ethyl acetate. The organic layer was washed with an aqueous sodium thiosulfate solution and saturated saline and dried over sodium sulfate. The solvent was distilled off under reduced pressure, and the obtained solids were collected to obtain the title compound (3.26 g).

(Step 2) 2-Amino-5-bromo-4-(tert-butyl)phenol

To 2-acetamido-5-bromo-4-(tert-butyl)phenyl acetate (656 mg) obtained in the preceding step 1 in ethanol (2 mL) a 5 M aqueous sodium hydroxide solution (3 mL) was added, and the mixture was reacted at 100° C. for 2 hours in a microwave reaction apparatus. A 10% aqueous phosphoric acid solution was added to the reaction mixture, followed by extraction with ethyl acetate. The organic layer was washed with saturated saline and dried over sodium sulfate. The solvent was distilled off under reduced pressure, and the obtained solids were collected to obtain the title compound (270 mg).

Production Example 4
2-Amino-4-(tert-butyl)-5-methylphenol (Step 1) 2-(4-(tert-Butyl)-3-methylphenyl)-4,4,5,5-tetramethyl-1,3,2-dioxaborolane A mixture of 2-(tert-butyl)toluene (100 mg), (1,5-cyclooctadiene)(methoxy)iridium(I) dimer (10 mg), 4,4'-di-tert-butyl-2,2'-dipyridyl (8.0 mg) and bis(pinacolato)diborane (171 mg) in hexane (1 mL) was stirred at 85° C. for 22 hours. The reaction mixture was directly purified by column chromatography (hexane:isopropyl ether) to obtain the title compound (121 mg).

(Step 2) 4-(tert-Butyl)-5-methyl-2-nitrophenol

To 2-(4-(tert-butyl)-3-methylphenyl)-4,4,5,5-tetramethyl-1,3,2-dioxaborolane (300 mg) obtained in the preceding step 1 in THF (6 mL), a 5 M aqueous sodium hydroxide solution (0.55 mL) and hydrogen peroxide water (30%, 0.30 mL) were added under ice cooling. After removal of the ice water bath, the mixture was stirred for 10 minutes, and then, 5 M hydrochloric acid (0.60 mL) was added thereto. After extraction with ethyl acetate, the organic layer was washed with saturated saline and dried over sodium sulfate. The solvent was distilled off under reduced pressure, and to the obtained residue, dichloromethane (3.0 mL) was added, and fuming nitric acid was added four times (60 µL each) under ice cooling. Water was added to the reaction mixture, followed by extraction with chloroform, and the organic layer was dried over sodium sulfate. The solvent was distilled off under reduced pressure, and the obtained residue was purified by column chromatography (hexane:diisopropyl ether) to obtain the title compound (148 mg).

(Step 3) 2-Amino-4-(tert-butyl)-5-methylphenol

To a solution of 4-(tert-butyl)-5-methyl-2-nitrophenol (148 mg) obtained in the preceding step 2 in ethyl acetate (2 mL), 10% palladium carbon (50% wet, 28 mg) was added under nitrogen stream, and after hydrogen purging, the mixture was stirred at room temperature for 15 hours. The reaction mixture was filtered through celite and washed with ethyl acetate. The filtrate was concentrated under reduced pressure to obtain the title compound (134 mg).

Production Example 5
2-Bromo-4-(tert-butyl)-5-chlorophenol (Step 1) 5-(tert-Butyl)-4-chloro-2-methoxyaniline The title compound (3.84 g) was obtained in the same way as in Production Example 1 (Steps 1 to 3) except that 5-(tert-butyl)-2-methoxyaniline (10 g) was used instead of 2-amino-4-(tert-butyl)phenol.

(Step 2) 1-Bromo-5-(tert-butyl)-4-chloro-2-methoxybenzene

To 5-(tert-butyl)-4-chloro-2-methoxyaniline (3.84 g) obtained in the preceding step 1, 48% hydrobromic acid (40 mL) was added, and an aqueous sodium nitrite (1.30 g) solution (10 mL) was added over 10 minutes under ice cooling. A solution of copper(I) bromide (1.80 g) in 48% hydrobromic acid (40 mL) was added thereto, and after removal of the ice bath, the mixture was stirred for 1.5 hours. The reaction mixture was heated to 80° C. and stirred overnight. The reaction mixture was cooled in an ice bath, and diethyl ether was added thereto. The organic layer was separated and washed with water and a saturated aqueous sodium bicarbonate. The resultant product was dried over sodium sulfate, and the solvent was distilled off under reduced pressure to obtain the title compound (2.93 g).

(Step 3) 2-Bromo-4-(tert-butyl)-5-chlorophenol

1-Bromo-5-(tert-butyl)-4-chloro-2-methoxybenzene (2.93 g) obtained in the preceding step 2 was cooled in a dry ice-acetone bath, and boron tribromide (1 M solution in dichloromethane, 35 mL) was added thereto. The mixture was warmed to room temperature and stirred for 4 hours. The reaction mixture was poured into ice water, and concentrated ammonia water was added thereto. After extraction with chloroform, the organic layer was washed with saturated saline and dried over sodium sulfate. The solvent was distilled off under reduced pressure to obtain the title compound (2.81 g).

Production Example 6 tert-Butyl 3-((5-formylfuran-2-carbonyl)-methylamino)azetidine-1-carboxylate To a solution of 5-formyl-2-furancarboxylic acid (500 mg) and tert-butyl 3-(methylamino)azetidine-1-carboxylate (845 mg) in DMF (10 mL), N,N-diisopropylethylamine (1.865 mL), HoBt hydrate (820 mg), and WSC hydrochloride (1.38 g) were added, and the mixture was stirred overnight at room temperature. Water was added to the reaction mixture, followed by extraction with ethyl acetate. The organic layer was washed with water and saturated saline and dried over sodium sulfate, and then, the solvent was distilled off under reduced pressure. The obtained residue was purified by column chromatography (hexane:ethyl acetate) to obtain the title compound (790 mg).

Production Example 7 5-Formyl-N-(1-prop-2-enoylazetidin-3-yl)furan-2-carboxamide (Step 1) tert-Butyl 3-(5-formylfuran-2-carboxamido)azetidine-1-carboxylate To a solution of 5-formyl-2-furancarboxylic acid (3.0 g) and 1-Boc-3-aminoazetidine (3.70 mL) in DMF (60 mL), N,N-diisopropylethylamine (11.2 mL), HoBt hydrate (4.92 g), and WSC hydrochloride (6.16 g) were added, and the mixture was stirred overnight at room temperature. Water was added to the reaction mixture, followed by extraction with ethyl acetate. The organic layer was washed with water and saturated saline and dried over sodium sulfate, and then, the solvent was distilled off under reduced pressure. The obtained residue was purified by column chromatography (hexane:ethyl acetate) to obtain the title compound (4.39 g).

(Step 2) 5-Formyl-N-(1-prop-2-enoylazetidin-3-yl)furan-2-carboxamide

To tert-butyl 3-(5-formylfuran-2-carboxamido)azetidine-1-carboxylate (4.39 g) obtained in the preceding step 1, chloroform (50 mL) and trifluoroacetic acid (25 mL) were added, and the mixture was stirred for 60 minutes. The reaction mixture was concentrated, and to the obtained residue, THF (50 mL) and N,N-diisopropylethylamine (21 mL) were added, and acryloyl chloride (1.2 mL) was added under ice cooling. Water was added to the reaction mixture, followed by extraction with a mixed solution of chloroform/methanol (4/1). The organic layer was washed with saturated saline and dried over sodium sulfate, then the solvent was distilled off under reduced pressure, and the obtained residue was purified by column chromatography (chloroform:methanol) to obtain the title compound (1.65 g)

Production Example 8
1-(3-Aminoazetidin-1-yl)prop-2-en-1-one hydrochloride (Step 1) tert-Butyl (1-acryloylazetidin-3-yl)carbamate To tert-butyl N-(azetidin-3-yl)carbamate hydrochloride (52.17 g), acetonitrile (500 mL) and a 5 M aqueous sodium hydroxide solution (120 mL) were added. A solution of 3-chloropropionitrile chloride (25 mL) in acetonitrile (50 mL) was added thereto over 15 minutes under ice cooling. After removal of the ice bath, a 5 M aqueous sodium hydroxide solution (80 mL) was added thereto, and the mixture was stirred for 2 hours. The organic layer was separated, and the aqueous layer was subjected to extraction with ethyl acetate. The organic layer was washed with a 10% aqueous phosphoric acid solution, a saturated aqueous sodium bicarbonate, and saturated saline and dried over sodium sulfate. The solvent was concentrated under reduced pressure, then hexane was added to the residue, and the obtained solids were collected to obtain the title compound (55.62 g).

(Step 2) 1-(3-Aminoazetidin-1-yl)prop-2-en-1-one hydrochloride

To tert-butyl (1-acryloylazetidin-3-yl)carbamate (55.62 g) obtained in the preceding step 1, acetonitrile (375 mL) and concentrated hydrochloric acid (60 mL) were added, and the mixture was stirred for 2.5 hours. Ethanol (75 mL) was added to the reaction mixture, then acetonitrile (500 mL) was added when solids were precipitated, and the mixture was stirred for 3 hours. Precipitated solids were collected and dried under reduced pressure to obtain the title compound (36.53 g).

Production Example 9 N-(1-Acryloylazetidin-3-yl)-2-formyl-1-methyl-1H-imidazole-5-carboxamide (Step 1) Methyl 2-(hydroxymethyl)-1-methyl-1H-imidazole-5-carboxylate To methyl 1-methyl-1H-imidazole-5-carboxylate (9.0 g), a 37% aqueous formaldehyde solution (60 mL) was added, and the mixture was reacted at 140° C. for 4 hours in a microwave reaction apparatus. The reaction mixture was purified by reverse-phase preparative chromatography (Biotage ODS 50 g) (water:methanol) to obtain the title compound (5.45 g).

(Step 2) Methyl 2-formyl-1-methyl-1H-imidazole-5-carboxylate

To a solution of methyl 2-(hydroxymethyl)-1-methyl-1H-imidazole-5-carboxylate (390 mg) obtained in the preceding step 1 in chloroform (8 mL), manganese dioxide (1.00 g) was added, and the mixture was heated to reflux for 1.5 hours. The reaction mixture was filtered through celite and washed with ethyl acetate, and the solvent in the filtrate was distilled off under reduced pressure. The obtained solids were collected to obtain the title compound (319 mg).

(Step 3) N-(1-Acryloylazetidin-3-yl)-2-formyl-1-methyl-1H-imidazole-5-carboxamide To a solution of methyl 2-formyl-1-methyl-1H-imidazole-5-carboxylate (319 mg) obtained in the preceding step 2 in methanol (1.5 mL) and THF (1.5 mL), a 2 M aqueous sodium hydroxide solution (2.0 mL) was added, and the mixture was stirred at room temperature for 2 hours and 15 minutes. 5 M hydrochloric acid (800 μL) was added to the reaction mixture, and the solvent was distilled off under reduced pressure. 1-(3-Aminoazetidin-1-yl)prop-2-en-1-one hydrochloride (370 mg) obtained in Production Example 8, DMF (2 mL), N,N-diisopropylethylamine (968 μL), and HATU (866 mg) were added to the obtained residue, and the mixture was stirred at room temperature for 60 minutes. Water was added to the reaction mixture, followed by extraction with chloroform/methanol (9/1). The extract was concentrated, and the obtained residue was purified by column chromatography (chloroform:methanol) to obtain the title compound (250 mg).

Production Example 10 tert-Butyl 3-(2-formyl-1,4-dimethyl-1H-imidazole-5-carboxamido)azetidine-1-carboxylate (Step 1) tert-Butyl 3-(1,4-dimethyl-1H-imidazole-5-carboxamido)azetidine-1-carboxylate To a solution of 1,4-dimethyl-1H-imidazole-5-carboxylic acid (1.04 g) and 1-Boc-3-aminoazetidine (1.53 g) in DMF (15 mL), N,N-diisopropylethylamine (3.88 mL) and HATU (3.67 g) were added, and the mixture was stirred overnight at room temperature. Water was added to the reaction mixture, followed by extraction with ethyl acetate. The organic layer was dried over sodium sulfate, and the solvent was distilled off under reduced pressure. The obtained residue was purified by column chromatography (basic silica gel, hexane:ethyl acetate) to obtain the title compound (2.15 g).

(Step 2) tert-Butyl 3-(2-formyl-1,4-dimethyl-1H-imidazole-5-carboxamido)azetidine-1-carboxylate To a solution of tert-butyl 3-(1,4-dimethyl-1H-imidazole-5-carboxamido)azetidine-1-carboxylate (500 mg) obtained in the preceding step 1 in THF (15 mL), 2,2,6,6-tetramethylpiperidine (1.44 mL) was added. After cooling in a dry ice-acetone bath, butyllithium (2.6 M solution in hexane, 4.0 mL) was added thereto, and the mixture was stirred for 1 hour in a dry ice-acetone bath. DMF (1.32 mL) was added thereto, then the mixture was stirred for 30 minutes, then 5 M hydrochloric acid (2.5 mL) and a saturated aqueous ammonium chloride (30 mL) were added thereto, and the mixture was warmed to room temperature. After extraction with ethyl acetate, the organic layer was dried over sodium sulfate, and the solvent was distilled off under reduced pressure. The obtained residue was purified by column chromatography (hexane:ethyl acetate) to obtain the title compound (294 mg).

Production Example 11 tert-Butyl 3-(2-formyl-1-isopropyl-4-methyl-1H-imidazole-5-carboxamido)azetidine-1-carboxylate

(Step 1) Ethyl 1-isopropyl-4-methyl-1H-imidazole-5-carboxylate

To a solution of ethyl 4-methyl-1H-imidazole-5-carboxylate (506 mg) in THF (10 mL), 2-propanol (237 mg), triphenylphosphine (1.02 g), and DIAD (772 µL) were added, and the mixture was stirred at room temperature for 3 hours. The solvent was distilled off under reduced pressure, and the obtained residue was purified by column chromatography (hexane:ethyl acetate) to obtain the title compound (517 mg).

(Step 2) tert-Butyl 3-(1-isopropyl-4-methyl-1H-imidazole-5-carboxamido)azetidine-1-carboxylate To ethyl 1-isopropyl-4-methyl-1H-imidazole-5-carboxylate (517 mg) obtained in the preceding step 1 in ethanol (5 mL), a 4 M aqueous sodium hydroxide solution (0.99 mL) was added, and the mixture was stirred for 1 hour and 20 minutes in an oil bath of 100° C. The reaction mixture was cooled in ice, then 6 M hydrochloric acid (660 µL) was added thereto, and the solvent in the reaction mixture was distilled off under reduced pressure. 1-Boc-3-aminoazetidine (452 mg), HoBt hydrate (408 mg), dichloromethane (5 mL), N,N-diisopropylethylamine (1.34 mL), and WSC hydrochloride (768 mg) were added to the obtained residue, and the mixture was stirred overnight at room temperature. An organic layer was separated by the addition of water and ethyl acetate to the reaction mixture, and washed with water. The solvent was distilled off under reduced pressure. The obtained residue was purified by column chromatography (hexane:ethyl acetate:methanol) to obtain the title compound (673 mg).

(Step 3) tert-Butyl 3-(2-formyl-1-isopropyl-4-methyl-1H-imidazole-5-carboxamido)azetidine-1-carboxylate To a solution of tert-butyl 3-(1-isopropyl-4-methyl-1H-imidazole-5-carboxamido)azetidine-1-carboxylate (673 mg) obtained in the preceding step 2 in THF (15 mL), 2,2,6,6-tetramethylpiperidine (1.47 mL) was added. After cooling in a dry ice-acetone bath, butyllithium (2.7 M solution in hexane, 4.5 mL) was added dropwise thereto. The reaction mixture was stirred for 2 hours under cooling in a dry ice-acetone bath, then DMF (1.1 mL) was added thereto, and the mixture was stirred for 30 minutes. A saturated aqueous ammonium chloride was added to the reaction mixture, and after removal of the cooling bath, the mixture was warmed. After extraction from the reaction mixture with ethyl acetate, the solvent was distilled off under reduced pressure, and the obtained residue was purified by column chromatography (hexane:ethyl acetate:methanol) to obtain the title compound (465 mg).

Example 1 N-(1-Acryloylazetidin-3-yl)-5-(((5-(tert-butyl)-4-chloro-2-hydroxyphenyl)amino)methyl)furan-2-carboxamide

(Step 1) tert-Butyl 3-(5-formylfuran-2-carboxamido)azetidine-1-carboxylate

To a solution of 5-formyl-2-furancarboxylic acid (140 mg) and 1-Boc-3-aminoazetidine (200 mg) in DMF (3 mL), N,N-diisopropylethylamine (200 µL) and HATU (400 mg) were added, and the mixture was stirred for 1 hour. Water and sodium bicarbonate were added to the reaction mixture, followed by extraction with ethyl acetate. The organic layer was washed with water and saturated saline and dried over sodium sulfate, and then, the solvent was distilled off under reduced pressure. Diisopropyl ether and hexane were added to the obtained residue, and precipitated solids were collected to obtain the title compound (215 mg).

(Step 2) tert-Butyl 3-(5-(((5-(tert-butyl)-4-chloro-2-hydroxyphenyl)amino)methyl)furan-2-carboxamido)azetidine-1-carboxylate To a solution of tert-butyl 3-(5-formylfuran-2-carboxamido)azetidine-1-carboxylate (70 mg) obtained in the preceding step 1 and 2-amino-4-(tert-butyl)-5-chlorophenol (40 mg) obtained in Production Example 1 in methanol (3 mL), acetic acid (10 µL) and sodium cyanoborohydride (35 mg) were added, and the mixture was stirred for 70 minutes. An aqueous ammonium chloride solution was added to the reaction mixture, followed by extraction with ethyl acetate. The organic layer was washed with saturated saline and dried over sodium sulfate, then the solvent was distilled off under reduced pressure, and the obtained residue was purified by column chromatography (hexane:ethyl acetate) to obtain the title compound (73 mg).

(Step 3) N-(1-Acryloylazetidin-3-yl)-5-(((5-(tert-butyl)-4-chloro-2-hydroxyphenyl)amino)methyl)furan-2-carboxamide To tert-butyl 3-(5-(((5-(tert-butyl)-4-chloro-2-hydroxyphenyl)amino)methyl)furan-2-carboxamido)azetidine-1-carboxylate (69 mg) obtained in the preceding step 2, trifluoroacetic acid (0.8 mL) was added, and the reaction mixture was stirred for 5 minutes and then concentrated. The obtained residue was dissolved in THF (5 mL), and N,N-diisopropylethylamine (0.5 mL) and a 1 M solution of acryloyl chloride in acetonitrile (150 µL) were added to the solution. Water was added to the reaction mixture, followed by extraction with ethyl acetate. The organic layer was washed with saturated saline and dried over sodium sulfate, then the solvent was distilled off under reduced pressure, and the obtained residue was purified by column chromatography (chloroform:ethanol) to obtain the title compound (60.3 mg).

Example 2 N-(1-Acryloylazetidin-3-yl)-3-(((5-(tert-butyl)-4-chloro-2-hydroxyphenyl)amino)methyl)benzamide The title compound (59.0 mg) was obtained in the same way as in Example 1 (Steps 1 to 3) except that 3-formylbenzoic acid (75 mg) was used instead of 5-formyl-2-furancarboxylic acid.

Example 3 N-(1-Acryloylazetidin-3-yl)-4-(((5-(tert-butyl)-4-chloro-2-hydroxyphenyl)amino)methyl)benzamide The title compound (40.9 mg) was obtained in the same way as in Example 1 (Steps 1 to 3) except that 4-carboxybenzaldehyde (75 mg) was used instead of 5-formyl-2-furancarboxylic acid.

Example 4 N-(1-Acryloylazetidin-3-yl)-5-(((5-(tert-butyl)-4-chloro-2-hydroxyphenyl)amino)methyl)-N-methylfuran-2-carboxamide The title compound (29.1 mg) was obtained in the same way as in Example 1 (Steps 1 to 3) except that 1-Boc-3-(methylamino)azetidine (56 mg) was used instead of 1-Boc-3-aminoazetidine.

Example 5 N-(1-Acryloylazetidin-3-yl)-5-(((5-(tert-butyl)-4-chloro-2-hydroxyphenyl)amino)methyl)-N-ethylfuran-2-carboxamide (Step 1) tert-Butyl 3-(N-ethyl-5-formylfuran-2-carboxamido)azetidine-1-carboxylate To a solution of tert-butyl 3-(5-formylfuran-2-carboxamido)azetidine-1-carboxylate (29 mg) obtained in Example 1 (Step 1) in DMF (1 mL), ethyl iodide (20 µL) and sodium hydride (60% in mineral oil, 8 mg) were added, and the mixture was stirred for 150 minutes. Water was added to the reaction mixture, followed by extraction with ethyl acetate. The organic layer was washed with saturated saline and dried over sodium sulfate, and the solvent was distilled off under reduced pressure to obtain a crude form of the title compound (7.75 mg).

(Step 2) N-(1-Acryloylazetidin-3-yl)-5-(((5-(tert-butyl)-4-chloro-2-hydroxyphenyl)amino)methyl)-N-ethylfuran-2-carboxamide The title compound (7.75 mg) was obtained in the same way as in Example 1 (Steps 2 and 3) except that a crude form of tert-butyl 3-(N-ethyl-5-formylfuran-2-carboxamido)azetidine-1-carboxylate was used instead of tert-butyl 3-(5-formylfuran-2-carboxamido)azetidine-1-carboxylate.

Example 6 (R)—N-(1-Acryloylpyrrolidin-3-yl)-5-(((5-(tert-butyl)-4-chloro-2-hydroxyphenyl)amino)methyl)-N-methylfuran-2-carboxamide The title compound (51.54 mg) was obtained in the same way as in Example 1 (Steps 1 to 3) except that tert-butyl (3R)-3-(methylamino)pyrrolidine-1-carboxylate (60 mg) was used instead of 1-Boc-3-aminoazetidine.

Example 7 N-(1-Acryloylazetidin-3-yl)-5-(((5-(tert-butyl)-4-chloro-2-hydroxyphenyl)amino)methyl)thiophene-2-carboxamide The title compound (36.0 mg) was obtained in the same way as in Example 1 (Steps 1 to 3) except that 5-formylthiophene-2-carboxylic acid (151 mg) was used instead of 5-formyl-2-furancarboxylic acid.

Example 8 N-(1-Acryloylazetidin-3-yl)-2-(((5-(tert-butyl)-4-chloro-2-hydroxyphenyl)amino)methyl)thiazole-4-carboxamide (Step 1) 2-Ethoxycarbonylthiazole-4-carboxylic acid To a solution of ethyl thiooxamate (1.02 g) in THF (20 mL), 3-bromo-2-oxopropionic acid (1.29 g) was added, and the mixture was stirred overnight at 50° C. The reaction mixture was concentrated, then ethyl acetate was added to the residue, and the obtained solids were collected to obtain the title compound (911 mg).

(Step 2) Ethyl 4-((1-tert-butoxycarbonylazetidin-3-yl)carbamoyl)thiazole-2-carboxylate To a solution of 2-ethoxycarbonylthiazole-4-carboxylic acid (265 mg) obtained in the preceding step 1 and 1-Boc-3-aminoazetidine (253 mg) in DMF (2 mL), N,N-diisopropylethylamine (672 µL) and HATU (599 mg) were added, and the mixture was stirred for 25 minutes. Ethyl acetate was added to the reaction mixture, and the organic layer was washed with water. The resultant product was dried over sodium sulfate, and the solvent was distilled off under reduced pressure. The obtained residue was purified by column chromatography (hexane:ethyl acetate) to obtain the title compound (319 mg).

(Step 3) tert-Butyl 3-((2-(hydroxymethyl)thiazole-4-carbonyl)amino)azetidine-1-carboxylate To a solution of ethyl 4-((1-tert-butoxycarbonylazetidin-3-yl)carbamoyl)thiazole-2-carboxylate (319 mg) obtained in the preceding step 2 in ethanol (5 mL), sodium borohydride (71.2 mg) was added, and the mixture was stirred at room temperature for 75 minutes. 2 M hydrochloric acid was added to the reaction mixture, then the mixture was concentrated, and the obtained residue was separated into organic and aqueous layers by the addition of ethyl acetate and a saturated aqueous solution of sodium bicarbonate. The solvent in the organic layer was distilled off under reduced pressure, and the obtained residue was purified by column chromatography (hexane:ethyl acetate) to obtain the title compound (260 mg).

(Step 4) tert-Butyl 3-((2-((5-(tert-butyl)-4-chloro-2-hydroxyanilino)methyl)thiazole-4-carbonyl)amino)azetidine-1-carboxylate To a solution of tert-butyl 3-((2-(hydroxymethyl)thiazole-4-carbonyl)amino)azetidine-1-carboxylate (130 mg) obtained in the preceding step 3 in ethyl acetate (10 mL), manganese dioxide (405 mg) was added, and the mixture was heated and stirred for 2 hours in an oil bath of 100° C. After cooling to room temperature, the reaction mixture was filtered through celite, and the filtrate was concentrated. 2-Amino-4-(tert-butyl)-5-chlorophenol (67.2 mg), ethanol (4 mL), acetic acid (10 µL), and sodium cyanoborohydride (74.3 mg) were added to the obtained residue, and the mixture was stirred for 20 minutes. Phosphoric acid was added to the reaction mixture, and the solvent was distilled off under reduced pressure. The obtained residue was separated into organic and aqueous layers by the addition of ethyl acetate and water. The solvent in the organic layer was distilled off under reduced pressure, and the obtained residue was purified by column chromatography (hexane:ethyl acetate) to obtain the title compound (118 mg).

(Step 5) N-(1-Acryloylazetidin-3-yl)-2-(((5-(tert-butyl)-4-chloro-2-hydroxyphenyl)amino)methyl)thiazole-4-carboxamide To tert-butyl 3-((2-((5-(tert-butyl)-4-chloro-2-hydroxyanilino)methyl)thiazole-4-carbonyl)amino)azetidine-1-carboxylate (118 mg) obtained in the preceding step 4, trifluoroacetic acid (1.5 mL) was added, and then, the reaction mixture was stirred for 25 minutes and then concentrated. The obtained residue was dissolved in THF (2 mL), and N,N-diisopropylethylamine (811 µL) and acryloyl chloride (21.2 µL) were added to the solution. Methanol was added to the reaction mixture, then the solvent was distilled off under reduced pressure, and the obtained residue was purified by column chromatography (ethyl acetate:methanol) to obtain the title compound (55.3 mg).

Example 9 N-(1-Acryloylazetidin-3-yl)-2-(((5-(tert-butyl)-4-chloro-2-hydroxyphenyl)amino)methyl)thiazole-5-carboxamide (Step 1) Methyl 2-vinylthiazole-5-carboxylate To a solution of methyl 2-bromothiazole-5-carboxylate (240 mg) and 2,6-di-tert-butyl-4-methylphenol (14.8 mg) in 1,4-dioxane (3 mL), tributyl(vinyl)tin (348 µL) and tetrakis(triphenylphosphine)palladium(0) (61.2 mg) were added, and the mixture was stirred at 100° C. for 2 hours in a microwave reaction apparatus. The reaction mixture was concentrated, and the obtained residue was purified by column chromatography (chloroform:ethanol) to obtain the title compound (166 mg).

(Step 2) Methyl 2-formylthiazole-5-carboxylate

To a solution of methyl 2-vinylthiazole-5-carboxylate (166 mg) obtained in the preceding step 1 in a mixed solvent of 1,4-dioxane (12 mL) and water (3 mL), sodium periodate (898 mg), osmium tetroxide (microcapsules, 0.2 g), and 2,5-lutidine (0.24 mL) were added, and the mixture was stirred overnight. The reaction mixture was separated into organic and aqueous layers by the addition of ethyl acetate and water. The organic layer was dried over magnesium sulfate, and the solvent was distilled off under reduced pressure. The obtained residue was purified by column chromatography (hexane:ethyl acetate) to obtain the title compound (53.9 mg).

(Step 3) Ethyl 5-((5-(tert-butyl)-4-chloro-2-hydroxyanilino)methyl)thiazole-2-carboxylate To a solution of methyl 2-formylthiazole-5-carboxylate (53.9 mg) obtained in the preceding step 2 and 2-amino-4-(tert-butyl)-5-chlorophenol (65.2 mg) in ethanol (2 mL), acetic acid (10 µL) and sodium cyanoborohydride (64.1 mg) were added, and the mixture was stirred for 2 hours. Phosphoric acid was added to the reaction mixture, and the solvent was distilled off under reduced pressure. The obtained residue was separated into organic and aqueous layers by the addition of ethyl acetate and water. The solvent in the organic layer was distilled off under reduced pressure, and the obtained residue was purified by column chromatography (hexane:ethyl acetate) to obtain the title compound (59.9 mg).

(Step 4) tert-Butyl 3-((5-((5-(tert-butyl)-4-chloro-2-hydroxyanilino)methyl)thiazole-2-carbonyl)amino)azetidine-1-carboxylate To a solution of ethyl 5-((5-(tert-butyl)-4-chloro-2-hydroxyanilino)methyl)thiazole-2-carboxylate (59.9 mg) obtained in the preceding step 3 in methanol (3 mL), a 4 M aqueous sodium hydroxide solution (211 µL) was added, and the mixture was stirred overnight. 2 M hydrochloric acid (423 µL) was added to the reaction mixture, and the solvent was distilled off under reduced pressure. The obtained residue was separated into organic and aqueous layers by the addition of ethyl acetate and water, and the solvent in the organic layer was distilled off under reduced pressure. 1-Boc-3-aminoazetidine (40.7 mg), DMF (2.5 mL), N,N-diisopropylethylamine (86.1 µL), and HATU (84.9 mg) were added to the obtained residue, and the mixture was stirred for 60 minutes. Ethyl acetate was added to the reaction mixture, and the organic layer was washed with water. The resultant product was dried over sodium sulfate, and the solvent was distilled off under reduced pressure. The obtained residue was purified by column chromatography (hexane:ethyl acetate) to obtain the title compound (9.9 mg).

(Step 5) N-(1-Acryloylazetidin-3-yl)-2-(((5-(tert-butyl)-4-chloro-2-hydroxyphenyl)amino)methyl)thiazole-5-carboxamide To tert-butyl 3-((5-((5-(tert-butyl)-4-chloro-2-hydroxyanilino)methyl)thiazole-2-carbonyl)amino)azetidine-1-carboxylate (9.9 mg) obtained in the preceding step 4, trifluoroacetic acid (1.5 mL) was added, and then, the reaction mixture was stirred for 15 minutes and then concentrated. The obtained residue was dissolved in THF (2.0 mL), and N,N-diisopropylethylamine (102 µL) and acryloyl chloride (1.8 µL) were added to the solution. Methanol was added to the reaction mixture, then the solvent was distilled off under reduced pressure, and the obtained residue was purified by column chromatography (ethyl acetate:methanol) to obtain the title compound (7.7 mg).

Example 10 N-(1-Acryloylazetidin-3-yl)-4-(((5-(tert-butyl)-4-chloro-2-hydroxyphenyl)amino)methyl)thiazole-2-carboxamide (Step 1) Ethyl 4-(hydroxymethyl)thiazole-2-carboxylate To a solution of 2-ethoxycarbonylthiazole-4-carboxylic acid (252 mg) in THF (5 mL), a borane-THF complex (0.95 M, 5 mL) was added. Ethanol was added to the reaction mixture, then the solvent was distilled off under reduced pressure, and the obtained residue was purified by column chromatography (hexane:ethyl acetate) to obtain the title compound (88 mg).

(Step 2) Ethyl 4-formylthiazole-2-carboxylate

To a solution of ethyl 4-(hydroxymethyl)thiazole-2-carboxylate (88 mg) obtained in the preceding step 1 in ethyl acetate (5 mL), manganese dioxide (270 mg) was added, and the mixture was heated and stirred for 2 hours in an oil bath of 100° C. After cooling to room temperature, the reaction mixture was filtered through celite, and the filtrate was concentrated to obtain the title compound (68.4 mg).

(Step 3) Ethyl 4-((5-(tert-butyl)-4-chloro-2-hydroxyanilino)methyl)thiazole-2-carboxylate To a solution of ethyl 4-formylthiazole-2-carboxylate (68.4 mg) obtained in the preceding step 2 in ethanol (4 mL), 2-amino-4-(tert-butyl)-5-chlorophenol (82.5 mg), acetic acid (10 µL), and sodium cyanoborohydride (75.5 mg) were added, and the mixture was stirred for 2 hours. Phosphoric acid was added to the reaction mixture, and the solvent was distilled off under reduced pressure. The obtained residue was separated into organic and aqueous layers by the addition of ethyl acetate and water. The solvent in the organic layer was distilled off under reduced pressure, and the obtained residue was purified by column chromatography (hexane:ethyl acetate) to obtain the title compound (106 mg).

(Step 4) 4-((5-(tert-Butyl)-4-chloro-2-hydroxyanilino)methyl)thiazole-2-carboxylic acid To a solution of ethyl 4-((5-(tert-butyl)-4-chloro-2-hydroxyanilino)methyl)thiazole-2-carboxylate (106 mg) obtained in the preceding step 3 in methanol (3 mL), a 4 M aqueous sodium hydroxide solution (359 µL) was added, and the mixture was stirred at room temperature for 45 minutes. 2 M hydrochloric acid (718 µL) was added to the reaction mixture, and the solvent was distilled off under reduced pressure. An organic layer was separated by the addition of ethyl acetate and water to the reaction mixture. The solvent was concentrated under reduced pressure to obtain the title compound (96.5 mg).

(Step 5) tert-Butyl 3-((4-((5-(tert-butyl)-4-chloro-2-hydroxyanilino)methyl)thiazole-2-carbonyl)amino)azetidine-1-carboxylate 4-((5-(tert-Butyl)-4-chloro-2-hydroxyanilino)methyl)thiazole-2-carboxylic acid (48.2 mg) obtained in the preceding step 4, 1-Boc-3-aminoazetidine (33.4 mg), DMF (2.5 mL), N,N-diisopropylethylamine (75 µL), and HATU (68.3 mg) were added, and the mixture was stirred at room temperature for 45 minutes. Ethyl acetate was added to the reaction mixture, and the organic layer was washed with water. The solvent was distilled off under reduced pressure, and the obtained residue was purified by column chromatography (hexane:ethyl acetate) to obtain the title compound (52.7 mg).

(Step 6) N-(1-Acryloylazetidin-3-yl)-4-(((5-(tert-butyl)-4-chloro-2-hydroxyphenyl)amino)methyl)thiazole-2-carboxamide To tert-butyl 3-((4-((5-(tert-butyl)-4-chloro-2-hydroxyanilino)methyl)thiazole-2-carbonyl)amino)azetidine-1-carboxylate (52.7 mg) obtained in the preceding step 5, trifluoroacetic acid (1.5 mL) was added, and then, the reaction mixture was stirred for 10 minutes and then concentrated. The obtained residue was dissolved in THF (2.0 mL), and N,N-diisopropylethylamine (272 µL) and acryloyl chloride (9.46 µL) were added to the solution. Methanol was added to the reaction mixture, then the solvent was distilled off under reduced pressure, and the obtained residue was purified by column chromatography (ethyl acetate:methanol) to obtain the title compound (38.0 mg).

Example 11 N-(1-Acryloylazetidin-3-yl)-2-(((5-(tert-butyl)-4-chloro-2-hydroxyphenyl)amino)methyl)oxazole-5-carboxamide

(Step 1) 5-(tert-Butyl)benzo[d]oxazol-2 (3H)-one

To a solution of 2-amino-4-(tert-butyl)phenol (5.0 g) in THF (50 mL), N,N'-carbonyldiimidazole (6.5 g) was added, and the mixture was stirred at 65° C. for 3 hours. The reaction mixture was concentrated under reduced pressure, then a 10% aqueous phosphoric acid solution and ethyl acetate were added to the residue, and the organic layer was washed with saturated saline and dried over sodium sulfate. The solvent was distilled off under reduced pressure, and the obtained solids were collected to obtain the title compound (5.15 g).

(Step 2) 5-(tert-Butyl)-6-chlorobenzo[d]oxazol-2 (3H)-one

To a solution of 5-(tert-butyl)benzo[d]oxazol-2 (3H)-one (1.91 g) obtained in the preceding step 1 in THF (30 mL), NCS (1.47 g) was added, and the mixture was stirred overnight at 60° C. NCS (1.00 g) was added to the reaction mixture, and the mixture was stirred at 75° C. for 4 days. NCS (2.50 g) was further added thereto, and the mixture was stirred at 65° C. for 20 minutes. Water and ethyl acetate were added to the reaction mixture, and the organic layer was washed with saturated saline and dried over sodium sulfate. The solvent was distilled off under reduced pressure, then the obtained residue was purified by column chromatography (hexane:ethyl acetate) and concentrated, and then, solids obtained in hexane, and collected to obtain the title compound (2.00 g).

(Step 3) Methyl 2-(bromomethyl)oxazole-5-carboxylate

To a solution of methyl 2-methyloxazole-5-carboxylate (100 mg) in carbon tetrachloride (1 mL), NBS (189 mg) and 2,2'-azobis(2-methylpropionitrile) (46 mg) were added, and the mixture was stirred overnight at 80° C. The reaction mixture was cooled to room temperature, and insoluble matter was filtered off and washed with chloroform. The filtrate was concentrated under reduced pressure, and ethyl acetate and an aqueous sodium thiosulfate solution were added to the residue. The organic layer was washed with a saturated aqueous sodium bicarbonate and saturated saline and dried over sodium sulfate. The solvent was distilled off under reduced pressure, and the obtained solids were collected to obtain a mixture of the title compound (title compound:dibromo form:starting material=about 4:2:1 mixture) (175 mg).

(Step 4) Methyl 2-((5-(tert-butyl)-6-chloro-2-oxobenzo[d]oxazol-3(2H)-yl)methyl)oxazole-5-carboxylate To a solution of the mixture of 5-(tert-butyl)-6-chlorobenzo[d]oxazol-2(3H)-one (88 mg) obtained in the preceding step 2 and methyl 2-(bromomethyl)oxazole-5-carboxylate (84 mg) obtained in the preceding step 3 in acetonitrile (1 mL), potassium carbonate (54 mg) was added, and the mixture was stirred. After stirring for 7 minutes, 5-(tert-butyl)-6-chlorobenzo[d]oxazol-2 (3H)-one (44 mg) was further added thereto, and the mixture was stirred at 80° C. for 30 minutes. Potassium carbonate (54 mg) was added thereto, and the mixture was further stirred at 80° C. for 2.5 hours. Water (0.5 mL) was added to the reaction mixture, and the mixture was stirred at 80° C. for 30 minutes. Water was added to the reaction mixture, followed by extraction with ethyl acetate. The organic layer was washed with saturated saline and dried over sodium sulfate, then the solvent was distilled off under reduced pressure, and the obtained residue was purified by column chromatography (hexane:ethyl acetate) to obtain the title compound (35.5 mg).

(Step 5) 2-(((5-(tert-Butyl)-4-chloro-2-hydroxyphenyl)amino)methyl)oxazole-5-carboxylic acid To a solution of methyl 2-((5-(tert-butyl)-6-chloro-2-oxobenzo[d]oxazol-3(2H)-yl)methyl)oxazole-5-carboxylate (35.5 mg) obtained in the preceding step 4 in acetonitrile (1 mL), a 4 M lithium hydroxide solution (0.5 mL) and water (0.5 mL) were added, and the mixture was stirred for 30 minutes. 5 M hydrochloric acid (0.4 mL), water, and ethyl acetate were added to the reaction mixture, and the organic layer was washed with saturated saline, and dried over sodium sulfate. The solvent was distilled off under reduced pressure to obtain a crude form of the title compound (35 mg).

(Step 6) tert-Butyl 3-((2-((5-(tert-butyl)-4-chloro-2-hydroxyanilino)methyl)oxazole-5-carbonyl)amino)azetidine-1-carboxylate To a solution of the crude form of 2-(((5-(tert-butyl)-4-chloro-2-hydroxyphenyl)amino)methyl)oxazole-5-carboxylic acid (16 mg) obtained in the preceding step 5 and 1-Boc-3-aminoazetidine (13 mg) in DMF (0.5 mL), N,N-diisopropylethylamine (26 µL), HoBt hydrate (11 mg), and WSC hydrochloride (14 mg) were added, and the mixture was stirred overnight. Water and ethyl acetate were added to the reaction mixture. The organic layer was washed with water and saturated saline and dried over sodium sulfate, and then, the solvent was distilled off under reduced pressure. The obtained residue was purified by column chromatography (chloroform:methanol) to obtain the title compound (21 mg).

(Step 7) N-(1-Acryloylazetidin-3-yl)-2-(((5-(tert-butyl)-4-chloro-2-hydroxyphenyl)amino)methyl)oxazole-5-carboxamide To a solution of tert-butyl 3-((2-((5-(tert-butyl)-4-chloro-2-hydroxyanilino)methyl)oxazole-5-carbonyl)amino)azetidine-1-carboxylate (21 mg) obtained in the preceding step 6 in chloroform (1 mL), trifluoroacetic acid (0.5 mL) was added, and the reaction mixture was stirred for 20 minutes and then concentrated. The obtained residue was dissolved in THF (1 mL), then N,N-diisopropylethylamine (16 µL) was added to the solution, and then, the mixture was cooled in an ice bath, followed by the addition of acrylic anhydride (5 µL). After stirring for 20 minutes, N,N-diisopropylethylamine (16 µL) was further added thereto, and the mixture was further stirred for 20 minutes. Methanol was added to the reaction mixture, then the mixture was concentrated under reduced pressure, and the obtained residue was purified by column chromatography (chloroform:methanol) and purified by reverse-phase preparative HPLC (water:acetonitrile (0.1% formic acid)) to obtain the title compound (6.05 mg).

Example 12 N-(1-Acryloylazetidin-3-yl)-5-(((5-(tert-butyl)-4-chloro-2-hydroxyphenyl)amino)methyl)oxazole-2-carboxamide (Step 1) Ethyl 5-((5-(tert-butyl)-6-chloro-2-oxo-1,3-benzoxazol-3-yl)methyl)oxazole-2-carboxylate The title compound (61.4 mg) was obtained in the same way as in Example 11 (Steps 3 and 4) except that ethyl 5-methyloxazole-2-carboxylate (100 mg) was used instead of methyl 2-methyloxazole-5-carboxylate.

(Step 2) tert-Butyl 3-((5-((5-(tert-butyl)-4-chloro-2-hydroxyanilino)methyl)oxazole-2-carbonyl)amino)azetidine-1-carboxylate To a solution of ethyl 5-((5-(tert-butyl)-6-chloro-2-oxo-1,3-benzoxazol-3-yl)methyl)oxazole-2-carboxylate (15 mg) obtained in the preceding step 1 in acetonitrile (0.5 mL), a 4 M lithium hydroxide solution (20 µL) and water (0.1 mL) were added, and the mixture was stirred for 90 minutes. DMF (0.5 mL), 1-Boc-3-aminoazetidine (10.5 mg), HoBt hydrate (9.1 mg), and WSC hydrochloride (11.4 mg) were added to the reaction mixture, and the mixture was stirred overnight. Water and ethyl acetate were added to the reaction mixture. The organic layer was washed with water and saturated saline and dried over sodium sulfate, and then, the solvent was distilled off under reduced pressure. The obtained residue was purified by column chromatography (chloroform:methanol) to obtain the title compound (2.0 mg).

(Step 3) N-(1-Acryloylazetidin-3-yl)-5-(((5-(tert-butyl)-4-chloro-2-hydroxyphenyl)amino)methyl)oxazole-2-carboxamide To a solution of tert-butyl 3-((2-((5-(tert-butyl)-4-chloro-2-hydroxyanilino)methyl)oxazole-5-carbonyl)amino)azetidine-1-carboxylate (3.4 mg) obtained in the preceding step 2 in chloroform (1 mL), trifluoroacetic acid (0.5 mL) was added, and the reaction mixture was stirred for 20 minutes and then concentrated. The obtained residue was dissolved in THF (1 mL), then N,N-diisopropylethylamine (5 µL) was added to the solution, and then, the mixture was cooled in an ice bath, followed by the addition of acrylic anhydride (8.2 µL). After stirring for 10 minutes, methanol was added to the reaction mixture, then the mixture was concentrated under reduced pressure, and the obtained residue was purified by reverse-phase preparative HPLC (water:acetonitrile (0.1% formic acid)) to obtain the title compound (1.43 mg).

Example 13 N-(1-Acryloylazetidin-3-yl)-2-(((5-(tert-butyl)-4-chloro-2-hydroxyphenyl)amino)methyl)oxazole-4-carboxamide The title compound (10.68 mg) was obtained in the same way as in Example 11 (Steps 4 to 7) except that methyl 2-(chloromethyl)oxazole-4-carboxylate (86 mg) was used instead of methyl 2-(bromomethyl)oxazole-5-carboxylate.

Example 14 N-(1-Acryloylazetidin-3-yl)-4-(((5-(tert-butyl)-4-chloro-2-hydroxyphenyl)amino)methyl)oxazole-2-carboxamide (Step 1) 4-((5-(tert-Butyl)-4-chloro-2-hydroxyanilino)methyl)oxazole-2-carboxylic acid The title compound (37.5 mg) was obtained in the same way as in Example 11 (Steps 3 to 5) except that ethyl 4-methyloxazole-2-carboxylate (100 mg) was used instead of methyl 2-methyloxazole-5-carboxylate.

(Step 2) tert-Butyl 3-((4-((5-(tert-butyl)-4-chloro-2-hydroxyanilino)methyl)oxazole-2-carbonyl)amino)azetidine-1-carboxylate To a solution of 4-((5-(tert-butyl)-4-chloro-2-hydroxyanilino)methyl)oxazole-2-carboxylic acid (19 mg) obtained in the preceding step 1 and 1-Boc-3-aminoazetidine (12 mg) in DMF (1.0 mL), N,N-diisopropylethylamine (24 µL), HoBt hydrate (11 mg), and WSC hydrochloride (13 mg) were added, and the mixture was stirred overnight. Water and ethyl acetate were added to the reaction mixture. The organic layer was washed with water and saturated saline, and dried over sodium sulfate, and then, the solvent was distilled off under reduced pressure. The obtained residue was purified by column chromatography (hexane:ethyl acetate) to obtain the title compound (8.0 mg).

(Step 3) N-(1-Acryloylazetidin-3-yl)-4-(((5-(tert-butyl)-4-chloro-2-hydroxyphenyl)amino)methyl) oxazole-2-carboxamide To a solution of tert-butyl 3-((4-((5-(tert-butyl)-4-chloro-2-hydroxyanilino)methyl)oxazole-2-carbonyl)amino)azetidine-1-carboxylate (8.0 mg) obtained in the preceding step 2 in chloroform (1 mL), trifluoroacetic acid (0.5 mL) was added, and the reaction mixture was stirred for 30 minutes and then concentrated. The obtained residue was dissolved in THF (1 mL), then N,N-diisopropylethylamine (12 μL) was added to the solution, and then, the mixture was cooled in an ice bath, followed by the addition of acryloyl chloride (1.4 μL). After stirring for 20 minutes, methanol was added to the reaction mixture, and the mixture was concentrated under reduced pressure. The obtained residue was purified by column chromatography (chloroform:methanol) and purified by reverse-phase preparative HPLC (water:acetonitrile (0.1% formic acid)) to obtain the title compound (3.39 mg).

Example 15 N-(1-Acryloylazetidin-3-yl)-2-(((5-(tert-butyl)-4-chloro-2-hydroxyphenyl)amino) methyl)isonicotinamide (Step 1) Methyl 2-vinylisonicotinate To a solution of methyl 2-bromoisonicotinate (303 mg) in 1,4-dioxane (3.0 mL), tributyl(vinyl)tin (444 μL), 2,6-di-tert-butyl-4-methylphenol (17.5 mg), and tetrakis(triphenylphosphine)palladium(0) (82.4 mg) were added, and the mixture was reacted at 100° C. for 2 hours in a microwave reaction apparatus. Tetrakis(triphenylphosphine)palladium (0) (40.2 mg) was further added thereto, and the mixture was further reacted at 100° C. for 2 hours in a microwave reaction apparatus. The solvent in the reaction mixture was distilled off under reduced pressure, and the obtained residue was purified by column chromatography (hexane:ethyl acetate) to obtain the title compound (106 mg).

(Step 2) Methyl 2-formylisonicotinate

To a solution of methyl 2-vinylisonicotinate (106 mg) obtained in the preceding step 1 in 1,4-dioxane (9.0 mL), water (2.0 mL), 2,6-lutidine (0.16 mL), an aqueous osmium tetroxide solution (0.15 M, 0.2 mL), and sodium periodate (562 mg) were added, and the mixture was stirred overnight at room temperature. An organic layer was separated by the addition of water and ethyl acetate to the reaction mixture, and the aqueous layer was subjected to extraction with ethyl acetate twice. The organic layer was dried over magnesium sulfate, and the solvent was concentrated under reduced pressure. The obtained residue was purified by column chromatography (hexane:ethyl acetate) to obtain the title compound (60.4 mg).

(Step 3) Methyl 2-((5-(tert-butyl)-4-chloro-2-hydroxyanilino)methyl)pyridine-4-carboxylate To a solution of methyl 2-formylisonicotinate (60.4 mg) obtained in the preceding step 2 and 2-amino-4-(tert-butyl)-5-chlorophenol (73.4 mg) in methanol (2 mL), acetic acid (10 μL) and sodium cyanoborohydride (58.9 mg) were added, and the mixture was stirred for 30 minutes. A 10% aqueous phosphoric acid solution (200 μL) was added to the reaction mixture, and the reaction mixture was concentrated under reduced pressure. An organic layer was separated by the addition of water and ethyl acetate to the obtained residue. The solvent was distilled off under reduced pressure, and the obtained residue was purified by column chromatography (hexane:ethyl acetate) to obtain the title compound (113 mg).

(Step 4) tert-Butyl 3-((2-((5-(tert-butyl)-4-chloro-2-hydroxyanilino)methyl)pyridine-4-carbonyl)amino) azetidine-1-carboxylate To a solution of methyl 2-((5-(tert-butyl)-4-chloro-2-hydroxyanilino)methyl)pyridine-4-carboxylate (34.3 mg) obtained in the preceding step 3 in methanol (3 mL), a 4 M aqueous sodium hydroxide solution (123 μL) was added, and the mixture was stirred at room temperature for 2.5 hours. 2 M hydrochloric acid (246 μL) was added to the reaction mixture, and the solvent was distilled off under reduced pressure. Ethyl acetate was added to the reaction mixture, and the solvent in the organic layer was distilled off under reduced pressure. To the obtained residue, 1-Boc-3-aminoazetidine (20.7 mg) and DMF (2 mL) were added, and further, N,N-diisopropylethylamine (50.2 μL) and HATU (44.3 mg) were added. The mixture was stirred at room temperature for 10 minutes, and ethyl acetate was added to the reaction mixture. The organic layer was washed with water, and the solvent was distilled off under reduced pressure. The obtained residue was purified by column chromatography (ethyl acetate:methanol) to obtain the title compound (23.2 mg).

(Step 5) N-(1-Acryloylazetidin-3-yl)-2-(((5-(tert-butyl)-4-chloro-2-hydroxyphenyl)amino)methyl) isonicotinamide To tert-butyl 3-((2-((5-(tert-butyl)-4-chloro-2-hydroxyanilino)methyl)pyridine-4-carbonyl)amino)azetidine-1-carboxylate (23.2 mg) obtained in the preceding step 4, trifluoroacetic acid (1.5 mL) was added, and the reaction mixture was stirred for 15 minutes and then concentrated. To the obtained residue, THF (2 mL) and N,N-diisopropylethylamine (121 μL) were added, and a solution of acryloyl chloride (3.44 μL) in acetonitrile (0.2 mL) was added under ice cooling. After stirring for 15 minutes, methanol was added to the reaction mixture, and the solvent was distilled off under reduced pressure. The obtained residue was purified by column chromatography (ethyl acetate:methanol) to obtain the title compound (7.2 mg).

Example 16 N-(1-Acryloylazetidin-3-yl)-4-(((5-(tert-butyl)-4-chloro-2-hydroxyphenyl)amino) methyl)picolinamide The title compound (20.1 mg) was obtained in the same way as in Example 9 (Steps 3 to 5) except that methyl 4-formylpyridine-2-carboxylate (44.3 mg) was used instead of methyl 2-formylthiazole-5-carboxylate.

Example 17 N-(1-Acryloylazetidin-3-yl)-5-(((5-(tert-butyl)-4-chloro-2-hydroxyphenyl)amino) methyl)nicotinamide The title compound (8.3 mg) was obtained in the same way as in Example 9 (Steps 3 to 5) except that methyl 5-formylpyridine-3-carboxylate (46.5 mg) was used instead of methyl 2-formylthiazole-5-carboxylate.

Example 18 N-(1-Acryloylazetidin-3-yl)-2-(((5-(tert-butyl)-4-chloro-2-hydroxyphenyl)amino)methyl)-1-methyl-1H-imidazole-5-carboxamide (Step 1) Methyl 2-bromo-1-methyl-1H-imidazole-5-carboxylate To a solution of methyl 1-methyl-1H-imidazole-5-carboxylate (302 mg) in carbon tetrachloride (5 mL), NBS (460 mg) and 2,2'-azobis(2-methylpropionitrile) (39.2 mg) were added, and the mixture was stirred at 90° C. for 4.5 hours. The reaction mixture was concentrated under reduced pressure, and the obtained residue was purified by column chromatography (hexane:ethyl acetate) to obtain the title compound (201 mg).

(Step 2) Methyl 1-methyl-2-vinyl-1H-imidazole-5-carboxylate

To a solution of methyl 2-bromo-1-methyl-1H-imidazole-5-carboxylate (201 mg) obtained in the preceding step 1 and 2,6-di-tert-butyl-4-methylphenol (11.6 mg) in 1,4-dioxane (3 mL), tributyl(vinyl)tin (294 µL) and tetrakis(triphenylphosphine)palladium(0) (67.5 mg) were added, and the mixture was stirred at 100° C. for 2 hours in a microwave reaction apparatus. The reaction mixture was concentrated, and the obtained residue was purified by column chromatography (hexane:ethyl acetate) to obtain the title compound (91.7 mg).

(Step 3) Methyl 2-formyl-1-methyl-1H-imidazole-5-carboxylate

To a solution of methyl 1-methyl-2-vinyl-1H-imidazole-5-carboxylate (91.7 mg) obtained in the preceding step 2 in 1,4-dioxane (9.0 mL), water (2.0 mL), 2,6-lutidine (0.16 mL), an aqueous osmium tetroxide solution (0.15 M, 0.2 mL), and sodium periodate (478 mg) were added, and the mixture was stirred overnight at room temperature. An organic layer was separated by the addition of water and ethyl acetate to the reaction mixture, and the aqueous layer was subjected to extraction with ethyl acetate twice. The organic layer was dried over magnesium sulfate, and the solvent was concentrated under reduced pressure. The obtained residue was purified by column chromatography (hexane:ethyl acetate) to obtain the title compound (70 mg).

(Step 4) N-(1-Acryloylazetidin-3-yl)-2-(((5-(tert-butyl)-4-chloro-2-hydroxyphenyl)amino)methyl)-1-methyl-1H-imidazole-5-carboxamide The title compound (5.0 mg) was obtained in the same way as in Example 9 (Steps 3 to 5) except that methyl 2-formyl-1-methyl-1H-imidazole-5-carboxylate (70 mg) obtained in the preceding step 3 was used instead of methyl 2-formylthiazole-5-carboxylate.

Example 19 N-(1-Acryloylazetidin-3-yl)-4-(((5-(tert-butyl)-4-chloro-2-hydroxyphenyl)amino)methyl)-1-methyl-1H-imidazole-2-carboxamide (Step 1) 2,2,2-Trichloro-1-(1-methyl-1H-imidazol-2-yl)ethan-1-one To a solution of 1-methylimidazole (995 mg) in dichloromethane (8 mL), trichloroacetyl chloride (2.20 g) was added dropwise, and the mixture was stirred overnight. Triethylamine (1.7 mL) was added to the reaction product under ice cooling, then the reaction mixture was concentrated under reduced pressure, and the obtained residue was purified by column chromatography (hexane:ethyl acetate) to obtain the title compound (2.18 g)

(Step 2) 1-(4-Bromo-1-methyl-1H-imidazol-2-yl)-2,2,2-trichloroethan-1-one

To a solution of 2,2,2-trichloro-1-(1-methyl-1H-imidazol-2-yl)ethan-1-one (1.01 g) obtained in the preceding step 1 in THF (17 mL), NBS (1.57 g) was added under cooling in an ice salt bath. The mixture was allowed to slowly warm to room temperature and stirred overnight. The reaction mixture was concentrated, and the obtained residue was purified by column chromatography (hexane:ethyl acetate) to obtain the title compound (1.06 g).

(Step 3) Methyl 4-bromo-1-methyl-1H-imidazole-2-carboxylate

To a solution of 1-(4-bromo-1-methyl-1H-imidazol-2-yl)-2,2,2-trichloroethan-1-one (1.06 g) obtained in the preceding step 2 in methanol (15 mL), sodium methoxide (25% solution in methanol, 173 mg) was added. After stirring at room temperature for 1 hour, the reaction mixture was concentrated under reduced pressure, and the obtained residue was purified by column chromatography (hexane:ethyl acetate) to obtain the title compound (592 mg).

(Step 4) Methyl 1-methyl-4-vinyl-1H-imidazole-2-carboxylate

To a solution of methyl 4-bromo-1-methyl-1H-imidazole-2-carboxylate (198 mg) obtained in the preceding step 3 and 2,6-di-tert-butyl-4-methylphenol (15.3 mg) in 1,4-dioxane (3 mL), tributyl(vinyl)tin (292 µL) and tetrakis(triphenylphosphine)palladium(0) (68.3 mg) were added, and the mixture was stirred at 100° C. for 2 hours in a microwave reaction apparatus. Tetrakis(triphenylphosphine)palladium (0) (74.4 mg) was further added thereto, and the mixture was stirred at 110° C. for 5 hours in a microwave reaction apparatus. Tetrakis(triphenylphosphine)palladium(0) (68.4 mg) was further added thereto, and the mixture was stirred at 110° C. for 10 hours in a microwave reaction apparatus. Insoluble matter in the reaction mixture was filtered off, then the filtrate was concentrated, and the obtained residue was purified by column chromatography (hexane:ethyl acetate) to obtain the title compound (30 mg).

(Step 5) Methyl 4-formyl-1-methyl-1H-imidazole-2-carboxylate

To a solution of methyl 1-methyl-4-vinyl-1H-imidazole-2-carboxylate (30 mg) obtained in the preceding step 4 in 1,4-dioxane (3 mL), water (0.6 mL), 2,6-lutidine (0.05 mL), an aqueous osmium tetroxide solution (0.15 M, 0.06 mL), and sodium periodate (161 mg) were added, and the mixture was stirred overnight at room temperature. An organic layer was separated by the addition of water and ethyl acetate to the reaction mixture, and the aqueous layer was subjected to extraction with ethyl acetate twice. The organic layer was dried over magnesium sulfate, and the solvent was concentrated under reduced pressure. The obtained residue was purified by column chromatography (hexane:ethyl acetate) to obtain the title compound (24.8 mg).

(Step 6) N-(1-Acryloylazetidin-3-yl)-4-(((5-(tert-butyl)-4-chloro-2-hydroxyphenyl)amino)methyl)-1-methyl-1H-imidazole-2-carboxamide The title compound (23.5 mg) was obtained in the same way as in Example 9 (Steps 3 to 5) except that methyl 4-formyl-1-methyl-1H-imidazole-2-carboxylate (24.8 mg) obtained in the preceding step 5 was used instead of methyl 2-formylthiazole-5-carboxylate.

Example 20 N-(1-Acryloylazetidin-3-yl)-2-(((5-(tert-butyl)-4-chloro-2-hydroxyphenyl)amino) methyl)-4-methylthiazole-5-carboxamide (Step 1) tert-Butyl 3-(2-bromo-4-methylthiazole-5-carboxamido)azetidine-1-carboxylate To a solution of 2-bromo-4-methylthiazole-5-carboxylic acid (222 mg) and 1-Boc-3-aminoazetidine (200 mg) in DMF (4 mL), HATU (500 mg) and N,N-diisopropylethylamine (340 µL) were added, and the mixture was stirred at room temperature for 2.5 hours. The reaction mixture was concentrated, and a 10% aqueous phosphoric acid solution was added to the residue, followed by extraction with ethyl acetate. The organic layer was washed with water and dried over sodium sulfate, and then, the solvent was distilled off under reduced pressure. The obtained residue was purified by column chromatography (hexane:ethyl acetate) to obtain the title compound (222 mg).

(Step 2) tert-Butyl 3-(4-methyl-2-vinylthiazole-5-carboxamido)azetidine-1-carboxylate To a solution of tert-butyl 3-(2-bromo-4-methylthiazole-5-carboxamido)azetidine-1-carboxylate (222 mg) obtained in the preceding step 1 in 1,4-dioxane (5 mL), tributyl(vinyl) tin (200 µL) and tetrakis(triphenylphosphine)palladium(0) (30 mg) were added, and the mixture was reacted overnight at 100° C. The solvent in the reaction mixture was distilled off under reduced pressure, and the obtained residue was purified by column chromatography (basic silica gel, hexane:ethyl acetate) to obtain the title compound (163 mg).

(Step 3) tert-Butyl 3-(2-formyl-4-methylthiazole-5-carboxamido)azetidine-1-carboxylate To a solution of tert-butyl 3-(4-methyl-2-vinylthiazole-5-carboxamido)azetidine-1-carboxylate (163 mg) obtained in the preceding step 2 in 1,4-dioxane (6 mL), water (2.0 mL), 2,6-lutidine (120 µL), an aqueous osmium tetroxide solution (1%, 260 µL), and sodium periodate (431 mg) were added, and the mixture was stirred overnight at room temperature. An aqueous sodium bicarbonate solution and ethyl acetate were added to the reaction mixture, then insoluble matter was filtered off, and then, the organic layer was separated. The organic layer was dried over magnesium sulfate, then the solvent was concentrated under reduced pressure, and the obtained residue was purified by column chromatography (chloroform:ethanol) to obtain the title compound (166 mg).

(Step 4) N-(1-Acryloylazetidin-3-yl)-2-(((5-(tert-butyl)-4-chloro-2-hydroxyphenyl)amino)methyl)-4-methylthiazole-5-carboxamide The title compound (14.2 mg) was obtained in the same way as in Example 1 (Steps 2 and 3) except that tert-butyl 3-(2-formyl-4-methylthiazole-5-carboxamido)azetidine-1-carboxylate (166 mg) obtained in the preceding step 3 was used instead of tert-butyl 3-(5-formylfuran-2-carboxamido) azetidine-1-carboxylate.

Example 21 N-(1-Acryloylazetidin-3-yl)-5-(((5-(tert-butyl)-4-chloro-2-hydroxyphenyl)amino) methyl)-3-methylfuran-2-carboxamide (Step 1) tert-Butyl 3-(3-methylfuran-2-carboxamido)azetidine-1-carboxylate To a solution of 3-methyl-2-furancarboxylic acid (252 mg) and 1-Boc-3-aminoazetidine (423 mg) in DMF (5 mL), N,N-diisopropylethylamine (680 µL) and HATU (1.0 g) were added, and the mixture was stirred overnight at room temperature. An organic layer was separated by the addition of water and ethyl acetate to the reaction mixture, and washed with water and saturated saline. The resultant product was dried over sodium sulfate, and then, the solvent was distilled off under reduced pressure. The obtained residue was purified by column chromatography (hexane:ethyl acetate) to obtain the title compound (519 mg).

(Step 2) tert-Butyl 3-(5-formyl-3-methylfuran-2-carboxamido)azetidine-1-carboxylate A solution of tert-butyl 3-(3-methylfuran-2-carboxamido) azetidine-1-carboxylate (519 mg) obtained in the preceding step 1 in THF (10 mL) was cooled in a dry ice-acetone bath, then butyllithium (1.65 M solution in hexane, 2.50 mL) was added thereto over 20 minutes, and the mixture was stirred for 1 hour. A solution of DMF (720 µL) in THF (5 mL) was added to the reaction mixture, and the mixture was further stirred for 1 hour. A 10% aqueous phosphoric acid solution was added to the reaction mixture, and the mixture was warmed to room temperature, followed by extraction with ethyl acetate. The organic layer was washed with saturated saline and dried over sodium sulfate, then the solvent was distilled off under reduced pressure, and the obtained residue was purified by column chromatography (hexane:ethyl acetate) to obtain the title compound (485 mg).

(Step 3) N-(1-Acryloylazetidin-3-yl)-5-(((5-(tert-butyl)-4-chloro-2-hydroxyphenyl)amino)methyl)-3-methylfuran-2-carboxamide The title compound (9.64 mg) was obtained in the same way as in Example 1 (Steps 2 and 3) except that tert-butyl 3-(5-formyl-3-methylfuran-2-carboxamido)azetidine-1-carboxylate (100 mg) obtained in the preceding step 2 was used instead of tert-butyl 3-(5-formylfuran-2-carboxamido)azetidine-1-carboxylate.

Example 22 N-(1-Acryloylazetidin-3-yl)-4-(((5-(tert-butyl)-4-chloro-2-hydroxyphenyl)amino) methyl)-2-chlorobenzamide (Step 1) tert-Butyl 3-((4-bromo-2-chlorobenzoyl) amino)azetidine-1-carboxylate To a solution of 4-bromo-2-chlorobenzoic acid (235 mg), 1-Boc-3-aminoazetidine (206 mg), and HoBt hydrate (202 mg) in DMF (2.35 mL), WSC hydrochloride (287 mg) was added, and the mixture was stirred at room temperature for 30 minutes. An aqueous sodium bicarbonate solution was added to the reaction mixture, followed by extraction with chloroform. The organic layer was washed with saturated saline and dried over sodium sulfate, and then, the solvent was distilled off under reduced pressure. The obtained residue was purified by column chromatography (hexane:ethyl acetate) to obtain the title compound (376 mg).

(Step 2) tert-Butyl 3-((2-chloro-4-formylbenzoyl)amino)azetidine-1-carboxylate

A solution of tert-butyl 3-((4-bromo-2-chlorobenzoyl)amino)azetidine-1-carboxylate (376 mg) obtained in the preceding step 2 in THF (4 mL) was cooled in a dry ice-acetone bath, then butyllithium (1.63 M solution in hexane, 1.84 mL) was added thereto, and the mixture was stirred for 10 minutes. DMF (155 µL) was added to the reaction mixture, and after removal of the dry ice-acetone bath, the mixture was warmed to room temperature and stirred for 20 minutes. 5 M hydrochloric acid was added to the reaction mixture, followed by extraction with ethyl acetate. The organic layer was washed with saturated saline and dried over sodium sulfate, then the solvent was distilled off under reduced pressure, and the obtained residue was purified by column chromatography (hexane:ethyl acetate) to obtain the title compound (50.7 mg).

(Step 3) N-(1-Acryloylazetidin-3-yl)-4-(((5-(tert-butyl)-4-chloro-2-hydroxyphenyl)amino)methyl)-2-chlorobenzamide The title compound (2.5 mg) was obtained in the same way as in Example 1 (Steps 2 and 3) except that tert-butyl 3-((2-chloro-4-formyl-benzoyl)amino)azetidine-1-carboxylate (50.7 mg) obtained in the preceding step 3 was used instead of tert-butyl 3-(5-formylfuran-2-carboxamido)azetidine-1-carboxylate.

Example 23 N-(1-Acryloylazetidin-3-yl)-5-(((5-(tert-butyl)-4-chloro-2-hydroxyphenyl)amino)methyl)-2-fluorobenzamide The title compound (2.8 mg) was obtained in the same way as in Example 22 (Steps 1 to 3) except that 4-bromo-2-fluorobenzoic acid (219 mg) was used instead of 4-bromo-2-chlorobenzoic acid.

Example 24 N-(1-Acryloylazetidin-3-yl)-2-(((5-(tert-butyl)-4-chloro-2-hydroxyphenyl)amino)methyl)-4-(trifluoromethyl)thiazole-5-carboxamide The title compound (15.25 mg) was obtained in the same way as in Example 20 (Steps 1 to 4) except that 2-bromo-4-(trifluoromethyl)thiazole-5-carboxylic acid (140 mg) was used instead of 2-bromo-4-methylthiazole-5-carboxylic acid.

Example 25 N-(1-Acryloylazetidin-3-yl)-2-(((5-(tert-butyl)-4-chloro-2-hydroxyphenyl)amino)methyl)-1-methyl-1H-imidazole-4-carboxamide (Step 1) Ethyl 3-(dimethylamino)-2-isocyanoacrylate To a solution of ethyl isocyanoacetate (1.00 g) in ethanol (1.5 mL), N,N-dimethylformamide dimethylacetal (2.0 mL) was added dropwise over 5 minutes under ice salt cooling. After removal of the ice bath, the reaction mixture was stirred for 2.5 hours and then concentrated, then MTBE (3 mL) and silica gel (1 g) were added to the obtained residue, and the mixture was stirred for 15 minutes. The silica gel was filtered off, and the solvent was distilled off under reduced pressure. The obtained residue was purified by column chromatography (hexane:ethyl acetate) to obtain the title compound (1.19 g)

(Step 2) Methyl 1-methyl-1H-imidazole-4-carboxylate

To a solution of ethyl 3-(dimethylamino)-2-isocyanoacrylate (1.19 g) obtained in the preceding step 1 in methanol (1 mL), 40% methylamine (solution in methanol, 2.75 mL) was added under ice cooling, and after removal of the ice bath, the mixture was then stirred overnight. The reaction mixture was concentrated, and the obtained residue was purified by column chromatography (hexane:ethyl acetate) to obtain the title compound (321 mg) and ethyl 1-methyl-1H-imidazole-4-carboxylate (419 mg).

(Step 3) Methyl 2-bromo-1-methyl-1H-imidazole-4-carboxylate

To a suspension of methyl 1-methyl-1H-imidazole-4-carboxylate (320 mg) obtained in the preceding step 2 in THF (3 mL), NBS (401 mg) was added, and the mixture was stirred overnight at room temperature. NBS (214 mg) was further added thereto, and the mixture was further stirred at room temperature for 7 hours. The reaction mixture was concentrated, and the obtained residue was purified by column chromatography (hexane:ethyl acetate) to obtain the title compound (64 mg).

(Step 4) N-(1-Acryloylazetidin-3-yl)-2-(((5-(tert-butyl)-4-chloro-2-hydroxyphenyl)amino)methyl)-1-methyl-1H-imidazole-4-carboxamide The title compound (24.3 mg) was obtained in the same way as in Example 18 (Steps 2 to 4) except that methyl 2-bromo-1-methyl-imidazole-4-carboxylate (64 mg) obtained in the preceding step 3 was used instead of methyl 1-methyl-2-vinyl-1H-imidazole-5-carboxylate.

Example 26 N-(1-Acryloylazetidin-3-yl)-2-(((5-(tert-butyl)-4-chloro-2-hydroxyphenyl)amino)methyl)-1H-imidazole-5-carboxamide (Step 1) Methyl 1-((2-(trimethylsilyl)ethoxy)methyl)-1H-imidazole-5-carboxylate To a suspension of methyl 4-imidazolecarboxylate (252 mg) and potassium carbonate (561 mg) in DMF (2 mL), 2-(trimethylsilyl)ethoxymethyl chloride (0.42 mL) was added dropwise. The reaction mixture was stirred for 3 hours, then ethyl acetate was added thereto, and the organic layer was washed with water. The solvent was concentrated under reduced pressure, and the obtained residue was purified by column chromatography (hexane:ethyl acetate) to obtain the title compound (287 mg).

(Step 2) N-(1-Acryloylazetidin-3-yl)-2-(((5-(tert-butyl)-4-chloro-2-hydroxyphenyl)amino)methyl)-1-((2-(trimethylsilyl)ethoxy)methyl)-1H-imidazole-5-carboxamide The title compound (28.7 mg) was obtained in the same way as in Example 18 (Steps 1 to 4) except that methyl 1-((2-(trimethylsilyl)ethoxy)methyl)-1H-imidazole-5-carboxylate (287 mg) obtained in the preceding step 1 was used instead of methyl 1-methyl-1H-imidazole-5-carboxylate.

(Step 3) N-(1-Acryloylazetidin-3-yl)-2-(((5-(tert-butyl)-4-chloro-2-hydroxyphenyl)amino)methyl)-1H-imidazole-5-carboxamide To N-(1-acryloylazetidin-3-yl)-2-(((5-(tert-butyl)-4-chloro-2-hydroxyphenyl)amino)methyl)-1-((2-(trimethylsilyl)ethoxy)methyl)-1H-imidazole-5-carboxamide (28.7 mg) obtained in the preceding step 2, trifluoroacetic acid (2 mL) was added, and the mixture was stirred for 2.5 hours. The reaction mixture was concentrated, then ethyl acetate was added to the residue, and the organic layer was washed with a saturated aqueous sodium bicarbonate. The solvent was concentrated under reduced pressure, and the obtained residue was purified by column chromatography (basic silica gel, ethyl acetate:methanol) to obtain the title compound (5.5 mg).

Example 27 N-(1-Acryloylazetidin-3-yl)-2-(((5-(tert-butyl)-4-chloro-2-hydroxyphenyl)amino) methyl)-4-iodo-1-methyl-1H-imidazole-5-carboxamide (Step 1) Methyl 2,4-diiodo-1-methyl-1H-imidazole-5-carboxylate To a solution of methyl 1-methyl-1H-imidazole-5-carboxylate (514 mg) in acetonitrile (25 mL), NIS (2.70 g) and trifluoroacetic acid (545 µL) were added, and the mixture was stirred overnight at 85° C. NIS (0.9 g) was further added thereto, and the mixture was stirred overnight under heating to reflux. NIS (1.8 g) was further added thereto, and the mixture was stirred for 6 days under heating to reflux. The reaction mixture was allowed to cool to room temperature, and diluted with ethyl acetate. The solvent was washed with water, an aqueous sodium sulfite solution, and 20% saline, then the solvent was concentrated under reduced pressure, and the obtained residue was purified by column chromatography (hexane:ethyl acetate) to obtain the title compound (229 mg) and methyl 2-iodo-1-methyl-1H-imidazole-5-carboxylate (131 mg).

(Step 2) Methyl 4-iodo-1-methyl-2-vinyl-1H-imidazole-5-carboxylate

To a mixture of methyl 2,4-diiodo-1-methyl-1H-imidazole-5-carboxylate (102 mg) obtained in the preceding step 1, potassium vinyltrifluoroborate (48.5 mg), and (1,1'-bis(diphenylphosphino)ferrocene)palladium(II) dichloride dichloromethane adduct (13 mg) in 1,4-dioxane (2 mL), a 2 M aqueous sodium carbonate solution (400 µL) was added, and the mixture was stirred at 90° C. for 1.5 hours in a nitrogen atmosphere. Potassium vinyltrifluoroborate (13.5 mg) and a 2 M aqueous sodium carbonate solution (100 µL) were further added thereto, and the mixture was stirred at 90° C. for 1 hour and 15 minutes. Water was added to the reaction mixture, followed by extraction with ethyl acetate three times. The organic layer was dried over sodium sulfate, and the solvent was concentrated under reduced pressure. The obtained residue was purified by column chromatography (hexane:ethyl acetate) to obtain the title compound (42.5 mg).

(Step 3) N-(1-Acryloylazetidin-3-yl)-2-(((5-(tert-butyl)-4-chloro-2-hydroxyphenyl)amino)methyl)-4-iodo-1-methyl-1H-imidazole-5-carboxamide The title compound (5.75 mg) was obtained in the same way as in Example 18 (Steps 3 and 4) except that methyl 4-iodo-1-methyl-2-vinyl-1H-imidazole-5-carboxylate (61.5 mg) obtained in the preceding step 2 was used instead of methyl 1-methyl-2-vinyl-1H-imidazole-5-carboxylate.

Example 28 N-(1-Acryloylazetidin-3-yl)-2-(((5-(tert-butyl)-4-chloro-2-hydroxyphenyl)amino) methyl)-N-methyloxazole-5-carboxamide The title compound (1.41 mg) was obtained in the same way as in Example 11 (Steps 6 and 7) except that tert-butyl 3-(methylamino)azetidine-1-carboxylate (14 mg) was used instead of 1-Boc-3-aminoazetidine.

Example 29 N-(1-Acryloylazetidin-3-yl)-4-(((5-(tert-butyl)-4-chloro-2-hydroxyphenyl)amino) methyl)-N-methylthiazole-2-carboxamide The title compound (19.5 mg) was obtained in the same way as in Example 10 (Steps 5 and 6) except that tert-butyl 3-(methylamino)azetidine-1-carboxylate (25.2 mg) was used instead of 1-Boc-3-aminoazetidine.

Example 30 N-(1-Acryloylazetidin-3-yl)-6-(((5-(tert-butyl)-4-chloro-2-hydroxyphenyl)amino) methyl)-N-methylpicolinamide The title compound (29.8 mg) was obtained in the same way as in Example 15 (Steps 3 to 5) except that methyl 6-formylpicolinate (83 mg) was used instead of methyl 2-formylisonicotinate and tert-butyl 3-(methylamino)azetidine-1-carboxylate (25 mg) was used instead of 1-Boc-3-aminoazetidine.

Example 31 N-(1-Acryloylazetidin-3-yl)-2-(((5-(tert-butyl)-4-chloro-2-hydroxyphenyl)amino) methyl)-N-methylthiazole-5-carboxamide The title compound (9.6 mg) was obtained in the same way as in Example 9 (Steps 4 and 5) except that tert-butyl 3-(methylamino)azetidine-1-carboxylate (35.8 mg) was used instead of 1-Boc-3-aminoazetidine.

Example 32 N-(1-Acryloylazetidin-3-yl)-2-(((5-(tert-butyl)-4-chloro-2-hydroxyphenyl)amino) methyl)-N-methylthiazole-4-carboxamide The title compound (33.3 mg) was obtained in the same way as in Example 8 (Steps 2 to 5) except that tert-butyl 3-(methylamino)azetidine-1-carboxylate (100 mg) was used instead of 1-Boc-3-aminoazetidine.

Example 33 N-(1-Acryloylazetidin-3-yl)-5-(((5-(tert-butyl)-4-chloro-2-hydroxyphenyl)amino) methyl)-N-methylfuran-3-carboxamide (Step 1) Ethyl 5-formylfuran-3-carboxylate To a solution of ethyl 3-furancarboxylate (1.00 g) in DMF (3.33 mL), phosphorus oxychloride (2.67 mL) was slowly added, and the mixture was stirred at 60° C. for 2 days. The reaction mixture was slowly poured into an aqueous sodium carbonate solution, followed by extraction with ethyl acetate. The organic layer was dried over sodium sulfate, and the solvent was distilled off under reduced pressure. The obtained residue was purified by column chromatography (hexane:ethyl acetate) to obtain the title compound (548 mg).

(Step 2) N-(1-Acryloylazetidin-3-yl)-5-(((5-(tert-butyl)-4-chloro-2-hydroxyphenyl)amino)methyl)-N-methylfuran-3-carboxamide The title compound (18.7 mg) was obtained in the same way as in Example 9 (Steps 3 to 5) except that ethyl 5-formylfuran-3-carboxylate (80 mg) obtained in the preceding step 1 was used instead of methyl 2-formylthiazole-5-carboxylate and tert-butyl 3-(methylamino)azetidine-1-carboxylate (80 mg) was used instead of 1-Boc-3-aminoazetidine.

Example 34 N-(1-Acryloylazetidin-3-yl)-4-(((5-(tert-butyl)-4-chloro-2-hydroxyphenyl)amino)methyl)-N-methylfuran-2-carboxamide (Step 1) 2-(tert-Butyl) 4-ethyl furan-2,4-dicarboxylate To a solution of ethyl 5-formylfuran-3-carboxylate (460 mg) obtained in Example 33 (Step 1) in a mixed solvent of 1,4-dioxane (10 mL) and water (5 mL), amidosulfuric acid (531 mg) and a solution of sodium chlorite (464 mg) in water (5 mL) under cooling in an ice bath were added, and the mixture was stirred for 6 hours. A 10% aqueous phosphoric acid solution was added to the reaction mixture, followed by extraction with ethyl acetate. The organic layer was dried over sodium sulfate, and the solvent was distilled off under reduced pressure. DMF (2 mL) and DMF di-tert-butyl acetal (2 mL) were added to the obtained residue, and the mixture was stirred at 80° C. for 2 hours. DMF di-tert-butyl acetal (2 mL) was further added thereto, and the mixture was further stirred at 80° C. for 1 hour. The reaction mixture was concentrated, and water was added to the obtained residue, followed by extraction with ethyl acetate. The organic layer was washed with water and saturated saline and dried over sodium sulfate, and the solvent was distilled off under reduced pressure. The obtained residue was purified by column chromatography (hexane:ethyl acetate) to obtain the title compound (281 mg).

(Step 2) 5-(tert-Butoxycarbonyl)furan-3-carboxylic acid

To a solution of 2-(tert-butyl) 4-ethyl furan-2,4-dicarboxylate (281 mg) obtained in the preceding step 1 in ethanol (4 mL), a 5 M aqueous sodium hydroxide solution (2 mL) was added, and the mixture was stirred for 15 minutes. A 10% aqueous phosphoric acid solution was added to the reaction mixture, and the solvent was distilled off under reduced pressure. The obtained residue was separated into organic and aqueous layers by the addition of ethyl acetate and water, and the solvent in the organic layer was distilled off under reduced pressure to obtain the title compound (203 mg).

(Step 3) tert-Butyl 4-(hydroxymethyl)furan-2-carboxylate

To a solution of 5-(tert-butoxycarbonyl)furan-3-carboxylic acid (203 mg) obtained in the preceding step 2 in THF (5 mL), a borane-dimethyl sulfide complex (300 µL) was added, and the mixture was stirred overnight at room temperature. Water and a saturated aqueous sodium bicarbonate were added to the reaction mixture, followed by extraction with ethyl acetate. The organic layer was washed with water and saturated saline and dried over sodium sulfate, and the solvent was distilled off under reduced pressure. The obtained residue was purified by column chromatography (hexane:ethyl acetate) to obtain the title compound (75.1 mg).

(Step 4) tert-Butyl 4-formylfuran-2-carboxylate

To a solution of tert-butyl 4-(hydroxymethyl)furan-2-carboxylate (75.1 mg) obtained in the preceding step 3 in chloroform (4 mL), manganese dioxide (200 mg) was added, and the mixture was stirred at 75° C. for 2 hours. The reaction mixture was filtered, and the solvent in the filtrate was distilled off under reduced pressure to obtain the title compound (74 mg).

(Step 5) tert-Butyl 4-(((5-(tert-butyl)-4-chloro-2-hydroxyphenyl)amino)methyl)furan-2-carboxylate To a solution of tert-butyl 4-formylfuran-2-carboxylate (74 mg) and 2-amino-4-(tert-butyl)-5-chlorophenol (80 mg) in methanol (3 mL), acetic acid (20 µL) and sodium cyanoborohydride (60 mg) were added, and the mixture was stirred at room temperature for 80 minutes. An aqueous sodium bicarbonate solution was added to the reaction mixture, followed by extraction with ethyl acetate. The organic layer was washed with saturated saline, and dried over sodium sulfate, then the solvent was distilled off under reduced pressure, and the obtained residue was purified by column chromatography (hexane:ethyl acetate) to obtain the title compound (40.6 mg).

(Step 6) tert-Butyl 3-(4-(((5-(tert-butyl)-4-chloro-2-hydroxyphenyl)amino)methyl)furan-2-carboxamido)azetidine-1-carboxylate To tert-butyl 4-(((5-(tert-butyl)-4-chloro-2-hydroxyphenyl)amino)methyl)furan-2-carboxylate (40.6 mg) obtained in the preceding step 5, trifluoroacetic acid (1 mL) was added, and the mixture was stirred at room temperature for 15 minutes. The reaction mixture was concentrated, then THF (4 mL), tert-butyl 3-(methylamino)azetidine-1-carboxylate (50 mg), HoBt hydrate (20 mg), triethylamine (100 µL), and WSC hydrochloride (50 mg) were added to the obtained residue, and the mixture was stirred overnight. An aqueous sodium bicarbonate solution and ethyl acetate were added to the reaction mixture, and the organic layer was washed with saturated saline and dried over sodium sulfate. The solvent was distilled off under reduced pressure, and the obtained residue was purified by column chromatography (hexane:ethyl acetate) to obtain the title compound (19.2 mg).

(Step 7) N-(1-Acryloylazetidin-3-yl)-4-(((5-(tert-butyl)-4-chloro-2-hydroxyphenyl)amino)methyl)-N-methylfuran-2-carboxamide To tert-butyl 3-(4-(((5-(tert-butyl)-4-chloro-2-hydroxyphenyl)amino)methyl)furan-2-carboxamido)azetidine-1-carboxylate (19.2 mg) obtained in the preceding step 6, trifluoroacetic acid (1 mL) was added, and the reaction mixture was stirred for 5 minutes and then concentrated.

THF (5 mL), N,N-diisopropylethylamine (0.5 mL), and a 1 M solution of acryloyl chloride in acetonitrile (35 µL) were added to the obtained residue. An aqueous sodium bicarbonate solution was added to the reaction mixture, followed by extraction with ethyl acetate. The organic layer was washed with saturated saline and dried over sodium sulfate, then the solvent was distilled off under reduced pressure, and the obtained residue was purified by column chromatography (chloroform:ethanol) to obtain the title compound (9.35 mg).

Example 35 N-(1-Acryloylazetidin-3-yl)-2-(((5-(tert-butyl)-4-chloro-2-hydroxyphenyl)amino)methyl)-N,4-dimethylthiazole-5-carboxamide The title compound (16.23 mg) was obtained in the same way as in Example 20 (Steps 1 to 4) except that tert-butyl 3-(methylamino)azetidine-1-carboxylate (200 mg) was used instead of 1-Boc-3-aminoazetidine.

Example 36 N-(1-Acryloylazetidin-3-yl)-2-(((5-(tert-butyl)-4-chloro-2-hydroxyphenyl)amino)methyl)-1-ethyl-1H-imidazole-5-carboxamide (Step 1) Methyl 1-ethyl-1H-imidazole-5-carboxylate To a solution of methyl 4-imidazolecarboxylate (502 mg) in THF (10 mL), ethanol (230 mg), triphenylphosphine (1.25 g), and DIAD (937 µL) were added, and the mixture was stirred at room temperature for 80 minutes. The solvent was distilled off under reduced pressure, and the obtained residue was purified by column chromatography (hexane:ethyl acetate) to obtain the title compound (447 mg).

(Step 2) Methyl 2-bromo-1-ethyl-1H-imidazole-5-carboxylate

To a solution of methyl 1-ethyl-1H-imidazole-5-carboxylate (447 mg) obtained in the preceding step 1 in carbon tetrachloride (7 mL), NBS (619 mg) and 2,2'-azobis(2-methylpropionitrile) (43.4 mg) were added, and the mixture was stirred at 90° C. for 4 hours. The reaction mixture was concentrated under reduced pressure, and the obtained residue was purified by column chromatography (hexane:ethyl acetate) to obtain the title compound (423 mg).

(Step 3) Methyl 1-ethyl-2-vinyl-1H-imidazole-5-carboxylate

To a solution of methyl 2-bromo-1-ethyl-1H-imidazole-5-carboxylate (204 mg) obtained in the preceding step 2 and 2,6-di-tert-butyl-4-methylphenol (12 mg) in 1,4-dioxane (3 mL), tributyl(vinyl)tin (280 µL) and tetrakis(triphenylphosphine)palladium(0) (64.5 mg) were added, and the mixture was stirred at 100° C. for 10 hours in a microwave reaction apparatus. Tetrakis(triphenylphosphine)palladium(0) (53.0 mg) was further added thereto, and the mixture was further stirred at 100° C. for 5 hours in a microwave reaction apparatus. The reaction mixture was concentrated, and the obtained residue was purified by column chromatography (hexane:ethyl acetate) to obtain the title compound (69.4 mg).

(Step 4) Methyl 1-ethyl-2-formyl-1H-imidazole-5-carboxylate

To a solution of methyl 1-ethyl-2-vinyl-1H-imidazole-5-carboxylate (69.4 mg) obtained in the preceding step 3 in a mixed solvent of dioxane (3 mL) and water (0.6 mL), sodium periodate (331 mg), an aqueous osmium tetroxide solution (0.15 M, 0.13 mL), and 2,6-lutidine (50 µL) were added, and the mixture was stirred overnight. The reaction mixture was separated into organic and aqueous layers by the addition of ethyl acetate and water. The organic layer was dried over magnesium sulfate, and the solvent was distilled off under reduced pressure. The obtained residue was purified by column chromatography (hexane:ethyl acetate) to obtain the title compound (53.7 mg).

(Step 5) Methyl 2-(((5-(tert-butyl)-4-chloro-2-hydroxyphenyl)amino)methyl)-1-ethyl-1H-imidazole-5-carboxylate To a solution of methyl 1-ethyl-2-formyl-1H-imidazole-5-carboxylate (53.7 mg) obtained in the preceding step 4 and 2-amino-4-(tert-butyl)-5-chlorophenol (60.4 mg) in methanol (2 mL), acetic acid (10 µL) and sodium cyanoborohydride (49.3 mg) were added, and the mixture was stirred for 20 minutes. A 10% aqueous phosphoric acid solution was added to the reaction mixture, and methanol was distilled off under reduced pressure. The obtained residue was separated into organic and aqueous layers by the addition of ethyl acetate and water. The solvent in the organic layer was distilled off under reduced pressure. the obtained residue was purified by column chromatography (hexane:ethyl acetate) to obtain the title compound (98.7 mg).

(Step 6) N-(1-Acryloylazetidin-3-yl)-2-(((5-(tert-butyl)-4-chloro-2-hydroxyphenyl)amino)methyl)-1-ethyl-1H-imidazole-5-carboxamide To methyl 2-(((5-(tert-butyl)-4-chloro-2-hydroxyphenyl)amino)methyl)-1-ethyl-1H-imidazole-5-carboxylate (26.8 mg) obtained in the preceding step 5 in methanol (2 mL), a 4 M aqueous sodium hydroxide solution (366 µL) was added, and the mixture was stirred for 20 minutes. A 4 M aqueous sodium hydroxide solution (366 µL) was further added thereto, then the mixture was further stirred for 2 hours and 15 minutes, then 5 M hydrochloric acid (586 µL) was added to the reaction mixture, and the solvent was distilled off under reduced pressure. The obtained residue was separated into organic and aqueous layers by the addition of ethyl acetate and water, and the solvent in the organic layer was distilled off under reduced pressure. 1-(3-Aminoazetidin-1-yl)prop-2-en-1-one trifluoromethanesulfonate (24 mg), DMF (1 mL), N,N-diisopropylethylamine (62.3 µL), and HATU (32.5 mg) were added to the obtained residue, and the mixture was stirred for 30 minutes. Ethyl acetate was added to the reaction mixture, and the organic layer was washed with water. The solvent was distilled off under reduced pressure. The obtained residue was purified by column chromatography (ethyl acetate:methanol) to obtain the title compound (27.2 mg).

Example 37 N-(1-Acryloylazetidin-3-yl)-2-(((5-(tert-butyl)-4-chloro-2-hydroxyphenyl)amino)methyl)-1-(2-methoxyethyl)-1H-imidazole-5-carboxamide (Step 1) Methyl 1-(2-methoxyethyl)-1H-imidazole-5-carboxylate To a solution of methyl 4-imidazolecarboxylate (302 mg) in THF (10 mL), 2-methoxyethanol (227 mg), triphenylphosphine (752 mg), and DIAD (592 mg) were added, and the mixture was stirred overnight at room temperature. The solvent was distilled off under reduced pressure, and the obtained residue was purified by column chromatography (hexane:ethyl acetate) to obtain the title compound (349 mg).

(Step 2) Methyl 2-(hydroxymethyl)-1-(2-methoxyethyl)-1H-imidazole-5-carboxylate

To a solution of methyl 1-(2-methoxyethyl)-1H-imidazole-5-carboxylate (79.6 mg) obtained in the preceding step 1 in methanol (2 mL), paraformaldehyde (41.3 mg) was added, and the mixture was reacted at 140° C. for 2 hours in a microwave reaction apparatus. Paraformaldehyde (48.2 mg) was further added thereto, and the mixture was further reacted at 140° C. for 2 hours. Water (0.5 mL) was added thereto, and the mixture was reacted at 140° C. for 2 hours and at 150° C. for 2 hours. Paraformaldehyde (41.3 mg) was further added thereto, and the mixture was reacted at 160° C. for 30 hours. The reaction mixture was concentrated under reduced pressure, and the obtained residue was purified by column chromatography (ethyl acetate:methanol) to obtain the title compound (10.8 mg).

(Step 3) Methyl 2-formyl-1-(2-methoxyethyl)-1H-imidazole-5-carboxylate

To a solution of methyl 2-(hydroxymethyl)-1-(2-methoxyethyl)-1H-imidazole-5-carboxylate (10.8 mg) obtained in the preceding step 2 in ethyl acetate (2 mL), manganese dioxide (40 mg) was added, and the mixture was stirred for 1 hour in an oil bath of 100° C. The reaction mixture was filtered, and the filtrate was concentrated under reduced pressure to obtain the title compound (7.3 mg).

(Step 4) N-(1-Acryloylazetidin-3-yl)-2-(((5-(tert-butyl)-4-chloro-2-hydroxyphenyl)amino)methyl)-1-(2-methoxyethyl)-1H-imidazole-5-carboxamide The title compound (7.2 mg) was obtained in the same way as in Example 36 (Steps 5 and 6) except that methyl 2-formyl-1-(2-methoxyethyl)-1H-imidazole-5-carboxylate (7.3 mg) obtained in the preceding step 3 was used instead of methyl 1-ethyl-2-formyl-1H-imidazole-5-carboxylate.

Example 38 N-(1-Acryloylazetidin-3-yl)-2-(((5-(tert-butyl)-4-chloro-2-hydroxyphenyl)amino)methyl)-1-(2-(dimethylamino)ethyl)-1H-imidazole-5-carboxamide The title compound (0.3 mg) was obtained in the same way as in Example 36 (Steps 1 to 6) except that N,N-dimethylethanolamine (172 mg) was used instead of 2-methoxyethanol.

Example 39 N-(1-Acryloylazetidin-3-yl)-2-(((5-(tert-butyl)-4-chloro-2-hydroxyphenyl)amino)methyl)-1,4-dimethyl-1H-imidazole-5-carboxamide (Step 1) Ethyl 1,4-dimethyl-1H-imidazole-5-carboxylate To a solution of ethyl 4-methyl-1H-imidazole-5-carboxylate (503 mg) in THF (10 mL), methanol (170 mg), triphenylphosphine (1.02 g), and DIAD (750 µL) were added, and the mixture was stirred overnight at room temperature. The solvent was distilled off under reduced pressure, and the obtained residue was purified by column chromatography (hexane:ethyl acetate) to obtain the title compound (468 mg).

(Step 2) Ethyl 2-(hydroxymethyl)-1,4-dimethyl-1H-imidazole-5-carboxylate

To a solution of ethyl 1,4-dimethyl-1H-imidazole-5-carboxylate (146 mg) obtained in the preceding step 1 in ethanol (2 mL), paraformaldehyde (292 mg) was added, and the mixture was reacted at 160° C. for 30 hours in a microwave reaction apparatus. The reaction mixture was concentrated under reduced pressure, and the obtained residue was purified by column chromatography (ethyl acetate:methanol) to obtain the title compound (140 mg).

(Step 3) Ethyl 1-formyl-1,4-dimethyl-1H-imidazole-5-carboxylate

To a solution of ethyl 2-(hydroxymethyl)-1,4-dimethyl-1H-imidazole-5-carboxylate (31.8 mg) obtained in the preceding step 2 in ethyl acetate (2 mL), manganese dioxide (65.5 mg) was added, and the mixture was stirred for 3 hours in an oil bath of 100° C. The reaction mixture was filtered, and the filtrate was concentrated under reduced pressure to obtain the title compound (23.8 mg).

(Step 4) Ethyl 2-(((5-(tert-butyl)-4-chloro-2-hydroxyphenyl)amino)methyl)-1,4-dimethyl-1H-imidazole-5-carboxylate To a solution of ethyl 1-formyl-1,4-dimethyl-1H-imidazole-5-carboxylate (23.8 mg) obtained in the preceding step 3 and 2-amino-4-(tert-butyl)-5-chlorophenol (34.6 mg) in methanol (1.5 mL), acetic acid (10 µL) and sodium cyanoborohydride (27 mg) were added, and the mixture was stirred for 15 minutes. A 10% aqueous phosphoric acid solution was added to the reaction mixture, and methanol was distilled off under reduced pressure. The obtained residue was separated into organic and aqueous layers by the addition of ethyl acetate and water. The solvent in the organic layer was distilled off under reduced pressure, and the obtained residue was purified by column chromatography (hexane:ethyl acetate) to obtain the title compound (33.6 mg).

(Step 5) N-(1-Acryloylazetidin-3-yl)-2-(((5-(tert-butyl)-4-chloro-2-hydroxyphenyl)amino)methyl)-1,4-dimethyl-1H-imidazole-5-carboxamide To ethyl 2-(((5-(tert-butyl)-4-chloro-2-hydroxyphenyl)amino)methyl)-1,4-dimethyl-1H-imidazole-5-carboxylate (33.6 mg) obtained in the preceding step 4 in methanol (3 mL), a 4 M aqueous sodium hydroxide solution (1.77 mL) was added, and the mixture was stirred for 2 hours. 6 M hydrochloric acid (1180 µL) was added to the reaction mixture, and the solvent was distilled off under reduced pressure. The obtained residue was separated into organic and aqueous layers by the addition of ethyl acetate and water, and the solvent in the organic layer was distilled off under reduced pressure. 1-(3-Aminoazetidin-1-yl)prop-2-en-1-one trifluoromethanesulfonate (24.4 mg), DMF (0.5 mL), N,N-diisopropylethylamine (45.1 µL), and HATU (42.8 mg) were added to the obtained residue, and the mixture was stirred for 30 minutes. Ethyl acetate was added to the reaction mixture, and the organic layer was washed with water. The solvent was distilled off under reduced pressure. The obtained residue was purified by column chromatography (ethyl acetate:methanol) to obtain the title compound (17.2 mg).

Example 40 N-(1-Acryloylazetidin-3-yl)-1-benzyl-2-(((5-(tert-butyl)-4-chloro-2-hydroxyphenyl)amino)methyl)-4-methyl-1H-imidazole-5-carboxamide (Step 1) Ethyl 2-bromo-4-methyl-1H-imidazole-5-carboxylate To a solution of ethyl 4-methyl-1H-imidazole-5-carboxylate (4.62 g) in a mixed solvent of acetonitrile (50 mL) and chloroform (50 mL), NBS (5.60 g) was added, and the mixture was stirred overnight at room temperature. The solvent in the reaction mixture was distilled off under reduced pressure, and an aqueous sodium bicarbonate solution and ethyl acetate were added to the obtained residue. The organic layer was washed with saturated saline and dried over sodium sulfate. The solvent was distilled off under reduced pressure, and the obtained residue was purified by column chromatography (hexane:ethyl acetate) to obtain the title compound (4.33 g)

(Step 2) Ethyl 1-benzyl-2-bromo-4-methyl-1H-imidazole-5-carboxylate

To a solution of ethyl 2-bromo-4-methyl-1H-imidazole-5-carboxylate (200 mg) obtained in the preceding step 1 in THF (3 mL), benzyl alcohol (103 mg), triphenylphosphine (254 mg), and DIAD (203 μL) were added, and the mixture was stirred overnight at room temperature. The solvent was distilled off under reduced pressure, and the obtained residue was purified by column chromatography (hexane:ethyl acetate) to obtain the title compound (232 mg).

(Step 3) N-(1-Acryloylazetidin-3-yl)-1-benzyl-2-(((5-(tert-butyl)-4-chloro-2-hydroxyphenyl)amino)methyl)-4-methyl-1H-imidazole-5-carboxamide The title compound (7.0 mg) was obtained in the same way as in Example 36 (Steps 5 and 6) except that ethyl 1-benzyl-2-bromo-4-methyl-1H-imidazole-5-carboxylate (232 mg) obtained in the preceding step 2 was used instead of methyl 2-bromo-1-ethyl-1H-imidazole-5-carboxylate.

Example 41 N-(1-Acryloylazetidin-3-yl)-2-(((5-(tert-butyl)-4-chloro-2-hydroxyphenyl)amino)methyl)-1-ethyl-4-methyl-1H-imidazole-5-carboxamide (Step 1) Ethyl 1-ethyl-4-methyl-1H-imidazole-5-carboxylate To a solution of ethyl 4-methyl-1H-imidazole-5-carboxylate (502 mg) in THF (10 mL), ethanol (380 μL), triphenylphosphine (1.11 g), and DIAD (898 μL) were added, and the mixture was stirred at room temperature for 1 hour. The solvent was distilled off under reduced pressure, and the obtained residue was purified by column chromatography (hexane:ethyl acetate) to obtain a mixture of the title compound and triphenylphosphine.

(Step 2) 1-Ethyl-4-methyl-1H-imidazole-5-carboxylic acid

To a solution of the mixture of ethyl 1-ethyl-4-methyl-1H-imidazole-5-carboxylate and triphenylphosphine obtained in the preceding step 1 in ethanol (2 mL), a 4 M aqueous sodium hydroxide solution (1.22 mL) was added, and the mixture was stirred for 1 hour and 40 minutes in an oil bath of 80° C. The reaction mixture was cooled in ice, then 6 M hydrochloric acid (820 μL) was added thereto, and ethanol was distilled off under reduced pressure. Ethyl acetate was added to the obtained residue, and insoluble matter was collected by filtration and washed with methanol. The washes were concentrated, then ethyl acetate was added to the residue, and the obtained solids were collected to obtain the title compound (501 mg).

(Step 3) tert-Butyl 3-(1-ethyl-4-methyl-1H-imidazole-5-carboxamido)azetidine-1-carboxylate To a solution of 1-ethyl-4-methyl-1H-imidazole-5-carboxylic acid (501 mg) obtained in the preceding step 2 and 1-Boc-3-aminoazetidine (618 mg) in DMF (4 mL), N,N-diisopropylethylamine (1.66 mL) and HATU (1.25 g) were added, and the mixture was stirred at room temperature for 30 minutes. An organic layer was separated by the addition of water and ethyl acetate to the reaction mixture, and washed with water. The solvent was distilled off under reduced pressure. The obtained residue was purified by column chromatography (hexane:ethyl acetate:methanol) to obtain the title compound (568 mg).

(Step 4) tert-Butyl 3-(1-ethyl-2-formyl-4-methyl-1H-imidazole-5-carboxamido)azetidine-1-carboxylate A solution of tert-butyl 3-(1-ethyl-4-methyl-1H-imidazole-5-carboxamido)azetidine-1-carboxylate (539 mg) obtained in the preceding step 3 in THF (15 mL) was cooled in a dry ice-acetone bath, and butyllithium (2.6 M solution in hexane, 2.0 mL) was added dropwise thereto. The reaction mixture was stirred for 3 hours under cooling in a dry ice-acetone bath, then DMF (0.4 mL) was added thereto, and the mixture was stirred for 50 minutes. A saturated aqueous ammonium chloride was added thereto, and after removal of the cooling bath, the mixture was warmed. After extraction from the reaction mixture with ethyl acetate, the solvent was distilled off under reduced pressure, and the obtained residue was purified by column chromatography (hexane:ethyl acetate) to obtain the title compound (428 mg).

(Step 5) tert-Butyl 3-(2-(((5-(tert-butyl)-4-chloro-2-hydroxyphenyl)amino)methyl)-1-ethyl-4-methyl-1H-imidazole-5-carboxamido)azetidine-1-carboxylate To a solution of tert-butyl 3-(1-ethyl-2-formyl-4-methyl-1H-imidazole-5-carboxamido)azetidine-1-carboxylate (37.6 mg) obtained in the preceding step 4 and 2-amino-4-(tert-butyl)-5-chlorophenol (21.8 mg) in dichloromethane (1.5 mL), trifluoroacetic acid (17.1 μL) and sodium triacetoxyborohydride (49.1 mg) were added, and the mixture was stirred for 9 hours. Water was added to the reaction mixture, followed by extraction with ethyl acetate. The solvent was distilled off under reduced pressure, and the obtained residue was purified by column chromatography (hexane:ethyl acetate:methanol) to obtain the title compound (7.9 mg).

(Step 6) N-(1-Acryloylazetidin-3-yl)-2-(((5-(tert-butyl)-4-chloro-2-hydroxyphenyl)amino)methyl)-1-ethyl-4-methyl-1H-imidazole-5-carboxamide To tert-butyl 3-(2-(((5-(tert-butyl)-4-chloro-2-hydroxyphenyl)amino)methyl)-1-ethyl-4-methyl-1H-imidazole-5- carboxamido)azetidine-1-carboxylate (7.9 mg) obtained in the preceding step 5, trifluoroacetic acid (1 mL) was added, and the reaction mixture was stirred for 20 minutes and then concentrated. The obtained residue was dissolved in THF (2 mL), and N,N-diisopropylethylamine (100 µL) and a solution of acryloyl chloride (1.4 µL) in acetonitrile (150 µL) were added to the solution. Methanol was added to the reaction mixture, and the solvent was distilled off under reduced pressure. The obtained residue was purified by column chromatography (ethyl acetate:methanol) to obtain the title compound (5.9 mg).

Example 42 N-(1-Acryloylazetidin-3-yl)-2-(((5-(tert-butyl)-4-chloro-2-hydroxyphenyl)amino)methyl)-1-isopropyl-4-methyl-1H-imidazole-5-carboxamide The title compound (17.0 mg) was obtained in the same way as in Example 41 (Steps 5 and 6) except that tert-butyl 3-(2-formyl-1-isopropyl-4-methyl-1H-imidazole-5-carboxamido)azetidine-1-carboxylate (24.8 mg) was used instead of tert-butyl 3-(1-ethyl-2-formyl-4-methyl-1H-imidazole-5-carboxamido)azetidine-1-carboxylate.

Example 43 N-(1-Acryloylazetidin-3-yl)-1-butyl-2-(((5-(tert-butyl)-4-chloro-2-hydroxyphenyl)amino)methyl)-4-methyl-1H-imidazole-5-carboxamide The title compound (23.2 mg) was obtained in the same way as in Example 41 (Steps 1 to 6) except that 1-butanol (295 mg) was used instead of ethanol of step 1.

Example 44 N-(1-Acryloylazetidin-3-yl)-2-(((5-(tert-butyl)-4-chloro-2-hydroxyphenyl)amino)methyl)-4-methyl-1-propyl-1H-imidazole-5-carboxamide The title compound (37.6 mg) was obtained in the same way as in Example 41 (Steps 1 to 6) except that 1-propanol (237 mg) was used instead of ethanol of step 1.

Example 45 N-(1-Acryloylazetidin-3-yl)-2-(((5-(tert-butyl)-4-chloro-2-hydroxyphenyl)amino)methyl)-1-cyclopentyl-4-methyl-1H-imidazole-5-carboxamide The title compound (17.8 mg) was obtained in the same way as in Example 41 (Steps 1 to 6) except that 1-cyclopentanol (336 mg) was used instead of ethanol of step 1.

Example 46 N-(1-Acryloylazetidin-3-yl)-2-(((5-(tert-butyl)-4-chloro-2-hydroxyphenyl)amino)methyl)-4-methyl-1-(pyridin-3-ylmethyl)-1H-imidazole-5-carboxamide The title compound (2.5 mg) was obtained in the same way as in Example 37 (Steps 1 to 4) except that 3-(hydroxymethyl)pyridine (45.4 mg) was used instead of 2-methoxyethanol.

Example 47 N-(1-Acryloylazetidin-3-yl)-5-(((4-chloro-2-hydroxy-5-(prop-1-en-2-yl)phenyl)amino)methyl)furan-2-carboxamide (Step 1) 5-Bromo-6-chlorobenzo[d]oxazol-2 (3H)-one To a solution of 5-bromo-4-chloro-2-hydroxybenzoic acid (5.02 g) in 1,4-dioxane (50 mL), triethylamine (5.80 mL) and DPPA (5.80 mL) were added, and the mixture was stirred at room temperature for 1 hour. The reaction mixture was stirred for 1 hour in an oil bath of 110° C. An organic layer was separated by the addition of an aqueous sodium bicarbonate solution and ethyl acetate to the reaction mixture. The organic layer was washed with saturated saline and dried over sodium sulfate, then the solvent was distilled off under reduced pressure, and the obtained residue was purified by column chromatography (hexane:ethyl acetate) to obtain the title compound (2.07 g)

(Step 2) 2-Amino-5-chloro-4-isopropenylphenol

To a solution of 5-bromo-6-chlorobenzo[d]oxazol-2(3H)-one (100 mg) obtained in the preceding step 1 in 1,4-dioxane (2 mL), 2-isopropenyl-4,4,5,5-tetramethyl-1,3,2-dioxaborolane (101 mg), Pd(PPh$_3$)$_4$ (70 mg), and a 2 M aqueous sodium carbonate solution (402 µL) were added, and the mixture was stirred overnight at 100° C. Water and ethyl acetate were added to the reaction mixture, and the organic layer was washed with saturated saline. The resultant product was dried over sodium sulfate, and the solvent was distilled off under reduced pressure. The obtained residue was purified by column chromatography (hexane:ethyl acetate) to obtain 6-chloro-5-isopropenyl-3H-1,3-benzoxazol-2-one (41.1 mg) and the title compound (11.7 mg).

(Step 3) N-(1-Acryloylazetidin-3-yl)-5-(((4-chloro-2-hydroxy-5-(prop-1-en-2-yl)phenyl)amino)methyl)furan-2-carboxamide The title compound (3.04 mg) was obtained in the same way as in Example 1 (Steps 2 and 3) except that 2-amino-5-chloro-4-isopropenyl-phenol (11.7 mg) obtained in the preceding step 2 was used instead of 2-amino-4-(tert-butyl)-5-chlorophenol.

Example 48 N-(1-Acryloylazetidin-3-yl)-5-(((4-chloro-2-hydroxy-5-isopropylphenyl)amino)methyl)furan-2-carboxamide (Step 1) 2-Amino-5-chloro-4-isopropenylphenol To a solution of 6-chloro-5-isopropenyl-3H-1,3-benzoxazol-2-one (20 mg) obtained in Example 47 (Step 2) in ethanol (1 mL), a 5 M aqueous sodium hydroxide solution (0.5 mL) was added, and the mixture was stirred at 100° C. for 6 hours. An organic layer was separated by the addition of 5 M hydrochloric acid (0.5 mL), water, and ethyl acetate to the reaction mixture, washed with saturated saline, and dried over sodium sulfate. The solvent was distilled off under reduced pressure to obtain the title compound (17.2 mg).

(Step 2) 2-Amino-5-chloro-4-isopropylphenol

To 2-amino-5-chloro-4-isopropenylphenol (17.2 mg) obtained in the preceding step 1 in ethanol (1 mL), 5 wt % platinum-active carbon (12 mg) was added under nitrogen stream. The reaction system was purged with hydrogen and stirred at room temperature for 2.5 hours. The reaction mixture was filtered through celite and washed with a chloroform-methanol mixed solvent. The solvent was distilled off under reduced pressure to obtain the title compound (17.7 mg).

(Step 3) N-(1-Acryloylazetidin-3-yl)-5-(((4-chloro-2-hydroxy-5-isopropylphenyl)amino)methyl)furan-2-carboxamide The title compound (5.56 mg) was obtained in the same way as in Example 1 (Steps 2 and 3) except that 2-amino-5-chloro-4-isopropyl-phenol (17.7 mg) obtained in the preceding step 2 was used instead of 2-amino-4-(tert-butyl)-5-chlorophenol.

Example 49 N-(1-Acryloylazetidin-3-yl)-5-(((4-chloro-2-hydroxy-5-(trifluoromethoxy)phenyl)amino)methyl)-N-methylfuran-2-carboxamide (Step 1)
2-Amino-5-chloro-4-(trifluoromethoxy)phenol To a solution of 2-amino-4-(trifluoromethoxy)phenol (50 mg) in THF (1 mL), NCS (38 mg) was added, and the mixture was stirred at room temperature for 2 hours. The reaction mixture was heated to 60° C. and stirred for 1 hour. The reaction mixture was allowed to cool, and then, an organic layer was separated by the addition of water, an aqueous sodium thiosulfate solution, and ethyl acetate. The organic layer was washed with a saturated aqueous sodium bicarbonate and saturated saline and dried over sodium sulfate, and then, the solvent was distilled off under reduced pressure. The obtained residue was purified by column chromatography (hexane:ethyl acetate) to obtain the title compound (10.4 mg).

(Step 2) N-(1-Acryloylazetidin-3-yl)-5-(((4-chloro-2-hydroxy-5-(trifluoromethoxy)phenyl)amino)methyl)-N-methylfuran-2-carboxamide The title compound (0.60 mg) was obtained in the same way as in Example 1 (Steps 2 and 3) except that tert-butyl 3-((5-formylfuran-2-carbonyl)-methylamino)azetidine-1-carboxylate (13.6 mg) obtained in Production Example 6 was used instead of tert-butyl 3-(5-formylfuran-2-carboxamido)azetidine-1-carboxylate and 2-amino-5-chloro-4-(trifluoromethoxy)phenol (10.4 mg) obtained in the preceding step 2 was used instead of 2-amino-4-(tert-butyl)-5-chlorophenol.

Example 50 N-(1-Acryloylazetidin-3-yl)-5-(((4-chloro-2-hydroxy-5-(trifluoromethyl)phenyl)amino)methyl)furan-2-carboxamide (Step 1) 5-Chloro-2-nitro-4-(trifluoromethyl)phenol To a solution of 1,5-dichloro-2-nitro-4-(trifluoromethyl)benzene (400 mg) in DMF (4 mL), potassium acetate (302 mg) was added, and the mixture was stirred at 80° C. for 8 hours. An organic layer was separated by the addition of water and ethyl acetate to the reaction mixture, and washed with saturated saline. The resultant product was dried over sodium sulfate, then the solvent was distilled off under reduced pressure, and the obtained residue was purified by column chromatography (hexane:ethyl acetate) to obtain the title compound (241 mg).

(Step 2)
2-Amino-5-chloro-4-(trifluoromethyl)phenol

To a solution of 5-chloro-2-nitro-4-(trifluoromethyl)phenol (130 mg) obtained in the preceding step 1 in ethyl acetate (1 mL), an iron powder (150 mg), acetic acid (3 mL), and water (5 mL) were added, and the mixture was stirred at 80° C. for 25 minutes. An organic layer was separated by the addition of water and ethyl acetate, and washed with a saturated aqueous sodium bicarbonate and saturated saline. The resultant product was dried over sodium sulfate, and the solvent was distilled off under reduced pressure to obtain the title compound (119 mg).

(Step 3) N-(1-Acryloylazetidin-3-yl)-5-(((4-chloro-2-hydroxy-5-(trifluoromethyl)phenyl)amino)methyl) furan-2-carboxamide The title compound (16.0 mg) was obtained in the same way as in Example 1 (Steps 2 and 3) except that 2-amino-5-chloro-4-(trifluoromethyl)phenol (10 mg) obtained in the preceding step 2 was used instead of 2-amino-4-(tert-butyl)-5-chlorophenol.

Example 51 N-(1-Acryloylazetidin-3-yl)-5-(((4-chloro-5-(2,2-difluorocyclopropyl)-2-hydroxyphenyl)amino)methyl)furan-2-carboxamide (Step 1) 2-Chloro-4-methoxy-1-vinylbenzene To a solution of 1-bromo-2-chloro-4-methoxybenzene (600 mg) in 1,4-dioxane (6 mL), 4,4,5,5-tetramethyl-2-vinyl-1,3,2-dioxaborolane (930 µL), Pd(PPh$_3$)$_4$ (470 mg), and a 2 M aqueous sodium carbonate solution (2.7 mL) were added, and the mixture was stirred overnight at 100° C. Water and ethyl acetate were added to the reaction mixture, and the organic layer was washed with saturated saline. The resultant product was dried over sodium sulfate, and the solvent was distilled off under reduced pressure. The obtained residue was purified by column chromatography (hexane:ethyl acetate) to obtain the title compound (353 mg).

(Step 2) 2-Chloro-1-(2,2-difluorocyclopropyl)-4-methoxybenzene

To a solution of 2-chloro-4-methoxy-1-vinylbenzene (188 mg) obtained in the preceding step 1 in acetonitrile (2 mL), sodium iodide (33.4 mg) and trimethyl(trifluoromethyl)silane (0.41 mL) were added, and the mixture was stirred at 110° C. for 4 hours. Sodium iodide (33.4 mg) and trimethyl(trifluoromethyl)silane (0.41 mL) were further added thereto, and the mixture was stirred at 110° C. for 45 minutes. The reaction mixture was filtered through celite and washed with ethyl acetate. The filtrate was distilled off under reduced pressure, and the obtained residue was purified by column chromatography (hexane) to obtain the title compound (215 mg).

(Step 3) 1-Chloro-2-(2,2-difluorocyclopropyl)-5-methoxy-4-nitrobenzene

To 2-chloro-1-(2,2-difluorocyclopropyl)-4-methoxybenzene (100 mg) obtained in the preceding step 2, acetic anhydride (1 mL) was added, and nitric acid (1.40) (35 µL) was added under ice cooling. The mixture was stirred for 1 hour under ice cooling, and water and chloroform were added to the reaction mixture. The organic layer was washed with water and saturated saline and dried over sodium sulfate, and then, the solvent was distilled off under reduced pressure. The obtained residue was purified by column chromatography (hexane:ethyl acetate) to obtain the title compound (65.2 mg).

(Step 4) 4-Chloro-5-(2,2-difluorocyclopropyl)-2-methoxyaniline

To a solution of 1-chloro-2-(2,2-difluorocyclopropyl)-5-methoxy-4-nitrobenzene (65 mg) obtained in the preceding step 3 in ethyl acetate (0.5 mL), an iron powder (68.8 mg), acetic acid (0.3 mL), and water (0.5 mL) were added, and the mixture was stirred at 80° C. for 15 minutes. An organic layer was separated by the addition of water and ethyl acetate, and washed with a saturated aqueous sodium bicarbonate and saturated saline. The resultant product was dried over sodium sulfate, and the solvent was distilled off under reduced pressure to obtain the title compound (61 mg).

(Step 5) 2-Amino-5-chloro-4-(2,2-difluorocyclopropyl)phenol

A solution of 4-chloro-5-(2,2-difluorocyclopropyl)-2-methoxyaniline (57 mg) obtained in the preceding step 4 in dichloromethane (1.5 mL) was cooled in a dry ice-acetone bath, and boron tribromide (1 M solution in dichloromethane, 490 µL) was added thereto. After removal of the dry ice-acetone bath, the mixture was warmed to room temperature and stirred for 1 hour. To the reaction mixture, water and chloroform were added, and then, concentrated ammonia water (1 mL) was added. The organic layer was washed with water and saturated saline and dried over sodium sulfate, and then, the solvent was distilled off under reduced pressure. The obtained residue was purified by column chromatography (hexane:ethyl acetate) to obtain the title compound (38.1 mg).

(Step 6) N-(1-Acryloylazetidin-3-yl)-5-(((4-chloro-5-(2,2-difluorocyclopropyl)-2-hydroxyphenyl)amino)methyl)furan-2-carboxamide The title compound (14.63 mg) was obtained in the same way as in Example 1 (Steps 2 and 3) except that 2-amino-5-chloro-4-(2,2-difluorocyclopropyl)phenol (10 mg) obtained in the preceding step 5 was used instead of 2-amino-4-(tert-butyl)-5-chlorophenol.

Example 52 N-(1-Acryloylazetidin-3-yl)-5-(((4-chloro-5-cyclopropyl-2-hydroxyphenyl)amino)methyl)furan-2-carboxamide

(Step 1) 4-Chloro-5-cyclopropyl-2-methoxyaniline

To 4-chloro-5-iodo-2-methoxyaniline (79 mg) obtained in Production Example 2 (Step 2), cyclopropylboric acid (40.7 mg), dichlorobis(tricyclohexylphosphine)palladium(II) (30.9 mg), tripotassium phosphate (177 mg), 1,4-dioxane (1 mL), and water (0.1 mL) were added, and the mixture was stirred overnight at 100° C. Cyclopropylboric acid (40.7 mg) and dichlorobis(tricyclohexylphosphine)palladium(II) (30.9 mg) were further added thereto, and the mixture was stirred overnight at 100° C. Water and ethyl acetate were added to the reaction mixture, and the organic layer was washed with saturated saline. The resultant product was dried over sodium sulfate, and the solvent was distilled off under reduced pressure. The obtained residue was purified by column chromatography (hexane:ethyl acetate) to obtain the title compound (31.6 mg).

(Step 2) 2-Amino-5-chloro-4-cyclopropylphenol

A solution of 4-chloro-5-cyclopropyl-2-methoxyaniline (31.6 mg) obtained in the preceding step 1 in dichloromethane (2 mL) was cooled in a dry ice-acetone bath, and boron tribromide (1 M solution in dichloromethane, 320 µL) was added thereto. After removal of the dry ice-acetone bath, the mixture was warmed to room temperature and stirred for 2.5 hours. To the reaction mixture, water and chloroform were added, and then, concentrated ammonia water (0.32 mL) was added. The organic layer was washed with water and saturated saline and dried over sodium sulfate, and then, the solvent was distilled off under reduced pressure. The obtained residue was purified by column chromatography (hexane:ethyl acetate) to obtain the title compound (7.9 mg).

(Step 3) N-(1-Acryloylazetidin-3-yl)-5-(((4-chloro-5-cyclopropyl-2-hydroxyphenyl)amino)methyl)furan-2-carboxamide To a solution of 2-amino-5-chloro-4-cyclopropylphenol (7.9 mg) obtained in the preceding step 2 and 5-formyl-N-(1-prop-2-enoylazetidin-3-yl)furan-2-carboxamide (11 mg) obtained in Production Example 7 in methanol (1 mL), acetic acid (2 µL) and sodium cyanoborohydride (10 mg) were added, and the mixture was stirred at 50° C. for 5 minutes. Water was added to the reaction mixture, followed by extraction with ethyl acetate. The organic layer was washed with saturated saline and dried over sodium sulfate, then the solvent was distilled off under reduced pressure, and the obtained residue was purified by reverse-phase preparative HPLC (water:acetonitrile (0.1% formic acid)) to obtain the title compound (2.71 mg).

Example 53 N-(1-Acryloylazetidin-3-yl)-5-(((4-chloro-5-cyclobutyl-2-hydroxyphenyl)amino)methyl)furan-2-carboxamide

(Step 1) 4-Chloro-5-cyclobutyl-2-methoxyaniline

To a solution of 4-chloro-5-iodo-2-methoxyaniline (79 mg) obtained in Production Example 2 (Step 2) in THF (2 mL), palladium acetate (12.5 mg), SPhos (22.9 mg), and cyclobutyl zinc bromide (0.5 M solution in THF, 1 mL) were added, and the mixture was stirred overnight at 65° C. A saturated aqueous ammonium chloride and ethyl acetate were added to the reaction mixture, and the organic layer was washed with saturated saline. The resultant product was dried over sodium sulfate, and the solvent was distilled off under reduced pressure. The obtained residue was purified by column chromatography (hexane:ethyl acetate) to obtain the title compound (51.2 mg).

(Step 2) 2-Amino-5-chloro-4-cyclobutylphenol

A solution of 4-chloro-5-cyclobutyl-2-methoxyaniline (51.2 mg) obtained in the preceding step 1 in dichloromethane (2 mL) was cooled in a dry ice-acetone bath, and boron tribromide (1 M solution in dichloromethane, 480 µL) was added thereto. After removal of the dry ice-acetone bath, the mixture was warmed to room temperature and stirred for 3 hours and 20 minutes. To the reaction mixture, water and chloroform were added, and then, concentrated ammonia water (0.48 mL) was added. The organic layer was washed with water and saturated saline and dried over sodium sulfate, and then, the solvent was distilled off under reduced pressure. The obtained residue was purified by column chromatography (hexane:ethyl acetate) to obtain the title compound (40.2 mg).

(Step 3) N-(1-Acryloylazetidin-3-yl)-5-(((4-chloro-5-cyclobutyl-2-hydroxyphenyl)amino)methyl)furan-2-carboxamide To a solution of 2-amino-5-chloro-4-cyclobutylphenol (10 mg) obtained in the preceding step 2 and 5-formyl-N-(1-prop-2-enoylazetidin-3-yl)furan-2-carboxamide (12.6 mg) obtained in Production Example 7 in methanol (1 mL), acetic acid (2 μL) and sodium cyanoborohydride (10 mg) were added, and the mixture was stirred at 50° C. for 5 minutes. Water was added to the reaction mixture, followed by extraction with ethyl acetate. The organic layer was washed with saturated saline and dried over sodium sulfate, then the solvent was distilled off under reduced pressure, and the obtained residue was purified by column chromatography (chloroform:methanol) to obtain the title compound (19.55 mg).

Example 54 N-(1-Acryloylazetidin-3-yl)-2-(((4-chloro-2-hydroxy-5-(trifluoromethyl)phenyl)amino)methyl)-1-methyl-1H-imidazole-5-carboxamide The title compound (30.26 mg) was obtained in the same way as in Example 53 (Step 3) except that 2-amino-5-chloro-4-(trifluoromethyl)phenol (25 mg) obtained in Example 50 (Step 2) was used instead of 2-amino-5-chloro-4-cyclobutylphenol and N-(1-acryloylazetidin-3-yl)-2-formyl-1-methyl-1H-imidazole-5-carboxamide (28 mg) obtained in Production Example 9 was used instead of 5-formyl-N-(1-prop-2-enoylazetidin-3-yl)furan-2-carboxamide.

Example 55 N-(1-Acryloylazetidin-3-yl)-2-(((4-chloro-5-(2,2-difluorocyclopropyl)-2-hydroxyphenyl)amino)methyl)-1-methyl-1H-imidazole-5-carboxamide The title compound (21.2 mg) was obtained in the same way as in Example 53 (Step 3) except that 2-amino-5-chloro-4-(2,2-difluorocyclopropyl)phenol (15 mg) obtained in Example 51 (Step 5) was used instead of 2-amino-5-chloro-4-cyclobutylphenol and N-(1-acryloylazetidin-3-yl)-2-formyl-1-methyl-1H-imidazole-5-carboxamide (22 mg) obtained in Production Example 9 was used instead of 5-formyl-N-(1-prop-2-enoylazetidin-3-yl)furan-2-carboxamide.

Example 56 N-(1-Acryloylazetidin-3-yl)-2-(((4-chloro-2-hydroxy-5-(2,2,2-trifluoroethyl)phenyl)amino)methyl)-1-methyl-1H-imidazole-5-carboxamide (Step 1)
1-Methoxy-2-nitro-4-(2,2,2-trifluoroethyl)benzene To a solution of 4-(bromomethyl)-1-methoxy-2-nitrobenzene (400 mg) and copper(I) iodide (80 mg) in NMP (5 mL), methyl 2,2-difluoro-2-(fluorosulfonyl)acetate (411 μL) was added, and the mixture was stirred overnight at 80° C. Water and ethyl acetate were added to the reaction mixture, and then, the organic layer was washed with water and saturated saline and dried over sodium sulfate. The solvent was distilled off under reduced pressure, and the obtained residue was purified by column chromatography (hexane:ethyl acetate) to obtain the title compound (242 mg).

(Step 2) 2-Methoxy-5-(2,2,2-trifluoroethyl)aniline

To a solution of 1-methoxy-2-nitro-4-(2,2,2-trifluoroethyl)benzene (130 mg) obtained in the preceding step 1 in ethyl acetate (2 mL), an iron powder (154 mg), acetic acid (0.6 mL), and water (1.0 mL) were added, and the mixture was stirred at 80° C. for 2.5 hours. An organic layer was separated by the addition of water and ethyl acetate, and washed with a saturated aqueous sodium bicarbonate and saturated saline. The resultant product was dried over sodium sulfate, and the solvent was distilled off under reduced pressure to obtain the title compound (108 mg).

(Step 3)
4-Chloro-2-methoxy-5-(2,2,2-trifluoroethyl)aniline

To a solution of 2-methoxy-5-(2,2,2-trifluoroethyl)aniline (60 mg) obtained in the preceding step 2 in THF (1 mL), NCS (43 mg) was added, and the mixture was stirred at 60° C. for 2 hours. The reaction mixture was allowed to cool, and then, an organic layer was separated by the addition of water, an aqueous sodium thiosulfate solution, and ethyl acetate. The organic layer was washed with a saturated aqueous sodium bicarbonate and saturated saline and dried over sodium sulfate, and then, the solvent was distilled off under reduced pressure. The obtained residue was purified by column chromatography (hexane:ethyl acetate) to obtain the title compound (41.4 mg).

(Step 4)
2-Amino-5-chloro-4-(2,2,2-trifluoroethyl)phenol

A solution of 4-chloro-2-methoxy-5-(2,2,2-trifluoroethyl)aniline (41 mg) obtained in the preceding step 3 in dichloromethane (2.0 mL) was cooled in a dry ice-acetone bath, and boron tribromide (1 M solution in dichloromethane, 340 μL) was added thereto. After removal of the dry ice-acetone bath, the mixture was warmed to room temperature and stirred for 3 hours. To the reaction mixture, water and chloroform were added, and then, concentrated ammonia water (0.34 mL) was added. The organic layer was washed with water and saturated saline and dried over sodium sulfate, and then, the solvent was distilled off under reduced pressure to obtain the title compound (35.2 mg).

(Step 5) N-(1-Acryloylazetidin-3-yl)-2-(((4-chloro-2-hydroxy-5-(2,2,2-trifluoroethyl)phenyl)amino)methyl)-1-methyl-1H-imidazole-5-carboxamide The title compound (25.7 mg) was obtained in the same way as in Example 53 (Step 3) except that 2-amino-5-chloro-4-(2,2,2-trifluoroethyl)phenol (15 mg) obtained in the preceding step 4 was used instead of 2-amino-5-chloro-4-cyclobutylphenol and N-(1-acryloylazetidin-3-yl)-2-formyl-1-methyl-1H-imidazole-5-carboxamide (21 mg) obtained in Production Example 9 was used instead of 5-formyl-N-(1-prop-2-enoylazetidin-3-yl)furan-2-carboxamide.

Example 57 N-(1-Acryloylazetidin-3-yl)-2-(((4-chloro-2-hydroxy-5-(3,3,3-trifluoroprop-1-en-2-yl)phenyl)amino)methyl)-1-methyl-1H-imidazole-5-carboxamide (Step 1) 2-Amino-5-chloro-4-(1-(trifluoromethyl)vinyl)phenol To a solution of 2-amino-5-chloro-4-iodophenol (50 mg) obtained in Production Example 2 in 1,4-dioxane (1 mL), 4,4,6-trimethyl-2-(1-(trifluoromethyl)vinyl)-1,3,2-dioxaborinane (91.5 mg), Pd(PPh$_3$)$_4$ (32 mg), and a 2 M aqueous sodium carbonate solution (186 µL) were added, and the mixture was stirred overnight at 100° C. Water and ethyl acetate were added to the reaction mixture, and the organic layer was washed with saturated saline. The resultant product was dried over sodium sulfate, and the solvent was distilled off under reduced pressure. The obtained residue was purified by column chromatography (hexane:ethyl acetate) to obtain the title compound (4.0 mg).

(Step 2) N-(1-Acryloylazetidin-3-yl)-2-(((4-chloro-2-hydroxy-5-(3,3,3-trifluoroprop-1-en-2-yl)phenyl)amino)methyl)-1-methyl-1H-imidazole-5-carboxamide The title compound (0.98 mg) was obtained in the same way as in Example 53 (Step 3) except that 2-amino-5-chloro-4-(1-(trifluoromethyl)vinyl)phenol (4.0 mg) obtained in the preceding step 1 was used instead of 2-amino-5-chloro-4-cyclobutylphenol and N-(1-acryloylazetidin-3-yl)-2-formyl-1-methyl-1H-imidazole-5-carboxamide (5.3 mg) obtained in Production Example 9 was used instead of 5-formyl-N-(1-prop-2-enoylazetidin-3-yl)furan-2-carboxamide.

Example 58 N-(1-Acryloylazetidin-3-yl)-2-(((4-chloro-2-hydroxy-5-(pentafluoro-λ6-sulfaneyl)phenyl)amino)methyl)-1-methyl-1H-imidazole-5-carboxamide (Step 1) 4-Chloro-2-fluoro-5-(pentafluoro-λ6-sulfaneyl)aniline To a solution of 2-fluoro-5-(pentafluoro-λ6-sulfaneyl)aniline (209 mg) in acetic acid (300 µL), NCS (124 mg) was added, and the mixture was stirred at 60° C. for 1 hour. Ethyl acetate (40 mL) was added to the reaction mixture, and the organic layer was washed with a saturated aqueous sodium bicarbonate. The organic layer was concentrated under reduced pressure, and the obtained residue was purified by column chromatography (hexane:ethyl acetate) to obtain the title compound (51.8 mg) and 2-chloro-6-fluoro-3-(pentafluoro-λ6-sulfaneyl)aniline (191 mg).

(Step 2) N-(4-chloro-2-fluoro-5-(pentafluoro-λ6-sulfaneyl)phenyl)acetamide

To 4-chloro-2-fluoro-5-(pentafluoro-λ6-sulfaneyl)aniline (51.8 mg) obtained in the preceding step 1, acetic anhydride (0.5 mL) and sodium acetate (36.3 mg) were added, and the mixture was stirred at 60° C. for 8 hours. Ethyl acetate (40 mL) and water (2 mL) were added to the reaction mixture, and the organic layer was washed with a saturated aqueous sodium bicarbonate. The organic layer was concentrated under reduced pressure, and the obtained residue was purified by column chromatography (hexane:ethyl acetate) to obtain the title compound (45.8 mg).

(Step 3) N-(4-Chloro-2-hydroxy-5-(pentafluoro-λ6-sulfaneyl)phenyl)acetamide

To N-(4-chloro-2-fluoro-5-(pentafluoro-λ6-sulfaneyl)phenyl)acetamide (44.8 mg) obtained in the preceding step 2, DMF (300 µL) and potassium acetate (29.4 mg) were added, and the mixture was reacted at 110° C. for 24 hours in a microwave reaction apparatus. Ethyl acetate (40 mL) and water (2 mL) were added to the reaction mixture, and the organic layer was washed with water. The organic layer was concentrated under reduced pressure, and the obtained residue was purified by column chromatography (hexane:ethyl acetate) to obtain the title compound (5.1 mg). Also, the starting material (20 mg) was recovered. The recovered starting material was subjected to this step again to obtain the title compound (4.4 mg).

(Step 4) 2-Amino-5-chloro-4-(pentafluoro-λ6-sulfaneyl)phenol

To N-(4-chloro-2-hydroxy-5-(pentafluoro-λ6-sulfaneyl)phenyl)acetamide (9.5 mg) obtained in the preceding step 3, ethanol (1 mL) and 6 M hydrochloric acid (500 µL) were added, and the mixture was reacted at 100° C. for 5 hours in a microwave reaction apparatus. The reaction mixture was concentrated under reduced pressure, then ethyl acetate (2 mL) and triethylamine (300 µL) were added to the residue, and the solvent was concentrated under reduced pressure. The obtained residue was purified by column chromatography (hexane:ethyl acetate) to obtain the title compound (6.9 mg).

(Step 5) N-(1-Acryloylazetidin-3-yl)-2-(((4-chloro-2-hydroxy-5-(pentafluoro-λ6-sulfaneyl)phenyl)amino)methyl)-1-methyl-1H-imidazole-5-carboxamide The title compound (12.7 mg) was obtained in the same way as in Example 41 (Step 5) except that N-(1-acryloylazetidin-3-yl)-2-formyl-1-methyl-1H-imidazole-5-carboxamide (8.5 mg) obtained in Production Example 9 was used instead of tert-butyl 3-(1-ethyl-2-formyl-4-methyl-1H-imidazole-5-carboxamido)azetidine-1-carboxylate and 2-amino-5-chloro-4-(pentafluoro-λ6-sulfaneyl)phenol (6.9 mg) obtained in the preceding step 4 was used instead of 2-amino-4-(tert-butyl)-5-chlorophenol.

Example 59 N-(1-Acryloylazetidin-3-yl)-2-(((4-chloro-2-hydroxy-5-(1,1,1-trifluoropropan-2-yl)phenyl)amino)methyl)-1-methyl-1H-imidazole-5-carboxamide (Step 1) 1-Methoxy-2-nitro-4-(1-(trifluoromethyl)vinyl)benzene To a solution of 4-bromo-1-methoxy-2-nitrobenzene (400 mg) in 1,4-dioxane (8 mL), 4,4,6-trimethyl-2-(1-(trifluoromethyl)vinyl)-1,3,2-dioxaborinane (674 mg), Pd(PPh$_3$)$_4$ (299 mg), and a 2 M aqueous sodium carbonate solution (1.72 mL) were added, and the mixture was stirred overnight at 100° C. Water and ethyl acetate were added to the reaction mixture, and the organic layer was washed with saturated saline. The resultant product was dried over sodium sulfate, and the solvent was distilled off under reduced pressure. The obtained residue was purified by column chromatography (hexane:ethyl acetate) to obtain the title compound (235.6 mg).

(Step 2) 2-Methoxy-5-(2,2,2-trifluoro-1-methylethyl)aniline

To 1-methoxy-2-nitro-4-(1-(trifluoromethyl)vinyl)benzene (80 mg) obtained in the preceding step 1 in ethanol (2 mL), 10% palladium carbon (50% wet, 21 mg) was added under nitrogen stream, and after hydrogen purging, the mixture was stirred at room temperature for 3 hours. The reaction mixture was filtered through celite and washed with chloroform and methanol. The filtrate was concentrated under reduced pressure to obtain the title compound (77.6 mg).

(Step 3) 4-Chloro-2-methoxy-5-(2,2,2-trifluoro-1-methylethyl)aniline

To a solution of 2-methoxy-5-(2,2,2-trifluoro-1-methylethyl)aniline (77.6 mg) obtained in the preceding step 2 in THF (1 mL), NCS (47 mg) was added, and the mixture was stirred at room temperature for 3 hours. The reaction mixture was heated to 60° C. and stirred for 2 hours. The reaction mixture was allowed to cool, and then, an organic layer was separated by the addition of water, an aqueous sodium thiosulfate solution, and ethyl acetate. The organic layer was washed with a saturated aqueous sodium bicarbonate and saturated saline and dried over sodium sulfate, and then, the solvent was distilled off under reduced pressure. The obtained residue was purified by column chromatography (hexane:ethyl acetate) to obtain the title compound (47.5 mg).

(Step 4) 2-Amino-5-chloro-4-(2,2,2-trifluoro-1-methylethyl)phenol

A solution of 4-chloro-2-methoxy-5-(2,2,2-trifluoro-1-methylethyl)aniline (47 mg) obtained in the preceding step 3 in dichloromethane (1.5 mL) was cooled in a dry ice-acetone bath, and boron tribromide (1 M solution in dichloromethane, 370 µL) was added thereto. After removal of the dry ice-acetone bath, the mixture was warmed to room temperature and stirred for 3 hours. To the reaction mixture, water and chloroform were added, and then, concentrated ammonia water (0.37 mL) was added. The organic layer was washed with water and saturated saline and dried over sodium sulfate, and then, the solvent was distilled off under reduced pressure. The obtained residue was purified by column chromatography (hexane:ethyl acetate) to obtain the title compound (42.3 mg).

(Step 5) N-(1-Acryloylazetidin-3-yl)-2-(((4-chloro-2-hydroxy-5-(1,1,1-trifluoropropan-2-yl)phenyl)amino)methyl)-1-methyl-1H-imidazole-5-carboxamide The title compound (28.2 mg) was obtained in the same way as in Example 53 (Step 3) except that 2-amino-5-chloro-4-(2,2,2-trifluoro-1-methylethyl)phenol (15 mg) obtained in the preceding step 4 was used instead of 2-amino-5-chloro-4-cyclobutylphenol and N-(1-acryloylazetidin-3-yl)-2-formyl-1-methyl-1H-imidazole-5-carboxamide (20 mg) obtained in Production Example 9 was used instead of 5-formyl-N-(1-prop-2-enoylazetidin-3-yl)furan-2-carboxamide.

Example 60 N-(1-Acryloylazetidin-3-yl)-2-(((4-chloro-2-hydroxy-5-isopropylphenyl)amino)methyl)-1-methyl-1H-imidazole-5-carboxamide The title compound (10.8 mg) was obtained in the same way as in Example 53 (Step 3) except that 2-amino-5-chloro-4-isopropylphenol (12 mg) obtained in Example 48 (Step 2) was used instead of 2-amino-5-chloro-4-cyclobutylphenol and N-(1-acryloylazetidin-3-yl)-2-formyl-1-methyl-1H-imidazole-5-carboxamide (20 mg) obtained in Production Example 9 was used instead of 5-formyl-N-(1-prop-2-enoylazetidin-3-yl)furan-2-carboxamide.

Example 61 N-(1-Acryloylazetidin-3-yl)-2-(((4-chloro-5-ethyl-2-hydroxyphenyl)amino)methyl)-1-methyl-1H-imidazole-5-carboxamide (Step 1) 2-Amino-5-chloro-4-ethylphenol The title compound (38.6 mg) was obtained in the same way as in Example 56 (Steps 3 and 4) except that 5-ethyl-2-methoxyaniline (400 mg) was used instead of 2-methoxy-5-(2,2,2-trifluoroethyl)aniline.

(Step 2) N-(1-Acryloylazetidin-3-yl)-2-(((4-chloro-5-ethyl-2-hydroxyphenyl)amino)methyl)-1-methyl-1H-imidazole-5-carboxamide The title compound (32.4 mg) was obtained in the same way as in Example 53 (Step 3) except that 2-amino-5-chloro-4-ethylphenol (15 mg) obtained in the preceding step 1 was used instead of 2-amino-5-chloro-4-cyclobutylphenol and N-(1-acryloylazetidin-3-yl)-2-formyl-1-methyl-1H-imidazole-5-carboxamide (28 mg) obtained in Production Example 9 was used instead of 5-formyl-N-(1-prop-2-enoylazetidin-3-yl)furan-2-carboxamide.

Example 62 N-(1-Acryloylazetidin-3-yl)-2-(((4-chloro-2-hydroxy-5-(trimethylsilyl)phenyl)amino)methyl)-1-methyl-1H-imidazole-5-carboxamide (Step 1) (4-Methoxy-3-nitrophenyl)trimethylsilane To a solution of 4-bromo-1-methoxy-2-nitrobenzene (300 mg) in 1,3-dimethyl-3,4,5,6-tetrahydro-2(1H)-pyrimidinone (3 mL), tris(dibenzylideneacetone)palladium(0) (35.5 mg), 2-(di-tert-butylphosphino)biphenyl (34.7 mg), hexamethyldisilane (227 mg), potassium fluoride (375 mg), and water (46 µL) were added, and the mixture was reacted at 100° C. for 2 hours in a microwave reaction apparatus. An organic layer was separated by the addition of water and ethyl acetate, washed with saturated saline, and dried over sodium sulfate. The solvent was distilled off under reduced pressure, and the obtained residue was purified by column chromatography (hexane:ethyl acetate) to obtain the title compound (209.8 mg).

(Step 2) 2-Amino-5-chloro-4-trimethylsilylphenol

The title compound (10.7 mg) was obtained in the same way as in Example 56 (Steps 2 to 4) except that (4-methoxy-3-nitrophenyl)trimethylsilane (110 mg) obtained in the preceding step 1 was used instead of 1-methoxy-2-nitro-4-(2,2,2-trifluoroethyl)benzene.

(Step 3) N-(1-Acryloylazetidin-3-yl)-2-(((4-chloro-2-hydroxy-5-(trimethylsilyl)phenyl)amino)methyl)-1-methyl-1H-imidazole-5-carboxamide The title compound (15.6 mg) was obtained in the same way as in Example 53 (Step 3) except that 2-amino-5-chloro-4-trimethylsilylphenol (10.7 mg) obtained in the preceding step 2 was used instead of 2-amino-5-chloro-4-cyclobutylphenol and N-(1-acryloylazetidin-3-yl)-2-formyl-1-methyl-1H-imidazole-5-carboxamide (15.7 mg) obtained in Production Example 9 was used instead of 5-formyl-N-(1-prop-2-enoylazetidin-3-yl)furan-2-carboxamide.

Example 63 N-(1-Acryloylazetidin-3-yl)-2-(((4-chloro-5-(2,2-difluoro-1-methylcyclopropyl)-2-hydroxyphenyl)amino)methyl)-1-methyl-1H-imidazole-5-carboxamide (Step 1) 2-Amino-5-chloro-4-(2,2-difluoro-1-methylcyclopropyl)phenol The title compound (44 mg) was obtained in the same way as in Example 51 (Steps 1 to 5) except that 2-isopropenyl-4,4,5,5-tetramethyl-1,3,2-dioxaborolane (679 µL) was used instead of 4,4,5,5-tetramethyl-2-vinyl-1,3,2-dioxaborolane.

(Step 2) N-(1-Acryloylazetidin-3-yl)-2-(((4-chloro-5-(2,2-difluoro-1-methylcyclopropyl)-2-hydroxyphenyl)amino)methyl)-1-methyl-1H-imidazole-5-carboxamide The title compound (24.7 mg) was obtained in the same way as in Example 53 (Step 3) except that 2-amino-5-chloro-4-(2,2-difluoro-1-methylcyclopropyl)phenol (15 mg) obtained in the preceding step 1 was used instead of 2-amino-5-chloro-4-cyclobutylphenol and N-(1-acryloylazetidin-3-yl)-2-formyl-1-methyl-1H-imidazole-5-carboxamide (20.2 mg) obtained in Production Example 9 was used instead of 5-formyl-N-(1-prop-2-enoylazetidin-3-yl)furan-2-carboxamide.

Example 64 N-(1-Acryloylazetidin-3-yl)-2-(((4-chloro-2-hydroxy-5-propylphenyl)amino)methyl)-1-methyl-1H-imidazole-5-carboxamide (Step 1) 1-Chloro-5-methoxy-4-nitro-2-((E)-prop-1-enyl)benzene To a solution of 1-chloro-2-iodo-5-methoxy-4-nitrobenzene (100 mg) obtained in Production Example 2 (Step 1) in 1,4-dioxane (1 mL), 4,4,5,5-tetramethyl-2-((E)-prop-1-enyl)-1,3,2-dioxaborolane (122 µL), Pd(PPh$_3$)$_4$ (55.3 mg), and a 2 M aqueous sodium carbonate solution (319 µL) were added, and the mixture was stirred overnight at 100° C. Water and ethyl acetate were added to the reaction mixture, and the organic layer was washed with saturated saline. The resultant product was dried over sodium sulfate, and the solvent was distilled off under reduced pressure. The obtained residue was purified by column chromatography (hexane:ethyl acetate) to obtain the title compound (52.6 mg).

(Step 2) 4-Chloro-2-methoxy-5-propylaniline

To 1-chloro-5-methoxy-4-nitro-2-((E)-prop-1-enyl)benzene (52 mg) obtained in the preceding step 1 in ethanol (1 mL), 5 wt % platinum-active carbon (11 mg) was added under nitrogen stream. The reaction system was purged with hydrogen and stirred at room temperature for 4 hours. The reaction mixture was filtered through celite and washed with a chloroform-methanol mixed solvent. The solvent was distilled off under reduced pressure to obtain the title compound (46.8 mg).

(Step 3) 2-Amino-5-chloro-4-propylphenol

A solution of 4-chloro-2-methoxy-5-propylaniline (46.8 mg) obtained in the preceding step 2 in dichloromethane (1.5 mL) was cooled in a dry ice-acetone bath, and boron tribromide (1 M solution in dichloromethane, 470 µL) was added thereto. After removal of the dry ice-acetone bath, the mixture was warmed to room temperature and stirred for 5 hours. To the reaction mixture, water and chloroform were added, and then, concentrated ammonia water (0.47 mL) was added. The organic layer was washed with water and saturated saline and dried over sodium sulfate, and then, the solvent was distilled off under reduced pressure. The obtained residue was purified by column chromatography (hexane:ethyl acetate) to obtain the title compound (19.8 mg).

(Step 4) N-(1-Acryloylazetidin-3-yl)-2-(((4-chloro-2-hydroxy-5-propylphenyl)amino)methyl)-1-methyl-1H-imidazole-5-carboxamide The title compound (35.4 mg) was obtained in the same way as in Example 53 (Step 3) except that 2-amino-5-chloro-4-propylphenol (19 mg) obtained in the preceding step 3 was used instead of 2-amino-5-chloro-4-cyclobutylphenol and N-(1-acryloylazetidin-3-yl)-2-formyl-1-methyl-1H-imidazole-5-carboxamide (32 mg) obtained in Production Example 9 was used instead of 5-formyl-N-(1-prop-2-enoylazetidin-3-yl)furan-2-carboxamide.

Example 65 N-(1-Acryloylazetidin-3-yl)-5-(((4-bromo-5-(tert-butyl)-2-hydroxyphenyl)amino)methyl)furan-2-carboxamide The title compound (10 mg) was obtained in the same way as in Example 53 (Step 3) except that 2-amino-5-bromo-4-(tert-butyl)phenol (10 mg) obtained in Production Example 3 was used instead of 2-amino-5-chloro-4-cyclobutylphenol.

Example 66 N-(1-Acryloylazetidin-3-yl)-5-(((5-(tert-butyl)-2-hydroxyphenyl)amino)methyl)furan-2-carboxamide The title compound (16.8 mg) was obtained in the same way as in Example 53 (Step 3) except that 2-amino-4-(tert-butyl)phenol (7 mg) was used instead of 2-amino-5-chloro-4-cyclobutylphenol.

Example 67 N-(1-Acryloylazetidin-3-yl)-5-(((5-(tert-butyl)-4-cyano-2-hydroxyphenyl)amino)methyl)furan-2-carboxamide (Step 1) tert-Butyl 3-(5-(((4-bromo-5-(tert-butyl)-2-hydroxyphenyl)amino)methyl)furan-2-carboxamido)azetidine-1-carboxylate The title compound (221 mg) was obtained in the same way as in Example 1 (Step 2) except that 2-amino-5-bromo-4-(tert-butyl)phenol (209 mg) obtained in Production Example 3 was used instead of 2-amino-4-(tert-butyl)-5-chlorophenol.

(Step 2) tert-Butyl 3-(5-(((4-cyano-5-(tert-butyl)-2-hydroxyphenyl)amino)methyl)furan-2-carboxamido)azetidine-1-carboxylate To a solution of tert-butyl 3-(5-(((4-bromo-5-(tert-butyl)-2-hydroxyphenyl)amino)methyl)furan-2-carboxamido)azetidine-1-carboxylate (52 mg) obtained in the preceding step 1 in DMF (1 mL), zinc cyanide (25 mg) and Pd(PPh$_3$)$_4$ (10 mg) were added, and the mixture was stirred overnight at 110° C. Pd(PPh$_3$)$_4$ (30 mg) was further added thereto, and the mixture was further stirred at 110° C. for 5 hours. Water and ethyl acetate were added thereto, and the organic layer was washed with saturated saline. The resultant product was dried over sodium sulfate, and the solvent was distilled off under reduced pressure. The obtained residue was purified by column chromatography (hexane:ethyl acetate) to obtain the title compound (35.4 mg).

(Step 3) N-(1-Acryloylazetidin-3-yl)-5-(((5-(tert-butyl)-4-cyano-2-hydroxyphenyl)amino)methyl)furan-2-carboxamide The title compound (8.15 mg) was obtained in the same way as in Example 1 (Step 3) except that tert-butyl 3-(5-(((4-cyano-5-(tert-butyl)-2-hydroxyphenyl)amino)methyl)furan-2-carboxamido)azetidine-1-carboxylate (35.4 mg) obtained in the preceding step 2 was used instead of tert-butyl 3-(5-(((5-(tert-butyl)-4-chloro-2-hydroxyphenyl)amino)methyl)furan-2-carboxamido)azetidine-1-carboxylate.

Example 68 N-(1-Acryloylazetidin-3-yl)-2-(((5-(tert-butyl)-2-hydroxy-4-methylphenyl)amino)methyl)-1-methyl-1H-imidazole-5-carboxamide (Step 1) N-(5-(tert-Butyl)-2-methoxyphenyl)acetamide To 5-(tert-butyl)-2-methoxyaniline (3.60 g) in ethyl acetate (15 mL), acetic anhydride (2.00 mL) was added. The reaction mixture was concentrated under reduced pressure, and IPE was added to the residue. Precipitated solids were collected to obtain the title compound (3.96 g)

(Step 2) N-(5-(tert-Butyl)-4-iodo-2-methoxyphenyl)acetamide

To a solution of N-(5-(tert-butyl)-2-methoxyphenyl)acetamide (942 mg) obtained in the preceding step 1 in chloroform (20 mL), iodine (650 mg) was added, then silver trifluoromethanesulfonate (200 mg) was added, and the mixture was stirred at room temperature for 20 minutes. Silver trifluoromethanesulfonate (200 mg) was further added thereto, and the mixture was stirred at room temperature for 30 minutes. Silver trifluoroacetate (250 mg) was added thereto, then the mixture was stirred for 10 minutes, then silver trifluoroacetate (250 mg) was added again thereto, and the mixture was stirred for 1.5 hours. Iodine (230 mg) was further added thereto, then the mixture was stirred for 30 minutes, then silver trifluoroacetate (250 mg) was added thereto, and the mixture was stirred for 30 minutes. An aqueous sodium bicarbonate solution and ethyl acetate were added to the reaction mixture, and insoluble matter was filtered off through celite. The organic layer was separated, washed with saturated saline, and dried over sodium sulfate. The solvent was distilled off under reduced pressure, and the obtained residue was purified by column chromatography (hexane:ethyl acetate) to obtain the title compound (155 mg) and N-(5-(tert-butyl)-3-iodo-2-methoxyphenyl)acetamide (76 mg).

(Step 3) N-(5-(tert-Butyl)-2-methoxy-4-methylphenyl)acetamide

A solution of N-(5-(tert-butyl)-4-iodo-2-methoxyphenyl)acetamide (70 mg) obtained in the preceding step 2, methylboric acid (36.2 mg), Pd(dppf)Cl$_2$·CH$_2$Cl$_2$ (16.5 mg), and a 0.5 M aqueous tripotassium phosphate solution (2.0 mL) in 1,4-dioxane (3.5 mL) was stirred overnight at 110° C. Water and ethyl acetate were added to the reaction mixture, and the organic layer was washed with saturated saline and dried over sodium sulfate. The solvent was distilled off under reduced pressure, and the obtained residue was purified by column chromatography (hexane:ethyl acetate) to obtain the title compound (18 mg).

(Step 4) 5-(tert-Butyl)-2-methoxy-4-methylaniline

To a solution of N-(5-(tert-butyl)-2-methoxy-4-methylphenyl)acetamide (13 mg) obtained in the preceding step 3 in ethanol (2 mL), a 5 M aqueous sodium hydroxide solution (2 mL) was added, and the mixture was reacted at 100° C. for 3 hours in a microwave reaction apparatus. The reaction mixture was further reacted at 110° C. for 1 hour, and then, 5 M hydrochloric acid was added thereto. After extraction with ethyl acetate, the organic layer was washed with saturated saline and dried over sodium sulfate. The solvent was distilled off under reduced pressure, and the obtained residue was purified by column chromatography (hexane:ethyl acetate) to obtain the title compound (8 mg).

(Step 5) 2-Amino-4-(tert-butyl)-5-methylphenol

A solution of 5-(tert-butyl)-2-methoxy-4-methylaniline (8 mg) obtained in the preceding step 4 in dichloromethane (0.5 mL) was cooled in a dry ice-acetone bath, and boron tribromide (1 M solution in dichloromethane, 0.5 mL) was added thereto. The mixture was warmed to room temperature and stirred for 30 minutes. To the reaction mixture, water was added, and then, ammonia water was added, followed by extraction with chloroform. The organic layer was washed with water and saturated saline and dried over sodium sulfate, and then, the solvent was distilled off under reduced pressure to obtain the title compound (7.3 mg).

(Step 6) N-(1-Acryloylazetidin-3-yl)-2-(((5-(tert-butyl)-2-hydroxy-4-methylphenyl)amino)methyl)-1-methyl-1H-imidazole-5-carboxamide The title compound (3.5 mg) was obtained in the same way as in Example 53 (Step 3) except that 2-amino-4-(tert-butyl)-5-methylphenol (7.3 mg) obtained in the preceding step 5 was used instead of 2-amino-5-chloro-4-cyclobutylphenol and N-(1-acryloylazetidin-3-yl)-2-formyl-1-methyl-1H-imidazole-5-carboxamide (15 mg) obtained in Production Example 9 was used instead of 5-formyl-N-(1-prop-2-enoylazetidin-3-yl)furan-2-carboxamide.

Example 69 N-(1-Acryloylazetidin-3-yl)-2-(((5-(tert-butyl)-2-hydroxy-4-vinylphenyl)amino)methyl)-1-methyl-1H-imidazole-5-carboxamide (Step 1) N-(5-(tert-Butyl)-2-hydroxy-4-vinylphenyl)acetamide To a solution of 2-acetamido-5-bromo-4-(tert-butyl)phenyl acetate (300 mg) obtained in Production Example 3 (Step 1) in 1,4-dioxane (4 mL), 4,4,5,5-tetramethyl-2-vinyl-1,3,2-dioxaborolane (281 mg), Pd(PPh$_3$)$_4$ (317 mg), and a 2 M aqueous sodium carbonate solution (914 µL) were added, and the mixture was reacted at 120° C. for 24 hours in a microwave reaction apparatus. Water and ethyl acetate were added to the reaction mixture, and the organic layer was washed with saturated saline. The resultant product was dried over sodium sulfate, and the solvent was distilled off under reduced pressure. The obtained residue was purified by column chromatography (hexane:ethyl acetate) to obtain the title compound (183 mg).

(Step 2) 2-Amino-4-(tert-butyl)-5-vinylphenol

To N-(5-(tert-butyl)-2-hydroxy-4-vinylphenyl)acetamide (25 mg) obtained in the preceding step 1 in ethanol (3 mL), a 5 M aqueous sodium hydroxide solution (2 mL) was added, and the mixture was reacted at 120° C. for 2 hours in a microwave reaction apparatus. 5 M hydrochloric acid was added to the reaction mixture, followed by extraction with ethyl acetate. The organic layer was washed with saturated saline and dried over sodium sulfate. The solvent was distilled off under reduced pressure, and the obtained residue was purified by column chromatography (hexane:ethyl acetate) to obtain the title compound (7 mg).

(Step 3) N-(1-Acryloylazetidin-3-yl)-2-(((5-(tert-butyl)-2-hydroxy-4-vinylphenyl)amino)methyl)-1-methyl-1H-imidazole-5-carboxamide The title compound (8.3 mg) was obtained in the same way as in Example 53 (Step 3) except that 2-amino-4-(tert-butyl)-5-vinylphenol (7 mg) obtained in the preceding step 2 was used instead of 2-amino-5-chloro-4-cyclobutylphenol and N-(1-acryloylazetidin-3-yl)-2-formyl-1-methyl-1H-imidazole-5-carboxamide (14 mg) obtained in Production Example 9 was used instead of 5-formyl-N-(1-prop-2-enoyl-azetidin-3-yl)furan-2-carboxamide.

Example 70 N-(1-Acryloylazetidin-3-yl)-2-(((5-(tert-butyl)-4-ethyl-2-hydroxyphenyl)amino)methyl)-1-methyl-1H-imidazole-5-carboxamide (Step 1) N-(5-(tert-Butyl)-4-ethyl-2-hydroxyphenyl)acetamide To a solution of N-(5-(tert-butyl)-2-hydroxy-4-vinylphenyl)acetamide (40 mg) obtained in Example 69 (Step 1) in ethanol (2 mL), 10% palladium carbon (50% wet, 6 mg) was added under nitrogen stream, and after hydrogen purging, the mixture was stirred at room temperature for 2 hours. The reaction mixture was filtered through celite and washed with ethyl acetate. The filtrate was concentrated under reduced pressure to obtain the title compound (34 mg).

(Step 2) 2-Amino-4-(tert-butyl)-5-ethylphenol

To a solution of N-(5-(tert-butyl)-4-ethyl-2-hydroxyphenyl)acetamide (34 mg) obtained in the preceding step 1 in ethanol (2 mL), a 5 M aqueous sodium hydroxide solution (1.5 mL) was added, and the mixture was reacted at 120° C. for 2 hours in a microwave reaction apparatus. 5 M hydrochloric acid was added to the reaction mixture, followed by extraction with ethyl acetate. The organic layer was washed with saturated saline and dried over sodium sulfate. The solvent was distilled off under reduced pressure, and the obtained residue was purified by column chromatography (hexane:ethyl acetate) to obtain the title compound (26 mg).

(Step 3) N-(1-Acryloylazetidin-3-yl)-2-(((5-(tert-butyl)-4-ethyl-2-hydroxyphenyl)amino)methyl)-1-methyl-1H-imidazole-5-carboxamide The title compound (6 mg) was obtained in the same way as in Example 53 (Step 3) except that 2-amino-4-(tert-butyl)-5-ethylphenol (26 mg) obtained in the preceding step 2 was used instead of 2-amino-5-chloro-4-cyclobutylphenol and N-(1-acryloylazetidin-3-yl)-2-formyl-1-methyl-1H-imidazole-5-carboxamide (51 mg) obtained in Production Example 9 was used instead of 5-formyl-N-(1-prop-2-enoyl-azetidin-3-yl)furan-2-carboxamide.

Example 71 N-(1-Acryloylazetidin-3-yl)-2-(((6-hydroxy-3,3-dimethyl-2,3-dihydro-1H-inden-5-yl)amino)methyl)-1-methyl-1H-imidazole-5-carboxamide (Step 1) 5-Methoxy-1,1-dimethyl-2,3-dihydro-1H-indene To titanium tetrachloride (1 M solution in dichloromethane, 50 mL), dimethylzinc (1 M solution in hexane, 50 mL) was added at −45° C. or lower in a dry ice-acetone bath, and then, a solution of 5-methoxy-1-indanone (3.25 g) in dichloromethane (30 mL) was added over 5 minutes. After removal of the dry ice-acetone bath, the mixture was stirred for 4 hours. The reaction mixture was poured into ice water, followed by extraction with ethyl acetate. The organic layer was washed with saturated saline and dried over sodium sulfate. The solvent was distilled off under reduced pressure, and the obtained residue was purified by column chromatography (hexane:ethyl acetate) to obtain the title compound (2.54 g)

(Step 2) 1,1-Dimethyl-2,3-dihydro-1H-inden-5-ol

5-Methoxy-1,1-dimethyl-2,3-dihydro-1H-indene (530 mg) obtained in the preceding step 1 was cooled in a dry ice-acetone bath, and boron tribromide (1 M solution in dichloromethane, 20 mL) was added thereto. After removal of the dry ice-acetone bath, the mixture was warmed to room temperature and stirred for 7 hours. The reaction mixture was poured into ice water, and concentrated ammonia water was added thereto. After extraction with chloroform, the organic layer was washed with saturated saline and dried over sodium sulfate. The solvent was distilled off under reduced pressure to obtain the title compound (487 mg).

(Step 3) 1,1-Dimethyl-6-nitro-2,3-dihydro-1H-inden-5-ol

To a solution of 1,1-dimethyl-2,3-dihydro-1H-inden-5-ol (487 mg) obtained in the preceding step 2 in trifluoroacetic acid (10 mL), sodium nitrate (225 mg) was added under ice cooling, and the mixture was stirred overnight at room temperature. To the reaction mixture, water was added, and then, concentrated ammonia water was added. After extraction with ethyl acetate, the organic layer was washed with saturated saline and dried over sodium sulfate. The solvent was distilled off under reduced pressure, and the obtained residue was purified by column chromatography (hexane:ethyl acetate) to obtain the title compound (121 mg).

(Step 4) 6-Amino-1,1-dimethyl-2,3-dihydro-1H-inden-5-ol

To a solution of 1,1-dimethyl-6-nitro-2,3-dihydro-1H-inden-5-ol (121 mg) obtained in the preceding step 3 in ethanol (5 mL), 10% palladium carbon (50% wet, 120 mg) was added under nitrogen stream, and after hydrogen purging, the mixture was stirred at room temperature for 3 hours. The reaction mixture was filtered and washed with methanol. The filtrate was concentrated under reduced pressure to obtain the title compound (99.7 mg).

(Step 5) N-(1-acryloylazetidin-3-yl)-2-(((6-hydroxy-3,3-dimethyl-2,3-dihydro-1H-inden-5-yl)amino) methyl)-1-methyl-1H-imidazole-5-carboxamide The title compound (31.8 mg) was obtained in the same way as in Example 53 (Step 3) except that 6-amino-1,1-dimethyl-2,3-dihydro-1H-inden-5-ol (20 mg) obtained in the preceding step 4 was used instead of 2-amino-5-chloro-4-cyclobutylphenol and N-(1-acryloylazetidin-3-yl)-2-formyl-1-methyl-1H-imidazole-5-carboxamide (35 mg) obtained in Production Example 9 was used instead of 5-formyl-N-(1-prop-2-enoylazetidin-3-yl)furan-2-carboxamide.

Example 72 N-(1-Acryloylazetidin-3-yl)-2-(((6-hydroxy-3,3-dimethyl-2,3-dihydro-1H-inden-5-yl) amino)methyl)-1,4-dimethyl-1H-imidazole-5-carboxamide The title compound (26.1 mg) was obtained in the same way as in Example 1 (Steps 2 and 3) except that 6-amino-1,1-dimethyl-2,3-dihydro-1H-inden-5-ol (33 mg) obtained in Example 71 (Step 4) was used instead of 2-amino-4-(tert-butyl)-5-chlorophenol and tert-butyl 3-(2-formyl-1,4-dimethyl-1H-imidazole-5-carboxamido)azetidine-1-carboxylate (30 mg) obtained in Production Example 10 was used instead of tert-butyl 3-(5-formylfuran-2-carboxamido)azetidine-1-carboxylate.

Example 73 N-(1-Acryloylazetidin-3-yl)-2-(((5-(tert-butyl)-4-chloro-3-fluoro-2-hydroxyphenyl) amino)methyl)-1-methyl-1H-imidazole-5-carboxamide (Step 1) 4-(tert-Butyl)-2-fluoro-6-nitrophenol To 4-(tert-butyl)-phenol (1.01 g) in methanol (4 mL), Selectfluor (2.64 g) was added, and the mixture was heated to reflux overnight. Ethyl acetate was added to the reaction mixture, then insoluble matter was filtered, and the filtrate was concentrated. To the obtained residue, dichloromethane (10 mL) was added, and fuming nitric acid (400 μL) was added under ice cooling. The consumption of the starting material was confirmed by NMR, and chloroform and water were added thereto. The organic layer was dried over sodium sulfate, and the solvent was distilled off under reduced pressure. The obtained residue was purified by column chromatography (hexane:ethyl acetate) to obtain the title compound (464 mg).

(Step 2) 5-(tert-Butyl)-1-fluoro-2-methoxy-3-nitrobenzene

To 4-(tert-butyl)-2-fluoro-6-nitrophenol (350 mg) obtained in the preceding step 1 in acetone (4 mL), potassium carbonate (600 mg) and dimethylsulfuric acid (230 μL) were added, and the mixture was heated to reflux for 30 minutes. The reaction mixture was diluted with ethyl acetate and then filtered, and the solvent in the filtrate was distilled off under reduced pressure. The obtained residue was purified by column chromatography (hexane:ethyl acetate) to obtain the title compound (200 mg).

(Step 3) 5-(tert-Butyl)-3-fluoro-2-methoxyaniline

To 5-(tert-butyl)-1-fluoro-2-methoxy-3-nitrobenzene (200 mg) obtained in the preceding step 2 in ethyl acetate (5 mL), 10% palladium carbon (50% wet, 85 mg) was added under nitrogen stream, and after hydrogen purging, the mixture was stirred at room temperature for 1 hour. The reaction mixture was filtered through celite and washed with ethyl acetate. The filtrate was concentrated under reduced pressure to obtain the title compound (168 mg).

(Step 4) 5-(tert-Butyl)-4-chloro-3-fluoro-2-methoxyaniline

To a solution of 5-(tert-butyl)-3-fluoro-2-methoxyaniline (155 mg) obtained in the preceding step 3 in acetic acid (4 mL), NCS (130 mg) was added, and the mixture was stirred for 4 hours. The reaction mixture was diluted with ethyl acetate, washed with an aqueous sodium bicarbonate solution, an aqueous sodium bisulfite solution, and saturated saline, and dried over sodium sulfate, and then, the solvent was distilled off under reduced pressure. The obtained residue was purified by column chromatography (hexane: ethyl acetate) to obtain the title compound (10.7 mg).

(Step 5) 6-Amino-4-(tert-butyl)-3-chloro-2-fluorophenol

A solution of 5-(tert-butyl)-4-chloro-3-fluoro-2-methoxyaniline (10.7 mg) obtained in the preceding step 4 in dichloromethane (1.5 mL) was cooled in a dry ice-acetone bath, and boron tribromide (1 M solution in dichloromethane, 130 μL) was added thereto. After removal of the dry ice-acetone bath, the mixture was warmed to room temperature and stirred for 1 hour. To the reaction mixture, water and dichloromethane were added, and then, concentrated ammonia water (0.13 mL) was added. The organic layer was washed with saturated saline and dried over sodium sulfate, and then, the solvent was distilled off under reduced pressure. The obtained residue was purified by column chromatography (hexane:ethyl acetate) to obtain the title compound (10 mg).

(Step 6) N-(1-Acryloylazetidin-3-yl)-2-(((5-(tert-butyl)-4-chloro-3-fluoro-2-hydroxyphenyl)amino) methyl)-1-methyl-1H-imidazole-5-carboxamide The title compound (16.6 mg) was obtained in the same way as in Example 53 (Step 3) except that 6-amino-4-(tert-butyl)-3-chloro-2-fluorophenol (10 mg) obtained in the preceding step 5 was used instead of 2-amino-5-chloro-4-cyclobutylphenol and N-(1-acryloylazetidin-3-yl)-2-formyl-1-methyl-1H-imidazole-5-carboxamide (14.5 mg) obtained in Production Example 9 was used instead of 5-formyl-N-(1-prop-2-enoylazetidin-3-yl)furan-2-carboxamide.

Example 74 N-(1-Acryloylazetidin-3-yl)-2-(((5-(tert-butyl)-2-hydroxy-3-methylphenyl)amino) methyl)-1-methyl-1H-imidazole-5-carboxamide The title compound (1.3 mg) was obtained in the same way as in Example 68 (Steps 3 to 6) using N-(5-(tert-butyl)-3-iodo-2-methoxyphenyl)acetamide (76 mg) obtained in Example 68 (Step 2) instead of N-(5-(tert-butyl)-4-iodo-2-methoxyphenyl)acetamide.

Example 75 N-(1-Acryloylazetidin-3-yl)-2-(((2-hydroxy-5-(pentafluoro-λ6-sulfaneyl)phenyl)amino) methyl)-1-methyl-1H-imidazole-5-carboxamide The title compound (12.6 mg) was obtained in the same way as in Example 53 (Step 3) except that 2-amino-4-

(pentafluorosulfanyl)phenol (22.6 mg) was used instead of 2-amino-5-chloro-4-cyclobutylphenol and N-(1-acryloylazetidin-3-yl)-2-formyl-1-methyl-1H-imidazole-5-carboxamide (23.3 mg) obtained in Production Example 9 was used instead of 5-formyl-N-(1-prop-2-enoylazetidin-3-yl)furan-2-carboxamide.

Example 76 N-(1-Acryloylazetidin-3-yl)-2-(((5-(tert-butyl)-2-hydroxy-4-methylphenyl)amino)methyl)-1,4-dimethyl-1H-imidazole-5-carboxamide The title compound (19.82 mg) was obtained in the same way as in Example 1 (Steps 2 and 3) except that 2-amino-4-(tert-butyl)-5-methylphenol (60 mg) obtained in Production Example 4 was used instead of 2-amino-4-(tert-butyl)-5-chlorophenol and tert-butyl 3-(2-formyl-1,4-dimethyl-1H-imidazole-5-carboxamido)azetidine-1-carboxylate (140 mg) obtained in Production Example 10 was used instead of tert-butyl 3-(5-formylfuran-2-carboxamido)azetidine-1-carboxylate.

Example 77 N-(1-Acryloylazetidin-3-yl)-2-(((5-(tert-butyl)-2-hydroxy-4-methylphenyl)amino)methyl)-1-isopropyl-4-(trifluoromethyl)-1H-imidazole-5-carboxamide (Step 1) Ethyl 3-isopropyl-5-(trifluoromethyl)-2-vinylimidazole-4-carboxylate To a mixture of ethyl 2-bromo-5-(trifluoromethyl)-1H-imidazole-4-carboxylate (107 mg), THF (2.0 mL), 2-propanol (0.04 mL), and triphenylphosphine (0.123 g), DIAD (0.086 mL) was added. After stirring at room temperature for 50 minutes, the reaction mixture was concentrated, and the obtained residue was purified by column chromatography (hexane:ethyl acetate=100:0-70:30) to obtain ethyl 2-bromo-3-isopropyl-5-(trifluoromethyl)imidazole-4-carboxylate (89 mg).

(Step 2) Ethyl 3-isopropyl-5-(trifluoromethyl)-2-vinylimidazole-4-carboxylate

A mixture of ethyl 2-bromo-3-isopropyl-5-(trifluoromethyl)imidazole-4-carboxylate (413 mg) obtained in the preceding step 1, potassium vinyltrifluoroborate (0.185 g), (1,1'-bis(diphenylphosphino)ferrocene)palladium(II) dichloride dichloromethane adduct (0.051 g), 1,4-dioxane (4 mL), and a 2 M aqueous sodium carbonate solution (1.6 mL) was stirred at 90° C. for 7 hours. After extraction from the reaction mixture with ethyl acetate, the organic layer was washed with water and 20% saline and then dried over sodium sulfate. Insoluble matter was filtered off, then the filtrate was concentrated, and the obtained residue was purified by column chromatography (hexane:ethyl acetate=100:0-70:30) to obtain the title compound (252 mg) as a colorless oil.

(Step 3) 1-Isopropyl-4-(trifluoromethyl)-2-vinyl-1H-imidazole-5-carboxylic acid

Ethyl 3-isopropyl-5-(trifluoromethyl)-2-vinylimidazole-4-carboxylate (252 mg) obtained in the preceding step 2 was dissolved in THF (3 mL), and methanol (2.0 mL) and a 1 M aqueous sodium hydroxide solution (2 mL) were added to the solution. The obtained mixture was stirred at room temperature for 40 minutes, and then, 5 M hydrochloric acid (0.4 mL) was added thereto, followed by extraction with ethyl acetate. The organic layer was washed with water and 20% saline and then dried over sodium sulfate. Insoluble matter was filtered off, and the filtrate was concentrated under reduced pressure to obtain the title compound (224 mg).

(Step 4) tert-Butyl 3-(1-isopropyl-4-(trifluoromethyl)-2-vinyl-1H-imidazole-5-carboxamido)azetidine-1-carboxylate To a solution of 1-isopropyl-4-(trifluoromethyl)-2-vinyl-1H-imidazole-5-carboxylic acid (224 mg) obtained in the preceding step 3 and 1-Boc-3-aminoazetidine (190 mg) in DMF (3.0 mL), N,N-diisopropylethylamine (190 μL) and HATU (380 mg) were added. The mixture was stirred at room temperature for 1 hour, and an organic layer was separated by the addition of water and ethyl acetate. The organic layer was washed with water and saturated saline and then dried over sodium sulfate. The solvent was distilled off under reduced pressure, and the obtained residue was purified by column chromatography (hexane:ethyl acetate) to obtain the title compound (359 mg).

(Step 5) tert-Butyl 3-((2-formyl-3-isopropyl-5-(trifluoromethyl)imidazole-4-carbonyl)amino)azetidine-1-carboxylate To a solution of tert-butyl 3-(4-methyl-2-vinylthiazole-5-carboxamido)azetidine-1-carboxylate (359 mg) obtained in the preceding step 2 in 1,4-dioxane (4.2 mL) and water (0.85 mL), 2,6-lutidine (191 μL) and sodium periodate (687 mg) were added, and then, an aqueous osmium tetroxide solution (0.15 M, 130 μL) was added. After stirring at room temperature for 13 hours, an aqueous sodium thiosulfate solution was added thereto, followed by extraction with ethyl acetate, and the organic layer was washed with saturated saline. The resultant product was dried over sodium sulfate, and then, the solvent was distilled off under reduced pressure. The obtained residue was purified by column chromatography (hexane:ethyl acetate) to obtain the title compound (310 mg).

(Step 6) N-(1-Acryloylazetidin-3-yl)-2-(((5-(tert-butyl)-2-hydroxy-4-methylphenyl)amino)methyl)-1-isopropyl-4-(trifluoromethyl)-1H-imidazole-5-carboxamide The title compound (21 mg) was obtained in the same way as in Example 1 (Steps 2 and 3) except that 2-amino-4-(tert-butyl)-5-methylphenol (20 mg) obtained in Production Example 4 was used instead of 2-amino-4-(tert-butyl)-5-chlorophenol and tert-butyl 3-((2-formyl-3-isopropyl-5-(trifluoromethyl)imidazole-4-carbonyl)amino)azetidine-1-carboxylate (35 mg) obtained in the preceding step 6 was used instead of tert-butyl 3-(5-formylfuran-2-carboxamido)azetidine-1-carboxylate.

Example 78 N-(1-Acryloylazetidin-3-yl)-2-(((5-(tert-butyl)-2-hydroxy-4-methylphenyl)amino)methyl)-1-isopropyl-4-methyl-1H-imidazole-5-carboxamide The title compound (31 mg) was obtained in the same way as in Example 41 (Steps 5 and 6) except that tert-butyl 3-(2-formyl-1-isopropyl-4-methyl-1H-imidazole-5-carboxamido)azetidine-1-carboxylate (30 mg) obtained in Production Example 11 was used instead of tert-butyl 3-(1-ethyl- 2-formyl-4-methyl-1H-imidazole-5-carboxamido)azetidine-1-carboxylate and 2-amino-4-(tert-butyl)-5-methylphenol (20 mg) obtained in Production Example 4 was used instead of 2-amino-4-(tert-butyl)-5-chlorophenol.

Example 79 N-(1-Acryloylazetidin-3-yl)-5-(1-((5-(tert-butyl)-4-chloro-2-hydroxyphenyl)amino)ethyl)furan-2-carboxamide The title compound (43 mg) was obtained in the same way as in Example 1 (Steps 1 to 3) except that 5-acetyl-2-furancarboxylic acid (200 mg) obtained in the preceding step 2 was used instead of 5-formyl-2-furancarboxylic acid.

Example 80 N-(1-Acryloylazetidin-3-yl)-2-(1-((5-(tert-butyl)-4-chloro-2-hydroxyphenyl)amino)ethyl)-1-methyl-1H-imidazole-5-carboxamide (Step 1) Methyl 2-(1-ethoxyvinyl)-1-methyl-1H-imidazole-5-carboxylate To a solution of methyl 2-bromo-1-methyl-1H-imidazole-5-carboxylate (230 mg) obtained in Example 18 (Step 1) in 1,4-dioxane (3 mL), tributyl(1-ethoxyvinyl)tin (767 mg) and tetrakis(triphenylphosphine)palladium(0) (167 mg) were added, and the mixture was stirred at 125° C. for 12 hours in a microwave reaction apparatus. The reaction mixture was concentrated, and the obtained residue was purified by column chromatography (hexane:ethyl acetate) to obtain the title compound (211 mg).

(Step 2) Methyl 2-acetyl-1-methyl-1H-imidazole-5-carboxylate

To methyl 2-(1-ethoxyvinyl)-1-methyl-1H-imidazole-5-carboxylate (211 mg) obtained in the preceding step 1 in THF (6 mL), 2 M hydrochloric acid (2 mL) was added, and the mixture was stirred at room temperature for 3 hours. A 5 M aqueous sodium hydroxide solution (800 µL) was added to the reaction mixture, followed by extraction with ethyl acetate. The organic layer was washed with saturated saline and dried over sodium sulfate. The solvent was distilled off under reduced pressure, and the obtained residue was purified by column chromatography (hexane:ethyl acetate) to obtain the title compound (146 mg).

(Step 3) Methyl 2-(1-((5-(tert-butyl)-4-chloro-2-hydroxyphenyl)amino)ethyl)-1-methyl-1H-imidazole-5-carboxylate To a solution of methyl 2-acetyl-1-methyl-1H-imidazole-5-carboxylate (113 mg) obtained in the preceding step 2 and 2-amino-4-(tert-butyl)-5-chlorophenol (124 mg) in dichloromethane solution (6 mL), trifluoroacetic acid (71 µL) and sodium triacetoxyborohydride (60 mg) were added, and the mixture was stirred overnight at room temperature. Water was added to the reaction mixture, followed by extraction with ethyl acetate. The solvent was distilled off under reduced pressure, and the obtained residue was purified by column chromatography (hexane:ethyl acetate:methanol) to obtain the title compound (109 mg).

(Step 4) N-(1-Acryloylazetidin-3-yl)-2-(1-((5-(tert-butyl)-4-chloro-2-hydroxyphenyl)amino)ethyl)-1-methyl-1H-imidazole-5-carboxamide To a solution of methyl 2-(1-((5-(tert-butyl)-4-chloro-2-hydroxyphenyl)amino)ethyl)-1-methyl-1H-imidazole-5-carboxylate (109 mg) obtained in the preceding step 3 in methanol (1 mL), a 1 M aqueous sodium hydroxide solution (1 mL) was added, and the mixture was stirred overnight at room temperature. 2 M hydrochloric acid (0.5 mL) was added to the reaction mixture, then the mixture was separated into organic and aqueous layers by the addition of ethyl acetate and water, and the solvent in the organic layer was distilled off under reduced pressure. 1-(3-Aminoazetidin-1-yl)prop-2-en-1-one hydrochloride (58 mg) obtained in Production Example 8, DMF (2 mL), N,N-diisopropylethylamine (152 µL), and HATU (136 mg) were added to the obtained residue, and the mixture was stirred for 80 minutes. Ethyl acetate was added to the reaction mixture, and the organic layer was washed with water. The resultant product was dried over sodium sulfate, and the solvent was distilled off under reduced pressure. The obtained residue was purified by column chromatography (ethyl acetate:methanol) to obtain the title compound (79 mg).

Example 81 N-(1-Acryloylazetidin-3-yl)-2-(1-((5-(tert-butyl)-4-chloro-2-hydroxyphenyl)amino)ethyl)-1,4-dimethyl-1H-imidazole-5-carboxamide (Step 1) Ethyl 2-bromo-4-methyl-1H-imidazole-5-carboxylate To ethyl 4-methyl-1H-imidazole-5-carboxylate (4.62 g) in a mixed solvent of acetonitrile (50 mL) and chloroform (50 mL), NBS (5.60 g) was added, and the mixture was stirred overnight at room temperature. The reaction mixture was concentrated under reduced pressure. The obtained residue was separated into organic and aqueous layers by the addition of ethyl acetate and water, and the solvent in the organic layer was distilled off under reduced pressure. The obtained residue was purified by column chromatography (hexane:ethyl acetate) to obtain the title compound (4.33 g).

(Step 2) Ethyl 2-bromo-1,4-dimethyl-1H-imidazole-5-carboxylate

To a solution of ethyl 2-bromo-4-methyl-1H-imidazole-5-carboxylate (466 mg) obtained in the preceding step 1 in THF (10 mL), methanol (130 µL), triphenylphosphine (650 mg), and DIAD (500 µL) were added, and the mixture was stirred at room temperature for 1.5 hours. The solvent was distilled off under reduced pressure, and the obtained residue was purified by column chromatography (hexane:chloroform) to obtain the title compound (576 mg).

(Step 3) tert-Butyl 3-(2-bromo-1,4-dimethyl-1H-imidazole-5-carboxamido)azetidine-1-carboxylate To ethyl 2-bromo-1,4-dimethyl-1H-imidazole-5-carboxylate (556 mg) obtained in the preceding step 2 in ethanol (7 mL), a 5 M aqueous sodium hydroxide solution (7 mL) was added, and the mixture was stirred at room temperature for 30 minutes. A 10% aqueous phosphoric acid solution was added to the reaction mixture, followed by extraction with ethyl acetate. The organic layer was washed with saturated saline and dried over sodium sulfate. The solvent was distilled off under reduced pressure, and 1-Boc-3-aminoazetidine (500 µL), HoBt hydrate (413 mg), and DMF (10 mL) were added to the obtained residue. Subsequently, triethylamine (1.0 mL) and WSC hydrochloride (776 mg) were added, and the mixture was stirred overnight. Water and ethyl acetate were added to the reaction mixture. The organic layer was washed with water and saturated saline and dried over sodium sulfate, and then, the solvent was distilled off under reduced pressure. The obtained residue was purified by column chromatography (chloroform:methanol) to obtain the title compound (459 mg).

(Step 4) tert-Butyl 3-(2-(1-ethoxyvinyl)-1,4-dimethyl-1H-imidazole-5-carboxamido)azetidine-1-carboxylate To a solution of tert-butyl 3-(2-bromo-1,4-dimethyl-1H-imidazole-5-carboxamido)azetidine-1-carboxylate (105 mg) obtained in the preceding step 3 in 1,4-dioxane (2 mL), tributyl(1-ethoxyvinyl)tin (200 μL) and tetrakis(triphenylphosphine)palladium(0) (35 mg) were added, and the mixture was stirred at 125° C. for 5 hours in a microwave reaction apparatus. The reaction mixture was concentrated, and the obtained residue was purified by column chromatography (hexane:ethyl acetate) to obtain the title compound (81 mg).

(Step 5) 2-Acetyl-N-(azetidin-3-yl)-1,4-dimethyl-1H-imidazole-5-carboxamide

To a solution of tert-butyl 3-(2-(1-ethoxyvinyl)-1,4-dimethyl-1H-imidazole-5-carboxamido)azetidine-1-carboxylate (81 mg) obtained in the preceding step 4 in THF (3 mL), 5 M hydrochloric acid (3 mL) was added, and the mixture was stirred overnight at room temperature. A 5 M aqueous sodium hydroxide solution (3 mL) was added to the reaction mixture, and the mixture was distilled off under reduced pressure. The obtained residue was purified by reverse-phase preparative chromatography (Biotage ODS 50 g) (water:methanol) to obtain the title compound (34 mg).

(Step 6) 2-Acetyl-N-(1-acryloylazetidin-3-yl)-1,4-dimethyl-1H-imidazole-5-carboxamide To 2-acetyl-N-(azetidin-3-yl)-1,4-dimethyl-1H-imidazole-5-carboxamide (34 mg) obtained in the preceding step 5, THF (2 mL), N,N-diisopropylethylamine (98 μL), and a 1 M solution of acryloyl chloride in acetonitrile (180 μL) were added. Water was added to the reaction mixture, followed by extraction with ethyl acetate. The organic layer was washed with saturated saline, and dried over sodium sulfate, then the solvent was distilled off under reduced pressure, and the obtained residue was purified by column chromatography (chloroform:ethanol) to obtain the title compound (24.5 mg).

(Step 7) N-(1-Acryloylazetidin-3-yl)-2-(1-((5-(tert-butyl)-4-chloro-2-hydroxyphenyl)amino)ethyl)-1,4-dimethyl-1H-imidazole-5-carboxamide To a solution of 2-acetyl-N-(1-acryloylazetidin-3-yl)-1,4-dimethyl-1H-imidazole-5-carboxamide (24.5 mg) obtained in the preceding step 6 in dichloromethane solution (1 mL), trifluoroacetic acid (20 μL) and sodium triacetoxyborohydride (60 mg) were added, and the mixture was stirred overnight at room temperature. The solvent in the reaction mixture was distilled off under reduced pressure, and the obtained residue was purified by column chromatography (chloroform:methanol) to obtain the title compound (22.6 mg).

Example 82 N-(1-Acryloylazetidin-3-yl)-2-(1-((5-(tert-butyl)-4-chloro-3-fluoro-2-hydroxyphenyl)amino)ethyl)-1-methyl-1H-imidazole-5-carboxamide (Step 1) 2-Acetyl-N-(1-acryloylazetidin-3-yl)-1-methyl-1H-imidazole-5-carboxamide To a solution of methyl 2-acetyl-1-methyl-1H-imidazole-5-carboxylate (252 mg) obtained in Example 80 (Step 2) in methanol (10 mL), a 5 M aqueous sodium hydroxide solution (2 mL) was added, and the mixture was stirred at room temperature for 1 hour. 5 M hydrochloric acid (2 mL) was added to the reaction mixture, then an organic layer was separated by the addition of ethyl acetate and water, and the solvent was distilled off under reduced pressure. 1-(3-Aminoazetidin-1-yl)prop-2-en-1-one hydrochloride (361 mg) obtained in Production Example 8, DMF (6.2 mL), N,N-diisopropylethylamine (944 μL), and HATU (844 mg) were added to the obtained residue, and the mixture was stirred for 5 minutes. Ethyl acetate was added to the reaction mixture, and the organic layer was washed with water. The resultant product was dried over sodium sulfate, and the solvent was distilled off under reduced pressure. The obtained residue was purified by column chromatography (chloroform:methanol) to obtain the title compound (335 mg).

(Step 2) N-(1-Acryloylazetidin-3-yl)-2-(1-((5-(tert-butyl)-4-chloro-3-fluoro-2-hydroxyphenyl)amino)ethyl)-1-methyl-1H-imidazole-5-carboxamide The title compound (41.7 mg) was obtained in the same way as in Example 53 (Step 3) except that 6-amino-4-(tert-butyl)-3-chloro-2-fluorophenol (39 mg) obtained in Example 73 (Step 5) was used instead of 2-amino-5-chloro-4-cyclobutylphenol and 2-acetyl-N-(1-acryloylazetidin-3-yl)-1-methyl-1H-imidazole-5-carboxamide (43.7 mg) obtained in the preceding step 1 was used instead of 5-formyl-N-(1-prop-2-enoylazetidin-3-yl)furan-2-carboxamide.

Example 83 N-(1-Acryloylazetidin-3-yl)-2-(((6-(tert-butyl)-5-chloro-3-hydroxypyridin-2-yl)amino)methyl)-1-methyl-1H-imidazole-5-carboxamide (Step 1) 6-(tert-Butyl)-2-nitropyridin-3-ol Concentrated sulfuric acid (2.5 mL) was cooled in an ice bath, and 6-(tert-butyl)pyridin-3-ol (250 mg) and fuming nitric acid (0.25 mL) were added thereto. The mixture was stirred for 10 minutes and then diluted with water, and a 5 M aqueous sodium hydroxide solution was added thereto, followed by extraction with chloroform. The organic layer was dried over sodium sulfate to obtain the title compound (255 mg).

(Step 2) 2-Amino-6-(tert-butyl)pyridin-3-ol

To 6-(tert-butyl)-2-nitropyridin-3-ol (255 mg) obtained in the preceding step 1 in ethanol (4 mL), 10% palladium carbon (50% wet, 25 mg) was added under nitrogen stream, and after hydrogen purging, the mixture was stirred overnight at 50° C. The reaction mixture was filtered through celite and washed with ethyl acetate. The filtrate was concentrated under reduced pressure to obtain the title compound (203 mg).

(Step 3) (2-Acetamido-6-(tert-butyl)-3-pyridyl) acetate

To 2-amino-6-(tert-butyl)pyridin-3-ol (203 mg) obtained in the preceding step 2, acetic anhydride (1 mL) and sodium acetate (160 mg) were added, and the mixture was stirred at 60° C. for 10 minutes. The reaction mixture was diluted with ethyl acetate and washed with a saturated aqueous sodium bicarbonate and saturated saline. The resultant product was dried over sodium sulfate. The solvent was distilled off under reduced pressure, and the obtained residue was purified by column chromatography (hexane:ethyl acetate) to obtain the title compound (285 mg).

(Step 4) (2-Acetamido-6-(tert-butyl)-5-chloro-3-pyridyl) acetate

To a solution of (2-acetamido-6-(tert-butyl)-3-pyridyl) acetate (75 mg) obtained in the preceding step 3 in DMF (1 mL), NCS (42 mg) was added, and the mixture was stirred overnight at room temperature. An organic layer was separated by the addition of water and ethyl acetate to the reaction mixture, and washed with water and saturated saline. The resultant product was dried over sodium sulfate. The solvent was distilled off under reduced pressure, and the obtained residue was purified by column chromatography (hexane:ethyl acetate) to obtain the title compound (42 mg).

(Step 5) 2-Amino-6-(tert-butyl)-5-chloropyridin-3-ol

To a solution of (2-acetamido-6-(tert-butyl)-5-chloro-3-pyridyl) acetate (42 g) obtained in the preceding step 4 in ethanol (3 mL), a 5 M aqueous sodium hydroxide solution (2 mL) was added, and the mixture was reacted at 110° C. for 90 minutes in a microwave reaction apparatus. An organic layer was separated by the addition of hydrochloric acid and ethyl acetate to the reaction mixture, and the solvent was distilled off under reduced pressure. The obtained residue was purified by column chromatography (hexane:ethyl acetate) to obtain the title compound (25.5 mg).

(Step 6) N-(1-Acryloylazetidin-3-yl)-2-(((6-(tert-butyl)-5-chloro-3-hydroxypyridin-2-yl)amino) methyl)-1-methyl-1H-imidazole-5-carboxamide The title compound (21.2 mg) was obtained in the same way as in Example 53 (Step 3) except that 2-amino-6-(tert-butyl)-5-chloropyridin-3-ol (15 mg) obtained in the preceding step 5 was used instead of 2-amino-5-chloro-4-cyclobutylphenol and N-(1-acryloylazetidin-3-yl)-2-formyl-1-methyl-1H-imidazole-5-carboxamide (28.3 mg) obtained in Production Example 9 was used instead of 5-formyl-N-(1-prop-2-enoylazetidin-3-yl)furan-2-carboxamide.

Example 84 N-(1-Acryloylazetidin-3-yl)-2-(((5-chloro-3-hydroxy-6-(trimethylsilyl)pyridin-2-yl) amino)methyl)-1-methyl-1H-imidazole-5-carboxamide (Step 1) (5-Methoxy-6-nitro-2-pyridyl)trimethylsilane A solution of 6-bromo-3-methoxy-2-nitropyridine (400 mg), tris(dibenzylideneacetone)dipalladium(0) (47 mg), 2-(di-tert-butylphosphino)biphenyl (46 mg), potassium fluoride (499 mg), and 1,3-dimethyl-3,4,5,6-tetrahydro-2(1H)-pyrimidinone (10 mL) was stirred at room temperature for 5 minutes, then hexamethyldisilane (0.42 mL) was added thereto, and the mixture was reacted at 100° C. for 2 hours in a microwave reaction apparatus. Water and ethyl acetate were added to the reaction mixture, and the organic layer was washed with water and saturated saline and dried over sodium sulfate, and then, the solvent was distilled off under reduced pressure. The obtained residue was purified by column chromatography (hexane:ethyl acetate) to obtain the title compound (134 mg).

(Step 2) 3-Methoxy-6-trimethylsilylpyridin-2-amine

To a solution of (5-methoxy-6-nitro-2-pyridyl)trimethylsilane (134 mg) obtained in the preceding step 1 in ethyl acetate (2 mL), an iron powder (165 mg), acetic acid (0.5 mL), and water (1 mL) were added, and the mixture was stirred at 80° C. for 3 hours. An organic layer was separated by the addition of water and ethyl acetate, and washed with a saturated aqueous sodium bicarbonate and saturated saline. The resultant product was dried over sodium sulfate, and the solvent was distilled off under reduced pressure to obtain the title compound (131 mg).

(Step 3) 5-Chloro-3-methoxy-6-trimethylsilylpyridin-2-amine

To a solution of 3-methoxy-6-trimethylsilylpyridin-2-amine (131 mg) obtained in the preceding step 2 in THF (1.5 mL), NCS (87 mg) was added, and the mixture was stirred at room temperature for 5 hours. An organic layer was separated by the addition of water, an aqueous sodium thiosulfate solution, and ethyl acetate to the reaction mixture. The organic layer was washed with a saturated aqueous sodium bicarbonate and saturated saline and dried over sodium sulfate, and then, the solvent was distilled off under reduced pressure. The obtained residue was purified by column chromatography (hexane:ethyl acetate) to obtain the title compound (82.1 mg).

(Step 4) 2-Amino-5-chloro-6-trimethylsilylpyridin-3-ol

A solution of 5-chloro-3-methoxy-6-trimethylsilylpyridin-2-amine (82 mg) obtained in the preceding step 3 in dichloromethane (1.5 mL) was cooled in a dry ice-acetone bath, and boron tribromide (1 M solution in dichloromethane, 710 μL) was added thereto. After removal of the dry ice-acetone bath, the mixture was warmed to room temperature and stirred for 8 hours. To the reaction mixture, water and chloroform were added, and then, concentrated ammonia water (0.71 mL) was added. The organic layer was washed with water and saturated saline and dried over sodium sulfate, and then, the solvent was distilled off under reduced pressure to obtain the title compound (72.4 mg).

(Step 5) N-(1-Acryloylazetidin-3-yl)-2-(((5-chloro-3-hydroxy-6-(trimethylsilyl)pyridin-2-yl)amino) methyl)-1-methyl-1H-imidazole-5-carboxamide The title compound (0.44 mg) was obtained in the same way as in Example 53 (Step 3) except that 2-amino-5-chloro-6-trimethylsilylpyridin-3-ol (15 mg) obtained in the preceding step 5 was used instead of 2-amino-5-chloro-4-cyclobutylphenol and N-(1-acryloylazetidin-3-yl)-2-formyl-1-methyl-1H-imidazole-5-carboxamide (21.8 mg) obtained in Production Example 9 was used instead of 5-formyl-N-(1-prop-2-enoylazetidin-3-yl)furan-2-carboxamide.

Example 85 N-(1-Acryloylazetidin-3-yl)-2-(((5-chloro-3-hydroxy-6-(trimethylsilyl)pyridin-2-yl) amino)methyl)-1,4-dimethyl-1H-imidazole-5-carboxamide The title compound (10.7 mg) was obtained in the same way as in Example 1 (Steps 2 and 3) except that 2-amino- 5-chloro-6-trimethylsilylpyridin-3-ol (30 mg) of Example 84 (Step 4) was used instead of 2-amino-4-(tert-butyl)-5-chlorophenol and tert-butyl 3-(2-formyl-1,4-dimethyl-1H-imidazole-5-carboxamido)azetidine-1-carboxylate (44.6 mg) obtained in Production Example 10 was used instead of tert-butyl 3-(5-formylfuran-2-carboxamido)azetidine-1-carboxylate.

Example 86 (E)-2-(((5-(tert-Butyl)-4-chloro-2-hydroxyphenyl)amino)methyl)-N-(1-(4-(dimethylamino)but-2-enoyl)azetidin-3-yl)thiazole-5-carboxamide To tert-butyl 3-((5-((5-(tert-butyl)-4-chloro-2-hydroxyanilino)methyl)thiazole-2-carbonyl)amino)azetidine-1-carboxylate (56.1 mg) obtained in Example 9 (Step 4) in ethanol (0.5 mL), 4 M hydrochloric acid (solution in 1,4-dioxane, 2.0 mL) was added, and the mixture was stirred at room temperature for 30 minutes. The reaction mixture was concentrated, and trans-4-dimethylaminocrotonic acid hydrochloride (24 mg), DMF (3 mL), N,N-diisopropylethylamine (60 µL), and HATU (50 mg) were added to the obtained residue, and the mixture was stirred for 1 hour. An organic layer was separated by the addition of ethyl acetate to the reaction mixture, and washed with water and a saturated aqueous sodium bicarbonate. The resultant product was dried over sodium sulfate, and the solvent was distilled off under reduced pressure. The obtained residue was purified by reverse-phase preparative HPLC (water:acetonitrile (0.1% formic acid)) to obtain the title compound (23.8 mg).

Example 87 (E)-5-(((5-(tert-Butyl)-4-chloro-2-hydroxyphenyl)amino)methyl)-N-(1-(4-(dimethylamino)but-2-enoyl)azetidin-3-yl)-N-methylfuran-2-carboxamide The title compound (5.55 mg) was obtained in the same way as in Example 1 (Steps 1 and 2) and Example 86 except that 1-Boc-3-(methylamino)azetidine (56 mg) was used instead of 1-Boc-3-aminoazetidine.

Example 88 (E)-2-(((5-(tert-Butyl)-4-chloro-2-hydroxyphenyl)amino)methyl)-N-(1-(4-(dimethylamino)but-2-enoyl)azetidin-3-yl)-4-methylthiazole-5-carboxamide The title compound (8.36 mg) was obtained in the same way as in Example 1 (Step 2) and Example 86 except that tert-butyl 3-(5-formyl-3-methylfuran-2-carboxamido)azetidine-1-carboxylate (100 mg) obtained in Example 21 (Step 2) was used instead of tert-butyl 3-(5-formylfuran-2-carboxamido)azetidine-1-carboxylate.

Example 89 (E)-2-(((5-(tert-Butyl)-4-chloro-2-hydroxyphenyl)amino)methyl)-N-(1-(4-(dimethylamino)but-2-enoyl)azetidin-3-yl)-1-methyl-1H-imidazole-5-carboxamide (Step 1) tert-Butyl 3-((2-((5-(tert-butyl)-4-chloro-2-hydroxyanilino)methyl)-3-methylimidazole-4-carbonyl)amino)azetidine-1-carboxylate The title compound (94.4 mg) was obtained in the same way as in Example 9 (Steps 3 and 4) except that methyl 2-formyl-1-methyl-1H-imidazole-5-carboxylate (70 mg) obtained in Example 18 (Step 3) was used instead of methyl 2-formylthiazole-5-carboxylate.

(Step 2) (E)-2-(((5-(tert-Butyl)-4-chloro-2-hydroxyphenyl)amino)methyl)-N-(1-(4-(dimethylamino)but-2-enoyl)azetidin-3-yl)-1-methyl-1H-imidazole-5-carboxamide The title compound (26.6 mg) was obtained in the same way as in Example 86 except that tert-butyl 3-((2-((5-(tert-butyl)-4-chloro-2-hydroxyanilino)methyl)-3-methylimidazole-4-carbonyl)amino)azetidine-1-carboxylate (44.6 mg) obtained in the preceding step 1 was used instead of tert-butyl 3-((5-((5-(tert-butyl)-4-chloro-2-hydroxyanilino)methyl)thiazole-2-carbonyl)amino)azetidine-1-carboxylate.

Example 90 N-(1-Acryloylazetidin-3-yl)-2-(5-(tert-butyl)-4-chloro-2-hydroxyphenethyl)-1-methyl-1H-imidazole-5-carboxamide (Step 1) (2-Bromo-4-(tert-butyl)-5-chlorophenoxy)(tert-butyl)dimethylsilane To a solution of 2-bromo-4-(tert-butyl)-5-chlorophenol (526 mg) obtained in Production Example 5 in dichloromethane (10 mL), imidazole (240 mg) and tert-butyldimethylchlorosilane (412 mg) were added, and the mixture was stirred overnight at room temperature. An organic layer was separated by the addition of water and ethyl acetate to the reaction mixture. The organic layer was washed with a saturated aqueous sodium bicarbonate and saturated saline and dried over sodium sulfate, and then, the solvent was distilled off under reduced pressure. The obtained residue was purified by column chromatography (hexane:ethyl acetate) to obtain the title compound (743 mg).

(Step 2) 4-(tert-Butyl)-5-chloro-2-ethynylphenol

To a solution of (2-bromo-4-(tert-butyl)-5-chlorophenoxy)(tert-butyl)dimethylsilane (463 mg) obtained in the preceding step 1 in 1,4-dioxane (3.0 mL), copper(I) iodide (23 mg), dichlorobis(triphenylphosphine)palladium(II) (43 mg), triethylamine (3.0 mL), and trimethylsilylacetylene (300 µL) were added, and the mixture was stirred at 85° C. for 2 hours. Trimethylsilylacetylene (300 µL) was further added thereto, and the mixture was stirred overnight at 85° C. The reaction mixture was concentrated under reduced pressure, then potassium carbonate (1.0 g) and methanol (10 mL) were added to the residue, and the mixture was stirred at room temperature for 1 hour. The reaction mixture was concentrated under reduced pressure, and an organic layer was separated by the addition of water and ethyl acetate. The organic layer was washed with saturated saline and dried over sodium sulfate, and then, the solvent was distilled off under reduced pressure. The obtained residue was purified by column chromatography (hexane:ethyl acetate) to obtain the title compound (101 mg).

(Step 3) Methyl 2-((5-(tert-butyl)-4-chloro-2-hydroxyphenyl)ethynyl)-1-methyl-1H-imidazole-5-carboxylate To methyl 2-bromo-1-methyl-1H-imidazole-5-carboxylate (106 mg) obtained in Example 18 (Step 1), 4-(tert-butyl)-5-chloro-2-ethynylphenol (101 mg) obtained in the preceding step 2, dichlorobis(triphenylphosphine)palladium(II) (34 mg), and copper(I) iodide (18 mg), THF (2 mL) and triethylamine (2 mL) were added, and the mixture was stirred at 60° C. for 4 hours. An organic layer was separated by the addition of water and ethyl acetate to the reaction mixture. The organic layer was washed with saturated saline and dried over sodium sulfate, and then, the solvent was distilled off under reduced pressure. The obtained residue was purified by column chromatography (hexane:ethyl acetate) to obtain the title compound (109 mg).

(Step 4) tert-Butyl 3-(2-((5-(tert-butyl)-4-chloro-2-hydroxyphenyl)ethynyl)-1-methyl-1H-imidazole-5-carboxamido)azetidine-1-carboxylate To memethyl 2-((5-(tert-butyl)-4-chloro-2-hydroxyphenyl)ethynyl)-1-methyl-1H-imidazole-5-carboxylate (106 mg) obtained in the preceding step 3 in ethanol (3 mL), a 5 M aqueous sodium hydroxide solution (2 mL) was added, and the mixture was stirred for 1 hour. The reaction mixture was concentrated under reduced pressure, and a 10% aqueous phosphoric acid solution was added to the residue, followed by extraction with ethyl acetate. The organic layer was dried over sodium sulfate, and the solvent was distilled off under reduced pressure. 1-Boc-3-aminoazetidine (100 µL), DMF (3 mL), N,N-diisopropylethylamine (150 µL), and HATU (116 mg) were added to the obtained residue, and the mixture was stirred at room temperature for 1 hour. Ethyl acetate was added to the reaction mixture, and the organic layer was washed with water. The solvent was distilled off under reduced pressure. The obtained residue was purified by column chromatography (chloroform:methanol) to obtain the title compound (25.4 mg).

(Step 5) tert-Butyl 3-(2-(5-(tert-butyl)-4-chloro-2-hydroxyphenethyl)-1-methyl-1H-imidazole-5-carboxamido)azetidine-1-carboxylate To a solution of tert-butyl 3-(2-((5-(tert-butyl)-4-chloro-2-hydroxyphenyl)ethynyl)-1-methyl-1H-imidazole-5-carboxamido)azetidine-1-carboxylate (25.4 mg) obtained in the preceding step 4 in ethanol (2 mL), 5% rhodium-active carbon (60 mg) was added under nitrogen stream, and after hydrogen purging, the mixture was stirred overnight at room temperature. The reaction mixture was filtered and washed with ethyl acetate. The filtrate was concentrated under reduced pressure to obtain the title compound (20 mg).

(Step 6) N-(1-Acryloylazetidin-3-yl)-2-(5-(tert-butyl)-4-chloro-2-hydroxyphenethyl)-1-methyl-1H-imidazole-5-carboxamide To tert-butyl 3-(2-(5-(tert-butyl)-4-chloro-2-hydroxyphenethyl)-1-methyl-1H-imidazole-5-carboxamido)azetidine-1-carboxylate (20 mg) obtained in the preceding step 5, trifluoroacetic acid (1 mL) was added, and the reaction mixture was stirred for 5 minutes and then concentrated. The obtained residue was dissolved in THF (5 mL), and N,N-diisopropylethylamine (0.5 mL) and a 1 M solution of acryloyl chloride in acetonitrile (40 µL) were added to the solution. Methanol was added to the reaction mixture, then the mixture was concentrated under reduced pressure, and the obtained residue was purified by reverse-phase preparative HPLC (water:acetonitrile (0.1% formic acid)) to obtain the title compound (2.67 mg).

Example 91 N-(1-Acryloylazetidin-3-yl)-2-((5-(tert-butyl)-4-chloro-2-hydroxyphenyl) (hydroxy) methyl)-1,4-dimethyl-1H-imidazole-5-carboxamide (Step 1) 1-Bromo-5-(tert-butyl)-4-chloro-2-((4-methoxybenzyl)oxy)benzene To a solution of 2-bromo-4-(tert-butyl)-5-chlorophenol (570 mg) obtained in Production Example 1 in DMF (7.0 mL), potassium carbonate (750 mg), tetrabutylammonium iodide (80 mg), and 4-methoxybenzyl chloride (360 µL) were added, and the mixture was stirred at room temperature for 8 hours. Water and hexane were added to the reaction mixture, and the organic layer was washed with a 10% aqueous phosphoric acid solution and saturated saline. The resultant product was dried over sodium sulfate, then the solvent was distilled off under reduced pressure, and the obtained residue was purified by column chromatography (hexane:ethyl acetate) to obtain the title compound (919 mg).

(Step 2) 5-(tert-Butyl)-4-chloro-2-((4-methoxybenzyl)oxy)benzaldehyde

A solution of 1-bromo-5-(tert-butyl)-4-chloro-2-((4-methoxybenzyl)oxy)benzene (319 mg) obtained in the preceding step 1 in THF (5.0 mL) was cooled in a dry ice-acetone bath, then butyllithium (1.55 M solution in hexane, 1.20 mL) was added thereto, and the mixture was stirred for 1.5 hours. DMF (200 µL) was added to the reaction mixture, and the mixture was warmed to 0° C. and stirred for 1.5 hours. Water and hexane were added to the reaction mixture, and the organic layer was washed with a 10% aqueous phosphoric acid solution and saturated saline. The resultant product was dried over sodium sulfate, then the solvent was distilled off under reduced pressure, and the obtained residue was purified by column chromatography (hexane:ethyl acetate) to obtain the title compound (218 mg).

(Step 3) tert-Butyl 3-(2-((5-(tert-butyl)-4-chloro-2-((4-methoxybenzyl)oxy)phenyl) (hydroxy)methyl)-1,4-dimethyl-1H-imidazole-5-carboxamido)azetidine-1-carboxylate To a solution of tert-butyl 3-(1,4-dimethyl-1H-imidazole-5-carboxamido)azetidine-1-carboxylate (300 mg) obtained in Production Example 10 (Step 1) in THF (5.0 mL), 2,2,6,6-tetramethylpiperidine (280 µL) was added. The mixture was cooled in a dry ice-acetone bath, then butyllithium (1.55 M solution in hexane, 1.27 mL) was added thereto, and the mixture was stirred for 3 hours in a dry ice-acetone bath. 5-(tert-Butyl)-4-chloro-2-((4-methoxybenzyl)oxy)benzaldehyde (218 mg) obtained in the preceding step 2 in THF (3.0 mL) was added thereto, and the mixture was stirred for 30 minutes. Water was added to the reaction mixture, and the mixture was warmed to room temperature. After extraction with ethyl acetate, the organic layer was washed with a 10% aqueous phosphoric acid solution and saturated saline and dried over sodium sulfate. The solvent was distilled off under reduced pressure, and the obtained residue was purified by column chromatography (hexane:ethyl acetate) to obtain the title compound (142 mg).

(Step 4) N-(1-Acryloylazetidin-3-yl)-2-((5-(tert-butyl)-4-chloro-2-hydroxyphenyl) (hydroxy) methyl)-1,4-dimethyl-1H-imidazole-5-carboxamide To tert-butyl 3-(2-((5-(tert-butyl)-4-chloro-2-((4-methoxybenzyl)oxy)phenyl) (hydroxy)methyl)-1,4-dimethyl-1H-imidazole-5-carboxamido)azetidine-1-carboxylate (42 mg) obtained in the preceding step 3, trifluoroacetic acid (1.0 mL) was added, and the reaction mixture was stirred for 5 minutes and then concentrated. THF (3 mL), N,N-diisopropylethylamine (300 μL), and a 1 M solution of acryloyl chloride in acetonitrile (30 μL) were added to the obtained residue. A saturated aqueous sodium bicarbonate was added to the reaction mixture, followed by extraction with ethyl acetate. The organic layer was washed with saturated saline and dried over sodium sulfate, then the solvent was distilled off under reduced pressure, and the obtained residue was purified by column chromatography (chloroform:ethanol) to obtain the title compound (13.2 mg).

Example 92 N-(1-Acryloylazetidin-3-yl)-2-(5-(tert-butyl)-4-chloro-2-hydroxybenzyl)-1,4-dimethyl-1H-imidazole-5-carboxamide To tert-butyl 3-(2-((5-(tert-butyl)-4-chloro-2-((4-methoxybenzyl)oxy)phenyl) (hydroxy)methyl)-1,4-dimethyl-1H-imidazole-5-carboxamido)azetidine-1-carboxylate (40 mg) obtained in Example 91 (Step 3), triethylsilane (0.3 mL), trifluoroacetic acid (0.5 mL), and dichloromethane (1.0 mL) were added, and the mixture was stirred for 80 minutes, then acetonitrile (2 mL) was added to the reaction mixture, and the mixture was stirred overnight at 60° C. The reaction mixture was concentrated, and THF (3 mL), N,N-diisopropylethylamine (0.5 mL), and a 1 M solution of acryloyl chloride in acetonitrile (120 μL) were added to the obtained residue. A saturated aqueous sodium bicarbonate was added to the reaction mixture, followed by extraction with ethyl acetate. The organic layer was washed with saturated saline and dried over sodium sulfate, then the solvent was distilled off under reduced pressure, and the obtained residue was purified by column chromatography (chloroform:ethanol) to obtain the title compound (18.9 mg).

Example 93 N-(1-Acryloylazetidin-3-yl)-2-((5-(tert-butyl)-4-fluoro-2-hydroxyphenyl) (hydroxy)methyl)-1,4-dimethyl-1H-imidazole-5-carboxamide (Step 1) 2-Bromo-4-(tert-butyl)-5-fluorophenol To aluminum(III) chloride (1.0 g), 2-bromo-5-fluorophenol (2.0 mL) and 2-chloro-2-methylpropane (2.0 mL) were added, and the mixture was stirred at room temperature for 1.5 hours. The reaction mixture was poured into ice water, followed by extraction with dichloromethane. The organic layer was dried over sodium sulfate, and the solvent was distilled off under reduced pressure. The obtained residue was purified by column chromatography (hexane:ethyl acetate) to obtain the title compound (3.84 g).

(Step 2) 2-(2-Bromo-4-(tert-butyl)-5-fluorophenoxy)tetrahydro-2H-pyran

To a solution of 2-bromo-4-(tert-butyl)-5-fluorophenol (2.85 g) obtained in the preceding step 1 in chloroform (30 mL), 3,4-dihydro-2H-pyran (5.0 mL) and pyrimidinium p-toluenesulfonic acid (100 mg) were added, and the mixture was stirred overnight at 60° C. N,N-Diisopropylethylamine was added thereto, and the reaction mixture was concentrated under reduced pressure. The obtained residue was purified by column chromatography (hexane:ethyl acetate) to obtain the title compound (2.93 g)

(Step 3) tert-Butyl 3-(2-((5-(tert-butyl)-4-fluoro-2-((tetrahydro-2H-pyran-2-yl)oxy)phenyl) (hydroxy)methyl)-1,4-dimethyl-1H-imidazole-5-carboxamido)azetidine-1-carboxylate The title compound (336 mg) was obtained in the same way as in Example 91 (Steps 2 and 3) except that 2-(2-bromo-4-(tert-butyl)-5-fluorophenoxy)tetrahydro-2H-pyran (900 mg) obtained in the preceding step 2 was used instead of 1-bromo-5-(tert-butyl)-4-chloro-2-((4-methoxybenzyl)oxy)benzene.

(Step 4) N-(1-Acryloylazetidin-3-yl)-2-((5-(tert-butyl)-4-fluoro-2-hydroxyphenyl) (hydroxy)methyl)-1,4-dimethyl-1H-imidazole-5-carboxamide To tert-butyl 3-(2-((5-(tert-butyl)-4-fluoro-2-((tetrahydro-2H-pyran-2-yl)oxy)phenyl) (hydroxy)methyl)-1,4-dimethyl-1H-imidazole-5-carboxamido)azetidine-1-carboxylate (29 mg) obtained in the preceding step 3, trifluoroacetic acid (0.5 mL) was added, and the reaction mixture was stirred for 2 hours and then concentrated. THF (3 mL), N,N-diisopropylethylamine (500 μL), and a 1 M solution of acryloyl chloride in acetonitrile (50 μL) were added to the obtained residue. A saturated aqueous sodium bicarbonate was added to the reaction mixture, followed by extraction with ethyl acetate. The organic layer was washed with saturated saline and dried over sodium sulfate, then the solvent was distilled off under reduced pressure, and the obtained residue was purified by column chromatography (chloroform:ethanol) to obtain the title compound (12.38 mg).

Example 94 N-(1-Acryloylazetidin-3-yl)-2-(5-(tert-butyl)-4-fluoro-2-hydroxybenzyl)-1,4-dimethyl-1H-imidazole-5-carboxamide To tert-butyl 3-(2-((5-(tert-butyl)-4-fluoro-2-((tetrahydro-2H-pyran-2-yl)oxy)phenyl) (hydroxy)methyl)-1,4-dimethyl-1H-imidazole-5-carboxamido)azetidine-1-carboxylate (19.2 mg) obtained in Example 93 (Step 3), triethylsilane (0.3 mL), trifluoroacetic acid (0.3 mL), and chloroform (3.0 mL) were added, and the mixture was stirred overnight at 60° C. The reaction mixture was concentrated, and THF (3 mL), N,N-diisopropylethylamine (0.5 mL), and a 1 M solution of acryloyl chloride in acetonitrile (33 μL) were added to the obtained residue. A saturated aqueous sodium bicarbonate was added to the reaction mixture, followed by extraction with ethyl acetate. The organic layer was washed with saturated saline and dried over sodium sulfate, then the solvent was distilled off under reduced pressure, and the obtained residue was purified by column chromatography (chloroform:ethanol) to obtain the title compound (9.64 mg).

Example 95 N-(1-Acryloylazetidin-3-yl)-2-(5-(tert-butyl)-4-chloro-2-hydroxybenzyl)-4-methylthiazole-5-carboxamide (Step 1) tert-Butyl 3-(4-methylthiazole-5-carboxamido)azetidine-1-carboxylate To a solution of 4-methyl-5-thiazolecarboxylic acid (286 mg) and 1-Boc-3-aminoazetidine (412 mg) in DMF (3 mL), N,N-diisopropylethylamine (0.7 mL) and HATU (1.00 g) were added, and the mixture was stirred at room temperature for 30 minutes. Water and a 10% aqueous phosphoric acid solution were added to the reaction mixture, followed by extraction with ethyl acetate. The organic layer was washed with a saturated aqueous sodium bicarbonate and saturated saline and dried over sodium sulfate, and the solvent was distilled off under reduced pressure. The obtained residue was purified by column chromatography (hexane:ethyl acetate) to obtain the title compound (725 mg).

(Step 2) N-(1-Acryloylazetidin-3-yl)-2-(5-(tert-butyl)-4-chloro-2-hydroxybenzyl)-4-methylthiazole-5-carboxamide The title compound (17.3 mg) was obtained in the same way as in Example 91 (Steps 3 and 4) except that tert-butyl 3-(4-methylthiazole-5-carboxamido)azetidine-1-carboxylate (164 mg) obtained in the preceding step 1 was used instead of tert-butyl 3-(1,4-dimethyl-1H-imidazole-5-carboxamido)azetidine-1-carboxylate.

Example 96 N-(1-Acryloylazetidin-3-yl)-1-(5-(tert-butyl)-4-chloro-2-hydroxybenzyl)-3,5-dimethyl-1H-pyrazole-4-carboxamide (Step 1) tert-Butyl 3-((3,5-dimethyl-1H-pyrazole-4-carbonyl)amino)azetidine-1-carboxylate The title compound (470 mg) was obtained in the same way as in Example 95 (Step 1) except that 3,5-dimethyl-1H-pyrazole-4-carboxylic acid (500 mg) was used instead of 4-methyl-5-thiazolecarboxylic acid.

(Step 2) (5-(tert-Butyl)-4-chloro-2-((4-methoxyphenyl)methoxy)phenyl)methanol

To a solution of tert-butyl 3-((3,5-dimethyl-1H-pyrazole-4-carbonyl)amino)azetidine-1-carboxylate (50 mg) obtained in the preceding step 1 and 5-(tert-butyl)-4-chloro-2-((4-methoxybenzyl)oxy)benzaldehyde (50 mg) obtained in Example 91 (Step 2) in dichloromethane solution (1 mL), trifluoroacetic acid (20 µL) and sodium triacetoxyborohydride (59 mg) were added, and the mixture was stirred at room temperature for 3 hours. Acetic acid (50 µL) was added thereto, and the mixture was stirred overnight. Water was added to the reaction mixture, followed by extraction with ethyl acetate, then the solvent was distilled off under reduced pressure, and the obtained residue was purified by column chromatography (hexane:ethyl acetate) to obtain the title compound (36.7 mg).

(Step 3) tert-Butyl 3-(1-(5-(tert-butyl)-4-chloro-2-((4-methoxybenzyl)oxy)benzyl)-3,5-dimethyl-1H-pyrazole-4-carboxamido)azetidine-1-carboxylate To a solution of tert-butyl 3-((3,5-dimethyl-1H-pyrazole-4-carbonyl)amino)azetidine-1-carboxylate (36.9 mg) obtained in the preceding step 1 and (5-(tert-butyl)-4-chloro-2-((4-methoxyphenyl)methoxy)phenyl)methanol (36.7 mg) obtained in the preceding step 2 in THF (2 mL), triphenylphosphine (28.8 mg) and DIAD (24 µL) were added, and the mixture was stirred at room temperature for 16 hours. Triphenylphosphine (40 mg) and DIAD (24 µL) were further added thereto, and the mixture was stirred for 2 hours. The solvent was distilled off under reduced pressure, and the obtained residue was purified by column chromatography (hexane:ethyl acetate) to obtain the title compound (15.6 mg).

(Step 4) N-(1-Acryloylazetidin-3-yl)-1-(5-(tert-butyl)-4-chloro-2-hydroxybenzyl)-3,5-dimethyl-1H-pyrazole-4-carboxamide To tert-butyl 3-(1-(5-(tert-butyl)-4-chloro-2-((4-methoxybenzyl)oxy)benzyl)-3,5-dimethyl-1H-pyrazole-4-carboxamido)azetidine-1-carboxylate (15.6 mg) obtained in the preceding step 3, trifluoroacetic acid (3.0 mL) was added, and the reaction mixture was stirred for 30 minutes and then concentrated. THF (2 mL), N,N-diisopropylethylamine (70 µL), and a 1 M solution of acryloyl chloride in acetonitrile (45 µL) were added to the obtained residue. Water was added to the reaction mixture, followed by extraction with ethyl acetate. The organic layer was washed with saturated saline and dried over sodium sulfate, then the solvent was distilled off under reduced pressure, and the obtained residue was purified by column chromatography (ethyl acetate:methanol) to obtain the title compound (8.66 mg).

Example 97 N-(1-Acryloylazetidin-3-yl)-2-(5-(tert-butyl)-4-chloro-2-hydroxybenzyl)-1-methyl-1H-imidazole-5-carboxamide (Step 1) tert-Butyl 3-(1-methyl-1H-imidazole-5-carboxamido)azetidine-1-carboxylate The title compound (604 mg) was obtained in the same way as in Example 95 (Step 1) except that 3-methylimidazole-4-carboxylic acid (380 mg) was used instead of 4-methyl-5-thiazolecarboxylic acid.

(Step 2) tert-Butyl 3-(2-((5-(tert-butyl)-4-chloro-2-((4-methoxybenzyl)oxy)phenyl) (hydroxy)methyl)-1-methyl-1H-imidazole-5-carboxamido)azetidine-1-carboxylate The title compound (153 mg) was obtained in the same way as in Example 91 (Step 3) except that tert-butyl 3-(1-methyl-1H-imidazole-5-carboxamido)azetidine-1-carboxylate (156 mg) obtained in the preceding step 1 was used instead of tert-butyl 3-(1,4-dimethyl-1H-imidazole-5-carboxamido)azetidine-1-carboxylate.

(Step 3) N-(1-Acryloylazetidin-3-yl)-2-(5-(tert-butyl)-4-chloro-2-hydroxybenzoyl)-1-methyl-1H-imidazole-5-carboxamide The title compound (16.17 mg) was obtained in the same way as in Example 92 except that tert-butyl 3-(2-((5-(tert-butyl)-4-chloro-2-((4-methoxybenzyl)oxy)phenyl) (hydroxy)methyl)-1-methyl-1H-imidazole-5-carboxamido)azetidine-1-carboxylate (40 mg) obtained in the preceding step 2 was used instead of tert-butyl 3-(2-((5-(tert-butyl)-4-chloro-2-((4-methoxybenzyl)oxy)phenyl) (hydroxy)methyl)-1,4-dimethyl-1H-imidazole-5-carboxamido)azetidine-1-carboxylate.

Example 98 N-(1-Acryloylazetidin-3-yl)-2-((5-(tert-butyl)-4-chloro-2-hydroxyphenyl) (hydroxy)methyl)-1-methyl-1H-imidazole-5-carboxamide The title compound (44.5 mg) was obtained in the same way as in Example 91 (Step 4) except that tert-butyl 3-(2-((5-(tert-butyl)-4-chloro-2-((4-methoxybenzyl)oxy)phenyl) (hydroxy)methyl)-1-methyl-1H-imidazole-5-carboxamido) azetidine-1-carboxylate (100 mg) obtained in Example 97 (Step 2) was used instead of tert-butyl 3-(2-((5-(tert-butyl)-

4-chloro-2-((4-methoxybenzyl)oxy)phenyl) (hydroxy) methyl)-1,4-dimethyl-1H-imidazole-5-carboxamido)azetidine-1-carboxylate.

Reference Example 1 N-(1-Acryloylazetidin-3-yl)-5-(((5-(tert-butyl)-4-chloro-2-methoxyphenyl)amino) methyl)furan-2-carboxamide The title compound (26.63 mg) was obtained in the same way as in Example 53 (Step 3) except that 5-(tert-butyl)-4-chloro-2-methoxyaniline (50 mg) of Production Example 5 (Step 1) was used instead of 2-amino-5-chloro-4-cyclobutylphenol and 5-formyl-N-(1-prop-2-enoylazetidin-3-yl)furan-2-carboxamide (37 mg) obtained in Production Example 7 was used instead of 5-formyl-N-(1-prop-2-enoylazetidin-3-yl)furan-2-carboxamide.

Reference Example 2 N-(1-Acryloylazetidin-3-yl)-5-(((3-(tert-butyl)-4-chlorophenyl)amino)methyl) furan-2-carboxamide (Step 1) 3-(tert-Butyl)-4-chloroaniline To 3-tert-butylaniline (100 mg) in 2-propanol (1 mL), NCS (89 mg) was added, and the mixture was stirred at room temperature for 20 minutes. An organic layer was separated by the addition of water, an aqueous sodium thiosulfate solution, and ethyl acetate to the reaction mixture. The organic layer was washed with a saturated aqueous sodium bicarbonate and saturated saline and dried over sodium sulfate, and then, the solvent was distilled off under reduced pressure. The obtained residue was purified by column chromatography (hexane:ethyl acetate) to obtain the title compound (32.7 mg).

(Step 2) N-(1-Acryloylazetidin-3-yl)-5-(((3-(tert-butyl)-4-chlorophenyl)amino)methyl)furan-2-carboxamide The title compound (75.7 mg) was obtained in the same way as in Example 1 (Steps 2 and 3) except that 3-(tert-butyl)-4-chloroaniline (32.7 mg) obtained in the preceding step 1 was used instead of 2-amino-4-(tert-butyl)-5-chlorophenol.

Hereinafter, a list of the compounds of Examples 1 to 98 and Reference Examples 1 and 2 will be shown.

In the tables, Abs denotes absolute configuration.

TABLE 1

| Example | | NMR | MS [M + H]+ |
|---|---|---|---|
| 1 | 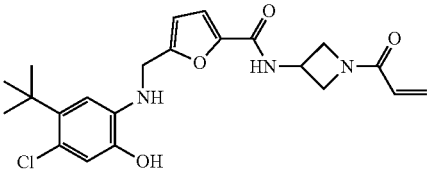 [SMILES: C=CC(=O)N1CC(NC(=O)c2ccc(CNc3cc(C(C)(C)C)c(Cl)cc3O)o2)C1] | 1H-NMR (CDCl3) δ: 8.42 (br s, 1H), 7.76-7.63 (m, 1H), 7.05 (d, J = 3.3 Hz, 1H), 6.79 (s, 1H), 6.67 (s, 1H), 6.35-6.27 (m, 2H), 6.11 (dd, J = 16.9, 10.3 Hz, 1H), 4.90-4.80 (m, 1H), 4.56-4.49 (m, 1H) 4.46-4.38 (m, 1H), 4.29 (s, 2H), 4.13-4.03 (m, 2H) 1.38 (s, 9H). | 432 |
| 2 | 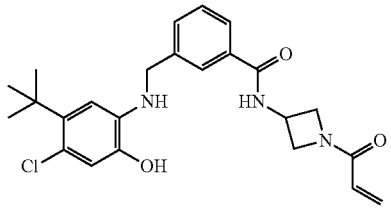 [SMILES: C=CC(=O)N1CC(NC(=O)c2cccc(CNc3cc(C(C)(C)C)c(Cl)cc3O)c2)C1] | 1H-NMR (CDCl3) δ: 7.88 (s, 1H), 7.76 (d, J = 7.7 Hz, 1H), 7.65-7.57 (m, 1H), 7.49 (d, J = 7.7 Hz, 1H), 7.39 (t, J = 7.7 Hz, 1H), 6.78 (s, 1H), 6.57 (s, 1H), 6.25 (dd, J = 16.9. 1.5 Hz, 1H) 6.09 (dd, J = 16.9, 10.3 Hz, 1H), 5.66 (dd, J = 10.3, 1.5 Hz, 1H), 4.91-4.82 (m, 1H), 4.59-4.52 (m, 1H), 4.46-4.39 (m, 1H), 4.32 (s, 2H), 4.11-4.02 (m, 2H), 1.33 (s, 9H). | 442 |
| 3 | 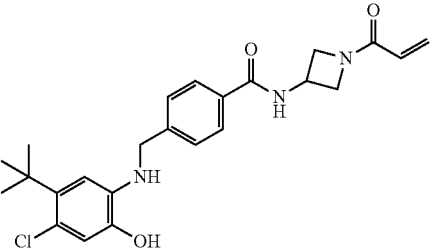 [SMILES: C=CC(=O)N1CC(NC(=O)c2ccc(CNc3cc(C(C)(C)C)c(Cl)cc3O)cc2)C1] | 1H-NMR (CDCl3) δ: 7.76 (d, J = 8.1 Hz, 2H), 7.46 (d, J = 8.4 Hz, 2H), 6.74 (s, 1H), 6.64 (br s, 1H), 6.57 (s, 1H), 6.34 (d, J = 16.5 Hz, 1H), 6.17 (dd, J = 16.9, 10.3 Hz, 1H), 5.70 (dd, J = 10.3, 1.8 Hz, 1H), 4.92-4.87 (m, 1H), 4.65-4.60 (m, 1H), 4.51-4.44 (m, 1H), 4.40 (s, 2H), 4.14-4.08 (m, 1H), 4.04-3.99 (m, 1H), 1.33 (s, 9H). | 442 |
| 4 | 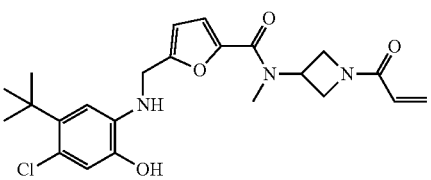 [SMILES: C=CC(=O)N1CC(N(C)C(=O)c2ccc(CNc3cc(C(C)(C)C)c(Cl)cc3O)o2)C1] | 1H-NMR (CDCl3) δ: 7.00 (d, J = 3.7 Hz, 1H), 6.72 (s, 1H) 6.60 (s, 1H), 6.44-6.36 (m, 2H), 6.17 (dd, J = 16.9, 10.3 Hz, 1H), 5.77 (d, J = 10.3 Hz, 1H), 4.45 (s, 2H), 4.35-4.07 (m, 5H), 3.12 (s, 3H), 1.35 (s, 9H). | 446 |

TABLE 1-continued

| Example | Structure | NMR | MS [M + H]+ |
|---|---|---|---|
| 5 | 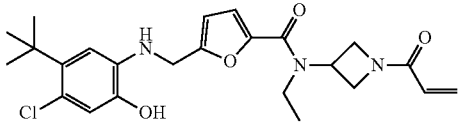 [SMILES: C=CC(=O)N1CC(N(CC)C(=O)c2ccc(CNc3cc(C(C)(C)C)c(Cl)cc3O)o2)C1] | 1H-NMR (CDCl3) δ: 7.01 (d, J = 3.3 Hz, 1H), 6.67 (s, 1H), 6.58 (s, 1H), 6.46-6.34 (m, 2H), 6.17 (dd, J = 16.9, 10.3 Hz, 1H), 5.79 (dd, J = 10.4, 1.3 Hz, 1H), 4.59-4.51 (m, 1H), 4.49-4.46 (m, 2H), 4.32-4.21 (m, 2H), 4.15-3.99 (m, 2H), 3.59 (q, J = 6.8 Hz, 2H), 1.34 (s, 9H), 1.22 (t, J = 6.8 Hz, 3H) | 460 |
| 6 | 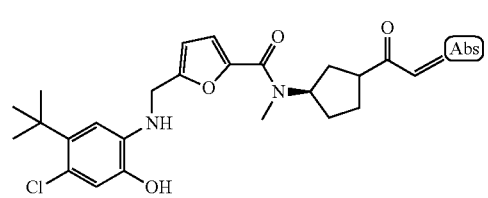 [SMILES: C=CC(=O)C1CC[C@@H](N(C)C(=O)c2ccc(CNc3cc(C(C)(C)C)c(Cl)cc3O)o2)C1] | 1H-NMR (CDCl3) δ: 7.02-6.96 (m, 1H), 6.79-6.56 (m, 2H), 6.49-6.44 (m, 1H), 6.40-6.35 (m, 2H), 5.84-5.69 (m, 1H), 4.44-4.37 (m, 2H), 3.87-3.67 (m, 2H), 3.49-3 31 (m, 2H), 3.04-2.94 (m, 3H), 2.15-2.03 (m, 1H), 1.94-1.83 (m, 1H), 1.40-1.33 (m, 9H). | 460 |
| 7 | 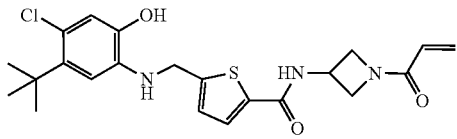 [SMILES: C=CC(=O)N1CC(NC(=O)c2ccc(CNc3cc(C(C)(C)C)c(Cl)cc3O)s2)C1] | 1H-NMR (DMSO-d6) δ 9.61 (s, 1H), 8.95 (d, J = 7.3 Hz, 1 H), 7.62 (d, J = 3.7 Hz., 1H), 7.06 (d, J = 3.7 Hz, 1H), 6.63 (s, 1H), 6.49 (s, 1H), 6.32(dd, J = 17.0, 10.2 Hz, 1H), 6.10 (dd, J = 16.8, 2.2 Hz, 1H) , 5.63 – 5.72 (m, 1H), 5.57 (t, J = 6.1 Hz. 1H), 4.65 (br d, J = 7.6 Hz, 1H), 4.41 – 4.55 (m, 3 H), 4.08 – 4.23 (m, 2H), 3.90 (dd, J = 10.4, 5.7 Hz, 1H), 1.28 (s, 9H) | 448 |
| 8 | 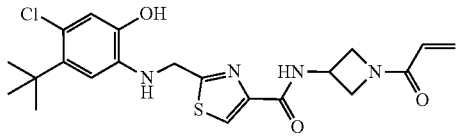 [SMILES: C=CC(=O)N1CC(NC(=O)c2csc(CNc3cc(C(C)(C)C)c(Cl)cc3O)n2)C1] | 1H-NMR (DMSO-d6) δ: 9.71 (s, 1H), 9.16 (d, J = 7.8 Hz, 1 H), 8.17(s,1H), 6.66 (s, 1H), 6.45 (s, 1H), 6.32(dd, J = 17.0, 10.2 Hz, 1H), 6.11 (dd, J = 16.9, 2.3 Hz, 1H), 5.93 (t, J = 6.10 Hz, 1H), 5.67 (dd, J = 10.4, 2.3 Hz, 1H), 4.76 (br d, J = 7.8 Hz, 1H), 4.62 (d, J = 5.9 Hz, 2H), 4.50 (t, J = 8.5 Hz, 1H), 4.13 – 4.27 (m, 2H), 3.94 – 4.06 (m, 1H) 1.99 (s, 1H), 1.24 (s, 9H) | 449 |

TABLE 2

| Example | Structure | NMR | MS [M + H]+ |
|---|---|---|---|
| 9 | 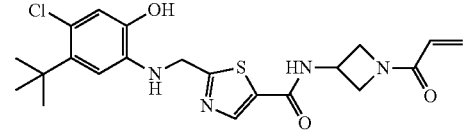 [SMILES: C=CC(=O)N1CC(NC(=O)c2cnc(CNc3cc(C(C)(C)C)c(Cl)cc3O)s2)C1] | 1H-NMR (DMSO-d6) δ: 9.64 (s, 1H), 9.50 (d, J = 7.6 Hz, 1 H), 7.91 (s, 1H), 6.63 (s, 1H), 6.53 (s, 1H), 6.25-6.34 (m, 1H), 6.05 – 6.13 (m, 1H), 5.59 – 5.70 (m, 2H), 4.64 – 4.74 (m, 1H), 4.59 (d, J = 6.3 Hz, 2H), 4.47 (t, J = 8.3 Hz, 1H), 4.12 – 4.26 (m, 2H), 3.94 – 4.07 (m, 3H), 1.30 (s, 9H) | 449 |
| 10 | 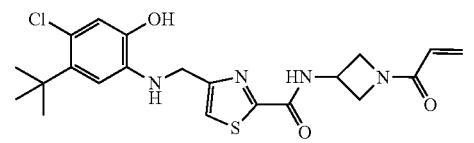 [SMILES: C=CC(=O)N1CC(NC(=O)c2nc(CNc3cc(C(C)(C)C)c(Cl)cc3O)cs2)C1] |  | 449 |
| 11 | 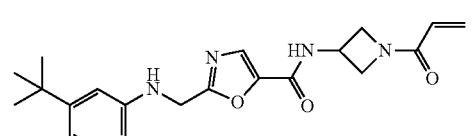 | 1H-NMR (CDCl3) δ: 7.66 (s, 1H), 6.76 (s, 1H), 6.69 (s, 1H), 6.34 (dd, J = 17.0, 1.8 Hz, 1H), 6.18 (dd, J = 17.0, 10.5 Hz, 1H), 5.75 (dd, J = 10.5, 1.8 Hz, 1H), 4.89-4.80 (m, 1H), 4.63-4.58 (m, 1H), 4.54 (s, 2H), 4.44-4.38 (m, 1H), 4.14-4.10 (m, 1H), 4.07-4.03 (m, 1H), 1.38 (s, 9H). | 433 |
| 12 | 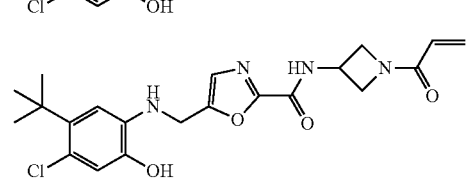 | 1H-NMR (CDCl3) δ: 7.65 (d, J = 7.8 Hz, 1H), 7,05 (s, 1H), 6.78 (s, 1H), 6.69 (s, 1H), 6.38 (dd. J = 16.9, 1.6 Hz, 6.17 (dd, J = 16.9, 10.5 Hz, 1H), 5.74 (dd, J = 10.5, 1.6 Hz, 1H), 4.94-4.87 (m. 1H), 4 63-4.59 (m, 1H), 4.49-4.45 (m, 1H), 4.45 (s, 2H), 4.19-4.14 (m, 1H), 4.09-4.05 (m, 1H), 1.40 (s, 9H) | 433 |

TABLE 2-continued

| Example | | NMR | MS [M + H]⁺ |
|---|---|---|---|
| 13 | 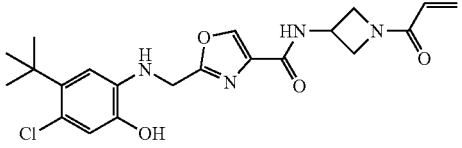 [SMILES: C=CC(=O)N1CC(NC(=O)c2coc(CNc3cc(C(C)(C)C)c(Cl)cc3O)n2)C1] | 1H-NMR (CDCl3) δ: 8.20 (s, 1H), 8.01 (d, J = 7.1 Hz, 1H), 6.75 (s, 1H), 6.67 (s, 1H), 6.34 (dd, J = 16.9, 1.7 Hz, 1H), 6.18 (dd, J = 16.9, 10.3 Hz, 1H), 5.73 (dd J = 10.3, 1.7 Hz, 1H), 4.92-4.84 (m, 1H) 4.63-4.58 (m, 1H), 4.48 (s, 2H) 4.48-4.4.43 (m, 1H), 4.18-4.14 (m, 1H), 4.08-4.04 (m, 1H), 1.40 (s, 9H). | 433 |
| 14 | 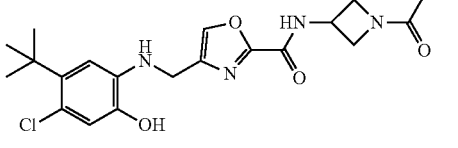 | 1H-NMR (CDCl3) δ: 7.82 (d, J = 7.6 Hz, 1H), 7.70 (s, 1H), 6.79 (s, 1H), 6.70 (s, 1H), 6.36 (dd, J = 17.1, 1.6 Hz, 1H), 6.14 (dd J = 17.1, 10.4 Hz, 1H), 5.72 (dd, J = 10.4, 1.6 Hz, 1H), 4.94-4.84 (m, 1H), 4.61-4.57 (m, 1H), 4.49-4.44 (m, 1H), 4.28 (s, 2H), 4.19-4.13 (m, 1H), 4.10-4.04 (m, 1H), 1.40 (s, 9H). | 433 |
| 15 | 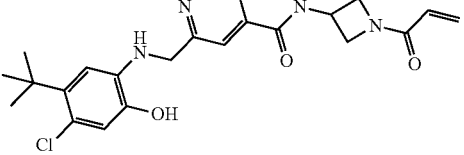 | 1H-NMR(DMSO-d6) δ: 9.63 (s, 1H), 9.31 (d, J = 7.0 Hz, 1H), 8.69 (dd, J = 0.6, 5.1 Hz, 1H), 7.81 (s, 1H), 7.67 (dd, J = 1.6, 5.2 Hz, 1H), 6.65 (s, 1H), 6.45 (s, 1H), 6.33 (dd, J = 10.3, 17.0 Hz, 1H), 6.11 (dd, J = 2 3, 16.9 Hz, 1H), 5.63-5.73 (m, 2H), 4.66-4.77 (m, 1H), 4.3 (t, J = 8.3 Hz, 1H), 4.44 (d, J = 5.6 Hz, 2H), 4.11-4.26 (m,2H), 3.90-3.97 (m, 1H), 1.27 (s, 9H) | 443 |
| 16 |  | 1H-NMR(DMSO-d6) δ: 9.61 (s, 1H), 9.46 (d, J = 7.3 Hz, 1H), 8.58 (d, J = 4.9 Hz, 1H), 8.02 (s, 1H), 7.57 (d, J = 5.1 Hz, 1H), 6.64 (s, 1H), 6.20-6.35(m, 2H), 6.09(dd, J = 17.0, 2.3 Hz, 1H), 5.75(t, J = 6.3 Hz, 1H), 5.61-5.69 (m, 1H), 4.70-4.83 (m, 1H), 4.36-4.54 (m, 3H), 4.12-4.31 (m, 2H), 3.93-4 07 (m, 2H), 1.20 (s, 9H) | 443 |

TABLE 3

| Example | | NMR | MS [M + H]⁺ |
|---|---|---|---|
| 17 | 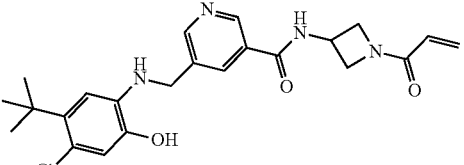 | | 443 |
| 18 | 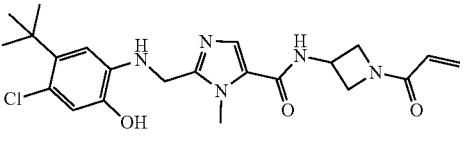 [SMILES: C=CC(=O)N1CC(NC(=O)c2cnc(CNc3cc(C(C)(C)C)c(Cl)cc3O)n2C)C1] | 1H-NMR(DMSO-d6) δ: 9.59 (s, 1H), 8.77 (d, J = 7.1 Hz, 1H), 7.56 (s, 1H), 6.85 (s, 1H), 6.63 (s, 1H), 6.33 (dd, J = 10.3, 16.9 Hz, 1H), 6.11 (dd, J = 2.3, 17.0 Hz, 1H), 5.68 (dd, J = 2.1, 10.3 Hz, 1H), 5.45 (t, J = 5.4 Hz, 1H), 4.47-4.72 (m, 2H), 4.36 (d, J = 5.4 Hz, 2H), 4.08-4.23 (m, 2H), 3.86-3.94 (m, 1H) 3.84 (s, 3H), 1.3-1.4 (m, 9H) | 446 |
| 19 | 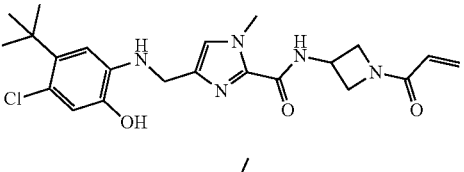 | 1H-NMR(DMSO-d6) δ: 9.53 (s, 1H), 9.08 (d, J = 7.8 Hz, 1H), 7.20 (s, 1H), 6.59-6.67 (m, 2H), 6.28 (d, J = 10.2 Hz, 1H) 6.12 (d, J = 2.2 Hz, 1H), 5.66 (brd, J = 10.5 Hz, 1H), 4.92 (t, J = 5.6 Hz, 1H), 4.70 (brd, J = 8.1 Hz,1H) 4.47(t, J = 8.3 Hz, 1H), 4.17 (brd, J = 5.9 Hz, 4H), 3.96-4.06 (m, 2H), 3.89 (s, 3H), 1.34 (s, 9H) | 446 |
| 20 | 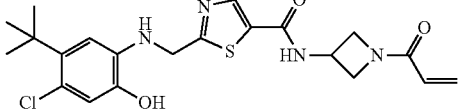 | 1H-NMR (CDCl3) δ: 8.12-7.86 (br m, 1H), 7.19-7.03 (br m, 1H), 6.80 (s, 1H), 6.60 (d, J = 1.8 Hz, 1H), 6.27 (dd, J = 16.9, 1.8 Hz, 1H), 6.09 (ddd, J = 16.9, 10.3, 1.8 Hz, 1H), 5.67 (dd, J = 10.4, 1.6 Hz, 1H), 4.84-4.70 (m, 2H), 4.63-4.51 (m, 1H), 4.59 (s, 2H), 4.43-4.36 (m, 1H), 4.16-4.08 (m, 1H), 4.01 (dd, J = 10.8, 4.9 Hz, 1H), 2.68 (s, 3H), 1.33 (s, 9H). | 463 |

TABLE 3-continued

| Example | NMR | MS [M + H]+ |
|---|---|---|
| 21 | 1H-NMR (CDCl3) δ: 6.99 (d, J = 7.7 Hz, 1H), 6.81 (s, 1H), 6.72 (s, 1H), 6.36 (dd, J = 16.9, 1.5 Hz, 1H), 6.21-6.13 (m, 2H), 5.72 (dd, J = 10.4, 1.6 Hz. 1H), 4.88-4.80 (m, 1H), 4.59-4.54 (m, 1H), 4.48-4.42 (m, 1H), 4.29 (s, 2H), 4.14-4.08 (m, 1H), 4.02 (dd, J = 11.0, 5.1 Hz, 1H), 2.33 (s, 3H), 1.40 (s, 9H). | 446 |
| 22 | 1H-NMR (CDCl3) δ: 7.64 (1H, d, J = 7.7 Hz), 7.43 (1H, s), 7.33 (1H, d, J = 8.1 Hz), 7.01 (1H, d, J = 7.0 Hz), 6.76 (1H, s), 6.55 (1H, s), 6.35 (1H, dd, J = 16.9 Hz), 6.16 (1H, dd, J = 16.9, 10.3 Hz), 5.71 (1H, d, J = 10.3 Hz), 4.86 (1H, t, J = 6.2 Hz), 4.61 (1H, t, J = 8.6 Hz), 4.44 (1H, t, J = 9.5 Hz), 4.34 (2H, s), 4.21 (1H, t, J = 6.0 Hz), 4.14 (1H, t, J = 7.1 Hz), 3.97 (1H, dd, J = 11.0, 5.1 Hz), 1.35 (9H, s). | 476 |
| 23 | 1H-NMR (CDCl3) δ: 8.05 (1H, d, J = 7.3 Hz), 7.52 (1H, d, J = 5.5 Hz), 7.18 (1H, dd, J = 13.0, 6.4 Hz), 7.11 (1H, dd, J = 11.5, 8.6 Hz), 6.74 (1H, s), 6.56 (1H, s), 6.36 (1H, d, J = 16.9 Hz), 6.17 (1H, dd, J = 16.9, 10.3 Hz), 5.71 (1H, d, J = 10.3 Hz), 4.89 (1H, d, J = 6.6 Hz), 4.62 (1H, t, J = 8.4 Hz), 4.47 (1H, t, J = 9.5 Hz), 4.34 (2H, s), 4.14 (1H, dd, J = 9.0, 4.9 Hz), 4.01 (1H, dd, J = 10.8, 5.3 Hz), 1.34 (9H, s). | 460 |
| 24 | 1H-NMR (DMSO-D6) δ: 9.69 (s, 1H), 9.45 (d, J = 6.6 Hz, 1H), 6.65 (s, 1H), 6.51 (s, 1H), 6.28 (dd, J = 16.9, 10.3 Hz, 1H), 6.08 (dd, J = 16.9, 2.2 Hz, 1H), 6.01 (t, J = 6.2 Hz, 1H), 5.65 (dd, J = 10.3, 2.2 Hz, 1H), 4.61 (d, J = 6.2 Hz, 2H), 4.64-4.57 (m, 1H), 4.49 (t, J = 8.4 Hz, 1H), 4.17 (t, J = 9.3 Hz, 1H), 4.04 (dd, J = 9.0, 5.7 Hz, 1H), 3.82 (dd, J = 10.4, 5.3 Hz, 1H) 1.27 (s, 9H). | 517 |

TABLE 4

| Example | NMR | MS [M + H]+ |
|---|---|---|
| 25 | 1H-NMR (DMSO-D6) δ: 9.58 (brs, 1H), 8.44 (brs, 1H), 7.61 (brs, 1H), 6.76 – 6.94 (m, 1H), 6.62 (brs, 1H), 6.28-6.37 (brs, 1H), 6.10 (brd, J = 17.1 Hz, 1H), 5.63 – 5.68 (m, 1H), 5.38 (brs, 1H), 4.71 (brs, 1H), 4.32-4.52 (m. 3H), 4.16 (brs, 2H), 3.87 – 3.96 (m. 1H), 3.67 (s, 3H), 1.32 (s 9H) | 446 |
| 26 | 1H-NMR (DMSO-D6) δ: 12.31 (s, 1H), 9.63 (s, 1H), 8.57 (d, J = 7.9 Hz, 1H), 7.54 (d, J = 2.3 Hz, 1H), 6.65 (s, 1H), 6.54 (s, 1H), 6.31 (dd, J = 10.3, 17.0 Hz, 1H), 6.10 (dd, J = 2.3, 17.0 Hz, 1H), 5.67 (dd, J = 2.4, 10.3 Hz, 1H), 5.26 (t, J = 5.6 Hz, 1H), 4.65-4.78 (m, 1H), 4.47 (t, J = 8.4 Hz, 1H), 4.32 (d, J = 5.6 Hz, 2H), 4.12-4.22 (m, 2H), 3.95 (dd, 1H, J = 5.9, 10.0 Hz), 1.3-1.3 (m, 9H) | 432 |
| 27 | 1H-NMR (DMSO-D6) δ: 9 57 (s, 1H), 8 83 (d, J = 7.7 Hz, 1H), 6.93 (s, 1H), 6.60 (s, 1H), 6.31 (dd J = 17.0, 10.4 Hz, 1H), 6.10 (dd, J = 17 0, 2.0 Hz, 1H), 5.67 (dd, J = 10.3, 2.2 Hz, 1H), 5.48 (t, J = 5 5 Hz, 1H), 4.74-4.66 (m, 1H), 4.52 (t, J = 8.4 Hz, 1H), 4.33 (d, J = 5.5 Hz, 2H), 4.20 (t, J = 9.2 Hz, 1H), 4 12 (dd, J = 8.6, 5.3 Hz, 1H), 3.91 (dd, J = 10.1, 5.3 Hz, 1H), 3.67 (s, 3H), 1.36 (s, 9H). | 572 |
| 28 | 1H-NMR (CDCl3) δ: 7.61 (s, 1H), 6.74-6.61 (brs, 1H), 6.51-6.38 (m, 2H), 6.19 (dd, J = 16.8, 10.2 Hz, 1H), 5.83 (brs, 1H), 4.79-4.00 (m, 7H), 3.11 (s, 3H), 1.31 (s, 9H). | 447 |

TABLE 4-continued

| Example | Structure | NMR | MS [M + H]+ |
|---|---|---|---|
| 29 | (structure) | | 463 |
| 30 | (structure) | 1H-NMR (CDCl3) δ: 7.82 (t, J = 7.7 Hz, 1H) 7.68 (d, J = 7.7 Hz, 1H), 7.43 d, J = 7.3 Hz, 1H), 6.69 (s, 1H), 6.49 (s, 1H), 6.38 (d, J = 16.5 Hz, 1H), 6.12 (dd, J = 16.9, 10.3 Hz, 1H), 5.74 (dd, J = 10.4, 1.6 Hz, 1H), 5.06-4.99 (m, 1H), 4.51 (s, 2H), 4.51-4.46 (m, 1H), 4.33-4.28 (m, 1H), 4.23 4.18 (m, 1H), 4.15-4.07 (m, 1H), 3.20 (s, 3H), 1.33 (s, 9H). | 457 |
| 31 | (structure) | 1H-NMR (DMSO-D6) δ: 9.70 (s, 1H), 8.04 (brs, 1H), 6.66 (s, 1H), 6.45 (s, 1H), 6.30 (dd, J = 17.1, 10.2 Hz, 1H), 6.10 (dd, J = 17.1, 2.2 Hz, 1H), 5.90 (t, J = 6.2 Hz, 1H), 5.64-5.71 (m, 1H), 5.07 (brt, J = 5.9 Hz, 1H), 4.59 (d, J = 5.9 Hz, 2H), 4.39 – 4.48 (m, 1H), 4.35 (brd, J = 5.1 Hz, 1H), 3.97 – 4.19 (m, 1H), 3.13 (brs, 3H), 1.26 (s, 9H) | 463 |
| 32 | (structure) | 1H-NMR (DMSO-D6) δ: 9.70 (s, 1H), 8.00 (s, 1H) 6.66 (s, 1H) 6.45 (s, 1H), 6.32 (dd, J = 16.8, 10.7 Hz, 1H), 6.11 (dd, J = 17.0, 2.3 Hz, 1H), 5.89 (t, J = 6.0 Hz, 1H), 5.61-5.73 (m, 1H), 5.05-5.09 (m, 1H), 4.62 (d, J = 5.9 Hz, 2H), 4.37 (brs, 2H), 3.98 – 4.17 (m, 2H), 3.08 (brs, 3H), 1.24 (s, 9H) | 463 |

TABLE 5

| Example | Structure | NMR | MS [M + H]+ |
|---|---|---|---|
| 33 | (structure) | 1H-NMR (CDCl3) δ: 7.67 (s, 1H), 6.76 (s, 1H), 6.74 (s, 1H), 6.38 (dd, J = 17.0, 1.6 Hz, 1H), 6.35 (s, 1H), 6.19 (dd, J = 16.9, 10.3 Hz, 1H), 5.74 (dd, J = 10.3, 1.8 Hz, 1H), 5.11 (br s, 1H), 4.50-4.39 (m, 1H), 4.34 (s, 2H), 4.31-4.24 (m, 3H), 4.19-4.12 (m, 1H), 3.15 (s, 3H), 1.41 (s, 9H). | 446 |
| 34 | (structure) | 1H-NMR (CDCl3) δ: 7.48 (s, 1H), 7.06 (s, 1H), 6.77 (s, 1H), 6.70 (s, 1H), 6.39 (dd, J = 17.0, 1.6 Hz, 1H), 6.20 (dd, J = 17.0, 10.4 Hz, 1H), 5.74 (dd, J = 10.4, 1.6 Hz 1H), 5.28-5.20 (m, 1H), 4.51 (t, J = 8.6 Hz, 1H), 4.38-4.27 (m, 2H), 4.23-4.17 (m, 1H), 4.20 (s, 2H), 3.24 (s, 3H), 1.41 (s, 9H). | 446 |
| 35 | (structure) | 1H-NMR (CDCl3) δ: 7.83 (br s, 1H), 6.77 (s, 1H), 6.67 (s, 1H), 6.39 (dd, J = 17.0, 1.6 Hz, 1H), 6.18 (dd, J = 16.9, 10.3 Hz, 1H), 5.76 (dd, J = 10.4, 1.6 Hz, 1H), 4.99 (br s, 1H), 4.77-4.60 (m, 1H), 4.63 (s, 2H), 4.52-4.42 (m, 1H), 4.36-4.26 (m, 2H), 4.23-4.15 (m, 1H), 3.09 (s, 3H), 2.44 (s, 3H), 1.36 (s, 8H). | 477 |
| 36 | (structure) | 1H-NMR (DMSO-D6) δ: 9.58 (s, 1H), 8.75 (d, J = 7.1 Hz, 1H), 7.58 (s, 1H), 6.87 (s, 1H), 6.62 (s, 1H), 6.33 (dd, J = 10.3, 17.0 Hz, 1H), 6.11 (dd, J = 2.1, 16.9 Hz, 1H), 5.68 (dd, J = 2.3, 10.3 Hz, 1H), 5.48 (t, J = 5.4 Hz, 1H), 4.62-4.72 (m, 1H), 4.51 (t, J = 8.5 Hz, 1H), 4.33-4 43 (m, 4H), 4.08-4.23 (m, 2H), 3.90 (dd, J = 5.5, 10.1 Hz, 1H), 1.36 (s, 9H), 1.21 (t, J = 6.9 Hz, 3H). | 460 |
| 37 | (structure) | 1H-NMR (CDCl3) δ: 7.56 (s, 1H), 6.99 (s, 1H), 6.94 (br d, J = 6.6 Hz, 1H), 6.90 (s, 1H), 6.37 (dd, J = 1.8, 17.0 Hz, 1H), 6.18 (dd, J = 10.3, 16.9 Hz, 1H), 5.73 (dd, J = 1.8, 10.4 Hz, 1H), 4.77-4.87 (m, 1H), 4.60 (t, J = 8.5 Hz, 1H), 4.40-4.52 (m, 5H), 4.01-4.16 (m, 2H), 3.69 (t, J = 4.6 Hz, 2H), 3.27 (s, 3H), 1.44 (s, 9H) | 490 |

TABLE 5-continued

| Example | NMR | MS [M + H]+ |
|---|---|---|
| 38 | | 503 |
| 39 | 1H-NMR (DMSO-D6) δ: 9.54 (s, 1H), 8.43 (d, J = 7.1 Hz, 1H), 6.92 (s, 1H), 6.61 (s, 1H), 6.31 (dd, J = 17.0, 10.4 Hz, 1H), 6.09 (dd, J = 16.8, 2 2 Hz, 1H), 5.66 (dd, J = 10.2, 2.2 Hz, 1H), 5.38 (t, J = 5.4 Hz, 1H), 4.72-4.64 (m, 1H), 4.50 (t, J = 8.2 Hz, 1H), 4.28 (d, J = 5.4 Hz, 2H), 4.21-4.15 (m, 1H), 4.13-4.08 (m, 1H), 3.91-3.85 (m, 1H), 3.65 (s, 3H), 2.24 (s, 3H), 1.35 (s, 9H). | 460 |
| 40 | 1H-NMR (DMSO-D6) δ: 9.56 (s, 1H), 8.56 (d, J = 7.0 Hz, 1H), 7.21-7.32 (m, 3H), 7.05-7.10 (m, 2H), 6.94 (s, 1H), 6.62 (s, 1H), 6.28 (dd, J = 10.3, 17.0 Hz, 1H), 6.09 (dd, J = 2.3, 17.0 Hz, 1H), 5.67 (dd, J = 2.3, 10.3 Hz, 1H), 5.44-5.53 (m, 3H), 4.49-4.60 (m, 1H), 4.44 (t, J = 8.5 Hz, 1H), 4.29 (d, J = 5.3 Hz, 2H), 4.09-4.16 (m, 1H), 3.90 (dd, J = 5.3, 8.6 Hz, 1H), 3.72 (dd, J = 5.4, 10.3 Hz, 1H), 2.26 (s, 3H), 1.37 (s, 9H) | 536 |

TABLE 6

| Example | NMR | MS [M + H]+ |
|---|---|---|
| 41 | | 474 |
| 42 | 1H-NMR (DMSO-D6) δ: 9.57 (s, 1H), 8.83 (d, J = 6.8 Hz, 1H), 6.96 (s, 1H), 6.62 (s, 1H), 6.33 (dd, J = 10.3, 16.9 Hz, 1H), 6.11 (dd, J = 2,1. 16.9 Hz, 1H), 5 68 (dd, J = 2.3, 10.3 Hz, 1H), 5.36 (t, J = 5.4 Hz, 1H), 4.77 (spt, J = 6.8 Hz, 1H), 4.50-4.69 (m, 2H), 4.32 (d, J = 5.5 Hz, 2H), 4.18-4.25 (m, 1H), 4.09 (dd, J = 5.5, 8.9 Hz, 1H), 3.86 (dd, J = 5.3, 10.1 Hz, 1H), 2.17 (s, 3H), 1.41 (d, J = 6.0 Hz, 6H), 1.38 (s, 9H) | 489 |
| 43 | 1H-NMR (DMSO-D6) δ: 9.57 (s, 1H), 8.55 (d, J = 7.0 Hz, 1H), 6.95 (s, 1H), 6.62 (s, 1H), 6.33 (dd, J = 10.3, 16.9 Hz, 1H), 6.11 (dd, J = 2.3, 17.0 Hz, 1H), 5.68 (dd, J = 2.3, 10.3 Hz, 1H), 5.41 (t, J = 5.4 Hz, 1H), 4.60-4.72 (m, 1H), 4.53 (t, J = 8.4 Hz, 1H), 4.30 (d, J = 5.3 Hz, 2H), 4.14-4.24 (m, 3H), 4.10 (dd, J = 5.4, 8.8 Hz, 1H), 3.87 (dd, J = 5.5, 10.3 Hz, 1H), 2.25 (s, 3H), 1.45-1.55 (m, 2H), 1.37 (s, 9H), 1.17-1.29 (m, 2H), 0.85 (t, J = 7.3 Hz, 3H) | 503 |
| 44 | | 488 |

TABLE 6-continued

| Example | NMR | MS [M + H]+ |
|---|---|---|
| 45 | 1H-NMR (DMSO-D6) δ: 9.57 (s, 1H), 8.83 (d, J = 6.8 Hz, 1H), 6.97 (s, 1H), 6.62 (s, 1H), 6.33 (dd, J = 10.3, 16.9 Hz, 1H), 6.11 (dd, J = 2.3, 16.9 Hz, 1H), 5.68 (dd, J = 2.3, 10.3 Hz, 1H), 5.37 (t, J = 5.4 Hz, 1H), 4.88 (quin, J = 8.9 Hz, 1H), 4.57-4.67 (m, 1H), 4.53 (t, 8.4 Hz, 1H), 4.32 (d, J = 5.5 Hz, 2H), 4.17-4.25 (m, 1H), 4.08 (dd, J = 5.3, 8.6 Hz, 1H), 3.84 (dd, J = 5.3, 10.3 Hz, 1H), 2.17 (s, 3H), 1.87-2.06 (m, 4H), 1.69-1.81 (m, 2H), 1.50-1.63 (m, 2H), 1.38 (s, 9H) | 514 |
| 46 | | 537 |
| 47 | 1H-NMR (CDCl3) δ: 7.45 (d, J = 7.3 Hz, 1H), 7.06 (d, J = 3.4 Hz, 1H), 6.82 (s, 1H), 6.49 (s, 1H), 6.36-6.32 (m, 2H), 6.15 (dd, J = 17.0, 10.4 Hz, 1H), 5.72 (dd, J = 10.5, 1.5 Hz, 1H), 5.16-5.13 (m, 1H), 4.91-4.84 (m, 2H), 4.59-4.55 (m, 1H), 4.47-4.42 (m, 1H), 4.34-4.29 (m, 2H), 4.15-4.4.11 (m, 1H), 4.08-4.04 (m, 1H), 2.05 (s, 3H). | 416 |
| 48 | 1H-NMR (CDCl3) δ: 7.59 (d, J = 7.3 Hz, 1H), 7.06 (d, J = 3.4 Hz, 1H), 6.80 (s, 1H), 6.54 (s, 1H), 6.37-6.30 (m, 2H), 6.13 (dd, J = 17.2, 10.4 Hz, 1H), 5.71 (dd, J = 10.4, 1.2 Hz, 1H), 4.91-4.82 (m, 1H), 4.57-4.53 (m, 1H), 4.45-4.40 (m, 1H), 4.32 (s, 2H), 4.13-4.04 (m, 2H), 3.29-3.22 (m, 1H), 1.15 (d, J = 6.8 Hz, 6H). | 418 |

TABLE 7

| Example | NMR | MS [M + H]+ |
|---|---|---|
| 49 | 1H-NMR (CDCl3) δ: 7.00 (d, J = 3.6 Hz, 1H), 6.73 (s, 1H), 6.45-6.36 (m, 3H), 6.15 (dd, J = 17.0, 10.6 Hz. 1H), 5.81 (d, J = 10.6 Hz, 1H), 4.47-4.09 (m, 7H), 3.41 (s, 3H). | 474 |
| 50 | 1H-NMR (CDCl3) δ: 9.46 (s, 1H), 7.31 (d, J = 7.6 Hz, 1H), 7.06 (d, J = 3.4 Hz, 1H), 6.94 (s, 1H), 6.38 (s, 1H), 6.37-6.31 (m, 2H), 6.14 (dd, J = 17.0, 10.4 Hz, 1H), 5.74 (dd, J = 10.4, 1.2 Hz, 1H) 4.90-4.82 (m, 1H), 4.67-4.55 (m, 1H), 4.48-4.42 (m, 1H), 4.32 (s, 2H), 4.18-4.12 (m, 1H), 4.07-4.03 (m, 1H). | 444 |
| 51 | 1H-NMR (CDCl3) δ: 7.07-7.01 (m, 2H), 6.87 (s, 1H), 6.51 (s, 1H), 6.37-6.33 (m, 2H), 6.16 (dd, J = 17.1, 10.6 Hz, 1H), 5.73 (dd, J = 10.6, 1.2 Hz, 1H), 4.90-4.83 (m, 1H), 4.62-4.55 (m, 1H), 4.49-4 43 (m, 1H), 4.33 (s, 2H), 4.16-4.08 (m, 1H), 4.06-3.99 (m, 1H), 2.82-2.70 (m, 1H), 1.88-1.77 (m, 1H), 1.49-1.38 (m, 1H). | 452 |
| 52 | 1H-NMR (CDCl3) δ: 7.15 (d, J = 8 0 Hz, 1H), 7.06 (d, J = 3 4 Hz, 1H), 6.81 (s, 1H), 6.37-6.32 (m, 2H), 6.25 (s, 1H), 6.16 (dd, J = 17.0, 10.4 Hz, 1H), 5.72 (dd, J = 10.4, 1.6 Hz, 1H), 4.91-4.82 (m, 1H), 4.60-4.54 (m, 1H), 4.49-4.41 (m, 1H), 4.31 (s, 2H), 4.13-4.08 (m, 1H), 4.07-3.99 (m, 1H), 2.08-1.99 (m, 1H), 0.93-0.87 (m, 2H), 0.55-0.51 (m, 2H). | 416 |

TABLE 7-continued

| Example | | NMR | MS [M + H]+ |
|---|---|---|---|
| 53 | 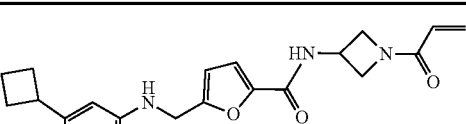 | 1H-NMR (CDCl3) δ: 7.11 (d J = 7.6 Hz, 1H), 7.07 (d, J = 3.2 Hz, 1H), 6.78 (s, 1H), 6.62 (s, 1H), 6.37-6.33 (m, 2H), 6.16 (dd, J = 16.8, 10.2 Hz, 1H), 5.72 (dd, J = 10.2, 1.4 Hz, 1H), 4.90-4.83 (m, 1H), 4.60-4.54 (m, 1H), 4.49-4.42 (m, 1H), 4.37 (s, 2H), 4.13-4.07 (m 1H), 4.06-3.99 (m, 1H), 3.74-3.62 (m, 1H), 2.36-2.28 (m, 2H), 2.06-1.92 (m, 3H), 1.82-1.73 (m, 1H). | 430 |
| 54 | | 1H-NMR (CD3OD) δ: 7.58 (s, 1H), 6.93 (s, 1H), 6.77 (s. 1H), 6.34 (dd, J = 17 0, 10.1 Hz, 1H), 6.24 (dd, J = 16.9, 2,2 Hz, 1H), 5.74 (dd, J = 10.3, 2.2 Hz, 1H), 4.79-4.75 (m, 1H), 4.65-4.59 (m, 1H), 4.50 (s, 2H), 4.40-4.35 (m, 1H), 4.24 (dd, J = 9.2, 5.5 Hz, 1H), 4.05 (dd, J = 11.0, 5.5 Hz, 1H), 3.93 (s, 3H). | 458 |
| 55 | | 1H-NMR (DMSO-D6) δ: 9.88 (s, 1H), 8.76 (d, J = 7.1 Hz, 1H), 7.55 (s, 1H), 6,71 (s, 1H), 6.66 (s, 1H), 6.31 (dd, J = 16.8, 10.2 Hz, 1H), 6.10 (dd, J = 16.8, 2.2 Hz, 1H), 5.66 (dd, J = 10.2, 2.2 Hz, 1H), 5.53-5.49 (m, 1H), 4.69-4.61 (m, 1H), 4.52-4.47 (m, 1H), 4.34 (d, J = 4.9 Hz, 2H), 4.20-4.13 (m, 1H), 4.13-4.07 (m, 1H), 3.92-3,86 (m, 1H), 3.81 (s, 3H), 2.85-2.77 (m, 1H), 1.98-1.88 (m, 1H), 1.83-1.73 (m, 1H). | 466 |
| 56 | | 1H-NMR (DMSO-D6) δ: 10.06 (s, 1H), 8.76 (d, J = 7.3 Hz, 1H), 7.55 (s, 1H), 6.77 (s, 1H), 6.72 (s, 1H), 6.31 (dd, J = 17.0, 10.3 Hz, 1H), 6.10 (dd, J = 17.0, 2.2 Hz. 1H), 5.66 (dd, J = 10.3, 2.2 Hz, 1H), 5.55-5.52 (m, 1H), 4.69-4.62 (m, 1H), 4.53-4.47 (m, 1H), 4.32 (d, J = 5.1 Hz, 2H), 4.21-4.15 (m, 1H), 4.13-4.07 (m. 1H), 3.92-3.86 (m, 1H), 3.82 (s, 3H), 3.54-3.45 (m, 2H) | 472 |

TABLE 8

| Example | | NMR | MS [M + H]+ |
|---|---|---|---|
| 57 | | 1H-NMR (CDCl3) δ: 7.54 (s, 1H), 6.85 (s, 1H), 6.57 (s, 1H), 6.35 (dd, J = 17.1, 1.8 Hz, 1H), 6.19 (dd, J = 17.1, 10.4 Hz, 1H), 6.13 (d, J = 1.2 Hz, 1H), 5.73 (dd, J = 10.4, 1.8 Hz, 1H), 5.59 (d, J = 1.2 Hz, 1H), 4.85-4.76 (m, 1H), 4.62-4.56 (m, 1H), 4.44-4 36 (m, 1H), 4.36 (s, 2H), 4.16-4.06 (m, 2H), 3.91 (s, 3H). | 484 |
| 58 | | 1H-NMR (DMSO-D6) δ: 11.18 (brs, 1H), 8.79 (d, J = 7.1 Hz, 1H), 7.55 (s, 1H), 7.34 (s, 1H), 6.79 (s, 1H), 6.32 (dd, J = 10.3, 16.9 Hz, 1H), 6.11 (dd, J = 2.3, 17.0 Hz, 1H), 6.07 (t, J = 4.8 Hz, 1H), 5.68 (dd, J = 2.1, 10.3 Hz, 1H), 4.60-4.72 (m, 1H), 4.50 (t, 1H, J = 8.4 Hz), 4.41 (br d, 2H, J = 4.3 Hz), 4.09-4.23 (m, 2H), 3.90 (dd, J = 5.4, 10.2 Hz, 1H), 3.83 (s, 3H) | 516 |
| 59 | | 1H-NMR (DMSO-D6) δ: 10.03 (s, 1H), 0.77 (d, J = 6.8 Hz, 1H), 7.54 (s, 1H), 6.86 (s, 1H), 6.69 (s, 1H), 6.31 (dd, J = 16.5, 10.4 Hz, 1H), 6.09 (d, J = 16.5 Hz, 1H), 5.70-5.83 (m, 2H), 4.68-4.60 (m, 1H), 4.52-4.45 (m, 1H), 4.40-4.26 (m, 2H), 4.20-4.13 (m, 1H), 4.13-4.07 (m, 1H), 3.97-3.85 (m, 2H), 3.82 (s, 3H), 1.37 (d, J = 6.6 Hz, 3H). | 486 |
| 60 | | 1H-NMR (DMSO-D6) δ: 9.60 (s, 1H), 8 77 (d, J = 7.3 Hz, 1H), 7.55 (s, 1H), 6.74 (s, 1H), 6.60 (s, 1H), 6.31 (dd, J = 16.8, 10.7 Hz, 1H), 6.10 (dd, J = 16.8, 2.4 Hz, 1H), 5.67 (dd, J = 10.7, 2.4 Hz, 1H), 5.47-5.43 (m, 1H), 4.70-4.59 (m, 1H), 4.51-4.44 (m, 1H), 4.34 (d, J = 4.4 Hz, 2H), 4.20-4.15 (m, 1H), 4.12-4.07 (m, 1H), 3.90-3.86 (m, 1H), 3.82 (s, 3H), 3.12-3.06 (m, 1H), 1.10 (d, J = 6.8 Hz, 6H). | 432 |

TABLE 8-continued

| Example | NMR | MS [M + H]+ |
|---|---|---|
| 61 | 1H-NMR (DMSO-D6) δ: 9.60 (s, 1H), 8.77 (d, J = 6.8 Hz, 1H), 7.56 (s, 1H), 6.65 (s, 1H), 6.63 (s, 1H), 6.31 (dd, J = 17.0, 10.4 Hz, 1H), 6.10 (dd, J = 17.0, 2.2 Hz, 1H), 5.66 (dd, J = 10.4. 2.2 Hz, 1H), 5.40-5.35 (m, 1H), 4.69-4.61 (m, 1H), 4.53-4.45 (m, 1H), 4.33 (d, J = 5.1 Hz, 2H), 4.20-4.16 (m, 1H), 4.12-4.08 (m, 1H), 3.91-3.87 (m, 1H), 3.82 (s, 3H), 2.49-2.46 (m, 2H), 1.08 (t. J = 7.6 Hz, 3H). | 418 |
| 62 | 1H-NMR (DMSO-D6) δ: 9.80 (s, 1H), 8.60 (d, J = 7.1 Hz, 1H), 7.39 (s, 1H), 6.65 (s, 1H), 6.50 (s, 1H), 6.16 (dd, J = 17.0, 10.3 Hz, 1H), 5.95 (dd, J = 17.0. 1.8 Hz, 1H), 5.51 (dd, J = 10.3, 1.8 Hz, 1H), 5.35-5.30 (m, 1H), 4.54-4.45 (m, 1H), 4.38-4.29 (m, 1H), 4.19 (d, J = 4.4 Hz, 2H), 4.06-4.00 (m, 1H), 3.97-3.91 (m, 1H), 3 77-3.70 (m, 1H), 3.67 (s, 3H), 0.10 (s, 9H). | 462 |
| 63 | 1H-NMR (CDCl3) δ: 7.53 (s, 1H), 6.77 (s, 1H), 6.63 (s, 1H), 6.34 (dd, J = 17.2, 1.6 Hz, 1H), 6.19 (dd, J = 17.2, 10.2 Hz, 1H), 5.74 (dd, J = 10.2, 1.8 Hz, 1H), 4.84-4.77 (m, 1H), 4.51-4.56 (m, 1H), 4.43-4.37 (m, 1H), 4.38 (s, 2H), 4.19-4.12 (m, 1H), 4.10-4.03 (m, 1H), 3.92 (s, 3H), 1.58-1.49 (m, 1H), 1.49-1.37 (m, 1H), 1.46 (s, 3H). | 480 |
| 64 | 1H-NMR (DMSO-D6) δ: 9.64 (s, 1H), 8.78 (d, J = 7.1 Hz, 1H), 7.55 (s, 1H), 6.62 (s, 2H), 6.31 (dd, J = 16.9, 10.2 Hz, 1H), 6.10 (dd, J = 16.9, 2.2 Hz, 1H), 5.67 (dd, J = 10.2, 2.2 Hz, 1H), 5.39-5.37 (m, 1H), 4.67-4.61 (m, 1H), 4.53-4.46 (m, 1H), 4.31 (d, J = 5.2 Hz, 2H), 4.22-4.14 (m, 1H), 4.13-4.08 (m, 1H), 3.92-3.85 (m, 1H), 3.81 (s, 3H), 2.49-2.43 (m, 2H), 1.53-1.44 (m, 2H), 0.86 (t, J = 7.2 Hz. 3H). | 432 |

TABLE 9

| Example | NMR | MS [M + H]+ |
|---|---|---|
| 65 | 1H-NMR (CDCl3) δ: 7.55 (d, J = 7.6 Hz, 1H), 7.10 (d, J = 3.6 Hz, 1H), 7.01 (s, 1H), 6.71 (s, 1H), 6.33-6.29 (m, 2H), 6.12 (dd, J = 16.8, 10.2 Hz, 1H), 5.69 (d, J = 10.2 Hz, 1H), 4.89-4.81 (m, 1H), 4.56-4.52 (m, 1H), 4 45-4.41 (m, 1H), 4.29 (s, 2H), 4.12-4.03 (m, 2H), 1.41 (s, 9H). | 476 |
| 66 | 1H-NMR (CDCl3) δ: 7.09-7 06 (m 2H), 6.74-6.66 (m, 3H), 6.37-6.33 (m, 2H), 6.16 (dd, J = 17.1, 10.3 Hz, 1H), 5.70 (dd, J = 10.3, 1.6 Hz, 1H), 4.92-4.82 (m, 1H), 4.58-4.52 (m, 1H), 4 47-4.43 (m, 1H), 4.37 (s, 2H), 4.12-4.09 (m, 1H), 4.06-3.98 (m, 1H), 1.25 (s, 9H). | 398 |
| 67 | 1H-NMR (CDCl3) δ: 7.10 (d, J = 3.3 Hz, 1H), 7.02 (s, 1H), 6.59 (s, 1H), 6.41 (d, J = 3 7 Hz, 1H), 6.35 (dd, J = 17.0, 1.3 Hz, 1H), 6.17 (dd, J = 16 9, 10.3 Hz, 1H), 5.74 (dd, J = 10.3, 1.5 Hz, 1H), 5.06 (t, J = 5.7 Hz, 1H), 4 93-4.85 (m, 1H), 4.61 (t, J = 8.4 Hz, 1H), 4.47 (t, J = 9.5 Hz, 1H), 4.41 (d, J = 5.9 Hz, 2H), 4.20-4.15 (m, 1H), 4.11-4.06 (m, 1H), 1.42 (s, 9H). | 423 |
| 68 | 1H-NMR (CD3OD) δ: 7.56 (s, 1H), 6.67 (s, 1H), 6.45 (s, 1H), 6.33 (dd, J = 17.0. 10.1 Hz, 1H), 6.23 (dd, J = 17.0, 2.0 Hz, 1H), 5.73 (dd, J = 10.3, 2 2 Hz, 1H), 4.61-4.57 (m, 2H), 4.43 (s, 2H), 4.36 (t, J = 9.5 Hz, 1H), 4.22 (dd, J = 9.3, 5.3 Hz, 1H), 4 03 (dd, J = 10.6, 5.5 Hz, 1H), 3.90 (d, J = 5.1 Hz, 3H), 2.32 (s, 3H), 1.28 (s, 9H). | 426 |

TABLE 9-continued

| Example | NMR | MS [M + H]+ |
|---|---|---|
| 69 | 1H-NMR (CDCl3) δ: 8.02 (s, 1H), 7.67 (s, 1H), 6.93 (s, 1H), 6.76 (s, 1H), 6.28 (d, J = 16.9 Hz, 1H), 6.11 (dd, J = 25.3, 15.0 Hz, 1H), 5.66 (d, J = 10.3 Hz, 1H), 5.26 (d, J = 17.2 Hz, 1H), 5.04 (d, J = 11.0 Hz, 1H), 4.81 (s, 1H), 4.51 (s, 1H), 4.35 (s, 3H), 4.08 (s, 2H), 3.83 (d, J = 13.6 Hz, 3H), 1.36 (d, J = 8.4 Hz, 9H). | 438 |
| 70 | 1H-NMR (CDCl3) δ: 8.05 (s, 1H), 7.66 (d, J = 7.7 Hz, 1H), 6.84 (s, 1H), 6.70 (s, 1H), 6.27 (dd, J = 17 0, 1.6 Hz 1H), 6.09 (dd, J = 16.9, 10.3 Hz, 1H), 5.66 (t, J = 5.9 Hz, 1H), 4.81 (dd, J = 12.5, 5.5 Hz, 1H), 4.51 (t, J = 8.2 Hz, 1H), 4.32 (s, 2H), 4.10-4.06 (m, 3H), 3.82 (s, 3H), 2.72 (q, J = 7.3 Hz, 2H), 1.34 (s, 9H), 1.16 (t, J = 7.3 Hz, 3H). | 440 |
| 71 | 1H-NMR (CD3OD) δ: 7 57 (s, 1H), 6.53 (s, 1H), 6.51 (s, 1H), 6.34 (dd, J = 17.0, 10.1 Hz, 1H), 6.24 (dd, J = 17.0, 2.0 Hz, 1H), 5.74 (dd, J = 10.3, 2.2 Hz, 1H), 4.79-4.73 (m, 1H), 4.62 (t, J = 8.8 Hz, 1H), 4.45 (s, 2H), 4.37 (t, J = 9.3 Hz, 1H), 4.23 (dd, J = 9.7, 5.3 Hz, 1H), 4.04 (dd, J = 10.6, 5.5 Hz, 1H), 2.68 (t, J = 7.1 Hz, 2H), 1.82 (t, J = 7.1 Hz, 2H), 1.15 (s, 6H). | 424 |
| 72 | 1H-NMR (DMSO-D6) δ: 9.06 (s, 1H), 8.47 (d, J = 7.3 Hz, 1H), 6.59 (s, 1H), 6.48 (s, 1H), 6.31 (dd, J = 17.0, 10.4 Hz, 1H), 6.09 (dd, J = 16.9, 2.2 Hz. 1H), 5.65 (dd, J = 10 4, 2.4 Hz, 1H), 5.05-4.98 (m, 1H), 4.74-4.65 (m, 1H), 4.51 (t, J = 8.4 Hz, 1H), 4.24 (d, J = 4.8 Hz, 2H), 4.19 (t, J = 9.2 Hz, 1H), 4.11 (dd, J = 8.3, 5.5 Hz, 1H), 3.88 (dd, J = 10.1, 5.7 Hz, 1H), 3.65 (s, 3H), 2.62 (t, J = 7.0 Hz, 2H), 2.25 (s, 3H), 1.76 (t, J = 7.1 Hz, 2H), 1.13 (s, 6H). | 438 |

TABLE 10

| Example | NMR | MS [M + H]+ |
|---|---|---|
| 73 | 1H-NMR (DMSO-D6) δ: 9 57 (br s, 1H), 8.81 (br s, 1H), 7.56 (br s, 1H), 6.70 (br s, 1H), 6.31 (dd, J = 16.9, 10.3 Hz, 1H), 6.10 (dd, J = 16.9, 2.2 Hz, 1H), 5.79 (s, 1H), 5.66 (dd, J = 10.3, 2.2 Hz, 1H), 4.68-4.61 (m, 1H), 4.49 (t, J = 8.4 Hz, 1H), 4.43-4.36 (m, 1H), 4.18 (t, J = 9.2 Hz, 1H), 4.10 (t, J = 6.6 Hz, 1H), 3.89 (dd, J = 9.9, 5.5 Hz, 1H), 3.81 (s, 3H), 1.36 (s, 9H). | 464 |
| 74 | 1H-NMR (CDCl3) δ: 7.52 (d, J = 10.3 Hz, 1H), 6.99 (s, 1H), 6.83 (s, 1H), 6.77 (s, 1H), 6.32 (d, J = 16.9 Hz, 1H), 6.15 (dd, J = 17.0, 10.1 Hz, 1H), 5.69 (d, J = 10.6 Hz, 1H), 4.83 (d, J = 7.7 Hz, 1H), 4.57 (t, J = 8.4 Hz, 1H), 4.44 (t, J = 9.7 Hz, 1H), 4.37 (s, 2H), 4.12-4.05 (m, 2H), 3.80 (s, 3H), 2.24 (s, 3H), 1.26 (s, 9H). | 426 |
| 75 | 1H-NMR (DMSO-D6) δ: 10.57 (br s, 1H), 8.79 (d, J = 7.1 Hz, 1H), 7.57 (s, 1H), 7.23 (d, J = 2.6 Hz, 1H), 6.95 (dd, J =2.7, 8.7 Hz, 1H), 6.76 (d, J = 8.6 Hz, 1H), 6.33 (dd, J = 10.3, 17.0 Hz, 1H), 6.11 (dd, J = 2.2, 16.9 Hz, 1H), 5.88 (t, J = 5.2 Hz, 1H), 5.68 (dd, J = 2.3, 10.3 Hz, 1H), 4.61-4.72 (m, 1H), 4.51 (t, J = 8 4 Hz, 1H), 4.40 (d, J = 5.1 Hz, 2H), 4.08-4.24 (m, 2H), 3.90 (dd, J = 5.4, 10.3 Hz, 1H), 3.84 (s, 3H) | 482 |
| 76 | 1H-NMR (DMSO-D6) δ 8.94 (br s, 1H), 8.44 (d, J = 7.3 Hz, 1H), 6.80 (s, 1H), 6.38 (s, 1H) 6.31 (dd, J = 16.9, 10.3 Hz, 1H), 6.09 (dd, J = 17.2, 2.2 Hz, 1H), 5.66 (dd, J = 10.3, 2.2 Hz, 1H), 5.06-4 93 (m, 1H), 4.74-4.64 (m, 1H), 4.50 (t, J = 8.4 Hz, 1H), 4.25 (s, 2H), 4.19 (t, J = 9.2 Hz, 1H), 4.10 (dd, J = 8.4, 5.5 Hz, 1H), 3.83 (dd, J = 10.3, 5.5 Hz, 1H), 3.64 (s, 3H), 2.25 (s, 3H), 2.24 (s, 3H), 1.28 (s, 9H). | 440 |

TABLE 10-continued

| Example | NMR | MS [M + H]+ |
|---|---|---|
| 77 | 1H-NMR (DMSO-D6) δ: 9.54 (d, J = 6.2 Hz, 1H), 8.95 (s, 1H), 6.89 (s, 1H), 6.38 (s, 1H), 6.31 (dd, J = 17.2, 10.3 Hz, 1H), 6.09 (dd, J = 17.2, 2.2 Hz, 1H), 5.66 (dd, J = 10.3, 2.2 Hz, 1H), 5.18-5.13 (m, 1H), 4.95-4.85 (m, 1H), 4.65-4.57 (m, 1H), 4.53 (t, J = 8.2 Hz, 1H), 4.37 (d, J = 5.5 Hz, 2H), 4.20 (t, J = 9.2 Hz, 1H), 4.02 (dd, J = 8.8, 5.1 Hz, 1H), 3.78 (dd, J = 10.3, 5.1 Hz, 1H), 2.24 (s, 3H), 1.40 (d, J = 7.0 Hz, 6H), 1.27 (s, 9H). | 522 |
| 78 | 1H-NMR (DMSO-D6) δ: 8.94 (s, 1H), 8.81 (d, J = 6.6 Hz, 1H), 6.81 (s, 1H), 6.38 (s, 1H), 6.31 (dd, J = 16.9, 10.3 Hz, 1H), 6.09 (dd, J = 17.2, 2.2 Hz, 1H), 5.66 (dd, J = 10.3, 2.2 Hz, 1H), 4.97-4.93 (m, 1H), 4.77-4.70 (m, 1H), 4.66-4.59 (m, 1H), 4.52 (t, J = 8.2 Hz, 1H), 4.26 (d, J = 5.1 Hz 2H), 4.20 (t, J = 9.2 Hz, 1H), 4.07 (dd, J = 8.6, 5.3 Hz, 1H), 3.84 (dd, J = 10.3, 5.5 Hz, 1H), 2.25 (s, 3H), 2.16 (s, 3H), 1.40 (d, J = 7.0 Hz, 6H), 1.29 (s, 9H). | 468 |
| 79 | 1H-NMR (CDCl3) δ 7.30 (d, J = 8.0 Hz, 0.6H), 7.13 (d, J = 8.0 Hz, 0.4H), 7.04 (d, J = 3.5 Hz, 1H), 6.81 (d, J = 3.5 Hz, 1H), 6.70 (d, J = 14.6 Hz, 1H), 6.37-6.28 (m, 2H), 6.20-6.12 (m, 1H), 5.73 (dd, J = 10.4, 1.6 Hz, 1H), 4.92-4.83 (m, 1H), 4 64-4.54 (m, 2H), 4.49-443 (m, 1H), 4.15-4.01 (m, 2H), 1.60 (d, J = 6.8 Hz, 3H), 1.36 (s, 9H). | 446 |

TABLE 11

| Example | NMR | MS [M + H]+ |
|---|---|---|
| 80 | 1H-NMR (DMSO-D6) δ: 9.62 (s, 1H), 8.75 (d, J = 7.3 Hz, 1H), 7.54 (s, 1H), 6.63 (s, 1H), 6.57 (s, 1H), 6.31 (dd, J = 16.9, 10.3 Hz, 1H), 6.10 (dd, J = 16.9, 2.2 Hz, 1H), 5.66 (dd, J = 10.3, 2.2 Hz, 1H), 4.97 (d, J = 8.1 Hz, 1H), 4.90-4.81 (m, 1H), 4.70-4.61 (m, 1H), 4.49 (t, J = 8.4 Hz, 1H), 4.17 (t, J = 9.2 Hz, 1H), 4.11-4.07 (m, 1H), 3.91-3.87 (m, 1H), 3.84 (s, 3H), 1.45 (d, J = 6.6 Hz, 3H), 1.30 (s, 9H). | 460 |
| 81 | 1H-NMR (CDCl3) δ: 6.83 (s, 1H), 6.76 (s, 1H), 6.35 (dd, J = 16.9, 1.8 Hz, 1H), 6.17 (dd, J = 17.2, 10.3 Hz, 1H), 6.09 (d, J = 7.0 Hz, 1H), 5.71 (dd, J = 10.3, 1.8 Hz, 1H) 4.90-4.79 (m, 1H), 4.65-4.56 (m, 1H), 4.51-4.41 (m, 2H), 4.12-4.04 (m, 1H), 3.99-3.91 (m, 1H), 3.74 (s, 3H), 2.44 (s, 3H), 1.56 (d, J = 7.0 Hz, 3H), 1.39 (s, 9H). | 474 |
| 82 | 1H-NMR (DMSO-D6) δ: 9.59 (s, 1H), 8.76 (d, J = 7.0 Hz, 1H), 7.54 (s, 1H), 6.43 (s, 1H), 6.31 (dd, J = 16.9, 10.3 Hz, 1H), 6.10 (dd, J = 17.0, 2.4 Hz, 1H), 5.66 (dd, J = 10.3, 2.2 Hz, 1H), 5.34 (d, J = 7.7 Hz, 1H), 4.93-4.86 (m, 1H), 4.69-4.61 (m, 1H), 4.49 (t, J = 8.2 Hz, 1H), 4.17 (t, J = 9.2 Hz, 1H), 4.12-4.07 (m, 1H), 3.91-3.87 (m, 1H), 3.84 (s, 3H), 1.47 (d, J = 6.6 Hz, 3H), 1.31 (s, 9H). | 478 |
| 83 | 1H-NMR (CDCl3) δ: 7.50 (s, 1H), 6.84 (s, 1H), 6.34 (dd, J = 17.1, 1.7 Hz, 1H), 6.19 (dd, J = 17.1, 10.5 Hz, 1H), 5.74 (dd, J = 10.5, 1.7 Hz, 1H), 4.84-4.73 (m, 1H), 4.77 (s, 2H), 4.63-4.56 (m, 1H), 4.43-4.36 (m, 1H), 4.18-4.12 (m, 1H), 4.11-4.05 (m, 1H), 3.91 (s, 3H), 1.38 (s, 9H). | 447 |
| 84 | 1H-NMR (CDCl3) δ: 7.57 (s, 1H), 6.74 (s, 1H), 6.37 (dd, J = 16.9, 1.7 Hz, 1H), 6.19 (dd, J = 16.9, 10.4 Hz, 1H), 5.74 (dd, J = 10.4, 1.7 Hz, 1H), 4.84-4.78 (m, 1H), 4.77 (s, 2H), 4.64-4.60 (m, 1H), 4.44-4.39 (m, 1H), 4.20-4.16 (m, 1H), 4.14-4.09 (m, 1H), 3.94 (s, 3H), 0.29 (s, 9H). | 463 |

TABLE 11-continued

| Example | Structure | NMR | MS [M + H]+ |
|---|---|---|---|
| 85 | 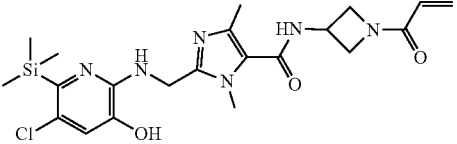 [SMILES: C=CC(=O)N1CC(NC(=O)c2c(C)nc(CNc3nc([Si](C)(C)C)c(Cl)cc3O)n2C)C1] | 1H-NMR (CDCl3): 6.45-6.40 (brs, 1H), 6.34 (dd, J = 17.2, 1.7 Hz, 1H), 6.19 (dd, J = 17.2, 10.4 Hz, 1H), 5.72 (dd, J = 10.4, 1.7 Hz, 1H), 4.87-4.84 (m, 1H), 4.73 (s, 2H), 4.65-4.61 (m, 1H), 4,49-4.44 (m, 1H), 4.24-4.18 (m, 1H), 4.16-4.10 (m, 1H) 3.84 (s, 3H) 2.34 (s, 3H), 0.21 (s, 9H). | 477 |
| 86 | 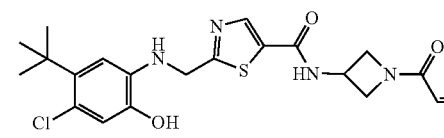 | 1H-NMR (CDCl3) δ: 8.28 (s, 1H) 8.12 (d, J = 6.6 Hz, 1H), 6.84 (dt, J = 15.2, 6.5 Hz, 1H), 6.62 (s, 1H), 6.59 (s, 1H) 5.99 (d, J = 15.4 Hz, 1H), 4.92-4.84 (m, 1H), 4.82-4.74 (m, 1H), 4.69 (s, 2H), 4.52 (t, J = 8.4 Hz, 1H), 4.33 (t, J = 9.5 Hz, 1H), 4.05 (dd, J = 11.0, 4.8 Hz, 1H), 4.00 (dd, J = 9.3, 4.6 Hz, 1H), 3.25 (dd, J = 14.3, 5.1 Hz, 1H), 3.04 (dd, J = 14.3, 7.3 Hz, 1H), 2.35 (s, 6H), 1.34 (s, 9H). | 506 |
| 87 | 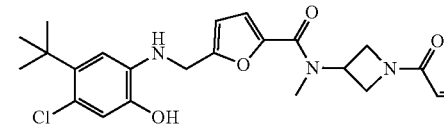 | 1H-NMR (CDCl3) δ: 7.07 (d, J = 3.3 Hz, 1H), 6.80-6.72 (m, 1H), 6.58 (s, 1H), 6.48 (s, 1H), 6.39 (d, J = 3.7 Hz, 1H), 6.08 (d, J = 15.8 Hz, 1H), 4.74-4.64 (m, 1H), 4.61-4.50 (m, 1H), 4.45 (s, 2H), 4.38 (t, J = 8.8 Hz, 1H), 4.28-4.21 (m, 1H), 4.20-4.15 (m, 1H), 4.14-4.08 (m, 1H), 3.19-3.13 (m, 1H), 3.11 (s, 3H), 3.10-3.06 (m, 1H), 2.41 (s, 6H), 1.36 (s, 9H). | 503 |

TABLE 12

| Example | Structure | NMR | MS [M + H]+ |
|---|---|---|---|
| 88 | 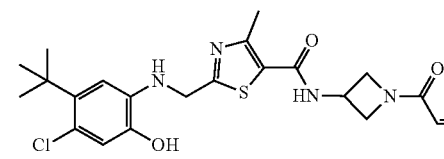 | 1H-NMR (CDCl3) δ: 7.86 (d, J = 7.3 Hz, 1H), 6.93-6.85 (m, 1H), 6.61 (s, 1H), 6.59 (s, 1H), 5.97 (d, J = 15.0 Hz, 1H), 4.88 (br s, 1H), 4.82-4.76 (m, 1H), 4.71 (d, J = 17.6 Hz, 1H), 4.64 (d, J = 17.2 Hz, 1H), 4.50 (t, J = 8.4 Hz, 1H), 4.32 (t, J = 9.5 Hz, 1H), 4.03 (dd, J = 11.0, 5.1 Hz, 1H), 3.94 (dd, J = 9.2, 4.8 Hz, 1H), 3.33 (dd, J = 13.9, 4.8 Hz, 1H), 3.03 (dd, J = 13.9, 8.1 Hz, 1H), 2.68 (s, 3H), 2.39 (s, 6H), 1.34 (s, 9H). | 520 |
| 89 | 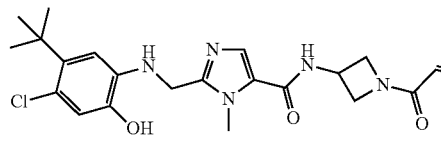 | 1H-NMR (DMSO-D6) δ: 9.59 (br s, 1H), 8.76 (d, J = 7.1 Hz, 1H), 7.56 (s, 1H), 6.85 (s, 1H), 6.63 (s, 1H), 6.59 (td, J = 6.3, 15.5 Hz, 1H), 6.11 (td, J = 1.5, 15.4 Hz, 1H), 5.45 (t, J = 5.3 Hz, 1H), 4.60-4.70 (m, 1H), 4.48 (t, J = 8.3 Hz, 1H), 4.36 (d, J = 5.3 Hz, 2H), 4.06-4.21 (m, 2H), 3.88 (br dd, J = 5.4, 10.3 Hz, 1H), 3.84 (s, 3H), 3.01 (dd, J = 1.3, 6.2 Hz, 2H), 2.14 (s, 6H), 1.36 (s, 9H) | 503 |
| 90 | 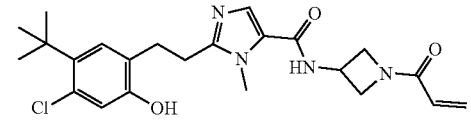 [SMILES: C=CC(=O)N1CC(NC(=O)c2cnc(CCc3cc(C(C)(C)C)c(Cl)cc3O)n2C)C1] | 1H-NMR (CDCl3) δ: 7.51 (s, 1H), 7.15 (s, 1H), 7.02 (d, J = 7.0 Hz, 1H), 6.89 (s, 1H), 6.31 (dd, J = 16.9, 1.5 Hz, 1H), 6.13 (dd, J = 17.0, 10.4 Hz, 1H), 5.69 (dd, J = 10.4, 1.6 Hz, 1H), 4.86-4.79 (m, 1H), 4.57 (t, J = 8.4 Hz, 1H), 4.44 (t, J = 9.5 Hz, 1H), 4.10-4.04 (m, 1H), 4.03-3.97 (m, 1H), 3.79 (s, 3H), 3.18-3.13 (m, 2H), 3.04-2.99 (m, 2H), 1.43 (s, 9H). | 445 |
| 91 | 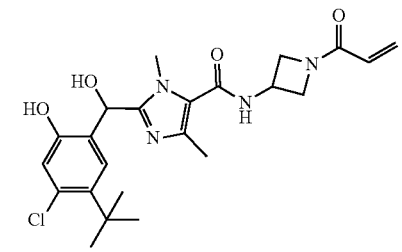 | 1H-NMR (CD3OD) δ: 7.56 (s, 1H), 6.78 (s, 1H), 6.34 (dd, J = 16.9, 9.9 Hz, 1H), 6.25 (dd, J = 17.0, 2.4 Hz, 1H), 6.12 (s, 1H), 5.75 (dd, J = 9.9, 2.2 Hz, 1H), 4.84-4.77 (m, 1H), 4.64 (t, J = 8.6 Hz, 1H), 4.40 (t, J = 9.5 Hz, 1H), 4.25 (dd, J = 9.2, 5.5 Hz, 1H), 4.04 (dd, J = 10.8, 5.3 Hz, 1H), 3.74 (s, 3H), 2.32 (s, 3H), 1.44 (s, 9H). | 481 |

TABLE 12-continued

| Example | | NMR | MS [M + H]+ |
|---|---|---|---|
| 92 | 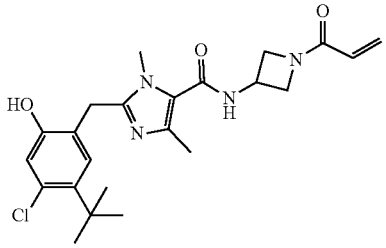 [SMILES: C=CC(=O)N1CC(NC(=O)c2c(C)nc(Cc3cc(C(C)(C)C)c(Cl)cc3O)n2C)C1] | 1H-NMR (CD3OD) δ: 7.03 (s, 1H), 6.81 (s, 1H), 6.35 (dd, J= 17.0, 10.1 Hz, 1H), 6.24 (dd, J = 16.9, 2.2 Hz, 1H), 5.74 (dd, J = 10.3, 2.2 Hz, 1H), 4.82-4.76 (m, 1H), 4.64 (t, J = 8.6 Hz, 1H), 4.40 (t, J = 9.3 Hz, 1H), 4.24 (dd, J = 9.2, 5.5 Hz, 1H), 4.03 (dd, J = 11.0, 5.5 Hz, 1H), 3.98 (s, 2H), 3.63 (s, 3H), 2.34 (s, 3H), 1.36 (s, 9H). | 445 |
| 93 | 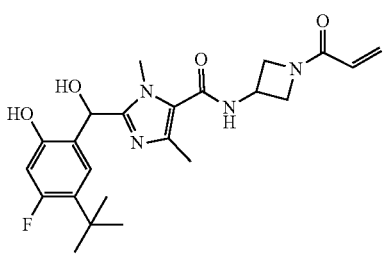 [SMILES: C=CC(=O)N1CC(NC(=O)c2c(C)nc(C(O)c3cc(C(C)(C)C)c(F)cc3O)n2C)C1] | 1H-NMR (CDCl3) δ: 6.97 (d, J = 8 8 Hz, 1H), 6.83-6.76 (m, 1H), 6.61 (d, J = 13.6 Hz, 1H), 6.29 (dd, J = 16.9, 1.5 Hz, 1H), 6.13 (dd, J = 16.9, 10.3 Hz, 1H), 5.76-5.73 (m, 1H), 5.69 (dd, J = 10.3, 1.5 Hz, 1H), 4.88-4.78 (m, 1H), 4.63-4.54 (m, 1H), 4.44-4.35 (m, 1H), 4.12-4.05 (m, 1H), 4.01-3.94 (m, 1H), 3.84 (s, 3H), 2.39 (s, 3H), 1.30 (s, 9H). | 445 |
| 94 | 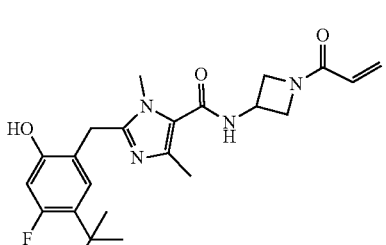 | 1H-NMR (CDCl3) δ: 6.93 (d, J = 9.2 Hz, 1H), 6.64 (d, J = 13.9 Hz, 1H), 6.35 (dt, J = 17.1, 1.5 Hz, 1H), 6.16 (dd, J = 17.2, 10.3 Hz, 1H), 6.15-6.06 (m, 1H), 5.70 (dd, J = 10.3, 1.8 Hz, 1H), 4.90-4.81 (m, 1H), 4.51 (t, J = 8.4 Hz, 1H), 4.47 (t, J = 9.3 Hz, 1H), 4.07 (dd, J = 8.8, 5.5 Hz, 1H), 3.99-3.94 (m, 1H), 3.93 (s, 2H), 3.87 (s, 3H), 2.42 (s, 3H), 1.32 (s, 9H). | 429 |

TABLE 13

| Example | | NMR | MS [M + H]+ |
|---|---|---|---|
| 95 | 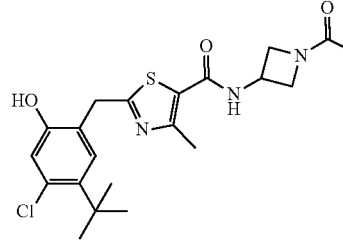 | 1H-NMR (CDCl3) δ: 9.65 (br s, 1H), 7.12 (s, 1H), 7.00 (s, 1H), 6.90 (br s, 1H), 6.29 (dd, J = 16.9, 1.1 Hz, 1H), 6.13 (dd, J = 16.9, 10.3 Hz, 1H), 5.70 (dd, J = 10.3, 1.8 Hz, 1H), 4.86-4.79 (m, 1H), 4.60-4.53 (m, 1H), 4.45-4.38 (m, 1H), 4.16 (s, 2H), 4.06-3.98 (m, 2H), 2.66 (s, 3H), 1.43 (s, 9H). | 448 |
| 96 | 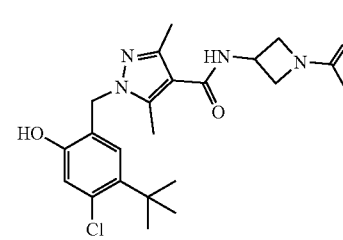 | 1H-NMR (DMSO-D6) δ: 8.06 (d, J = 7.3 Hz, 1H), 6.92 (s, 1H), 6.83 (s, 1H), 6.31 (dd, J = 16.9, 10.3 Hz, 1H), 6.09 (dd, J = 17.2, 2.2 Hz, 1H), 5.66 (dd, J = 10.3, 2.2 Hz, 1H), 5.07 (s, 2H), 4.72-4.63 (m, 1H), 4.49 (t, J = 8.4 Hz, 1H), 4.17 (t, J = 9.2 Hz, 1H), 4.08 (dd, J = 8.6, 5.7 Hz, 1H), 3.86 (dd, J = 10.3, 5.5 Hz, 1H), 2.34 (s, 3H), 2.23 (s, 3H), 1.30 (s, 9H). | 445 |

TABLE 13-continued

| Example | | NMR | MS [M + H]+ |
|---|---|---|---|
| 97 | 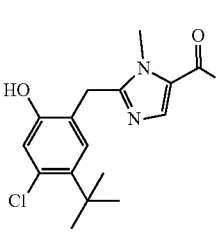 | 1H-NMR (CDCl3) δ: 7.57 (s, 1H), 7.42 (d, J = 7.3 Hz, 1H), 7.09 (s, 1H), 6.96 (s, 1H), 6.30 (dd, J = 16.9, 1.8 Hz, 1H), 6.14 (dd, J = 16.9, 10.3 Hz, 1H), 5.70 (dd, J = 10.3, 1.5 Hz, 1H), 4.87-4.80 (m, 1H), 4.59-4.53 (m, 1H), 4.43-4.36 (m, 1H), 4.05-4.00 (m, 2H), 3.99 (s, 2H), 3.98 (s, 3H), 1.43 (s, 9H). | 431 |
| 98 | 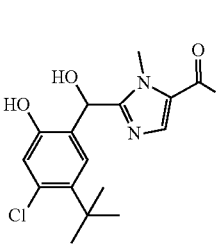 | 1H-NMR (DMSO-D6) δ: 9.75 (s, 1H), 8.76 (d, J = 7.0 Hz, 1H), 7.59 (s, 1H), 7.45 (s, 1H), 6.74 (s, 1H), 6.31 (dd, J = 17.2, 9.5 Hz, 1H), 6.10 (dd, J = 16.9, 2.2 Hz, 1H), 5.99 (d, J = 5.9 Hz, 1H), 5.92 (d, J = 5.5 Hz, 1H), 5.67 (dd, J = 10.3, 2.2 Hz, 1H), 4.70-4.62 (m, 1H), 4.53-4.47 (m, 1H), 4.21-4.15 (m, 1H), 4.13-4.07 (m, 1H), 3.92-3.86 (m, 1H), 3.88 (s, 3H), 1.40 (s, 9H). | 447 |

TABLE 14

| Example | | NMR | MS [M + H]+ |
|---|---|---|---|
| Reference Example 1 | 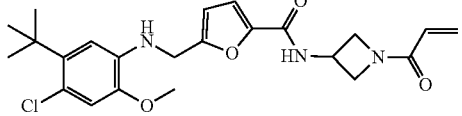 | 1H-NMR (CDCl3) δ: 7.10 (d, J = 3.3 Hz, 1H), 6.83 (d, J = 7.3 Hz, 1H), 6.76 (s, 1H), 6.68 (s, 1H), 6.39-6.33 (m, 2H), 6.18 (dd, J = 17.0, 10.4 Hz, 1H), 5.70 (dd, J = 10.4, 1.6 Hz, 1H), 4.94-4.85 (m, 1H), 4.62-4.57 (m, 1H), 4.50-4.44 (m, 1H), 4.38 (s, 2H), 4.13-4.08 (m, 1H), 4.02 (dd, J = 10.8, 4.9 Hz, 1H), 3.83 (s, 3H), 1.41 (s, 9H). | 446 |
| Reference Example 2 | 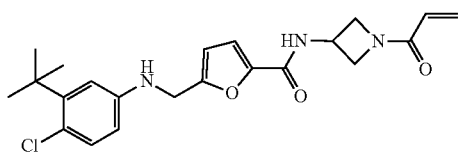 [SMILES: C=CC(=O)N1CC(NC(=O)c2ccc(CNc3ccc(Cl)c(C(C)(C)C)c3)o2)C1] | 1H-NMR (CDCl3) δ: 7.26 (s, 2H), 7.15 (d, J = 8.5 Hz, 1H), 7.10 (d, J = 3.7 Hz, 1H), 7.02 (d, J = 7.3 Hz, 1H), 6.71 (d, J = 2.9 Hz, 1H), 6.43 (dd, J = 8.5, 2.9 Hz, 1H), 6.37 (d, J = 3.2 Hz, 1H), 6.33 (d, J = 1.7 Hz, 1H), 6.18 (dd, J = 17.1, 10.2 Hz, 1H), 5.71 (dd, J = 10.4, 1.6 Hz, 1H), 4.96-4.86 (m, 1H), 4.60 (t, J = 8.5 Hz, 1H), 4.47 (dd, J = 10.2, 8.5 Hz, 1H), 4.35 (s, 2H), 4.12-4.01 (m, 2H), 1.43 (s, 9H). | 416 |

Test Example 1 Test of Compounds on Whether to Bind to KRAS G12C Mutant

K-Ras4B (1-169) protein was expressed in E. coli strain BL21 (DE3) by synthesizing a nucleotide sequence encoding the amino acid sequence represented by GenPept ID NP_004976 as a sequence optimized for E. coli by use of GeneArt Technology (Life Technologies Corp.) such that the protein was N-terminally His-tagged and fused with a TEV protease recognition sequence (ENLYFQG). The expressed His-tagged K-Ras4B (1-169) was purified through a Ni column, then cleaved at its tag with N-terminally His-tagged TEV protease, and passed through a Ni column again to recover a flow-through fraction, which was further purified by anion-exchange chromatography to obtain the protein. G12C K-Ras4B (1-169) protein, which was a KRAS G12C mutant, was obtained in the same way as in the K-Ras4B (1-169) protein except that glycine at position 12 of the amino acid sequence represented by GenPept ID NP_004976 was mutated to cysteine.

The K-Ras4B (1-169) protein and the G12C K-Ras4B (1-169) protein were mixed and diluted with a buffer solution (1×TBS and 0.1 mM TCEP) to prepare a protein solution containing 1 µM each of the proteins. Each test compound was dissolved at 10 mM in DMSO and further diluted 10-fold with DMSO to make a 1 mM solution. Then, the solution was diluted 5-fold with DMSO to make a 200 µM solution. The 200 µM solution was further diluted 5-fold to make a 40 PM solution. 1 µL of the 40 µM test compound was added to 19 µL of the 1 µM protein solution such that the final compound concentration was 2 µM. The mixture was stored for 2 hours in an incubator of 25° C., and the reaction was terminated by the addition of 80 µL of a 1×TBS solution containing 0.2% formic acid, followed by LC-MS measurement.

The LC-MS measurement was performed by using Xevo G2-S Q-Tof manufactured by Waters Corp., performing reverse-phase chromatography with a desalting column, and obtaining mass spectra of positive ions by electrospray. For the mass spectra, spectra of polyvalent ions were collectively converted to molecular weights by the MaxEnt technique using OpenLynx software, and then, a compound binding rate was obtained from the ratio of signal intensity corresponding to the molecular weight of a protein to signal intensity corresponding to the molecular weight of a compound bound with the protein.

Information on the selectivity for G12C K-Ras4B (1-169) was also obtained by obtaining the compound binding rates for K-Ras4B (1-169) and for G12C K-Ras4B (1-169) at the same time.

The binding rates of test compounds having a final compound concentration of 2 μM for G12C K-Ras4B (1-169) are shown in the table below. The binding rate for G12C K-Ras4B (1-169) is rated "A" for 80% or more, "B" for 60% or more and less than 80%, "C" for 40% or more and less than 60%, "D" for 20% or more and less than 40%, and "E" for less than 20%. All the test compounds had a binding rate of 0% for K-Ras4B (1-169), demonstrating that the compounds of Examples had higher selectivity for G12C K-Ras4B (1-169) than that for wild-type KRAS (K-Ras4B (1-169)).

TABLE 15

| Example | |
|---|---|
| 1 | A |
| 2 | B |
| 3 | B |
| 4 | A |
| 5 | A |
| 6 | D |
| 7 | A |
| 8 | A |
| 9 | A |
| 10 | A |
| 11 | B |
| 12 | C |
| 13 | A |
| 14 | A |
| 15 | D |
| 16 | A |
| 17 | D |
| 18 | A |
| 19 | A |
| 20 | A |
| 21 | B |
| 22 | D |
| 23 | C |
| 24 | C |
| 25 | E |
| 26 | A |
| 27 | A |
| 28 | C |
| 29 | A |
| 30 | E |
| 31 | C |
| 32 | B |
| 33 | E |
| 34 | A |
| 35 | E |
| 36 | A |
| 37 | A |
| 38 | A |
| 39 | A |
| 40 | A |
| 41 | A |
| 42 | A |
| 43 | A |
| 44 | A |
| 45 | A |
| 46 | A |
| 47 | D |
| 48 | D |
| 49 | E |
| 50 | D |
| 51 | C |
| 52 | D |
| 53 | E |
| 54 | C |
| 55 | C |
| 56 | E |
| 57 | D |
| 58 | D |
| 59 | B |
| 60 | A |
| 61 | B |
| 62 | A |
| 63 | A |
| 64 | D |
| 65 | A |
| 66 | E |
| 67 | C |
| 68 | A |
| 69 | B |
| 70 | B |
| 71 | C |
| 72 | A |
| 73 | B |
| 74 | E |
| 75 | E |
| 76 | A |
| 77 | D |
| 78 | A |
| 79 | D |
| 80 | B |
| 81 | B |
| 82 | B |
| 83 | B |
| 84 | A |
| 85 | C |
| 86 | B |
| 87 | A |
| 88 | C |
| 89 | A |
| 90 | D |
| 91 | D |
| 92 | B |
| 93 | E |
| 94 | C |
| 95 | C |
| 96 | A |
| 97 | A |
| 98 | B |
| Reference Example1 | E |
| Reference Example2 | E |

Test Example 2 Evaluation of Inhibitory Effect of Compounds on Nucleotide (GDP-GTP) Exchange Reaction of KRAS G12C Mutant SOS1 protein was expressed in *E. coli* strain BL21 (DE3) by synthesizing a nucleotide sequence encoding the amino acid sequence represented by GenPept ID NP_005624 as a sequence optimized for *E. coli* by use of GeneArt Technology (Life Technologies Corp.) such that the protein was N-terminally His-tagged and fused with a TEV protease recognition sequence (ENLYFQG). The expressed His-tagged SOS1 (564-1049) was purified through a Ni column, then cleaved at its tag with N-terminally His-tagged TEV protease, and passed through a Ni column again to recover a flow-through fraction to obtain the protein.

Each compound was studied for its inhibitory effect on the exchange reaction of GDP into GppNHp in BODIPY® FL bound with the KRAS G12C mutant by fluorescence measurement using the G12C K-Ras4B (1-169) protein and the SOS1 protein.

For the preparation of the KRAS G12C mutant bound with BODIPY® FL GDP, first, 50 μM G12C K-Ras4B (1-169) protein and 1 mM BODIPY® FL GDP (Invitrogen Corp., G22360) were incubated for 1 hour in a buffer solution (20 mM Tris-HCl (pH 7.5), 50 mM NaCl, and 1 mM DTT) in ice in the presence of 2.5 mM EDTA. Then, $MgCl_2$ was added thereto at a final concentration of 10 mM, then the mixture was incubated at room temperature for 30 minutes, and then, the protein was passed through a NAP-5 column for removal of free nucleotides and used for compound evaluation.

For the measurement of the inhibitory activity of compounds against nucleotide exchange reaction, first, the compound of the present invention was serially diluted with DMSO. Subsequently, the serially diluted solution of the compound of the present invention in DMSO (final concentration of DMSO: 5%) and the KRAS G12C mutant (25 nM) bound with BODIPY® FL GDP were added into a reaction buffer solution (20 mM Tris-HCl (pH 7.5), 100 mM NaCl, 1 mM $MgCl_2$, 2 mM DTT, and 0.1% Tween 20), and the mixture was preincubated at 25° C. for 4 hours. Then, Son of Sevenless Homolog 1 (SOS1, amino acid region: 564-1049) and GppNHp (GMPPNP, Jena Bioscience GmbH, NU-401-50) were added thereto at final concentrations of 100 nM and 1 μM, respectively, and the mixture was reacted for 30 minutes. The change in fluorescence intensity of BODIPY® FL (excitation wavelength: 485 nm, fluorescence wavelength: 520 nm) between immediately after the start of reaction and after 30 minutes from the start of reaction was standardized, and then, the compound concentration at which 50% inhibition was achieved was calculated as IC50 (nM) when the signal value for only DMSO was defined as 0% inhibition and the signal value for no addition of GppNHp was defined as 100% inhibition.

The values of the inhibitory effects IC50 (nM) of the test compounds are shown in the table below.

TABLE 16

| Example | IC50 (nM) |
|---|---|
| 1 | 326 |
| 2 | 815 |
| 3 | 753 |
| 4 | 11 |
| 5 | 12 |
| 6 | 164 |
| 7 | 1509 |
| 8 | 58 |
| 9 | 39 |
| 10 | 67 |
| 11 | 123 |
| 12 | 954 |
| 13 | 735 |
| 14 | 420 |
| 15 | 825 |
| 16 | 3014 |
| 17 | 2071 |
| 18 | 11 |
| 19 | 233 |
| 20 | 13 |
| 21 | 808 |
| 22 | 2385 |
| 23 | 1001 |
| 24 | 780 |
| 25 | 4678 |
| 26 | 212 |
| 27 | 16 |
| 28 | 201 |
| 29 | 12 |
| 30 | 1692 |
| 31 | 247 |
| 32 | 64 |
| 33 | 1488 |
| 34 | 80 |
| 35 | 463 |
| 36 | 15 |
| 37 | 13 |
| 38 | 9 |
| 39 | 5 |
| 40 | 13 |

TABLE 16-continued

| Example | IC50 (nM) |
|---|---|
| 41 | 8 |
| 42 | 11 |
| 43 | 7 |
| 44 | 9 |
| 45 | 16 |
| 46 | 5 |
| 47 | 4738 |
| 48 | 3969 |
| 49 | 1144 |
| 50 | 3144 |
| 51 | 763 |
| 52 | 2091 |
| 53 | 5971 |
| 54 | 420 |
| 55 | 122 |
| 56 | 599 |
| 57 | 522 |
| 58 | 995 |
| 59 | 140 |
| 60 | 37 |
| 61 | 144 |
| 62 | 11 |
| 63 | 37 |
| 64 | 366 |
| 65 | 353 |
| 66 | 9801 |
| 67 | 1028 |
| 68 | 33 |
| 69 | 89 |
| 70 | 84 |
| 71 | 221 |
| 72 | 164 |
| 73 | 69 |
| 74 | 701 |
| 75 | 661 |
| 76 | 17 |
| 77 | 240 |
| 78 | 50 |
| 79 | 3897 |
| 80 | 104 |
| 81 | 225 |
| 82 | 1044 |
| 83 | 23 |
| 84 | 63 |
| 85 | 39 |
| 86 | 701 |
| 87 | 193 |
| 88 | 109 |
| 89 | 61 |
| 90 | 549 |
| 91 | 128 |
| 92 | 55 |
| 93 | 500 |
| 94 | 170 |
| 95 | 467 |
| 96 | 65 |
| 97 | 22 |
| 98 | 205 |
| Reference Example1 | >10000 |
| Reference Example2 | >10000 |

Test Example 3 Measurement Test of Growth Inhibition Activity Against KRAS-G12C Mutant Cell Line (NCI-H358) (In Vitro)

KRAS-G12C mutant human lung cancer cell line NCI-H358 cells (ATCC, Cat #: CRL-5807) were suspended in RPMI1640 medium (manufactured by Fujifilm Wako Pure Chemical Corp.) containing 10% fetal bovine serum. The cell suspension was seeded at 500 cells/well into the wells of a 384-well flat-bottom microplate and cultured at 37° C. for 1 day in an incubator containing 5% $CO_2$. The compound of the present invention was dissolved in DMSO and diluted with DMSO such that the concentration of the test compound was 500 times the final concentration. The solution of the test compound in DMSO was diluted with the medium used for suspending the cells, and the resultant was added to each well of the cell culture plate such that the final concentration of DMSO was 0.2%, followed by culture at 37° C. for another 3 days in an incubator containing 5% $CO_2$. The cell count after the 3-day culture in the presence of the compound was measured using CellTiter-Glo 2.0 (manufactured by Promega Corp.) in accordance with the protocol recommended by Promega Corp. The growth inhibition rate was calculated according to the expression given below, and the concentration of the test compound at which 50% inhibition was achieved (IC50 (nM)) was determined.

The results are shown in the table below.

Growth inhibition rate (%)=$(C-T)/(C) \times 100$

T: the emission intensity in a well supplemented with the test compound.

C: the emission intensity in a well not supplemented with the test compound.

These test results demonstrated that the compound of the present invention has excellent cell growth inhibition activity against the KRAS-G12C mutant cell line NCI-H358.

TABLE 17

| Example | IC50 (nM) |
|---------|-----------|
| 1 | 4106 |
| 4 | 1171 |
| 5 | 699 |
| 18 | 562 |
| 20 | 658 |
| 29 | 1113 |
| 37 | 321 |
| 38 | 708 |
| 39 | 112 |
| 40 | 535 |
| 41 | 281 |
| 42 | 301 |
| 43 | 351 |
| 44 | 511 |
| 45 | 576 |
| 46 | 916 |
| 76 | 399 |
| 78 | 993 |
| 92 | 1097 |
| 96 | 1364 |
| 97 | 683 |

The invention claimed is:

1. A phenol compound represented by the following Formula (I) or a salt thereof:

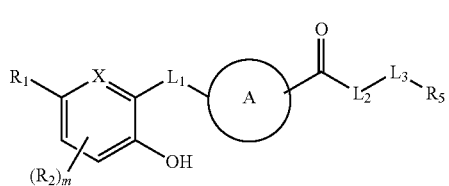

wherein $R_1$ represents substituted or unsubstituted C1-C6 alkyl, substituted or unsubstituted C2-C6 alkenyl, substituted or unsubstituted C2-C6 alkynyl, substituted or unsubstituted C3-C7 cycloalkyl, substituted or unsubstituted silyl, or substituted or unsubstituted sulfanyl;

$R_2$ represents halogen, cyano, nitro, C1-C6 alkyl, C2-C6 alkenyl, or C2-C6 alkynyl;

at least one of $R_2$ is present in the para-position of $L_1$, m represents 1 or 2;

when m is 2, $R_2$ may be identical or different;

$R_1$, and $R_2$ which is present in the para-position of $L_1$, taken together with the following adjacent group:

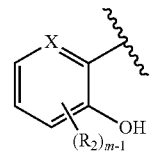

may form

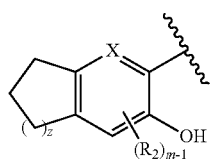

wherein

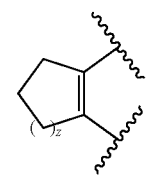

may have at least one member selected from the group consisting of halogen and C1-C6 alkyl as a substituent; and z represents an integer of 1 to 3;

X represents nitrogen, CH, or $CR_2$;

$L_1$ represents —NH—C(Ra)$_2$—, —C(Ra)$_2$—, or —C(Ra)$_2$—C(Ra)$_2$—;

Ra are identical or different, and each represents hydrogen, C1-C6 alkyl, or hydroxyl;

ring A represents a 5- or 6-membered unsaturated heterocyclic group that may have substituent $R_6$ or a benzene ring that may have substituent $R_6$;

$R_6$ represents at least one member selected from the group consisting of halogen, cyano, nitro, amino, hydroxyl, carboxyl, C1-C6 alkyl that may have substituent $R_{71}$, C2-C6 alkenyl that may have substituent $R_{72}$, C2-C6 alkynyl that may have substituent $R_{73}$, C3-C10 cycloalkyl that may have substituent $R_{74}$, C4-C10 cycloalkenyl that may have substituent $R_{75}$, C6-C10 aromatic hydrocarbon that may have substituent $R_{76}$, a 4- to 10-membered saturated heterocyclic group that may have substituent $R_{77}$, and a 5- to 10-membered unsaturated heterocyclic group that may have substituent $R_{78}$; and when one or more substituents are present, they may be identical or different;

when $R_6$ is C1-C6 alkyl that may have substituent $R_{71}$, C2-C6 alkenyl that may have substituent $R_{72}$, or C2-C6 alkynyl that may have substituent $R_{73}$, the substituent $R_{71}$, $R_{72}$, or $R_{73}$ represents halogen, cyano, nitro, amino, hydroxyl, carboxyl, C1-C6 alkoxy, di(C1-C6 alkyl)amino, C3-C7 cycloalkyl, substituted or unsubstituted C6-C10 aromatic hydrocarbon, a substituted or unsubstituted 4- to 10-membered saturated heterocyclic group, or a substituted or unsubstituted 5- to 10-membered unsaturated heterocyclic group; and when one or more substituents $R_{71}$, $R_{72}$, or $R_{73}$ are present, they may be identical or different;

when $R_6$ is C3-C10 cycloalkyl that may have substituent $R_{74}$, C4-C10 cycloalkenyl that may have substituent $R_{75}$, C6-C10 aromatic hydrocarbon that may have substituent $R_{76}$, a 4- to 10-membered saturated heterocyclic group that may have substituent $R_{77}$, or a 5- to 10-membered unsaturated heterocyclic group that may have substituent $R_{78}$, the substituent $R_{74}$, $R_{75}$, $R_{76}$, $R_{77}$, or $R_{78}$ represents halogen, cyano, nitro, amino, hydroxyl, carboxyl, substituted or unsubstituted C1-C6 alkyl, C2-C6 alkenyl, C2-C6 alkynyl, C1-C6 alkoxy, di(C1-C6 alkyl)amino, (C1-C6 alkyl) carbonyl, C7-C14 aralkyl, (C1-C6 alkoxy) carbonyl, C3-C7 cycloalkyl, C6-C10 aromatic hydrocarbon, a substituted or unsubstituted 4- to 10-membered saturated heterocyclic group, or a substituted or unsubstituted 5- to 10-membered unsaturated heterocyclic group; and when one or more substituents $R_{74}$, $R_{75}$, $R_{76}$, $R_{77}$, or $R_{78}$ are present, they may be identical or different;

$L_2$ represents

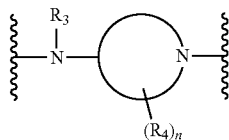

wherein

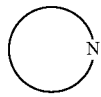

represents a 4- to 8-membered saturated heterocyclic ring having at least one nitrogen;

$R_3$ represents hydrogen or C1-C6 alkyl, $R_4$ represents halogen, cyano, nitro, amino, hydroxyl, carboxyl, C1-C6 alkyl that may have substituent $R_8$, C2-C6 alkenyl, C2-C6 alkynyl, or C1-C6 alkoxy; when two $R_4$ are present on the same carbon atom, the two $R_4$, taken together with the carbon atom to which these groups are attached, may form a 3- to 8-membered saturated hydrocarbon ring;

$R_8$ represents halogen, cyano, hydroxyl, C1-C6 alkoxy, or di(C1-C6 alkyl)amino;

n represents an integer of 0 to 3; and when n is 2 or 3, $R_4$ may be identical or different;

$L_3$ represents —C(=O)— or —S(=O)$_2$—; and $R_5$ represents substituted or unsubstituted C2-C6 alkenyl or substituted or unsubstituted C2-C6 alkynyl.

2. The phenol compound or a salt thereof according to claim 1, wherein in the Formula (I), $R_1$ represents substituted or unsubstituted C1-C6 alkyl, substituted or unsubstituted C2-C6 alkenyl, substituted or unsubstituted C3-C7 cycloalkyl, tri (C1-C6 alkyl) silyl, or pentafluorosulfanyl, when $R_1$ is substituted or unsubstituted C1-C6 alkyl, substituted or unsubstituted C2-C6 alkenyl, or substituted or unsubstituted C3-C7 cycloalkyl, the substituent is halogen, cyano, or C1-C6 alkyl; and when one or more substituents are present, they may be identical or different, $R_2$ represents halogen, cyano, C1-C6 alkyl, or C2-C6 alkenyl, $R_1$, and $R_2$ which is present in the para-position of $L_1$, taken together with the following adjacent group:

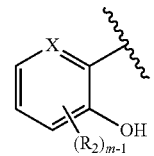

may form

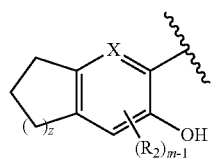

wherein

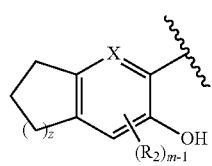

may have at least one member selected from the group consisting of halogen and C1-C6 alkyl as a substituent, m represents 1 or 2, z represents an integer of 1 to 3, and X represents nitrogen or CH.

3. The phenol compound or a salt thereof according to claim 1, wherein in the Formula (I), $L_1$ represents —NH—C(Ra)$_2$—, —C(Ra)$_2$—, or —C(Ra)$_2$—C(Ra)$_2$—, and Ra are identical or different, and each represents hydrogen, methyl, or hydroxyl.

4. The phenol compound or a salt thereof according to claim 1, wherein in the Formula (I), ring A represents

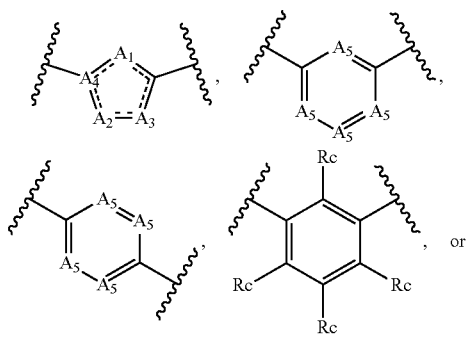

-continued

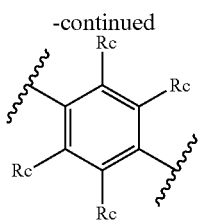

wherein
represents a single bond or a double bond,
- $A_1$ represents C—Rb1, nitrogen, N—Rb1, oxygen, or sulfur,
- $A_2$ represents C—Rb2, nitrogen, N—Rb2, oxygen, or sulfur,
- $A_3$ represents C—Rb3, nitrogen, N—Rb3, oxygen, or sulfur,
- $A_4$ represents carbon or nitrogen,
- at least one of $A_1$, $A_2$, $A_3$, and $A_4$ is at least one member selected from the group consisting of nitrogen, N—Rb1, N—Rb2, N—Rb3, oxygen, and sulfur,
- $A_5$ represents C—Rb5 or N—Rb5, and at least one of $A_5$ is N—Rb5,
- Rb1, Rb2, and Rb3 are identical or different, and each represents hydrogen, halogen, cyano, C1-C6 alkyl that may have substituent $R_{71}$, alkenyl that may have substituent $R_{72}$, alkynyl that may have substituent $R_{73}$, C3-C7 cycloalkyl that may have substituent $R_{74}$, C4-C7 cycloalkenyl that may have substituent $R_{75}$, C6-C10 aromatic hydrocarbon that may have substituent $R_{76}$, a 4- to 10-membered saturated heterocyclic group that may have substituent $R_{77}$, or a 5- to 10-membered unsaturated heterocyclic group that may have substituent $R_{78}$, when Rb1, Rb2, or Rb3 is C1-C6 alkyl that may have substituent $R_{71}$, C2-C6 alkenyl that may have substituent $R_{72}$, or C2-C6 alkynyl that may have substituent $R_{73}$, the substituent $R_{71}$, $R_{72}$, or $R_{73}$ represents halogen, cyano, nitro, amino, hydroxyl, carboxyl, C1-C6 alkoxy, di(C1-C6 alkyl)amino, C3-C7 cycloalkyl, substituted or unsubstituted C6-C10 aromatic hydrocarbon, a substituted or unsubstituted 4- to 10-membered saturated heterocyclic group, or a substituted or unsubstituted 5- to 10-membered unsaturated heterocyclic group; and when one or more substituents $R_{71}$, $R_{72}$, or $R_{73}$ are present, they may be identical or different,
- when Rb1, Rb2, or Rb3 is C3-C10 cycloalkyl that may have substituent $R_{74}$, C4-C10 cycloalkenyl that may have substituent $R_{75}$, C6-C10 aromatic hydrocarbon that may have substituent $R_{76}$, a 4- to 10-membered saturated heterocyclic group that may have substituent $R_{77}$, or a 5- to 10-membered unsaturated heterocyclic group that may have substituent $R_{78}$, the substituent $R_{74}$, $R_{75}$, $R_{76}$, $R_{77}$, or $R_{78}$ represents halogen, cyano, nitro, amino, hydroxyl, carboxyl, substituted or unsubstituted C1-C6 alkyl, C2-C6 alkenyl, C2-C6 alkynyl, C1-C6 alkoxy, di(C1-C6 alkyl)amino, (C1-C6 alkyl)carbonyl, C7-C14 aralkyl, (C1-C6 alkoxy) carbonyl, C3-C7 cycloalkyl, C6-C10 aromatic hydrocarbon, a substituted or unsubstituted 4- to 10-membered saturated heterocyclic group, or a substituted or unsubstituted 5- to 10-membered unsaturated heterocyclic group; and when one or more substituents $R_{74}$, $R_{75}$, $R_{76}$, $R_{77}$, or $R_{78}$ are present, they may be identical or different,
- Rb5 are identical or different, and each represents hydrogen, halogen, or C1-C6 alkyl, and
- Rc are identical or different, and each represents hydrogen, halogen, or C1-C6 alkyl.

5. The phenol compound or a salt thereof according to claim 1, wherein in the Formula (I),
$L_2$ represents

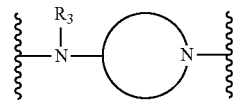

wherein

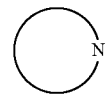

represents azetidine or pyrrolidine, and
$R_3$ represents hydrogen or C1-C6 alkyl.

6. The phenol compound or a salt thereof according to claim 1, wherein in the Formula (I), $L_3$ represents —C(=O)—.

7. The phenol compound or a salt thereof according to claim 1, wherein in the Formula (I), $R_5$ represents vinyl, dimethylamino-1-propenyl, or 1-propynyl.

8. The phenol compound or a salt thereof according to claim 1, wherein in the Formula (I),
ring A represents

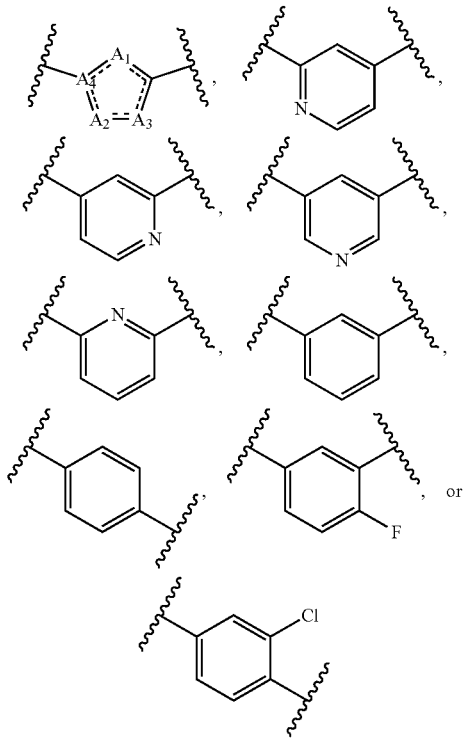

wherein represents a single bond or a double bond,
A₁ represents C—Rb1, nitrogen, N—Rb1, oxygen, or sulfur,
A₂ represents C—Rb2, nitrogen, N—Rb2, oxygen, or sulfur,
A₃ represents C—Rb3, nitrogen, N—Rb3, oxygen, or sulfur, and
A₄ represents carbon or nitrogen;
wherein at least one of $A_1$, $A_2$, $A_3$, and $A_4$ is at least one member selected from the group consisting of nitrogen, N—Rb1, N—Rb2, N—Rb3, oxygen, and sulfur,
Rb1 represents hydrogen, halogen, C1-C6 alkyl that may have substituent $R_{71}$, C3-C7 cycloalkyl that may have substituent $R_{74}$, C4-C7 cycloalkenyl, a monocyclic 4- to 7-membered saturated heterocyclic group having one nitrogen or oxygen that may have substituent $R_{77}$, or a monocyclic 5- to 8-membered unsaturated heterocyclic group having one nitrogen,
$R_{71}$ represents halogen, C1-C6 alkoxy, C3-C7 cycloalkyl, C6-C10 aromatic hydrocarbon that may have C1-C6 alkoxy as a substituent, a monocyclic 4- to 7-membered saturated heterocyclic group having one nitrogen that may have C1-C6 alkyl as a substituent, a monocyclic 5- to 8-membered unsaturated heterocyclic group having one nitrogen, or di(C1-C6 alkyl)amino,
$R_{74}$ represents hydroxyl or C1-C6 alkoxy,
$R_{77}$ represents C1-C6 alkyl that may have halogen or C6-C10 aromatic hydrocarbon as a substituent, C2-C6 alkenyl, (C1-C6 alkyl) carbonyl, (C1-C6 alkoxy) carbonyl, a monocyclic 4- to 7-membered saturated heterocyclic group having one nitrogen or oxygen, or a monocyclic 5- to 8-membered unsaturated heterocyclic group having one nitrogen,
Rb2 represents hydrogen or C1-C6 alkyl, and
Rb3 represents hydrogen, halogen, or C1-C6 alkyl that may have halogen as a substituent.

9. The phenol compound or a salt thereof according to claim 1, wherein in the Formula (I), $R_5$ is vinyl or dimethylamino-1-propenyl.

10. The phenol compound or a salt thereof according to claim 1, wherein in the Formula (I),
ring A represents

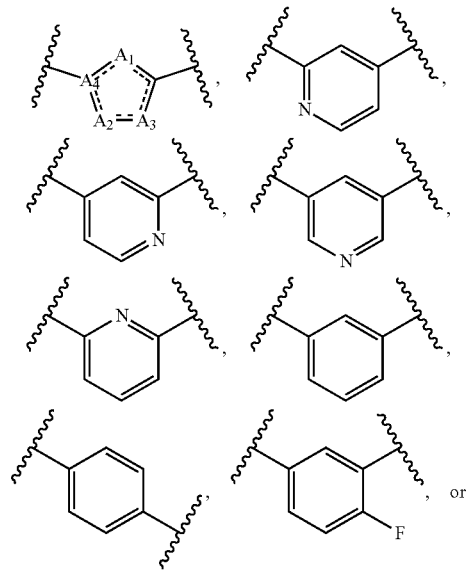

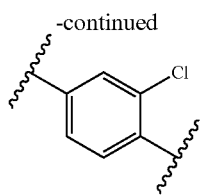

wherein
represents a single bond or a double bond,
A₁ represents C—Rb1, nitrogen, N—Rb1, oxygen, or sulfur,
A₂ represents C—Rb2, nitrogen, N—Rb2, oxygen, or sulfur,
A₃ represents C—Rb3, nitrogen, N—Rb3, oxygen, or sulfur, and
A₄ represents carbon or nitrogen;
wherein at least one of $A_1$, $A_2$, $A_3$, and $A_4$ is at least one member selected from the group consisting of nitrogen, N—Rb1, N—Rb2, N—Rb3, oxygen, and sulfur,
Rb1 represents hydrogen, C1-C6 alkyl that may have substituent $R_{71}$, or C3-C7 cycloalkyl,
$R_{71}$ represents C1-C6 alkoxy, C6-C10 aromatic hydrocarbon, a monocyclic 5- to 8-membered unsaturated heterocyclic group having one nitrogen, or di(C1-C6 alkyl)amino,
Rb2 represents hydrogen or C1-C6 alkyl, and
Rb3 represents hydrogen, halogen, or C1-C6 alkyl that may have halogen as a substituent.

11. A compound according to any one of the following (1) to (23), or a salt of the compound according to any one of the following (1) to (23):
(1) N-(1-acryloylazetidin-3-yl)-5-(((5-(tert-butyl)-4-chloro-2-hydroxyphenyl)amino) methyl)-N-methyl-furan-2-carboxamide,
(2) N-(1-acryloylazetidin-3-yl)-5-(((5-(tert-butyl)-4-chloro-2-hydroxyphenyl)amino) methyl)-N-ethyl-furan-2-carboxamide,
(3) N-(1-acryloylazetidin-3-yl)-2-(((5-(tert-butyl)-4-chloro-2-hydroxyphenyl)amino) methyl)-1-methyl-1H-imidazole-5-carboxamide,
(4) N-(1-acryloylazetidin-3-yl)-2-(((5-(tert-butyl)-4-chloro-2-hydroxyphenyl)amino) methyl)-4-methylthiazole-5-carboxamide,
(5) N-(1-acryloylazetidin-3-yl)-2-(((5-(tert-butyl)-4-chloro-2-hydroxyphenyl)amino) methyl)-4-iodo-1-methyl-1H-imidazole-5-carboxamide,
(6) N-(1-acryloylazetidin-3-yl)-4-(((5-(tert-butyl)-4-chloro-2-hydroxyphenyl)amino) methyl)-N-methylthiazole-2-carboxamide,
(7) N-(1-acryloylazetidin-3-yl)-2-(((5-(tert-butyl)-4-chloro-2-hydroxyphenyl)amino) methyl)-1-ethyl-1H-imidazole-5-carboxamide,
(8) N-(1-acryloylazetidin-3-yl)-2-(((5-(tert-butyl)-4-chloro-2-hydroxyphenyl)amino) methyl)-1-(2-methoxyethyl)-1H-imidazole-5-carboxamide,
(9) N-(1-acryloylazetidin-3-yl)-2-(((5-(tert-butyl)-4-chloro-2-hydroxyphenyl)amino) methyl)-1-(2-(dimethylamino)ethyl)-1H-imidazole-5-carboxamide,
(10) N-(1-acryloylazetidin-3-yl)-2-(((5-(tert-butyl)-4-chloro-2-hydroxyphenyl)amino) methyl)-1,4-dimethyl-1H-imidazole-5-carboxamide,
(11) N-(1-acryloylazetidin-3-yl)-1-benzyl-2-(((5-(tert-butyl)-4-chloro-2-hydroxyphenyl)amino) methyl)-4-methyl-1H-imidazole-5-carboxamide,

(12) N-(1-acryloylazetidin-3-yl)-2-(((5-(tert-butyl)-4-chloro-2-hydroxyphenyl)amino) methyl)-1-ethyl-4-methyl-1H-imidazole-5-carboxamide,

(13) N-(1-acryloylazetidin-3-yl)-2-(((5-(tert-butyl)-4-chloro-2-hydroxyphenyl)amino) methyl)-1-isopropyl-4-methyl-1H-imidazole-5-carboxamide,

(14) N-(1-acryloylazetidin-3-yl)-1-butyl-2-(((5-(tert-butyl)-4-chloro-2-hydroxyphenyl)amino) methyl)-4-methyl-1H-imidazole-5-carboxamide,

(15) N-(1-acryloylazetidin-3-yl)-2-(((5-(tert-butyl)-4-chloro-2-hydroxyphenyl)amino) methyl)-4-methyl-1-propyl-1H-imidazole-5-carboxamide,

(16) N-(1-acryloylazetidin-3-yl)-2-(((5-(tert-butyl)-4-chloro-2-hydroxyphenyl)amino) methyl)-1-cyclopentyl-4-methyl-1H-imidazole-5-carboxamide,

(17) N-(1-acryloylazetidin-3-yl)-2-(((5-(tert-butyl)-4-chloro-2-hydroxyphenyl)amino) methyl)-4-methyl-1-(pyridin-3-ylmethyl)-1H-imidazole-5-carboxamide,

(18) N-(1-acryloylazetidin-3-yl)-2-(((5-(tert-butyl)-2-hydroxy-4-methylphenyl)amino)methyl)-1,4-dimethyl-1H-imidazole-5-carboxamide,

(19) N-(1-acryloylazetidin-3-yl)-2-(((6-(tert-butyl)-5-chloro-3-hydroxypyridin-2-yl)amino)methyl)-1-methyl-1H-imidazole-5-carboxamide,

(20) (E)-2-(((5-(tert-butyl)-4-chloro-2-hydroxyphenyl)amino)methyl)-N-(1-(4-(dimethylamino) but-2-enoyl azetidin-3-yl)-1-methyl-1H-imidazole-5-carboxamide,

(21) N-(1-acryloylazetidin-3-yl)-2-(5-(tert-butyl)-4-chloro-2-hydroxybenzyl)-1,4-dimethyl-1H-imidazole-5-carboxamide,

(22) N-(1-acryloylazetidin-3-yl)-1-(5-(tert-butyl)-4-chloro-2-hydroxybenzyl)-3,5-dimethyl-1H-pyrazole-4-carboxamide, and

(23) N-(1-acryloylazetidin-3-yl)-2-(5-(tert-butyl)-4-chloro-2-hydroxybenzyl)-1-methyl-1H-imidazole-5-carboxamide.

12. A pharmaceutical composition comprising the compound or a salt thereof according to claim 1, and a pharmaceutically acceptable carrier.

13. An antitumor agent comprising the compound or a salt thereof according to claim 1 as an active ingredient.

14. An antitumor agent comprising the compound or a salt thereof according to claim 1, and one or more other antitumor agents, as active ingredients.

15. A method of treating a tumor comprising administering an antitumor agent to a subject in need thereof in combination with one or more other antitumor agents, the antitumor agent comprising the compound or a salt thereof according to claim 1 as an active ingredient.

16. A KRAS G12C mutant inhibitor comprising the compound or a salt thereof according to claim 11 as an active ingredient.

17. A pharmaceutical composition comprising the compound or a salt thereof according to claim 11, and a pharmaceutically acceptable carrier.

18. An antitumor agent comprising the compound or a salt thereof according to claim 11 as an active ingredient.

19. An antitumor agent comprising the compound or a salt thereof according to claim 11, and one or more other antitumor agents, as active ingredients.

20. A method of treating a tumor comprising administering an antitumor agent to a subject in need thereof in combination with one or more other antitumor agents, the antitumor agent comprising the compound or a salt thereof according to claim 11 as an active ingredient.

* * * * *